US011906810B2

(12) United States Patent
Wang et al.

(10) Patent No.: US 11,906,810 B2
(45) Date of Patent: Feb. 20, 2024

(54) OPTICAL ELEMENT DRIVING MECHANISM

(71) Applicant: TDK TAIWAN CORP., Taoyuan (TW)

(72) Inventors: Ying-Jen Wang, Taoyuan (TW); Ya-Hsiu Wu, Taoyuan (TW); Chen-Chi Kuo, Taoyuan (TW); Chao-Chang Hu, Taoyuan (TW); Yi-Ho Chen, Taoyuan (TW); Che-Wei Chang, Taoyuan (TW); Ko-Lun Chao, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 379 days.

(21) Appl. No.: 17/193,505

(22) Filed: Mar. 5, 2021

(65) Prior Publication Data

US 2021/0278624 A1    Sep. 9, 2021

Related U.S. Application Data

(60) Provisional application No. 63/056,183, filed on Jul. 24, 2020, provisional application No. 63/050,503, (Continued)

(51) Int. Cl.
   *G02B 7/09*      (2021.01)
   *G01B 7/00*      (2006.01)
   *G02B 27/64*     (2006.01)

(52) U.S. Cl.
   CPC .............. *G02B 7/09* (2013.01); *G01B 7/003* (2013.01); *G02B 27/646* (2013.01)

(58) Field of Classification Search
   None
   See application file for complete search history.

(56) References Cited

U.S. PATENT DOCUMENTS

2006/0064884 A1    3/2006  Seo
2010/0165131 A1    7/2010  Makimoto et al.
(Continued)

FOREIGN PATENT DOCUMENTS

EP    2469333 A1    6/2012
EP    2921892 A2    9/2015
(Continued)

OTHER PUBLICATIONS

Search Report issued in corresponding EP application No. 21161023.3 dated Jul. 26, 2021 (14 pages).
(Continued)

*Primary Examiner* — Stephone B Allen
*Assistant Examiner* — Tamara Y. Washington
(74) *Attorney, Agent, or Firm* — MUNCY, GEISSLER, OLDS & LOWE, PC

(57) ABSTRACT

An optical element driving mechanism is provided. The optical element driving mechanism is disposed on an electronic apparatus. The optical element driving mechanism includes a first movable portion, a fixed portion, a first driving assembly, a circuit assembly, and a first position sensing assembly. The first movable portion is used for connecting to a first optical element. The first optical element is used for corresponding to light. The first movable portion is movable relative to the fixed portion. The first driving assembly is used for driving the first movable portion to move relative to the fixed portion. The circuit assembly is used for electrically connected to the electronic apparatus. The first position sensing assembly is used for detecting the movement of the first movable portion relative to the fixed portion.

19 Claims, 142 Drawing Sheets

Related U.S. Application Data filed on Jul. 10, 2020, provisional application No. 63/041,459, filed on Jun. 19, 2020, provisional application No. 63/017,313, filed on Apr. 29, 2020, provisional application No. 63/000,604, filed on Mar. 27, 2020, provisional application No. 62/986,039, filed on Mar. 6, 2020.

(56) References Cited

U.S. PATENT DOCUMENTS

| | | | |
|---|---|---|---|
| 2017/0017056 A1* | 1/2017 | Park | H02K 41/0356 |
| 2018/0210163 A1* | 7/2018 | Jung | H04N 23/687 |
| 2019/0141248 A1 | 5/2019 | Hubert et al. | |
| 2022/0236516 A1* | 7/2022 | Suzuki | G03B 13/36 |

FOREIGN PATENT DOCUMENTS

| | | | |
|---|---|---|---|
| JP | 2008122532 A | 5/2008 | |
| JP | 2012177753 A | 9/2012 | |

OTHER PUBLICATIONS

European Office Action dated Aug. 11, 2023 for correspondince Application No. Application No. 21161023.3 in Europe.

\* cited by examiner

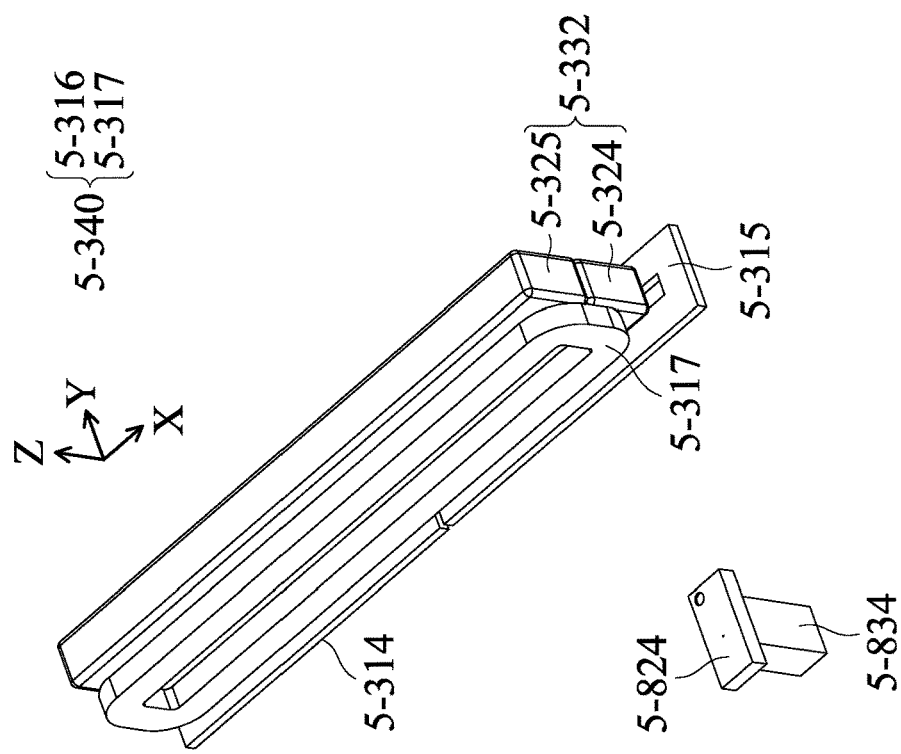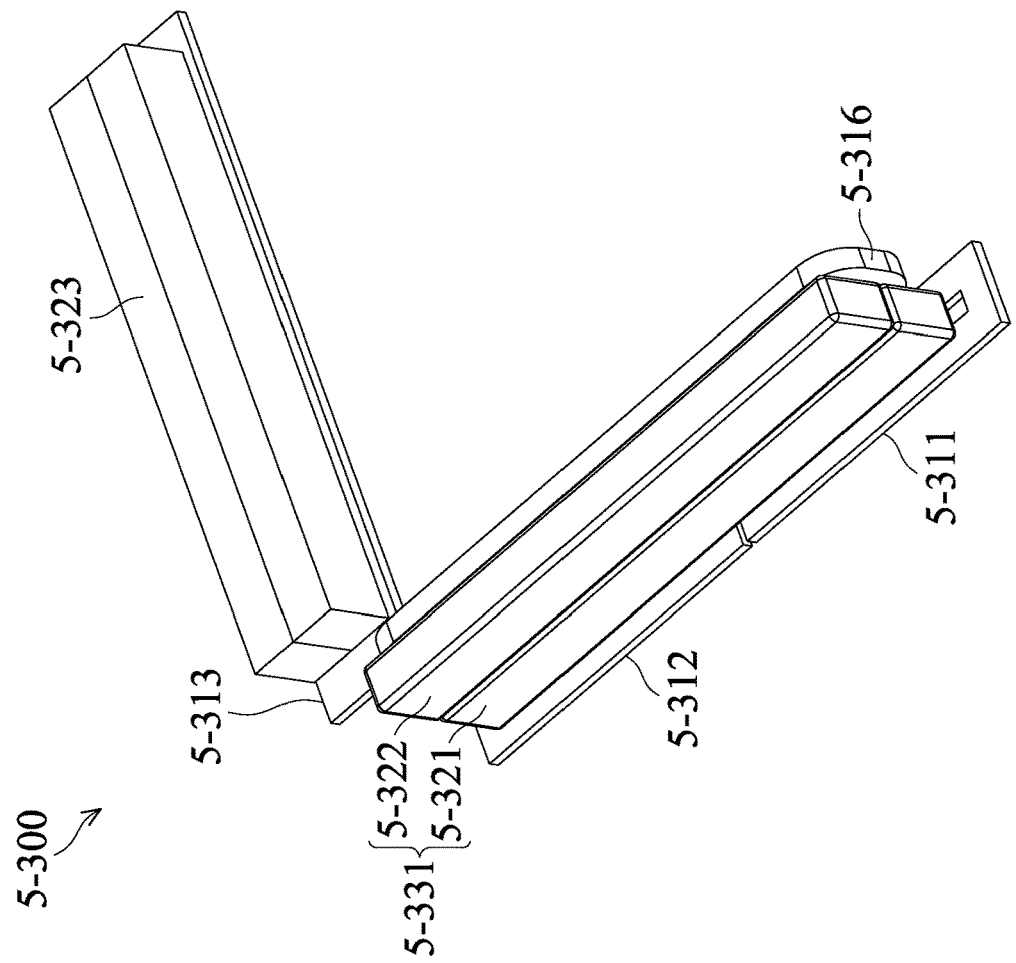
FIG. 38A

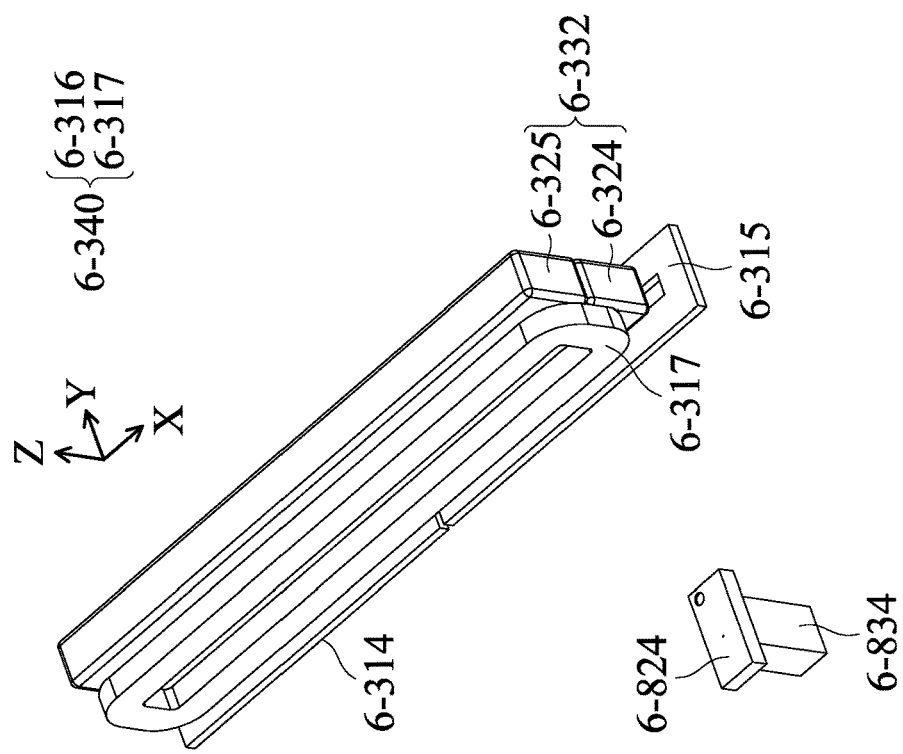
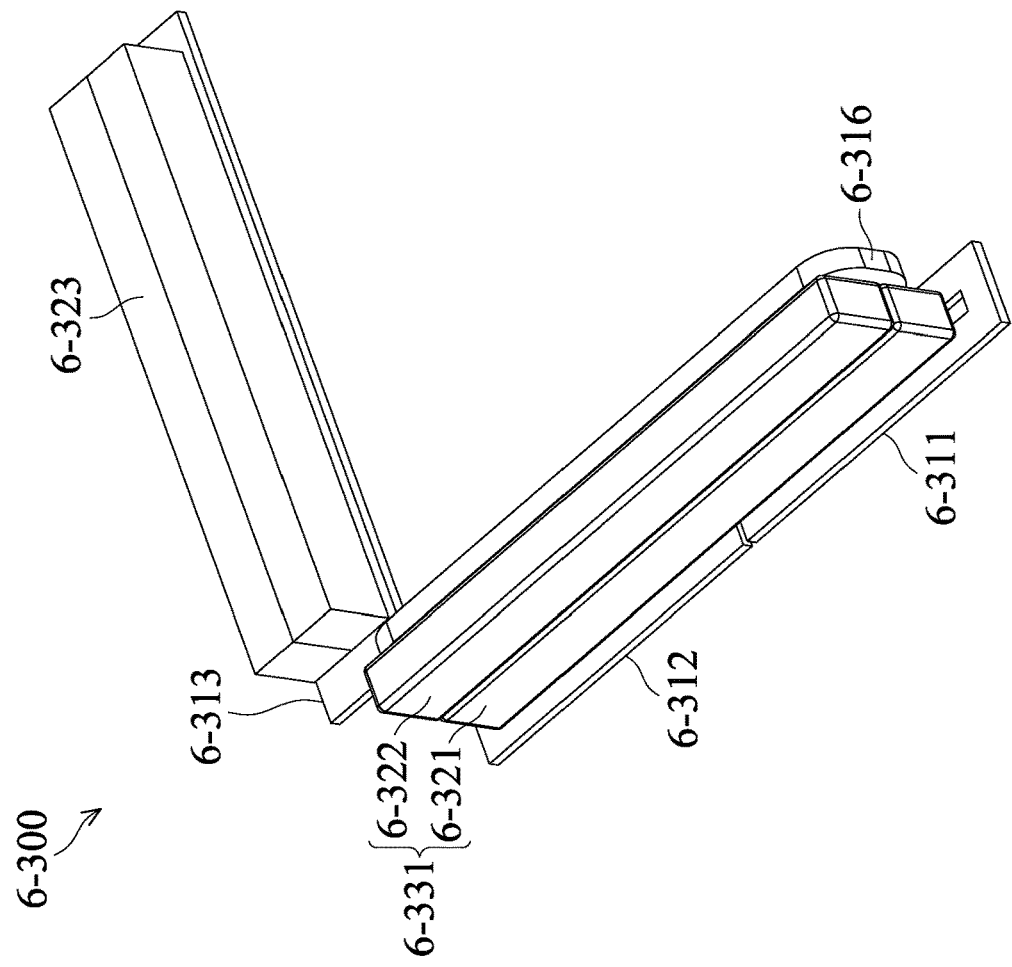
FIG. 45A

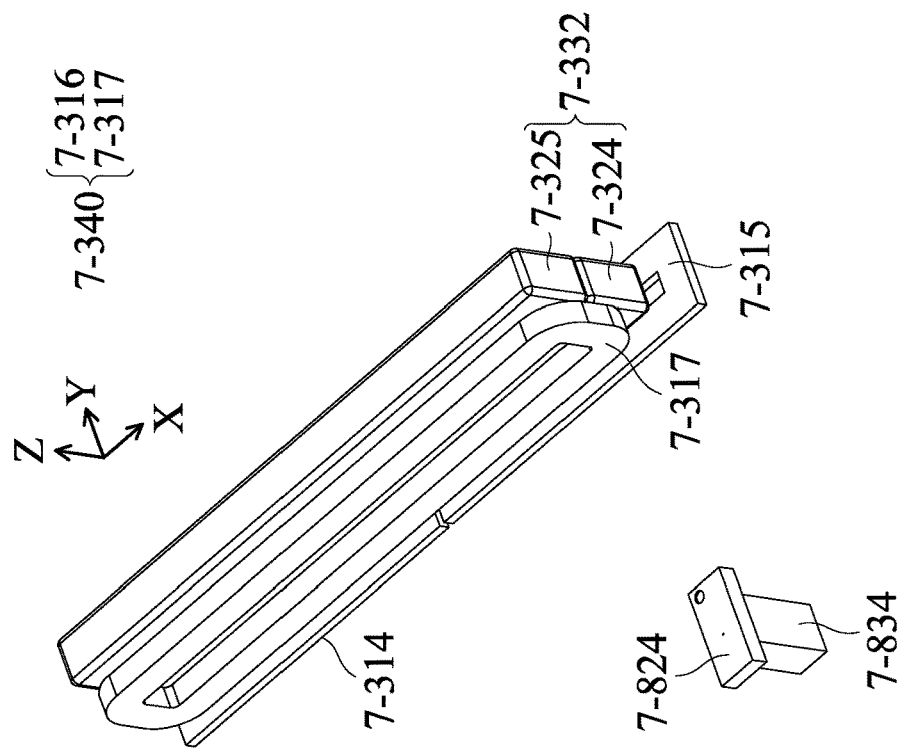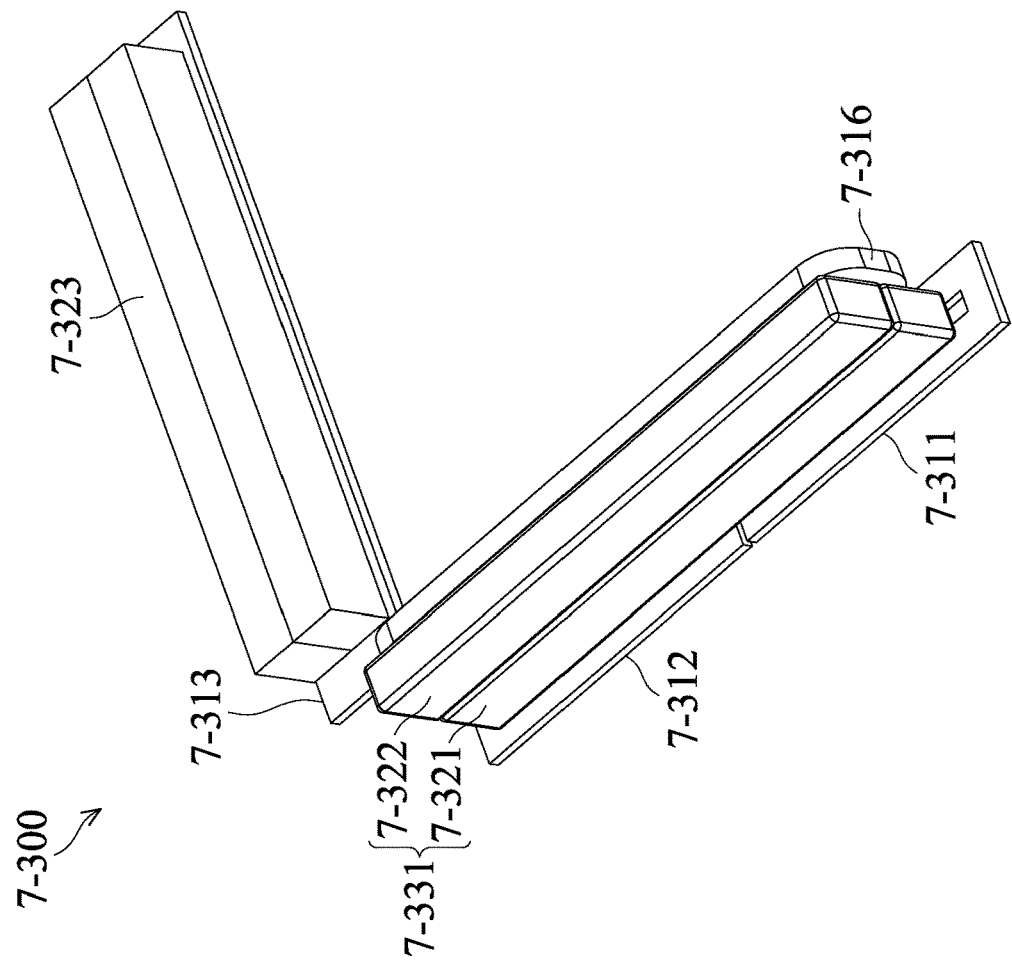
FIG. 52A

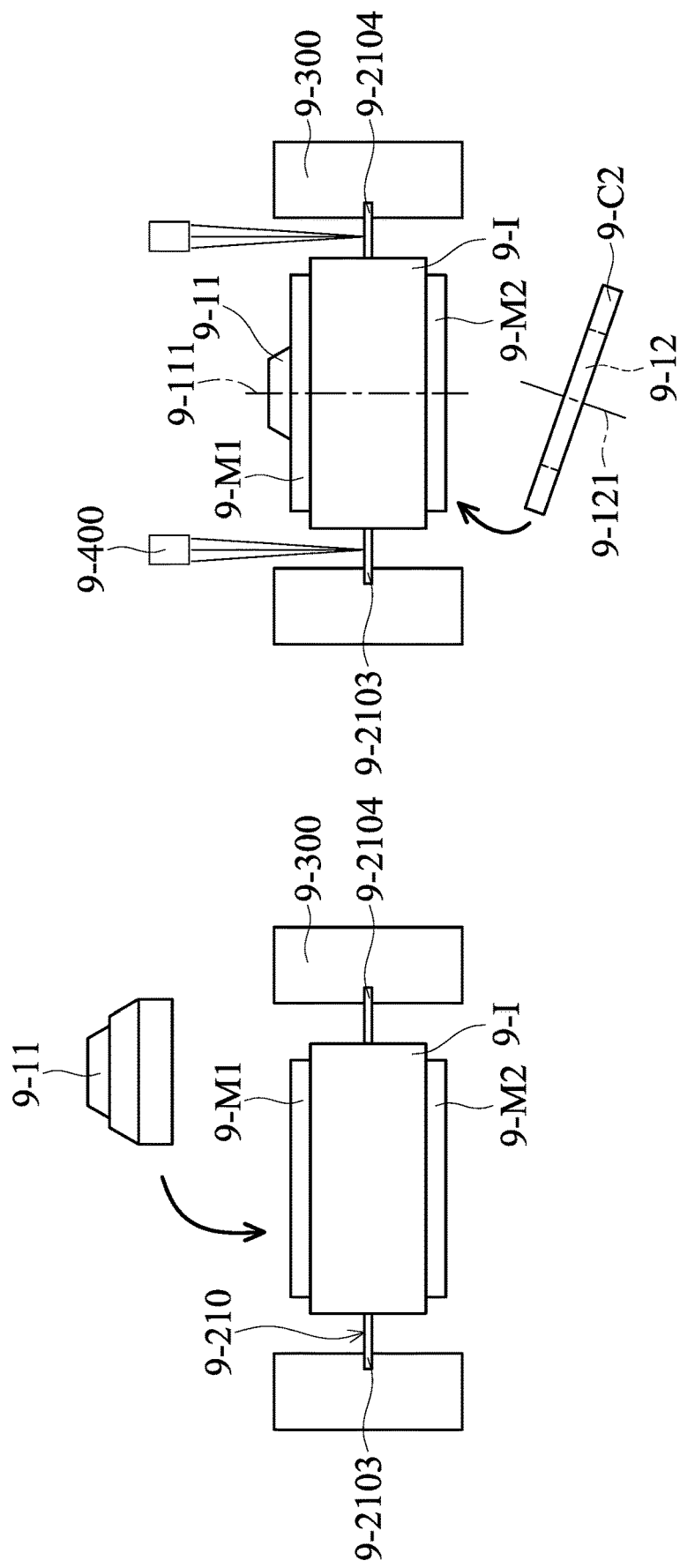

OPTICAL ELEMENT DRIVING MECHANISM

CROSS REFERENCE TO RELATED APPLICATIONS

This application claims the benefit of U.S. Provisional Application No. 62/986,039, filed on Mar. 6, 2020, No. 63/000,604, filed on Mar. 27, 2020, No. 63/017,313, filed on Apr. 29, 2020, No. 63/041,459, filed on Jun. 19, 2020, No. 63/050,503, filed on Jul. 10, 2020, and No. 63/056,183, filed on Jul. 24, 2020, the entirety of which are incorporated by reference herein.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided in some embodiments of the present disclosure. The optical element driving mechanism is disposed on an electronic apparatus. The optical element driving mechanism includes a first movable portion, a fixed portion, a first driving assembly, a circuit assembly, and a first position sensing assembly. The first movable portion is used for connecting to a first optical element. The first optical element is used for corresponding to light. The first movable portion is movable relative to the fixed portion. The first driving assembly is used for driving the first movable portion to move relative to the fixed portion. The circuit assembly is used for electrically connected to the electronic apparatus. The first position sensing assembly is used for detecting the movement of the first movable portion relative to the fixed portion.

In some embodiments, the first positon sensing assembly includes: a first magnetic sensing unit, including a first reference magnetic unit and a first magnetic sensing unit, a second magnetic sensing unit, including a second reference magnetic unit and a second magnetic sensing unit, and a third magnetic sensing unit, including a third reference magnetic unit and a third magnetic sensing unit; wherein: the fixed portion includes a main axis passing through a reference point of the movable portion. The first reference magnetic unit includes a first north pole and a first south pole, the first north pole and the first south pole are arranged in a first direction when viewed along the main axis. The second reference magnetic unit includes a second north pole and a second south pole, the second north pole and the second south pole are arranged in a second direction when viewed along the main axis. The third reference magnetic unit includes a third north pole and a third south pole, the third north pole and the third south pole are arranged in a third direction when viewed along the main axis, at least one of the first direction, the second direction, and the third direction is different from other two of the first direction, the second direction, and the third direction.

In some embodiments, at least two of the first direction, the second direction, and the third direction are parallel, at least two of the first direction, the second direction, and the third direction are perpendicular. When viewed along the main axis, at least a portion of the first magnetic sensing unit overlaps the first reference magnetic unit. The second magnetic sensing unit is used for detecting the magnetic field strength in a direction that is parallel to the main axis, at least a portion of the second magnetic sensing unit overlaps the second reference magnetic unit when viewed along the main axis. The third magnetic sensing unit is used for detecting the magnetic field strength in a direction that is parallel to the main axis, at least a portion of the third magnetic sensing unit overlaps the third reference magnetic unit when viewed along the main axis.

In some embodiments, when viewed along the main axis, the first reference magnetic unit is strip-shaped and extends in a fourth direction. When viewed along the main axis, the second reference magnetic unit is strip-shaped and extends in a fifth direction. When viewed along the main axis, the third reference magnetic unit is strip-shaped and extends in a sixth direction, at least one of the fourth direction, the fifth direction, and the sixth direction is different from other two of the fourth direction, the fifth direction, and the sixth direction, at least two of the fourth direction, the fifth direction, and the sixth direction are parallel. The first direction and the fourth direction are not parallel.

In some embodiments, the fourth direction is perpendicular to the first direction. When viewed along the main axis, the first magnetic detecting unit is strip-shaped and extends in a seventh direction. When viewed along the main axis, the second magnetic detecting unit is strip-shaped and extends in an eighth direction. When viewed along the main axis, the third magnetic detecting unit is strip-shaped and extends in a ninth direction, at least one of the seventh direction, the eighth direction, and the ninth direction is different from other two of the seventh direction, the eighth direction, and the ninth direction, at least two of the seventh direction, the eighth direction, and the ninth direction are parallel. The seventh direction and the first direction are not parallel. The seventh direction and the first direction are not perpendicular. The seventh direction and the fourth direction are not parallel. The seventh direction and the fourth direction are not perpendicular.

In some embodiments, when viewed along the main axis, the fixed portion includes a first side, a second side, a third side, and a fourth side. The first side and the third side are parallel. The second side and the fourth side are parallel. The second side is between the first side and the third side. The first side and the second side extend in different directions. When viewed along the main axis, the first magnetic sensing unit is at a first corner that is formed by the first side and the fourth side. When viewed along the main axis, the second magnetic sensing unit is at a second corner that is formed by the first side and the second side. When viewed along the main axis, the third magnetic sensing unit is at a third corner that is formed by the second side and the third side.

In some embodiments, when viewed along the main axis, the first optical element does not overlap the first position sensing assembly; in a direction that is perpendicular to the main axis, at least a portion of the first optical element overlaps the first position sensing assembly. When viewed along the main axis, the first direction is not parallel to the first side. When viewed along the main axis, the first direction is not perpendicular to the first side. When viewed along the main axis, at least one of a connection of the first north pole and the first south pole, a connection of the second north pole and the second south pole, and a connection of the third north pole and the third south pole does pass through a center of the first optical element. The first position sensing assembly is used for detecting the movement of the first movable portion relative to the fixed portion in directions that are perpendicular to the main axis. The first position sensing assembly is used for detecting the rotation of the first movable portion relative to the fixed portion with a first rotation axis that is parallel to the main axis.

In some embodiments, when viewed along the main axis, two of the connection of the first north pole and the first south pole, the connection of the second north pole and the second south pole, and the connection of the third north pole and the third south pole pass through the center of the first optical element.

In some embodiments, when viewed along the main axis, at least three of the connection of the first north pole and the first south pole, the connection of the second north pole and the second south pole, and the connection of the third north pole and the third south pole pass through the center of the first optical element.

In some embodiments, the optical element driving mechanism further includes a second optical assembly, the second optical assembly includes: a second movable portion used for holding a second optical element, and a second driving assembly used for driving the second movable portion to move relative to the first movable portion; wherein: the second driving assembly is used for driving the second movable portion to move relative to the first movable portion along an optical axis of the first optical element, and the optical axis and the main axis are parallel. The second driving assembly is used for generating a driving force with the first reference magnetic unit to drive the second movable portion moving relative to the first movable portion.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 38A, FIG. 38B, FIG. 38C, FIG. 38D, and FIG. 38E are schematic views of some elements of the optical system.

FIG. 45A, FIG. 45B, FIG. 45C, FIG. 45D, and FIG. 45E are schematic views of some elements of the optical system.

FIG. 52A, FIG. 52B, FIG. 52C, FIG. 52D, and FIG. 52E are schematic views of some elements of the optical system.

FIG. 65 is a schematic view of the optical system in FIG. 63 in the first assembling step.

FIG. 66 is a schematic view of the optical system in FIG. 63 in the second assembling step.

DETAILED DESCRIPTION OF DISCLOSURE

Figure 1:
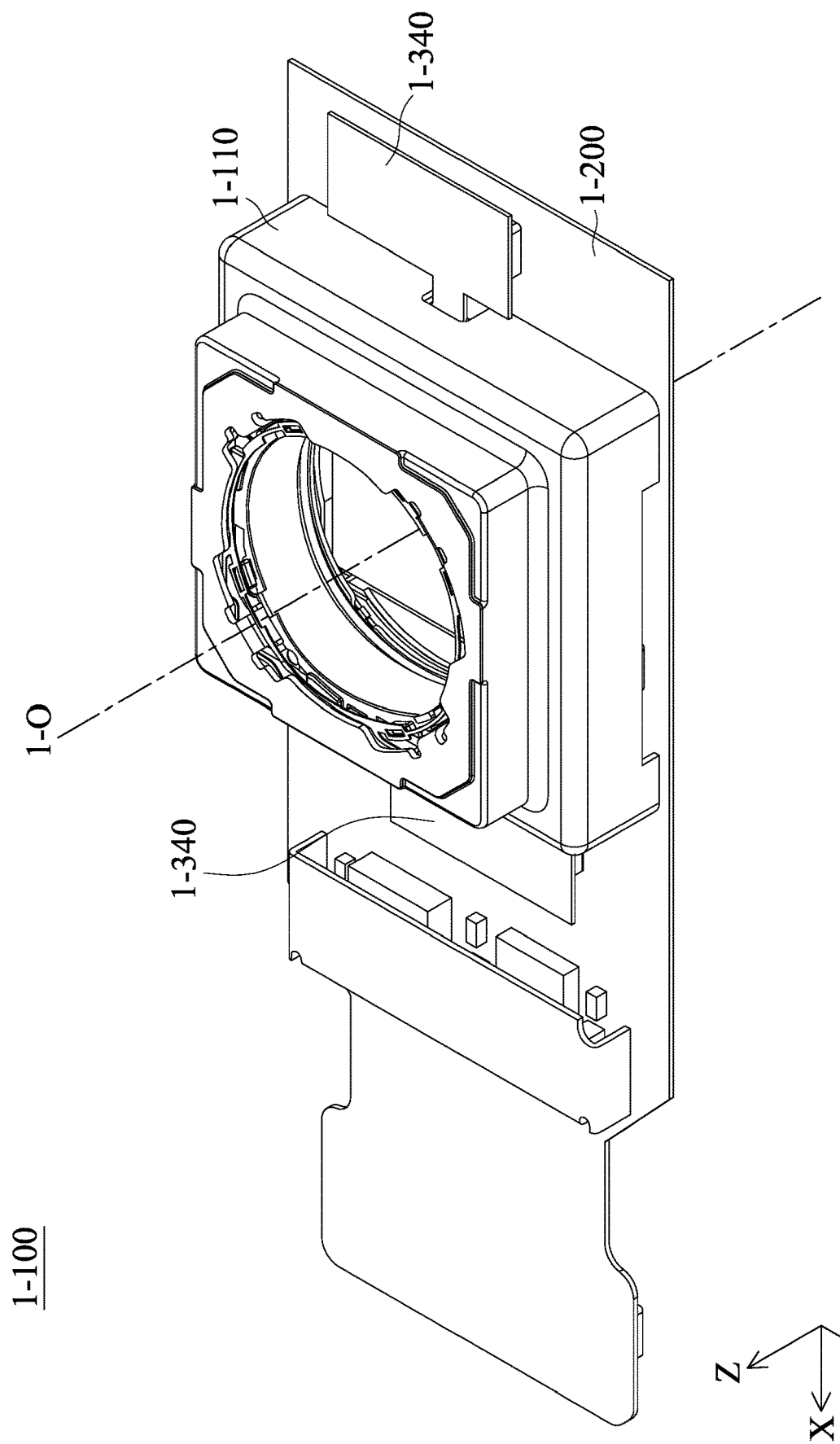
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
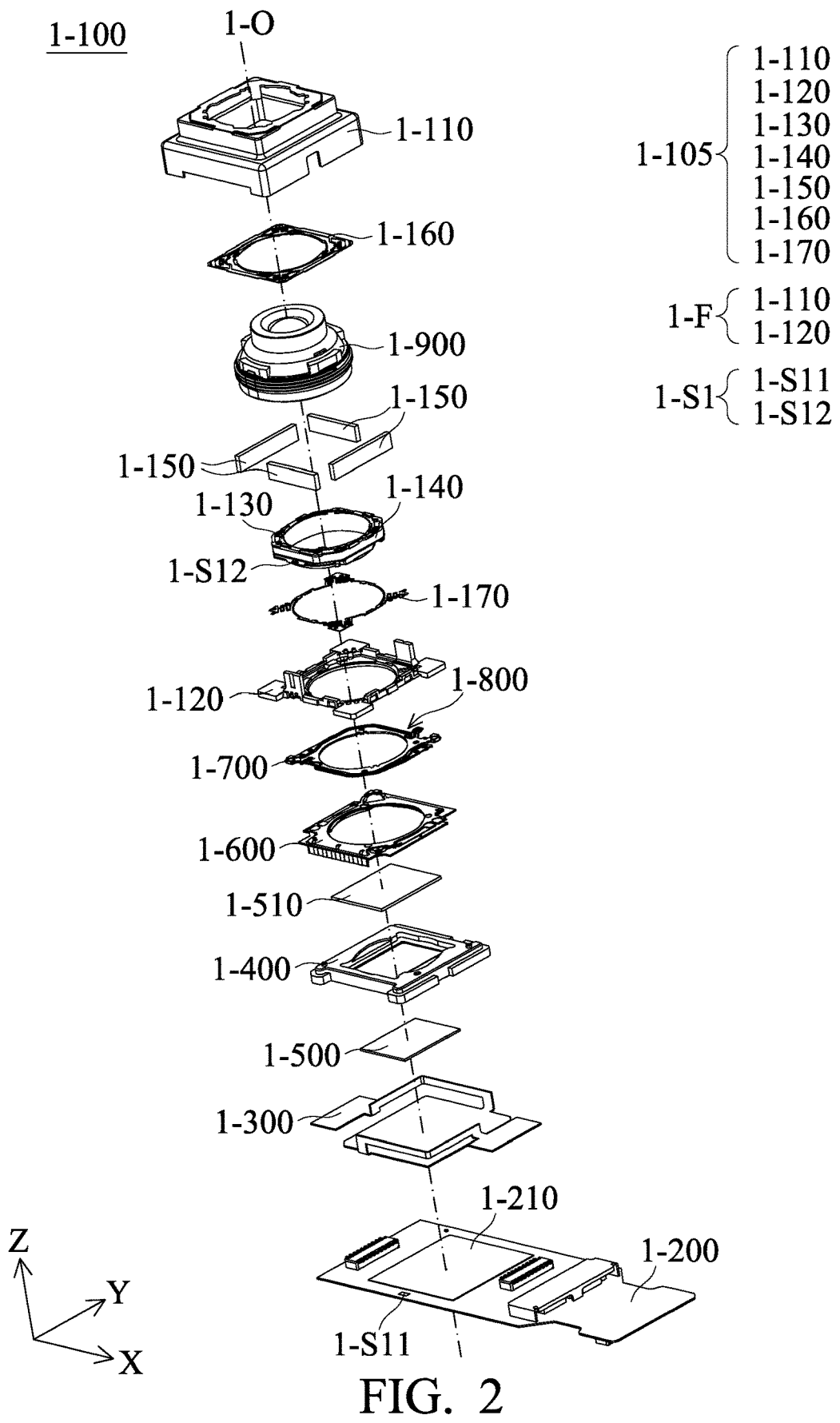
FIG. 2 is an exploded view of the optical element driving mechanism.
Figure 3:
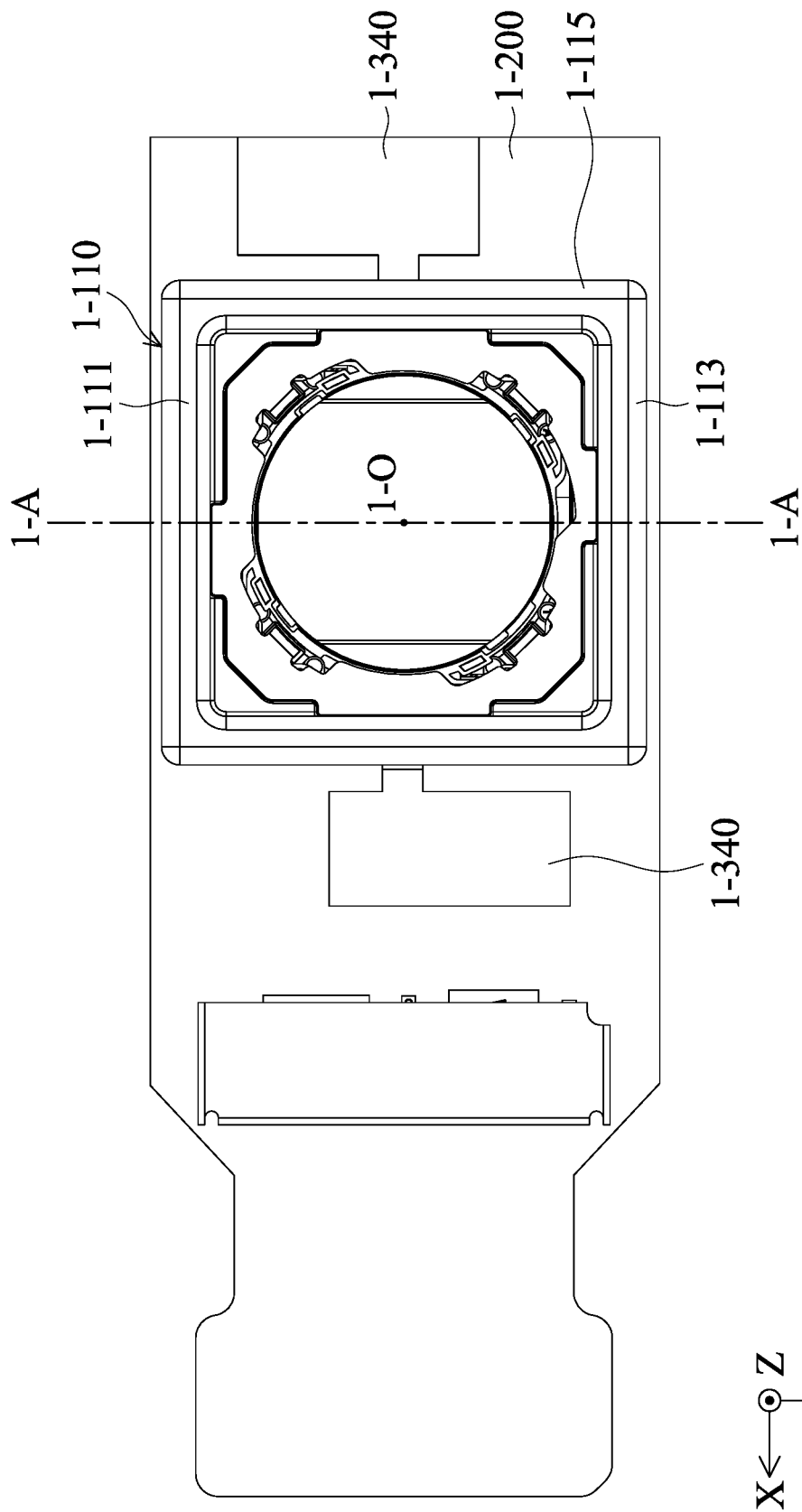
FIG. 3 is a top view of the optical element driving mechanism.
Figure 4A:
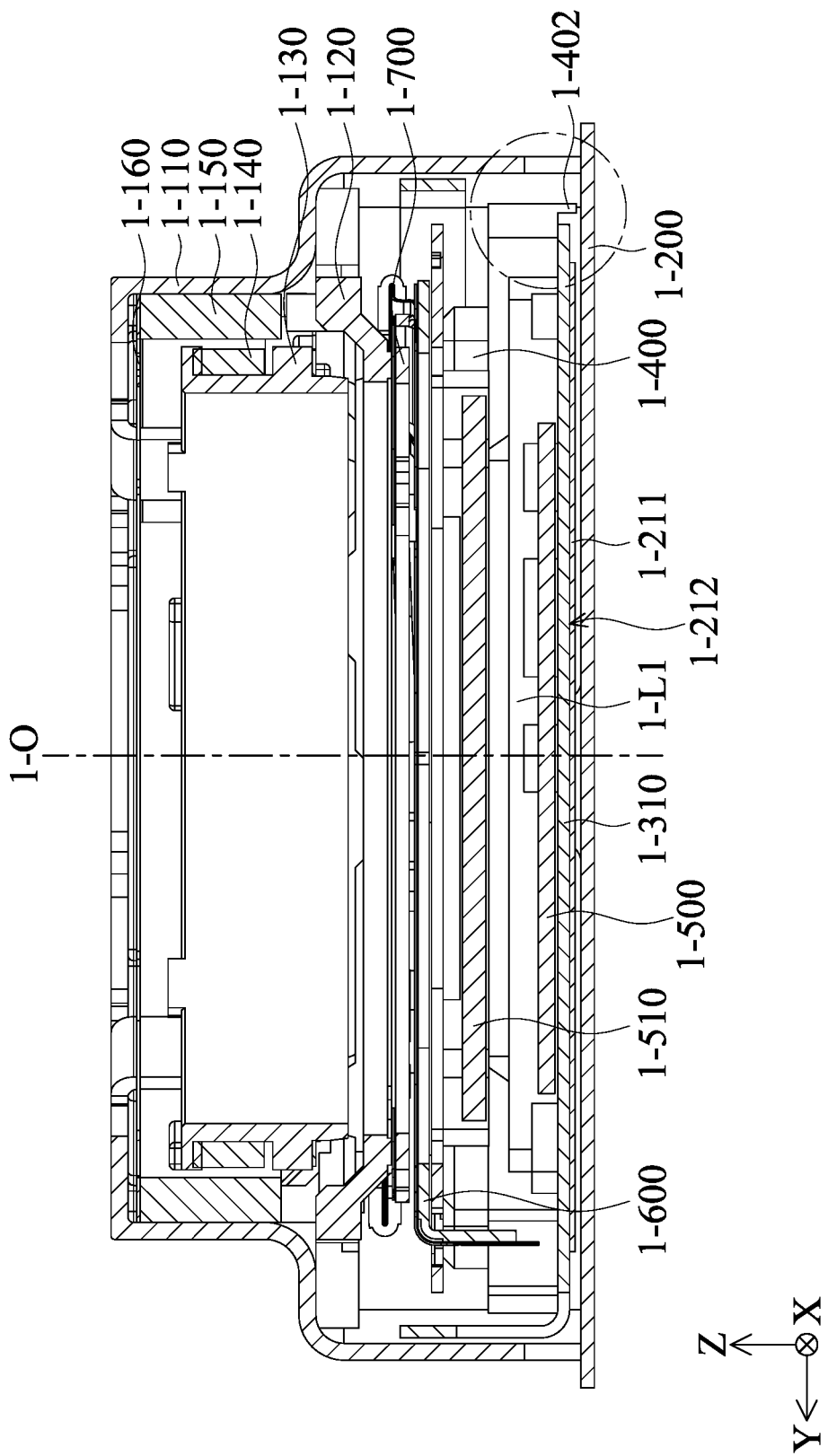
FIG. 4A is a cross-sectional view of the optical element driving mechanism illustrated along the line 1-A-1-A of FIG. 3.
Figure 5A:
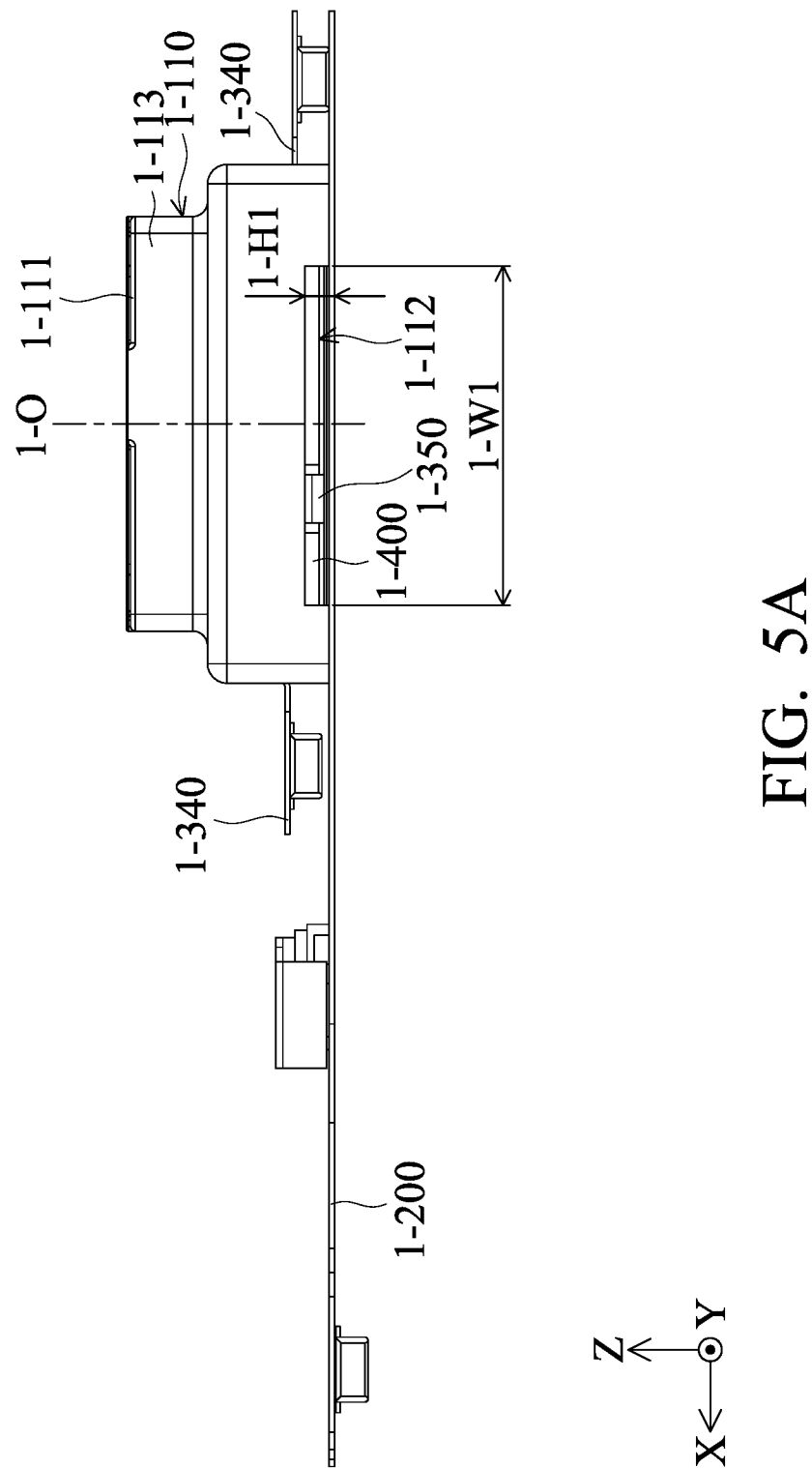
FIG. 5A is a side view of the optical element driving mechanism.
Figure 5B:
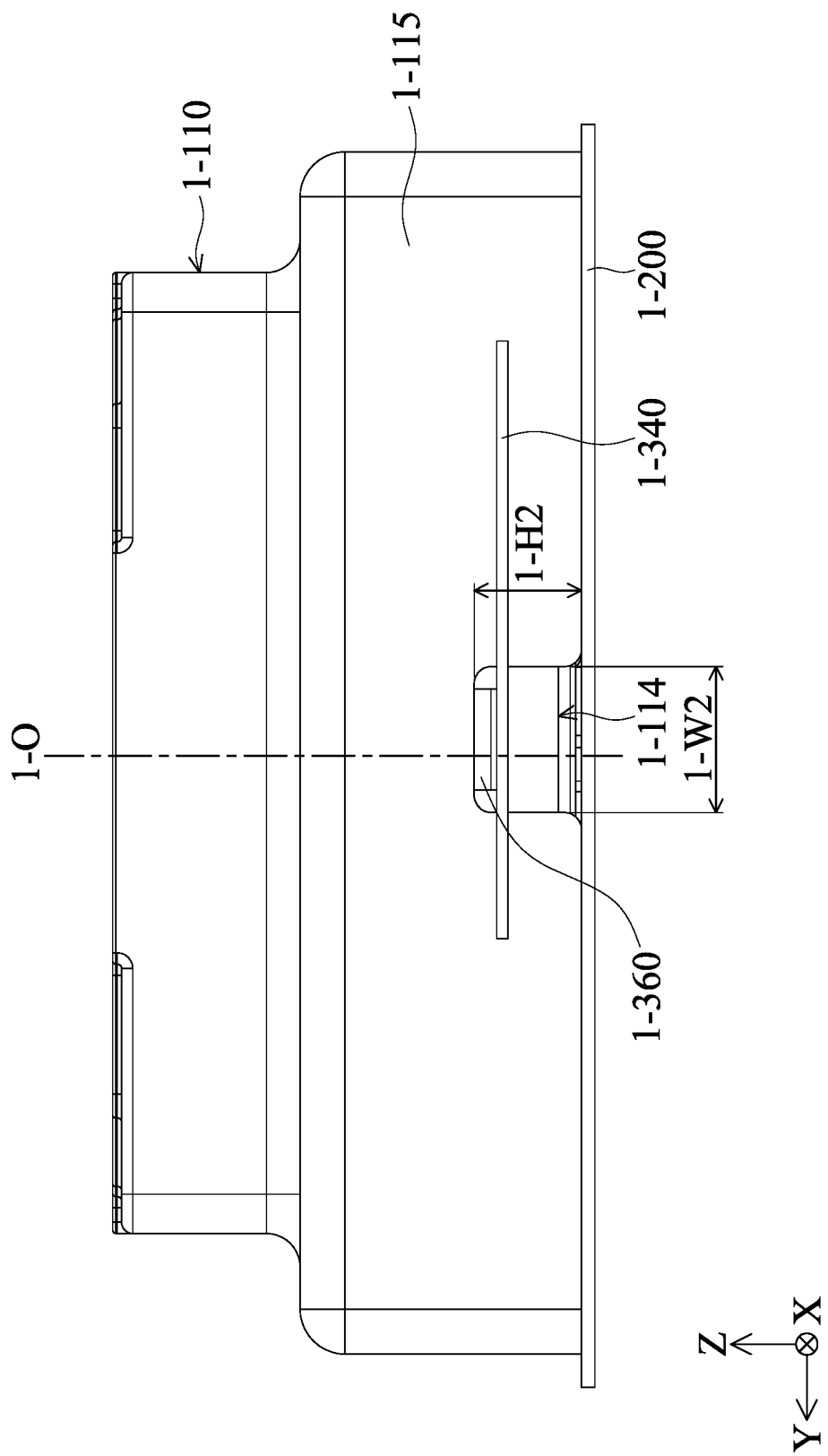
FIG. 5B is a side view of the optical element driving mechanism.

FIG. 1 is a schematic view of an optical element driving mechanism 1-100 in some embodiments of the present disclosure. FIG. 2 is an exploded view of the optical element driving mechanism 1-100. FIG. 3 is a top view of the optical element driving mechanism 1-100. FIG. 4A is a cross-sectional view of the optical element driving mechanism 1-100 illustrated along the line 1-A-1-A of FIG. 3. FIG. 5A is a side view of the optical element driving mechanism 1-100. FIG. 5B is a side view of the optical element driving mechanism 1-100.

In some embodiments, the optical element driving mechanism 1-100 mainly includes a case 1-110, a bottom 1-120, a first movable portion 1-130, a first coil 1-140, a first magnetic element 1-150, a first resilient element 1-160, a second resilient element 1-170, a third substrate 1-200, a heat dissipation assembly 1-210, a circuit assembly 1-300, a first movable portion 1-400, a first optical element 1-500, a light filter 1-510, a substrate 1-600, a resilient assembly 1-700, and a first driving assembly 1-800 arranged along a main axis 1-O. The optical element driving mechanism 1-100 may be disposed on an electronic apparatus, such as a cellphone, a tablet, or a notebook, but it is not limited thereto.

The optical element driving mechanism 1-100 may be used for driving the second optical element 1-900, or may be used for driving various optical elements, such as a lens, a mirror, a prism), a beam splitter, an aperture, a liquid lens, an image sensor, a camera module, or ranging module. It should be noted that the definition of the optical element is not limited to the element that is related to visible light, and other elements that relate to invisible light (e.g. infrared or ultraviolet) are also included in the present disclosure.

In some embodiments, the case 1-110, the bottom 1-120, the first movable portion 1-130, the first coil 1-140, the first magnetic element 1-150, the first resilient element 1-160, and the second resilient element 1-170 may be called as a second optical assembly 1-105 used for driving the second optical element 1-900 to move in the X, the Y, or the Z direction. Moreover, the case 1-110 and the bottom 1-120 may be affixed on the third substrate 1-200, so the case 1-110, the bottom 1-120, and the third substrate 1-200 may be called as a fixed portion 1-F. The first movable portion 1-130 and the first movable portion 1-400 may move relative to the fixed portion 1-F. In some embodiments, the first movable portion 1-130 may move relative to the first movable portion 1-400.

It should be noted that a case opening may be formed on the case 1-110, and a bottom opening may be formed on the bottom 1-120. The center of the case opening corresponds to the main axis 1-O, such as the main axis 1-O included by the fixed portion 1-F, wherein the case 1-110 and the bottom 1-120 may arrange along the main axis 1-O. The bottom opening corresponds to the first optical element 1-500, and the first optical element 1-500 may be disposed on the third substrate 1-200. Therefore, the first optical element 1-500 may correspond to the second optical element 1-900, such as may arrange along the main axis 1-O (in the Z direction), so the second optical element 1-900 may perform focus to the first optical element 1-500.

In some embodiments, the first movable portion 1-130 may have a through hole, and the second optical element 1-900 may be affixed in the through hole to move with the second optical element 1-900. The first movable portion 1-130 may be used for holding the second optical element 1-900. In some embodiments, the first magnetic element 1-150 and the first coil 1-140 may be called as a second driving assembly 1-D2 used for driving the first movable portion 1-130 to move relative to the fixed portion 1-F.

The first magnetic element 1-150 and the first coil 1-140 may be respectively disposed on the fixed portion 1-F and the first movable portion 1-130, or their positions may be interchanged, depending on design requirement. It should be noted that the interaction between the first coil 1-140 and the first magnetic element 1-150 may generate a magnetic force to move the second optical element 1-900 on the first movable portion 1-130 relative to the fixed portion 1-F, so auto focus (AF) or optical image stabilization (OIS) may be achieved. In some embodiments, the second driving assembly 1-D2 may include piezoelectric elements or shape memory alloy elements.

In this embodiment, the first movable portion 1-130 and the second optical element 1-900 disposed in the first movable portion 1-130 are movably disposed in the fixed portion 1-F. More specifically, the first movable portion 1-130 may be connected to the fixed portion 1-F and suspended in the fixed portion 1-F by the first resilient element 1-160 and the second resilient element 1-170 that are made by metal. When current is passed to the first coil 1-140, the first coil 1-140 will interact with the magnetic field generated by the first magnetic element 1-150 to create an electromagnetic force to move the first movable portion 1-130 and the second optical element 1-900 relative to the fixed portion 1-F along the main axis 1-O, so auto focus may be achieved.

In some embodiments, a first sensing assembly 1-1-S1 may be disposed in the optical element driving mechanism 1-100 to detect the position of the first movable portion 1-130 relative to the fixed portion 1-F. For example, the first sensing assembly 1-1-S1 may include a first sensing element 1-1-S11 and a second sensing element 1-1-S12. The first sensing element 1-1-S11 may be affixed on the fixed portion 1-F (e.g. the third substrate 1-200 or the bottom 1-120), and the second sensing element 1-1-S12 may be disposed on the first movable portion 1-130. Alternatively, the first sensing assembly 1-1-S1 may be disposed between the first substrate 1-310 and the first movable portion 1-400, depending on design requirement.

The first sensing element 1-1-S11 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The 1-S2 may include magnetic element, and the first sensing element 1-1-S11 may detect the magnetic field change caused by the second sensing element 1-1-S12 when the first movable portion 1-130 is moving, so the position of the first movable portion 1-130 relative to the fixed portion 1-F may be received. In some embodiments, other similar sensing assemblies may be provided to detect the position of the first movable portion 1-400 relative to the fixed portion 1-F, such as disposed between the first substrate 1-310 and the first movable portion 1-400.

For example, the sensing assembly may be used for detecting the movement of the first movable portion 1-400 or the first movable portion 1-130 relative to the fixed portion 1-F in different dimensions, such as a translational movement in the X direction (first dimension), a translational movement in the Y direction (second dimension), a translational movement in the Z direction (third dimension), a rotational movement with Z axis as its rotational axis (fourth dimension), but the present disclosure is not limited thereto.

The third substrate 1-200 may be, for example, a flexible printed circuit, and may be affixed on the bottom 1-120 by gluing. In this embodiment, the third substrate 1-200 is electrically connected to other electronic elements inside or outside the optical element driving mechanism 1-100. For example, electrical signal may be provided to the second driving assembly 1-D2 through the third substrate 1-200, so the movement of the first movable portion 1-130 in the X, the Y, or the Z direction may be controlled to achieve auto focus or optical image stabilization.

The heat dissipation assembly 1-210 may be disposed on the circuit assembly 1-300 and may have a first gap 1-L with the fixed portion 1-F (e.g. the third substrate 1-200) in the Z direction (the third direction) that is not zero. In other words, the heat dissipation assembly 1-210 may in direct contact with the circuit assembly 1-300, and may be separated by the third substrate 1-200. The material of the heat dissipation assembly 1-210 may include non-magnetic conductive materials to prevent magnetic interference. In some embodiments, the heat dissipation assembly 1-210 may include a first heat dissipation element 1-211 and a second heat dissipation element 1-212.

The first heat dissipation element 1-211 may be a metal plate (e.g. a steel plate), and the second heat dissipation element 1-212 may include metal, graphene, heat conduction adhesive, or ceramic. The second heat dissipation element 1-212 may be disposed between the first heat dissipation element 1-211 and the first substrate 1-310 of the circuit assembly 1-300 to fill the space between the first heat dissipation element 1-211 and the circuit assembly 1-300, so heat generated by the first optical element 1-500 may pass through the circuit assembly 1-300 and the second heat dissipation element 1-212 to the first heat dissipation element 1-211, and be dissipated by the first heat dissipation element 1-211. In some embodiments, the first heat dissipation element 1-211 may include fins (not shown) to dissipate the heat. Moreover, the thermal conductivity of the first heat dissipation element 1-211 may be higher than that of the second heat dissipation element 1-212.

In some embodiments, the circuit assembly 1-300 may be a flexible printed circuit that is affixed on the first movable portion 1-400 by glue. In this embodiment, the circuit assembly 1-300 is electrically connected to other electronic element or electronic apparatus inside or outside the optical element driving mechanism 1-100. For example, the electric signal of the electronic element may be transferred by the circuit assembly 1-300 to the first driving assembly 1-800 and the second optical assembly 1-105. In other words, the second optical assembly 1-105 and the first driving assembly 1-800 may be electrically connected to the electronic apparatus through the circuit assembly 1-300. Therefore, the movement of the first movable portion 1-400 in the X, the Y, or the Z direction may be controlled to achieve auto focus or optical image stabilization. In some embodiments, the circuit assembly 1-300 may be used for movably connect the first movable portion 1-400 and the fixed portion 1-F.

The first optical element 1-500 and the light filter 1-510 may be disposed on the first movable portion 1-400, such may be connected to the first movable portion 1-400. For example, the first optical element 1-500 and the light filter 1-510 may move with the first movable portion 1-400 relative to the fixed portion 1-F. the first optical element 1-500 may include a photoelectric converter, such as may be an optical sensor corresponding to the light passing through the second optical element 1-900 and used for converting the light to an electric signal, and then the electric signal may be provided to the electronic apparatus. Therefore, the first optical element 1-500 disposed on the first movable portion 1-400 may be moved by the first movable portion 1-400 to achieve optical image stabilization.

The light filter 1-510 may only allow light having specific wavelength, and remove light with other unwanted wavelengths. For example, the light filter 1-510 may remove infrared and allow visible to pass through, but it is not limited thereto. Therefore, the light detected by the first optical element 1-500 may be closer to that detected by eyes.

The substrate 1-600 may be disposed on the first movable portion 1-400, the resilient assembly 1-700 may be used for movably connecting the substrate 1-600 and the fixed portion 1-F (e.g. the bottom 1-120), and the first driving assembly 1-800 may drive the first movable portion 1-400 to move relative to the fixed portion 1-F or the first movable portion 1-130.

Figures 4B, 4C:
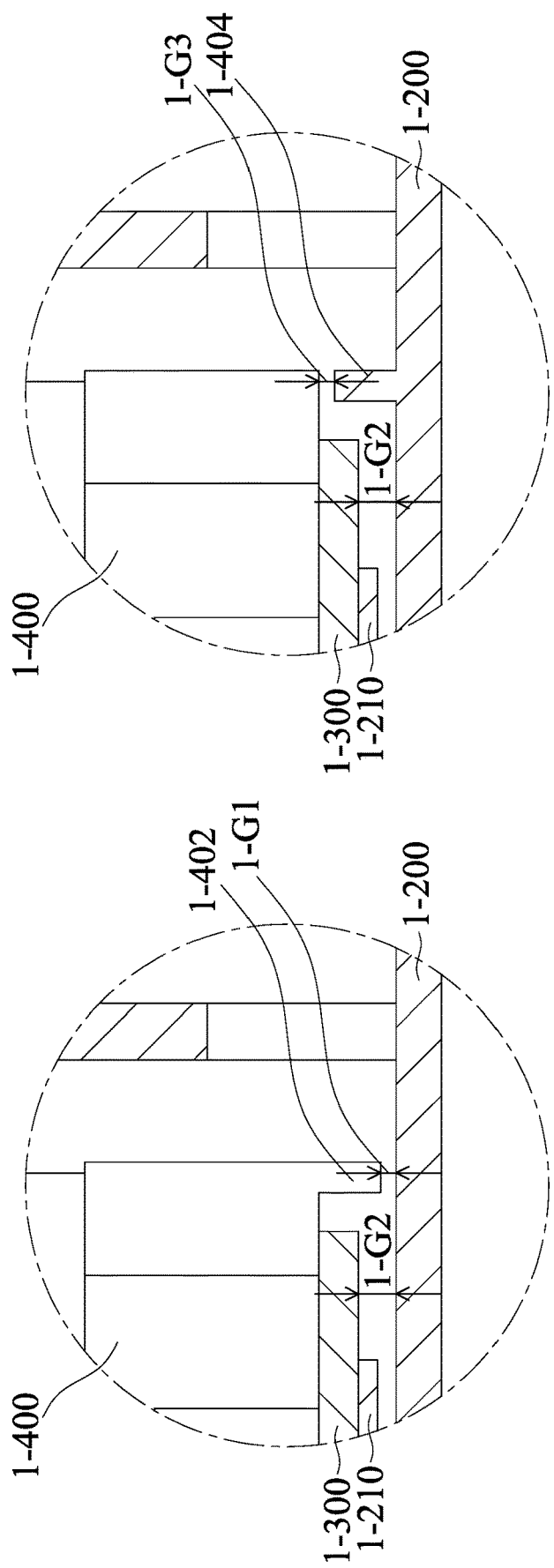
FIG. 4B is an enlarged view of FIG. 4A.
FIG. 4C is a schematic view of another embodiment of the present disclosure.

Moreover, as shown in FIG. 4B, the optical element driving mechanism 1-100 may include a stopping element 1-402 disposed between the first movable portion 1-400 and the fixed portion 1-F (e.g. the third substrate 1-200) to only allow the first movable portion 1-400 move in a first limit range in the third direction (e.g. the Z direction). It should be noted that when the first movable portion 1-400 is in any position of the first limit range, the heat dissipation assembly 1-210 and the first substrate 1-310 do not in contact with the fixed portion 1-F. Instead, the stopping element 1-402 will be in direct contact with the fixed portion 1-F to protect the heat dissipation assembly 1-210 and the first substrate 1-310. For example, in the third direction, the minimum distance 1-G1 between the stopping element 1-402 and the fixed portion 1-F (e.g. the third substrate 1-200) is less than the minimum distance 1-G2 between the circuit assembly 1-300 and the fixed portion 1-F.

However, the present disclosure is not limited thereto. For example, FIG. 4C is a schematic view of another embodiment of the present disclosure, wherein the stopping element 1-404 on the third substrate 1-200 is illustrated. The stopping element 1-404 may be used to limit the first movable portion 1-400 to only move in a third limit range in the third direction (e.g. the Z direction).

It should be noted that when the first movable portion 1-400 is at any position of the first limit range, the heat dissipation assembly 1-210 and the first substrate 1-310 do not in direct contact with the fixed portion 1-F. Instead, the stopping element 1-404 is in contact with the fixed portion 1-F to protect the heat dissipation assembly 1-210 and the first substrate 1-310. For example, in the third direction, the minimum distance 1-G3 between the stopping element 1-404 and the fixed portion 1-F (e.g. the third substrate 1-200) is less than the minimum distance 1-G4 between the circuit assembly 1-300 and the fixed portion 1-F in the third direction.

Figure 6:
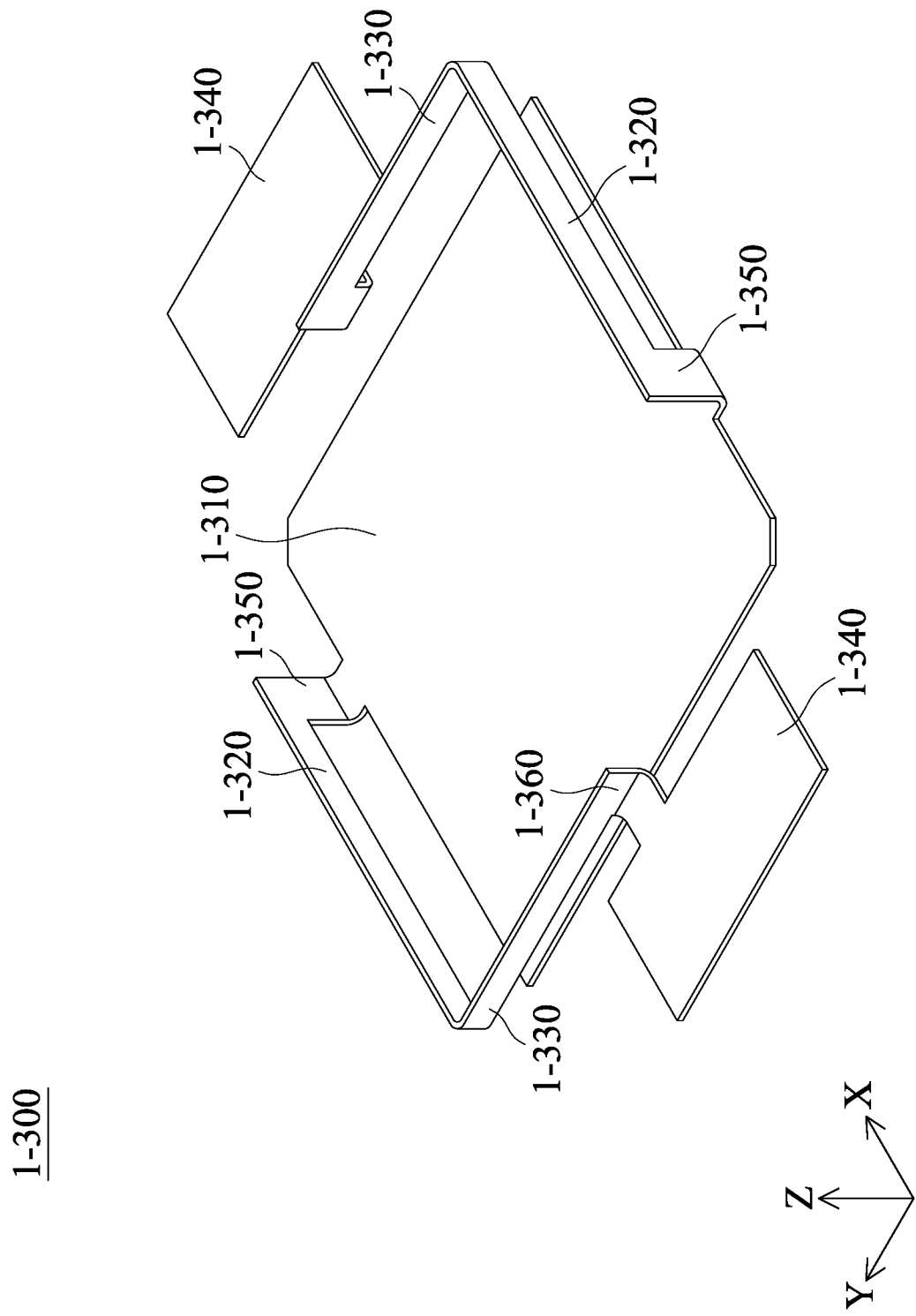
FIG. 6 is a schematic view of the circuit assembly.

FIG. 6 is a schematic view of the circuit assembly 1-300. As shown in FIG. 6, the circuit assembly 1-300 may include a first substrate 1-310, a first connecting portion 1-320, a second connecting portion 1-330, and a third connecting portion 1-340. The first connecting portion 1-320 may be connected to the first substrate 1-310 through a first transmission portion 1-350, the first connecting portion 1-320 may extend in the first direction (e.g. the X direction), and the first transmission portion 1-350 may extend in the Z direction. The second connecting portion 1-330 may be connected to the first connecting portion 1-320 and extending in the second direction (e.g. the Y direction). The third connecting portion 1-340 may be connected to the second connecting portion 1-330 through the second transmission portion 1-360.

It should be noted that the first direction and the second direction are different, such as may be perpendicular. Moreover, a normal direction of the first substrate 1-310 may extend in the third direction (the Z direction), and the third direction is different from the first and the second directions. The third connecting portion 1-340 may be plate-shaped, and the normal direction of the third connecting portion 1-340 may be different from the first direction and the second direction. The first transmission portion 1-350 and the second transmission portion 1-360 may extend in the third direction.

In some embodiments, the circuit assembly 1-300 may include a heat conductive element and a circuit element (not shown). The heat conductive element and the circuit element may include metal, and the heat conductive element and the circuit element are electrically isolated. The circuit element may be electrically connected to the electronic apparatus. For example, the heat conductive element may be disposed on the surface of the first connecting portion 1-320, the second connecting portion 1-330, and the third connecting portion 1-340, or the heat conductive element may be disposed in the first connecting portion 1-320, the second connecting portion 1-330, and the third connecting portion 1-340, depending on design requirement. The heat conductive element allows the first substrate 1-310 in direct contact with the first optical element 1-500 to dissipate the heat generated by the operation of the first optical element 1-500.

Refer to FIG. 3. In some embodiments, when viewed along the main axis 1-O, the case 1-110 is rectangular, and may include a top plate 1-111, a first sidewall 1-113 and a second sidewall 1-115 extending from the top plate 1-111. The first sidewall 1-113 may be adjacent to the second sidewall 1-115. Moreover, as shown in FIG. 5A and FIG. 5B, the first sidewall 1-113 may have a first opening 1-112, and the second sidewall 1-115 may have a second opening 1-114. The circuit assembly 1-300 may be connected to the electronic apparatus outside the optical element driving mechanism 1-100 through the second opening 1-114.

As shown in FIG. 5A, when viewed along the second direction (the Y direction), the first movable portion 1-400 may be exposed form the case 1-110 through the first opening 1-112, and the first transmission portion 1-350 of the circuit assembly 1-300 may be exposed from the case 1-110 of the first opening 1-112, but the first connecting portion 1-320 is not exposed from the case 1-110 by the first opening 1-112. Moreover, as shown in FIG. 5B, when viewed along the first direction (the X direction), the second transmission portion 1-360 may be exposed from the case 1-110 through the second opening 1-114, but the second connecting portion 1-330 is not exposed from the case 1-110 through the second opening 1-114, so the circuit assembly 1-300 may be protected.

The first opening 1-112 may have a height 1-H1 (e.g. the dimension in the Z direction) and a width 1-W1 (e.g. the dimension in the X direction), and the second opening 1-114 may have a height 1-H2 (e.g. the dimension in the Z direction) and a width 1-W2 (e.g. the dimension in the X direction). The height 1-H1 of the first opening 1-112 is less than the height 1-H2 of the second opening 1-114, and the height 1-H1 of the first opening 1-112 is greater than the width 1-W2 of the second opening 1-114. Therefore, circuit with different width may pass into the case 1-110.

Moreover, as shown in FIG. 4A, when viewed along the first direction (e.g. the X direction), the first substrate 1-310 does not overlap the heat dissipation assembly 1-210, and the first substrate 1-310 and the first movable portion 1-400 are disposed on opposite sides of the heat dissipation assembly 1-210. Moreover, the size of the heat dissipation assembly 1-210 is less than that of the first substrate 1-310. In other words, at least a portion of the first substrate 1-310 is exposed from the heat dissipation assembly 1-210 in the third direction (the Z direction).

Figure 7A:
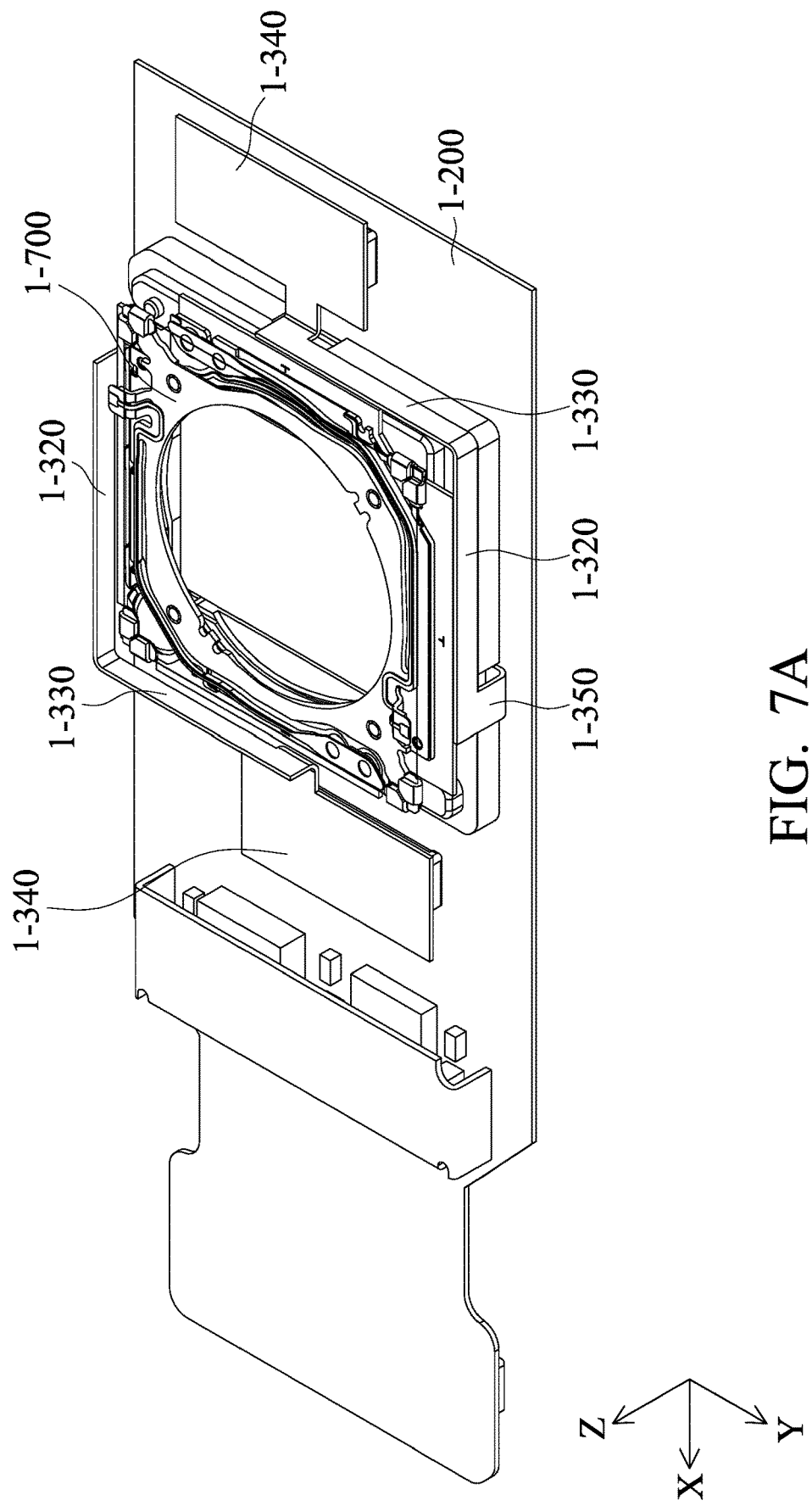
FIG. 7A is a schematic view of some elements of the optical element driving mechanism.
Figure 7B:
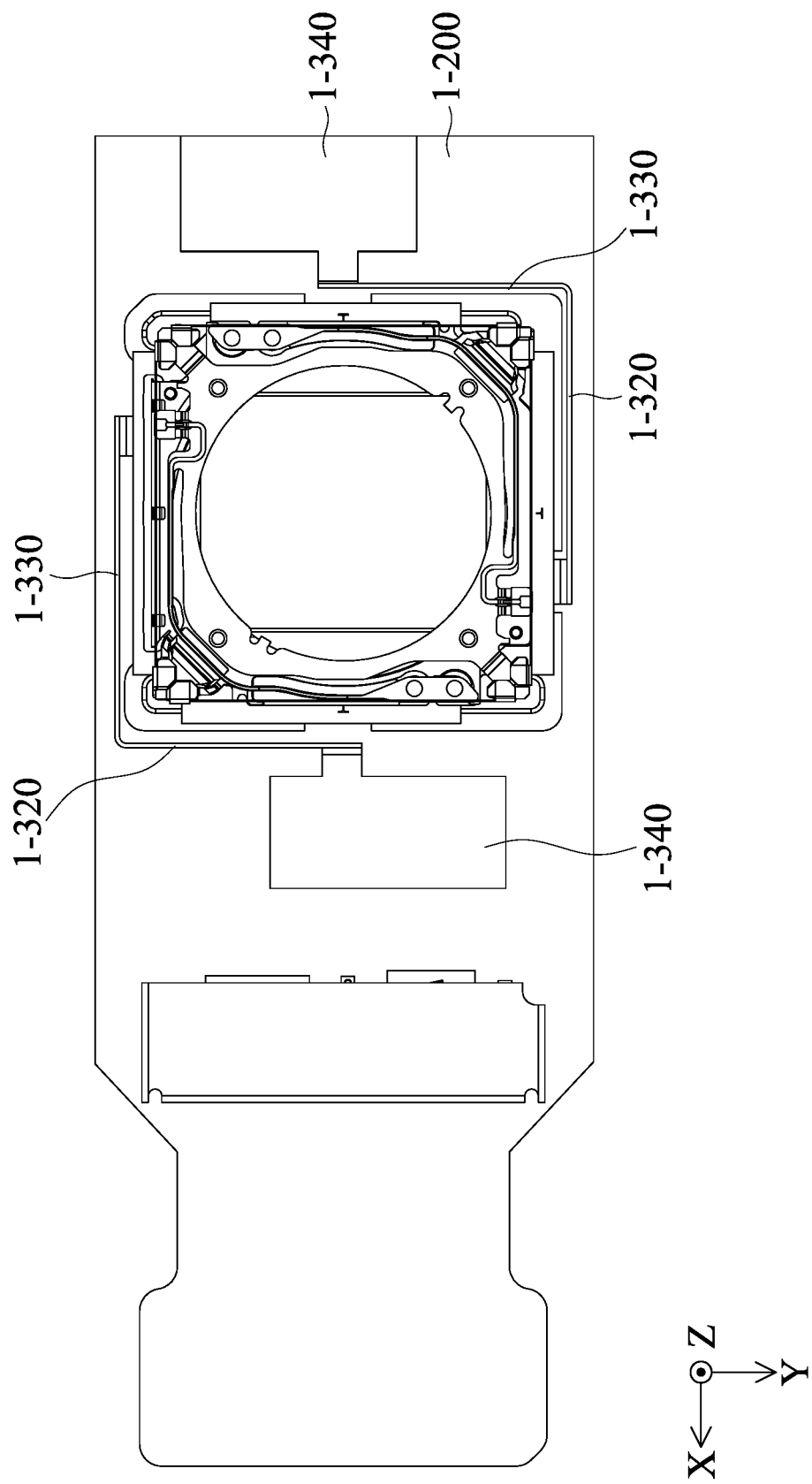
FIG. 7B is a schematic view of some elements of the optical element driving mechanism.
Figure 7C:
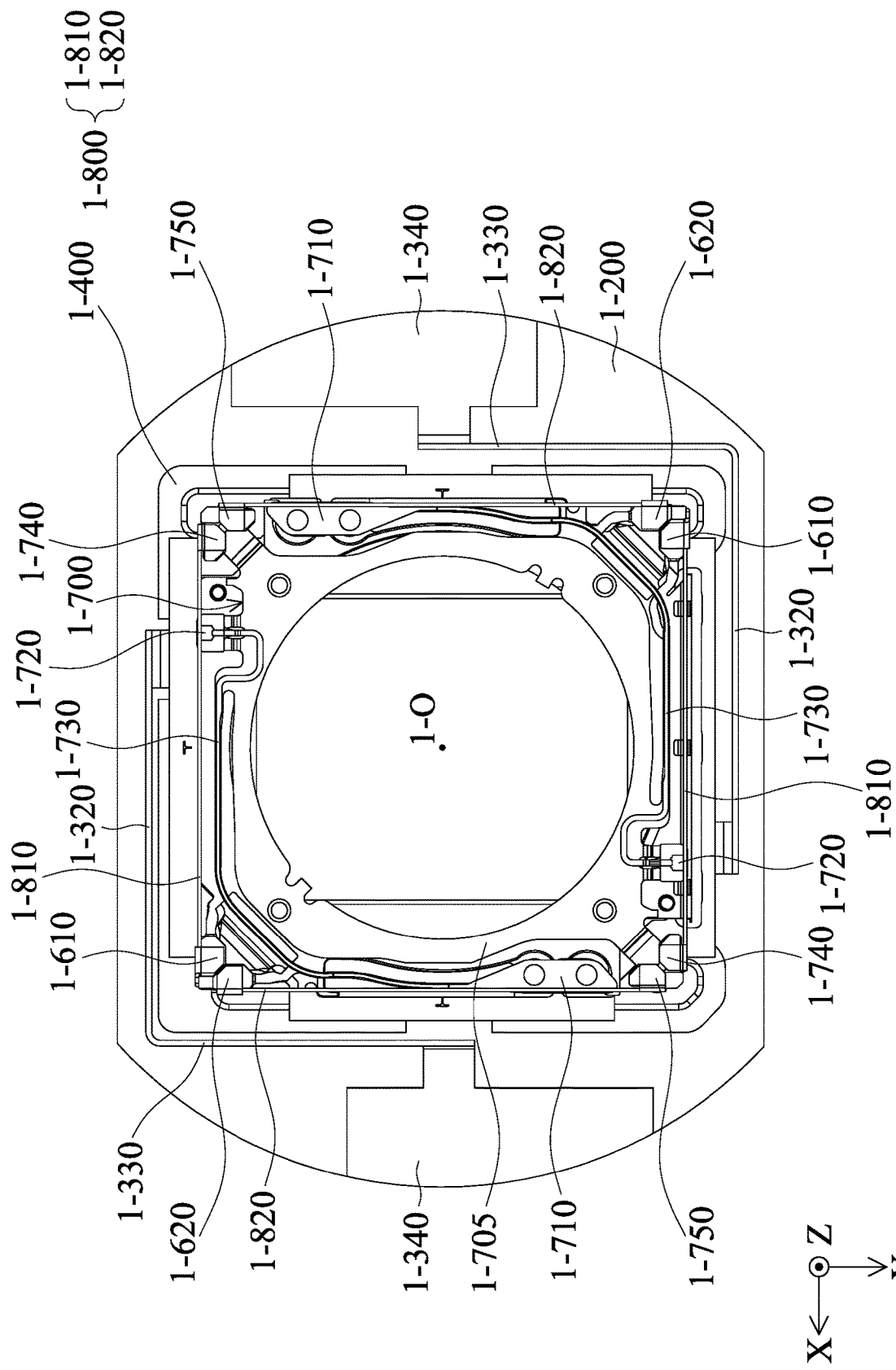
FIG. 7C is an enlarged view of FIG. 7B.
Figure 7D:
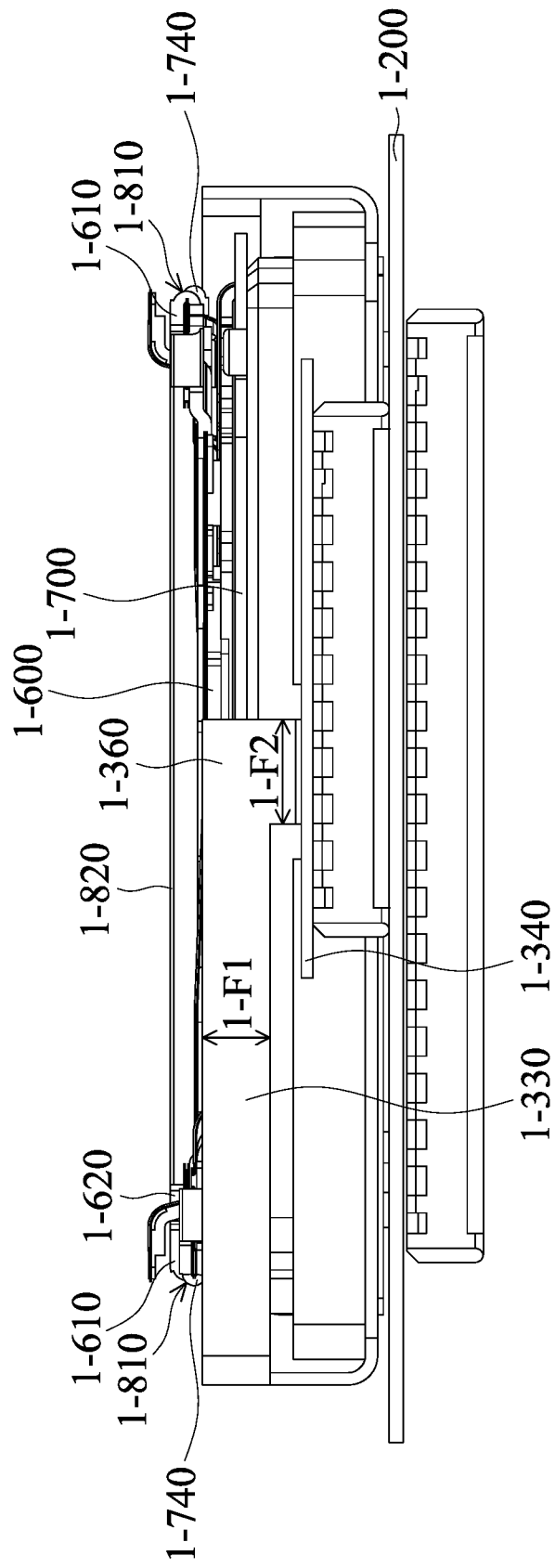
FIG. 7D is a side view of some elements of the optical element driving mechanism.
Figure 7E:
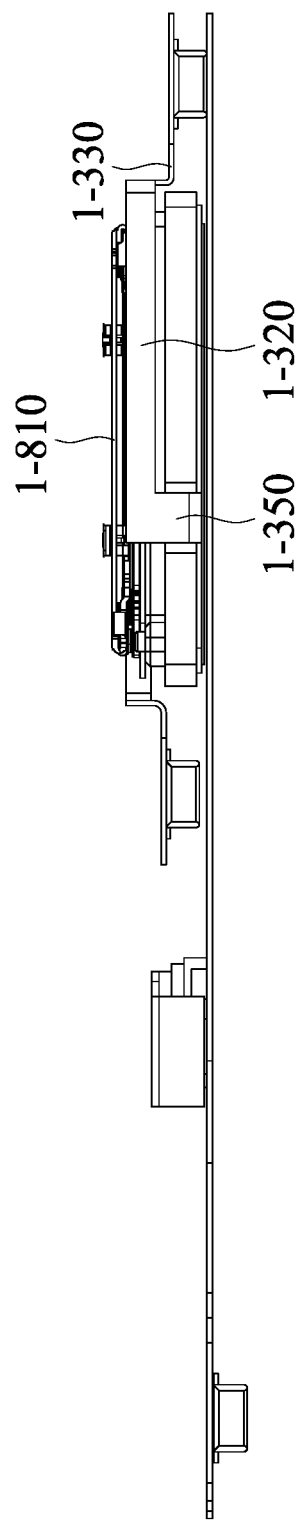
FIG. 7E is a side view of some elements of the optical element driving mechanism.
Figure 7F:
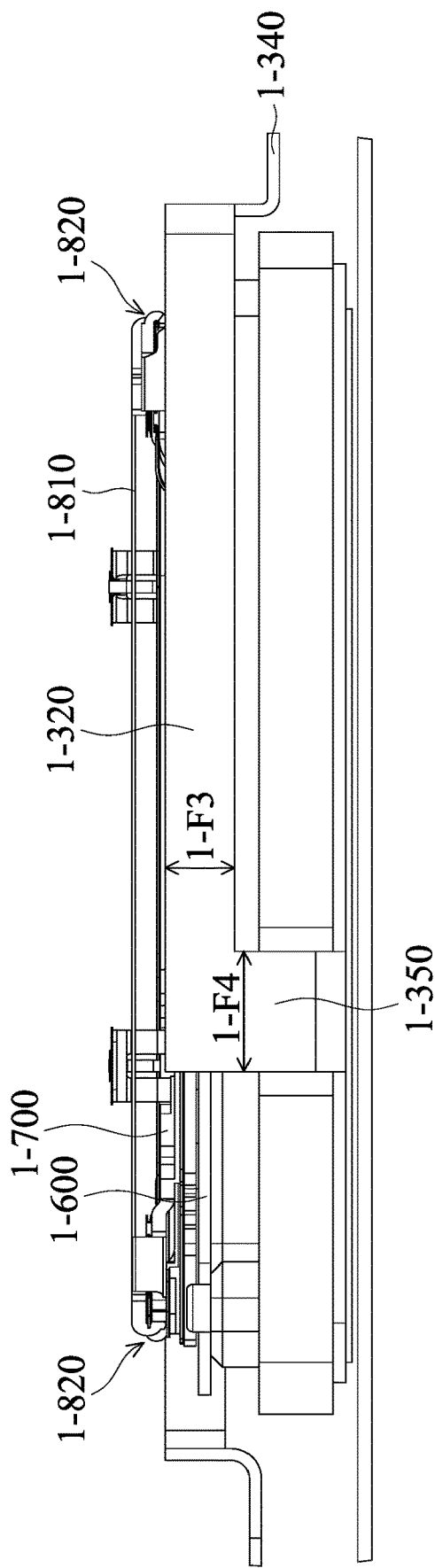
FIG. 7F is an enlarged view of FIG. 7E.

FIG. 7A is a schematic view of some elements of the optical element driving mechanism optical element driving mechanism 1-100. FIG. 7B is a schematic view of some elements of the optical element driving mechanism optical element driving mechanism 1-100. FIG. 7C is an enlarged view of FIG. 7B. FIG. 7D is a side view of some elements of the optical element driving mechanism optical element driving mechanism 1-100. FIG. 7E is a side view of some elements of the optical element driving mechanism optical element driving mechanism 1-100. FIG. 7F is an enlarged view of FIG. 7E, wherein the second optical assembly 1-105 is omitted to show other elements more clearly.

As shown in FIG. 7C, the resilient assembly 1-700 may include a main body 1-705, a fixed portion connecting portion 1-710, a movable portion connecting portion 1-720, and a resilient portion 1-730. The main body 1-705 of the resilient assembly 1-700 may be plate-shaped. The fixed portion connecting portion 1-710 may be affixed on the fixed portion 1-F, and the movable portion connecting portion 1-720 may be disposed on the main body 1-705 and affixed on the first movable portion 1-400. The fixed portion connecting portion 1-710 may be movably connected to the movable portion connecting portion 1-720 through the resilient portion 1-730.

As shown in FIG. 7C, in some embodiments, the first driving assembly 1-800 may include a first driving element 1-810 extending in the first direction (e.g. the X direction) and a second driving element 1-820 extending in the second direction (e.g. the Y direction). The first driving element 1-810 and the second driving element 1-820 may be used for driving the first movable portion 1-400 to move relative to the fixed portion 1-F. In some embodiments, the material of the first driving element 1-810 and the second driving element 1-820 may include shape memory alloy (SMA), and may be strip-shaped and extending in a direction. Shape memory alloy is an alloy that can eliminate the deformation in lower temperature by heating. When the shape memory alloy performs plastic deformation under its phase transition temperature, it may return to its original shape by heating.

The resilient assembly 1-700 may movably connected to the substrate 1-600 by the first driving element 1-810 and the second driving element 1-820. For example, the resilient assembly 1-700 may have a first driving element connecting portion 1-740 and a second driving element connecting portion 1-750. The first driving element connecting portion 1-740 is connected to the first driving element 1-810, and the second driving element connecting portion 1-750 is connected to the second driving element 1-820. For example, the first driving element 1-810 and the second driving element 1-820 may be clipped to the first driving element connecting portion 1-740 and the second driving element connecting portion 1-750, respectively.

Moreover, the substrate 1-600 may include a first driving element connecting portion 1-610 and a second driving element connecting portion 1-620 used for connecting to the first driving element 1-810 and the second driving element 1-820, respectively. For example, the first driving element 1-810 and the second driving element 1-820 may be clipped to the first driving element connecting portion 1-610 and the second driving element connecting portion 1-620, respectively. Therefore, an end of the second driving element 1-820 may be connected to the substrate 1-600, and another end of the second driving element 1-820 may be connected to the resilient assembly 1-700. When the first driving element 1-810 and the second driving element 1-820 deform, the substrate 1-600 may move relative to the resilient assembly 1-700, so the first movable portion 1-400 and the first optical element 1-500 disposed on the first movable portion 1-400 may move relative to the fixed portion 1-F to achieve optical image stabilization.

As shown in FIG. 7C, when viewed along the Z direction (the third direction), the first connecting portion 1-320, the second connecting portion 1-330, and the third connecting portion 1-340 of the circuit assembly 1-300 do not overlap the substrate 1-600 and the resilient assembly 1-700 to reduce the size of the optical element driving mechanism 1-100 in the Z direction, so miniaturization may be achieved.

As shown in FIG. 7D, when viewed along the X direction (the first direction), at least a portion of the second connecting portion 1-330 overlaps the substrate 1-600. Moreover, when viewed along the X direction (the first direction), at least a portion of the circuit assembly 1-300 overlaps the resilient assembly 1-700. For example, at least a portion of the second connecting portion 1-330 overlaps the resilient assembly 1-700. However, the third connecting portion 1-340 does not overlap the substrate 1-600 and the resilient assembly 1-700, and at least a portion of the resilient assembly 1-700 overlaps the first movable portion 1-400. When viewed along the X direction (the first direction), the second driving element 1-820 does not overlap the circuit assembly 1-300 and the first substrate 1-310, and at least a portion of the first driving element connecting portion 1-610 overlaps the resilient assembly 1-700. Therefore, the size of the optical element driving mechanism 1-100 in other directions may be reduced to achieve miniaturization.

Moreover, the second connecting portion 1-330 may have a width 1-F1, the second transmission portion 1-360 may have a width 1-F2, and the width 1-F1 and the width 1-F2 may be different. For example, the width 1-F2 may be greater than the width 1-F1, so the mechanic strength of the circuit assembly 1-300 in the bended portion may be enhanced.

As shown in FIG. 7F, when viewed along the second direction, the first connecting portion 1-320 at least partially overlaps the substrate 1-600 and the resilient assembly 1-700. The third connecting portion 1-340 does not overlap the first movable portion 1-400, the substrate 1-600, and the resilient assembly 1-700. Moreover, the second driving element 1-820 does not overlap the first driving element 1-810, and the first driving element 1-810 does not overlap the circuit assembly 1-300. Therefore, the size of the optical element driving mechanism 1-100 in other directions may be reduced to achieve miniaturization.

Moreover, the first connecting portion 1-320 may have a width 1-F3, the first transmission portion 1-350 may have a width 1-F4, and the width 1-F3 may be different from the width 1-F4 (e.g. the width 1-F4 may be greater than the width 1-F3). Therefore, the mechanical strength of the circuit assembly 1-300 in the bending portion may be enhanced.

In some embodiments, the coefficient of elasticity of the circuit assembly 1-300 may be different from that of the resilient assembly 1-700. For example, the coefficient of elasticity of the circuit assembly 1-300 may be less than that of the resilient assembly 1-700. Moreover, the coefficients of elasticity of the circuit assembly 1-300 in the first direction and the second direction are different. Therefore, the force to move the first movable portion 1-400 in different directions may be controlled.

Figure 8:
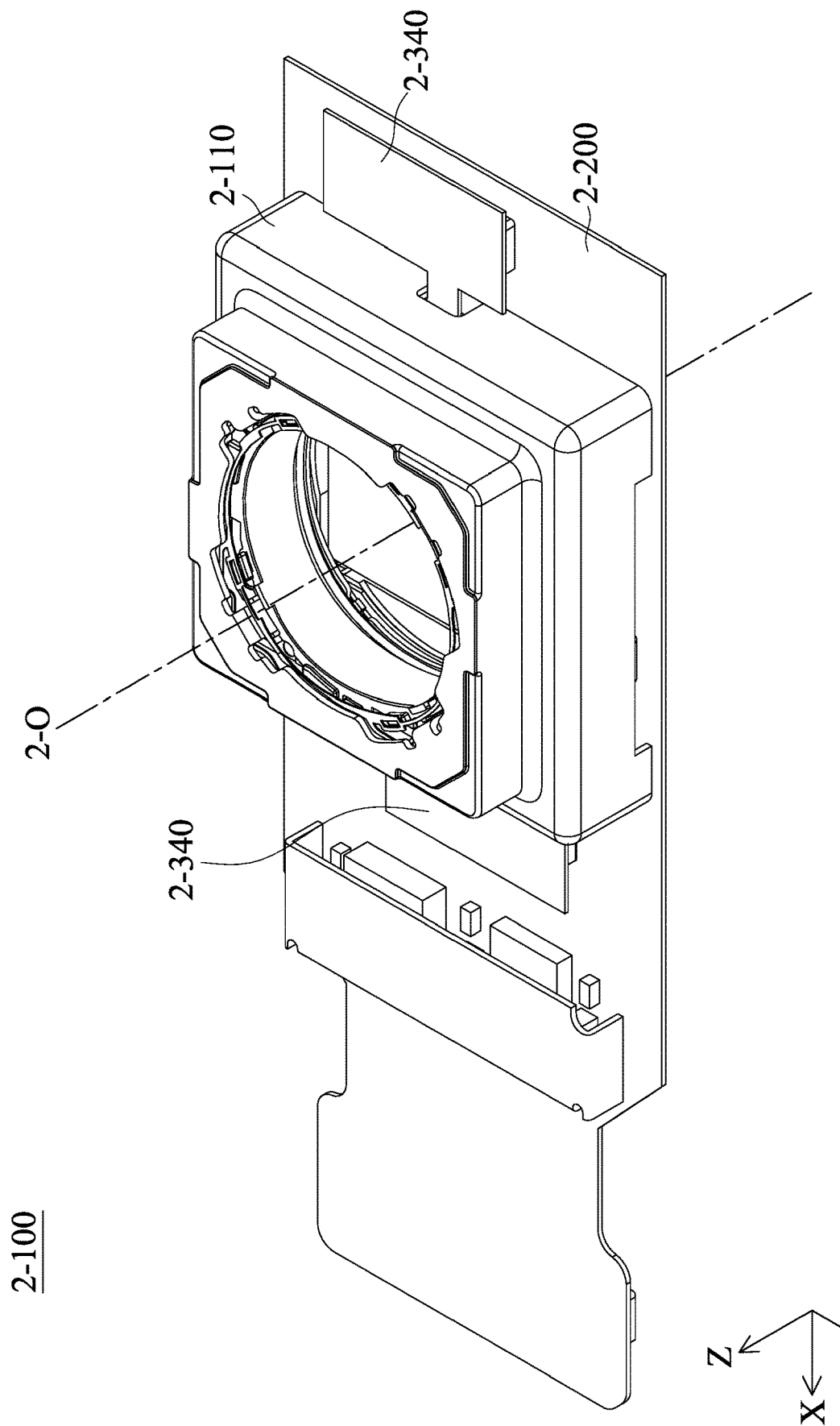
FIG. 8 is a schematic view of an optical element driving mechanism in some embodiments of the present disclosure.
Figure 9:
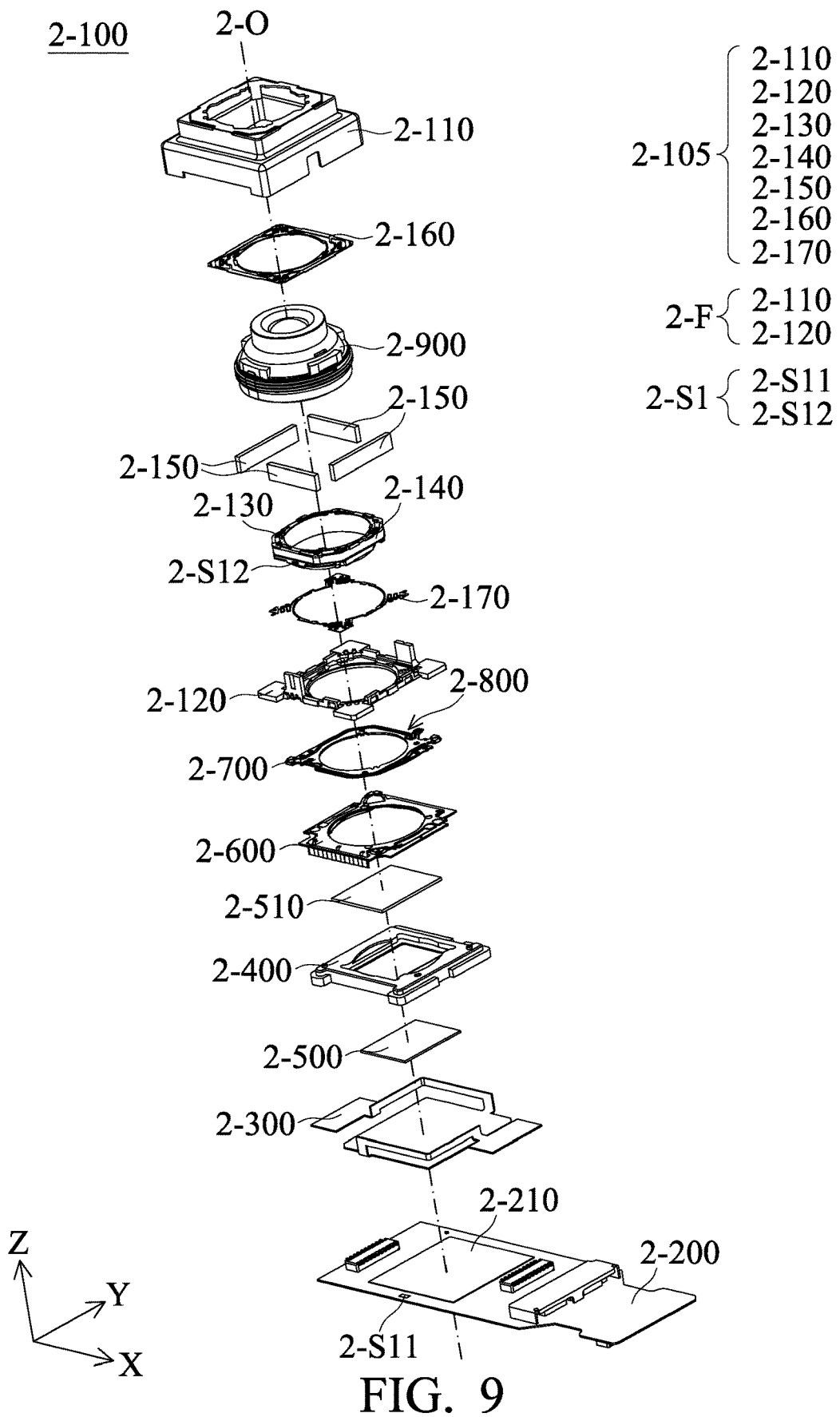
FIG. 9 is an exploded view of the optical element driving mechanism.
Figure 10:
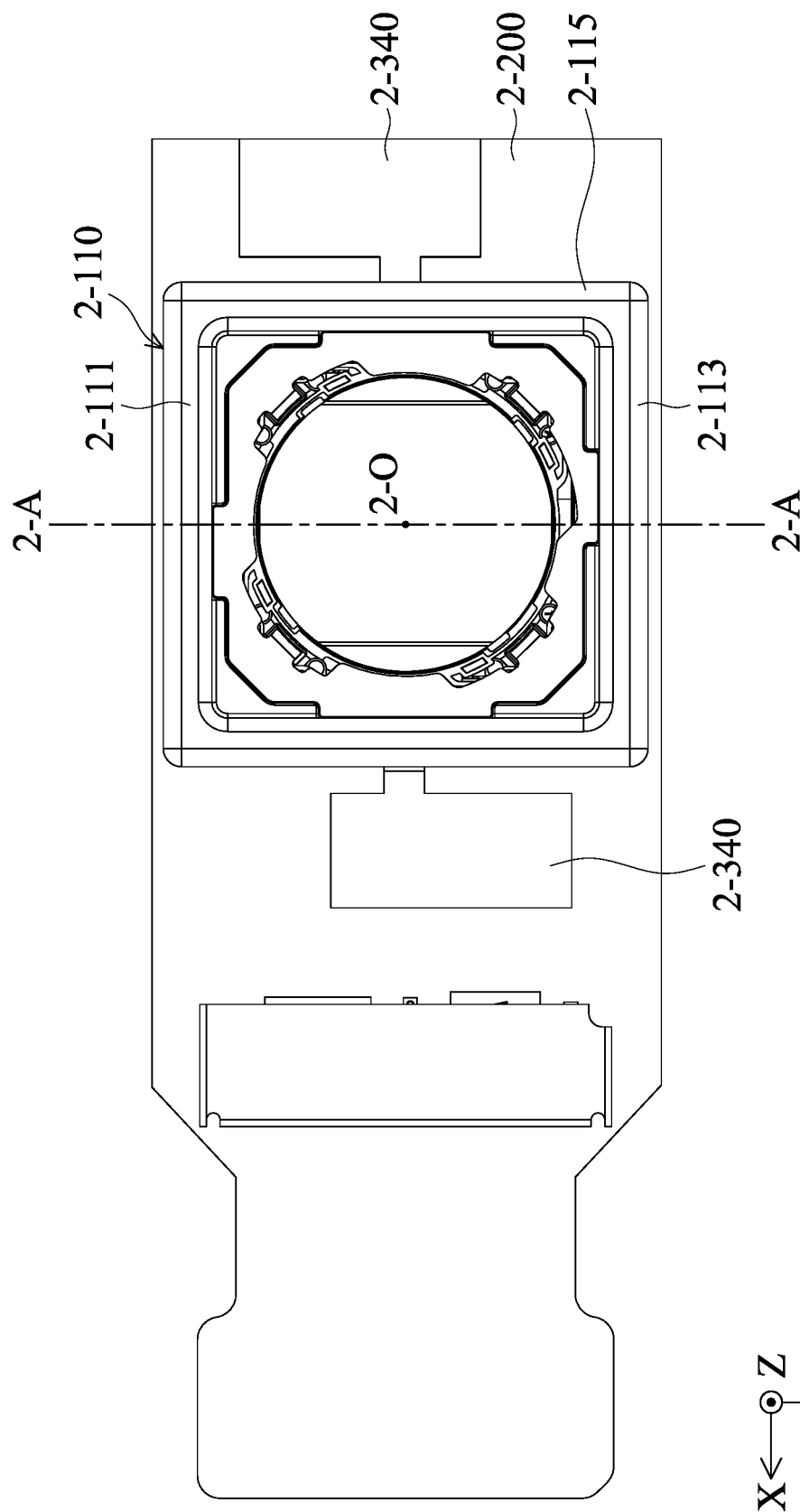
FIG. 10 is a top view of the optical element driving mechanism.
Figure 11A:
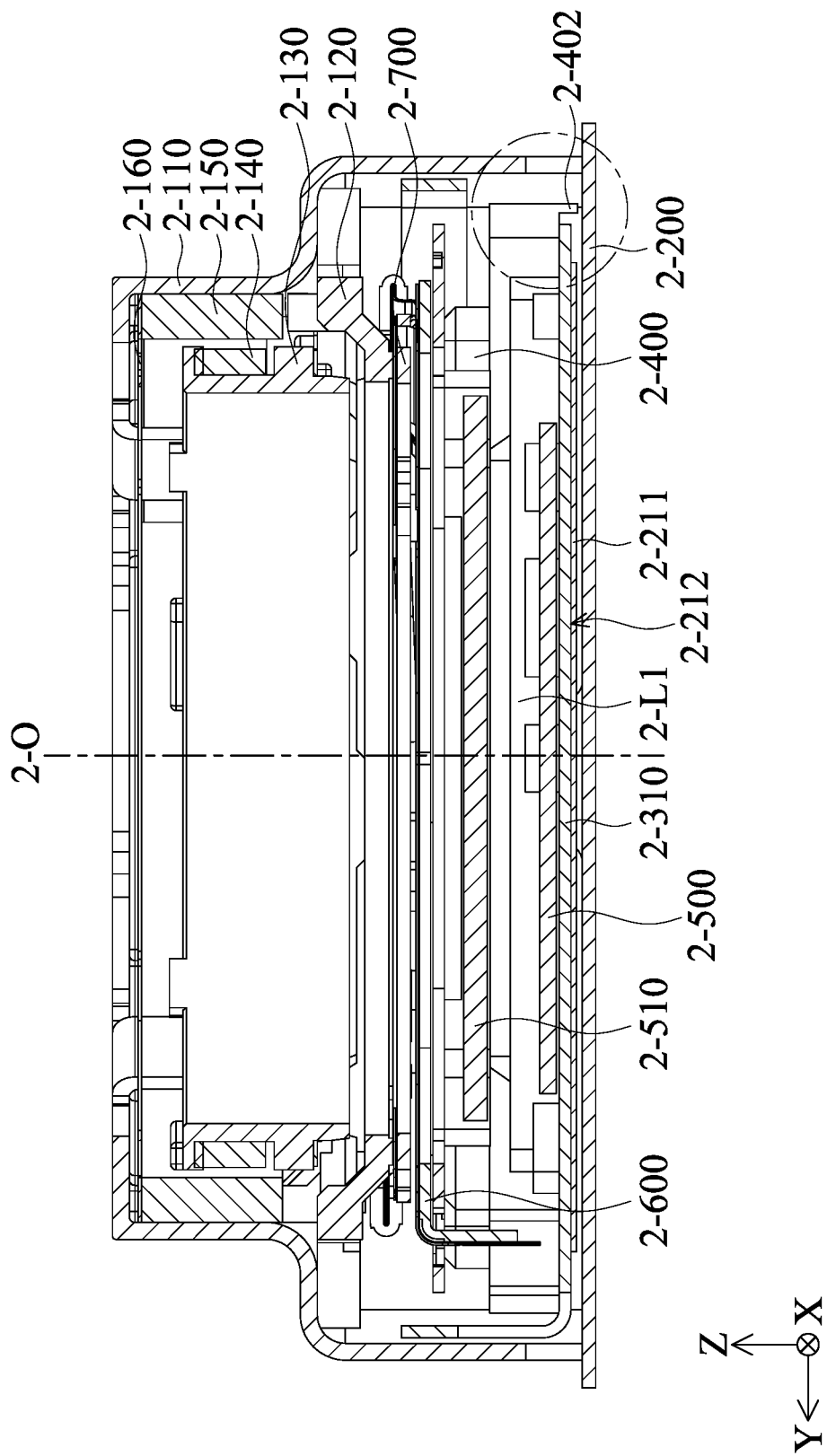
FIG. 11A is a cross-sectional view of the optical element driving mechanism illustrated along the line 2-A-2-A of FIG. 10.
Figure 12A:
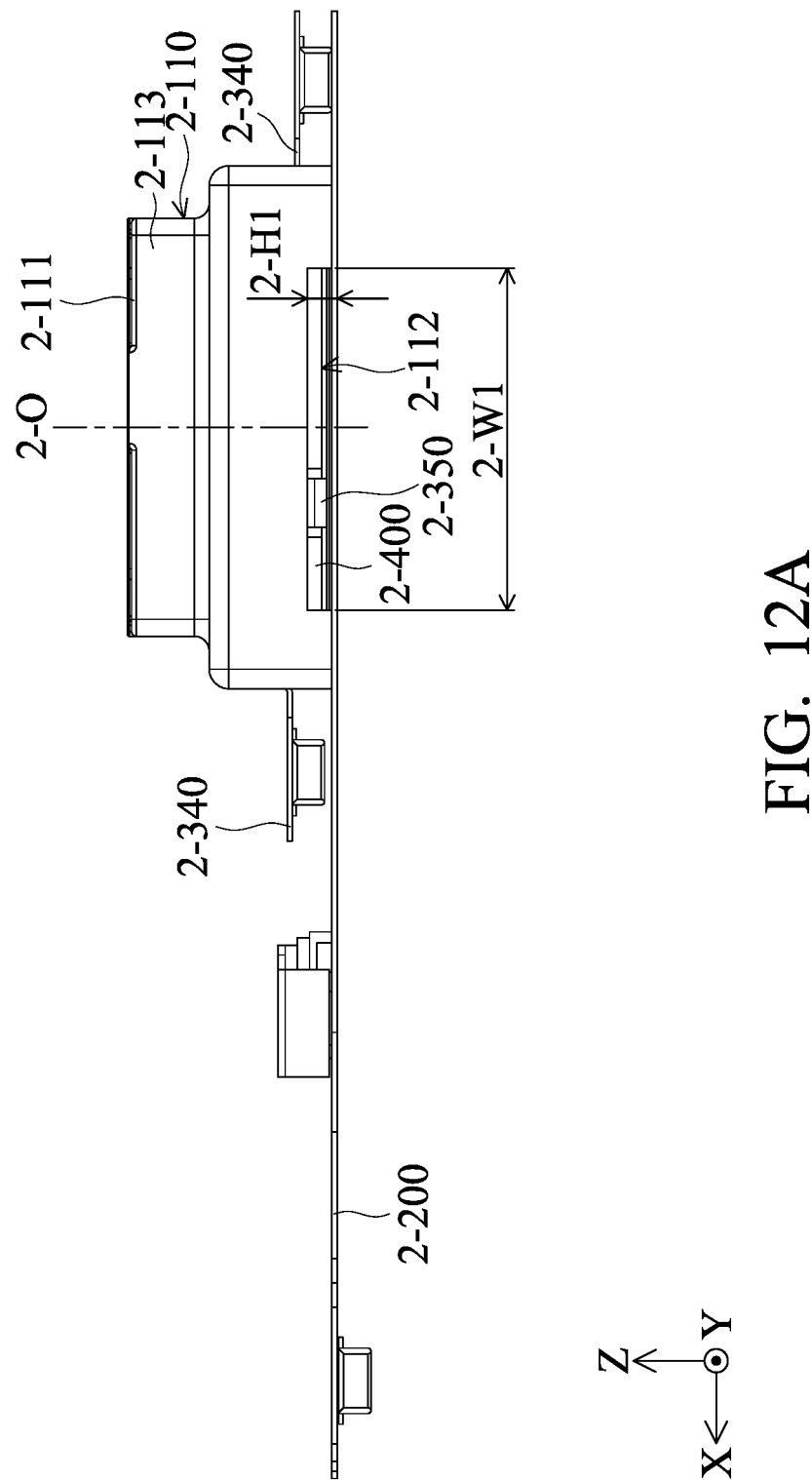
FIG. 12A is a side view of the optical element driving mechanism.
Figure 12B:
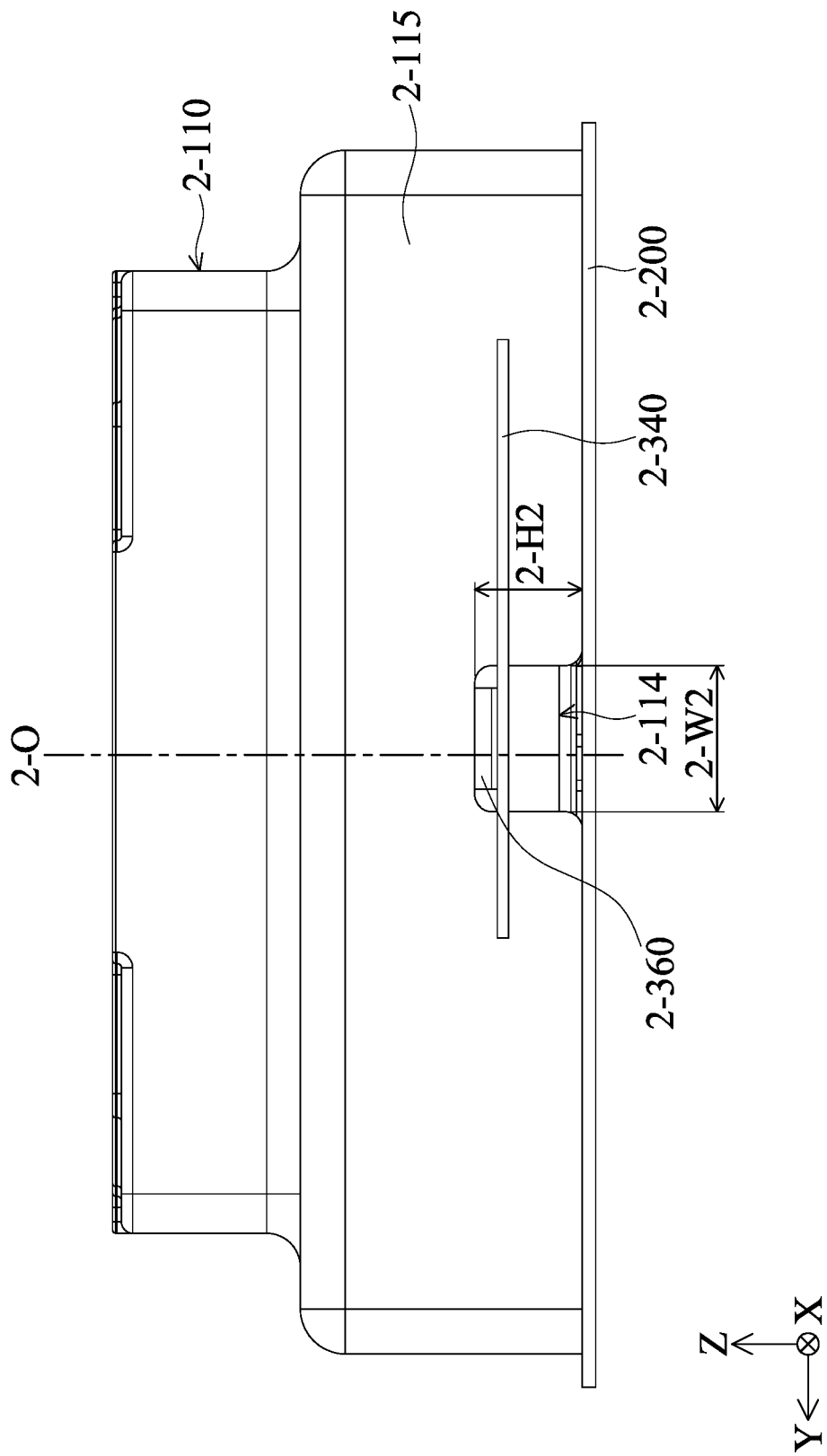
FIG. 12B is a side view of the optical element driving mechanism.

FIG. 8 is a schematic view of an optical element driving mechanism 2-100 in some embodiments of the present disclosure. FIG. 9 is an exploded view of the optical element driving mechanism 2-100. FIG. 10 is a top view of the optical element driving mechanism 2-100. FIG. 11A is a cross-sectional view of the optical element driving mechanism 2-100 illustrated along the line 2-A-2-A of FIG. 10. FIG. 12A is a side view of the optical element driving mechanism 2-100. FIG. 12B is a side view of the optical element driving mechanism 2-100.

In some embodiments, the optical element driving mechanism 2-100 mainly includes a case 2-110, a bottom 2-120, a first movable portion 2-130, a first coil 2-140, a first magnetic element 2-150, a first resilient element 2-160, a second resilient element 2-170, a third substrate 2-200, a heat dissipation assembly 2-210, a circuit assembly 2-300, a first movable portion 2-400, a first optical element 2-500, a light filter 2-510, a substrate 2-600, a resilient assembly 2-700, and a first driving assembly 2-800 arranged along a main axis 2-O. The optical element driving mechanism 2-100 may be disposed on an electronic apparatus, such as a cellphone, a tablet, or a notebook, but it is not limited thereto.

The optical element driving mechanism 2-100 may be used for driving the second optical element 2-900, or may be used for driving various optical elements, such as a lens, a mirror, a prism), a beam splitter, an aperture, a liquid lens, an image sensor, a camera module, or ranging module. It should be noted that the definition of the optical element is not limited to the element that is related to visible light, and other elements that relate to invisible light (e.g. infrared or ultraviolet) are also included in the present disclosure.

In some embodiments, the case 2-110, the bottom 2-120, the first movable portion 2-130, the first coil 2-140, the first magnetic element 2-150, the first resilient element 2-160, and the second resilient element 2-170 may be called as a second optical assembly 2-105 used for driving the second optical element 2-900 to move in the X, the Y, or the Z direction. Moreover, the case 2-110 and the bottom 2-120 may be affixed on the third substrate 2-200, so the case 2-110, the bottom 2-120, and the third substrate 2-200 may be called as a fixed portion 2-F. The first movable portion 2-130 and the first movable portion 2-400 may move relative to the fixed portion 2-F. In some embodiments, the first movable portion 2-130 may move relative to the first movable portion 2-400.

It should be noted that a case opening may be formed on the case 2-110, and a bottom opening may be formed on the bottom 2-120. The center of the case opening corresponds to the main axis 2-O, such as the main axis 2-O included by the fixed portion 2-F, wherein the case 2-110 and the bottom 2-120 may arrange along the main axis 2-O. The bottom opening corresponds to the first optical element 2-500, and the first optical element 2-500 may be disposed on the third substrate 2-200. Therefore, the first optical element 2-500 may correspond to the second optical element 2-900, such as may arrange along the main axis 2-O (in the Z direction), so the second optical element 2-900 may perform focus to the first optical element 2-500.

In some embodiments, the first movable portion 2-130 may have a through hole, and the second optical element 2-900 may be affixed in the through hole to move with the second optical element 2-900. The first movable portion 2-130 may be used for holding the second optical element 2-900. In some embodiments, the first magnetic element 2-150 and the first coil 2-140 may be called as a second driving assembly 2-D used for driving the first movable portion 2-130 to move relative to the fixed portion 2-F.

The first magnetic element 2-150 and the first coil 2-140 may be respectively disposed on the fixed portion 2-F and the first movable portion 2-130, or their positions may be interchanged, depending on design requirement. It should be noted that the interaction between the first coil 2-140 and the first magnetic element 2-150 may generate a magnetic force to move the second optical element 2-900 on the first movable portion 2-130 relative to the fixed portion 2-F, so auto focus (AF) or optical image stabilization (OIS) may be achieved. In some embodiments, the second driving assembly 2-D may include piezoelectric elements or shape memory alloy elements.

In this embodiment, the first movable portion 2-130 and the second optical element 2-900 disposed in the first movable portion 2-130 are movably disposed in the fixed portion 2-F. More specifically, the first movable portion 2-130 may be connected to the fixed portion 2-F and suspended in the fixed portion 2-F by the first resilient element 2-160 and the second resilient element 2-170 that are made by metal. When current is passed to the first coil 2-140, the first coil 2-140 will interact with the magnetic field generated by the first magnetic element 2-150 to create an electromagnetic force to move the first movable portion 2-130 and the second optical element 2-900 relative to the fixed portion 2-F along the main axis 2-O, so auto focus may be achieved.

In some embodiments, a second sensing assembly 2-S1 may be disposed in the optical element driving mechanism 2-100 to detect the position of the first movable portion 2-130 relative to the fixed portion 2-F. For example, the second sensing assembly 2-S1 may include a magnetic sensing element 2-S11 and a reference magnetic element 2-S12. The magnetic sensing element 2-S11 may be affixed on the fixed portion 2-F (e.g. the third substrate 2-200 or the bottom 2-120), and the reference magnetic element 2-S12 may be disposed on the first movable portion 2-130. Alternatively, the second sensing assembly 2-S1 may be disposed between the first substrate 2-310 and the first movable portion 2-400, depending on design requirement.

The magnetic sensing element 2-S11 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The 2-S2 may include magnetic element, and the magnetic sensing element 2-S11 may detect the magnetic field change caused by the reference magnetic element 2-S12 when the first movable portion 2-130 is moving, so the position of the first movable portion 2-130 relative to the fixed portion 2-F may be received. In some embodiments, other similar sensing assemblies may be provided to detect the position of the first movable portion 2-400 relative to the fixed portion 2-F, such as disposed between the first substrate 2-310 and the first movable portion 2-400.

For example, in some embodiments, the sensing assembly may be used for detecting the movement of the first movable portion 2-400 or the first movable portion 2-130 relative to the fixed portion 2-F in different dimensions, such as a translational movement in the X direction (first dimension), a translational movement in the Y direction (second dimension), a translational movement in the Z direction (third dimension), a rotational movement with Z axis as its rotational axis (fourth dimension), but the present disclosure is not limited thereto.

The third substrate 2-200 may be, for example, a flexible printed circuit, and may be affixed on the bottom 2-120 by gluing. In this embodiment, the third substrate 2-200 is electrically connected to other electronic elements inside or outside the optical element driving mechanism 2-100. For example, electrical signal may be provided to the second driving assembly 2-D through the third substrate 2-200, so the movement of the first movable portion 2-130 in the X, the Y, or the Z direction may be controlled to achieve auto focus or optical image stabilization.

The heat dissipation assembly 2-210 may be disposed on the circuit assembly 2-300 and may have a first gap 2-L with the fixed portion 2-F (e.g. the third substrate 2-200) in the Z direction (the third extending direction) that is not zero. In other words, the heat dissipation assembly 2-210 may in direct contact with the circuit assembly 2-300, and may be separated by the third substrate 2-200. The material of the heat dissipation assembly 2-210 may include non-magnetic conductive materials to prevent magnetic interference. In some embodiments, the heat dissipation assembly 2-210 may include a first heat dissipation element 2-211 and a second heat dissipation element 2-212.

The first heat dissipation element 2-211 may be a metal plate (e.g. a steel plate), and the second heat dissipation element 2-212 may include metal, graphene, heat conduction adhesive, or ceramic. The second heat dissipation element 2-212 may be disposed between the first heat dissipation element 2-211 and the first substrate 2-310 of the circuit assembly 2-300 to fill the space between the first heat dissipation element 2-211 and the circuit assembly 2-300, so heat generated by the first optical element 2-500 may pass through the circuit assembly 2-300 and the second heat dissipation element 2-212 to the first heat dissipation element 2-211, and be dissipated by the first heat dissipation element 2-211. In some embodiments, the first heat dissipation element 2-211 may include fins (not shown) to dissipate the heat. Moreover, the thermal conductivity of the first heat dissipation element 2-211 may be higher than that of the second heat dissipation element 2-212.

In some embodiments, the circuit assembly 2-300 may be a flexible printed circuit that is affixed on the first movable portion 2-400 by glue. In this embodiment, the circuit assembly 2-300 is electrically connected to other electronic element or electronic apparatus inside or outside the optical element driving mechanism 2-100. For example, the electric signal of the electronic element may be transferred by the circuit assembly 2-300 to the first driving assembly 2-800 and the second optical assembly 2-105. In other words, the second optical assembly 2-105 and the first driving assembly 2-800 may be electrically connected to the electronic apparatus through the circuit assembly 2-300. Therefore, the movement of the first movable portion 2-400 in the X, the Y, or the Z direction may be controlled to achieve auto focus or optical image stabilization. In some embodiments, the circuit assembly 2-300 may be used for movably connect the first movable portion 2-400 and the fixed portion 2-F.

The first optical element 2-500 and the light filter 2-510 may be disposed on the first movable portion 2-400, such may be connected to the first movable portion 2-400. For example, the first optical element 2-500 and the light filter 2-510 may move with the first movable portion 2-400 relative to the fixed portion 2-F. the first optical element 2-500 may include a photoelectric converter, such as may be an optical sensor corresponding to the light passing through the second optical element 2-900 and used for converting the light to an electric signal, and then the electric signal may be provided to the electronic apparatus. Therefore, the first optical element 2-500 disposed on the first movable portion 2-400 may be moved by the first movable portion 2-400 to achieve optical image stabilization.

The light filter 2-510 may only allow light having specific wavelength, and remove light with other unwanted wavelengths. For example, the light filter 2-510 may remove infrared and allow visible to pass through, but it is not limited thereto. Therefore, the light detected by the first optical element 2-500 may be closer to that detected by eyes.

The substrate 2-600 may be disposed on the first movable portion 2-400, the resilient assembly 2-700 may be used for movably connecting the substrate 2-600 and the fixed portion 2-F (e.g. the bottom 2-120), and the first driving assembly 2-800 may drive the first movable portion 2-400 to move relative to the fixed portion 2-F or the first movable portion 2-130.

Figures 11B, 11C:
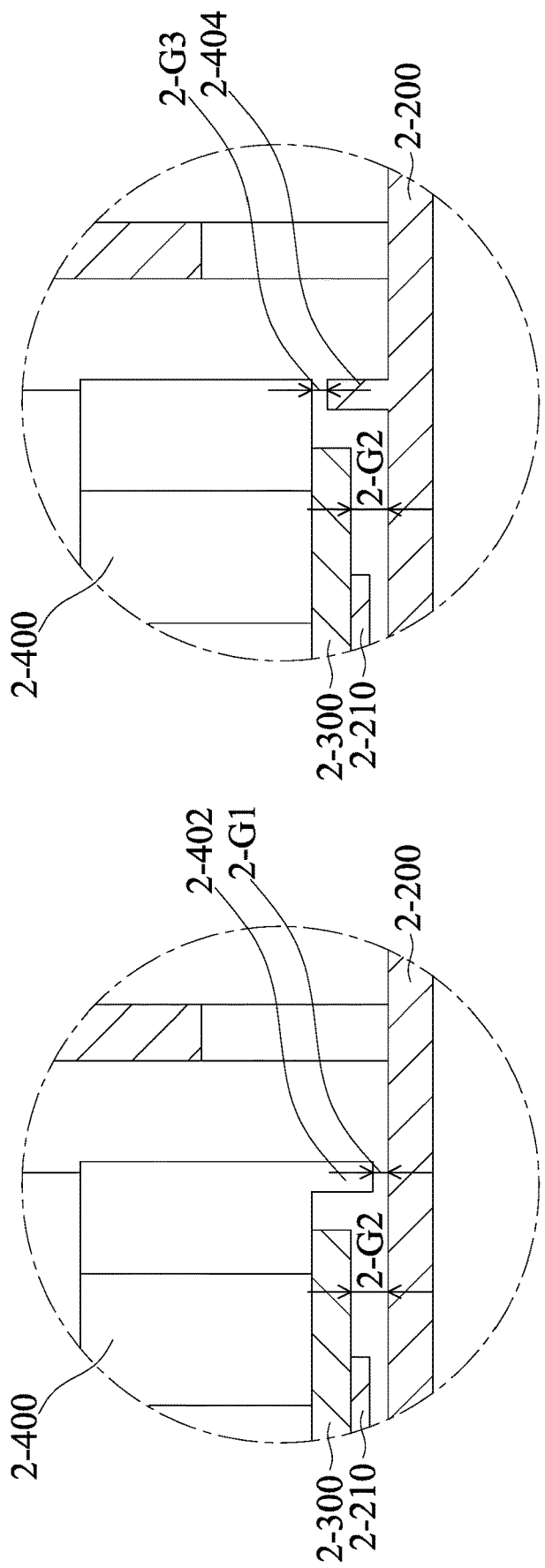
FIG. 11B is an enlarged view of FIG. 11A.
FIG. 11C is a schematic view of another embodiment of the present disclosure.

Moreover, as shown in FIG. 11B, the optical element driving mechanism 2-100 may include a stopping element 2-402 disposed between the first movable portion 2-400 and the fixed portion 2-F (e.g. the third substrate 2-200) to only allow the first movable portion 2-400 move in a first limit range in the third extending direction (e.g. the Z direction). It should be noted that when the first movable portion 2-400 is in any position of the first limit range, the heat dissipation assembly 2-210 and the first substrate 2-310 do not in contact with the fixed portion 2-F. Instead, the stopping element 2-402 will be in direct contact with the fixed portion 2-F to protect the heat dissipation assembly 2-210 and the first substrate 2-310. For example, in the third extending direction, the minimum distance 2-G1 between the stopping element 2-402 and the fixed portion 2-F (e.g. the third substrate 2-200) is less than the minimum distance 2-G2 between the circuit assembly 2-300 and the fixed portion 2-F.

However, the present disclosure is not limited thereto. For example, FIG. 11C is a schematic view of another embodiment of the present disclosure, wherein the stopping element 2-404 on the third substrate 2-200 is illustrated. The stopping element 2-404 may be used to limit the first movable portion 2-400 to only move in a third limit range in the third extending direction (e.g. the Z direction).

It should be noted that when the first movable portion 2-400 is at any position of the first limit range, the heat dissipation assembly 2-210 and the first substrate 2-310 do not in direct contact with the fixed portion 2-F. Instead, the stopping element 2-404 is in contact with the fixed portion 2-F to protect the heat dissipation assembly 2-210 and the first substrate 2-310. For example, in the third extending direction, the minimum distance 2-G3 between the stopping element 2-404 and the fixed portion 2-F (e.g. the third substrate 2-200) is less than the minimum distance 2-G4 between the circuit assembly 2-300 and the fixed portion 2-F in the third extending direction.

Figure 13:
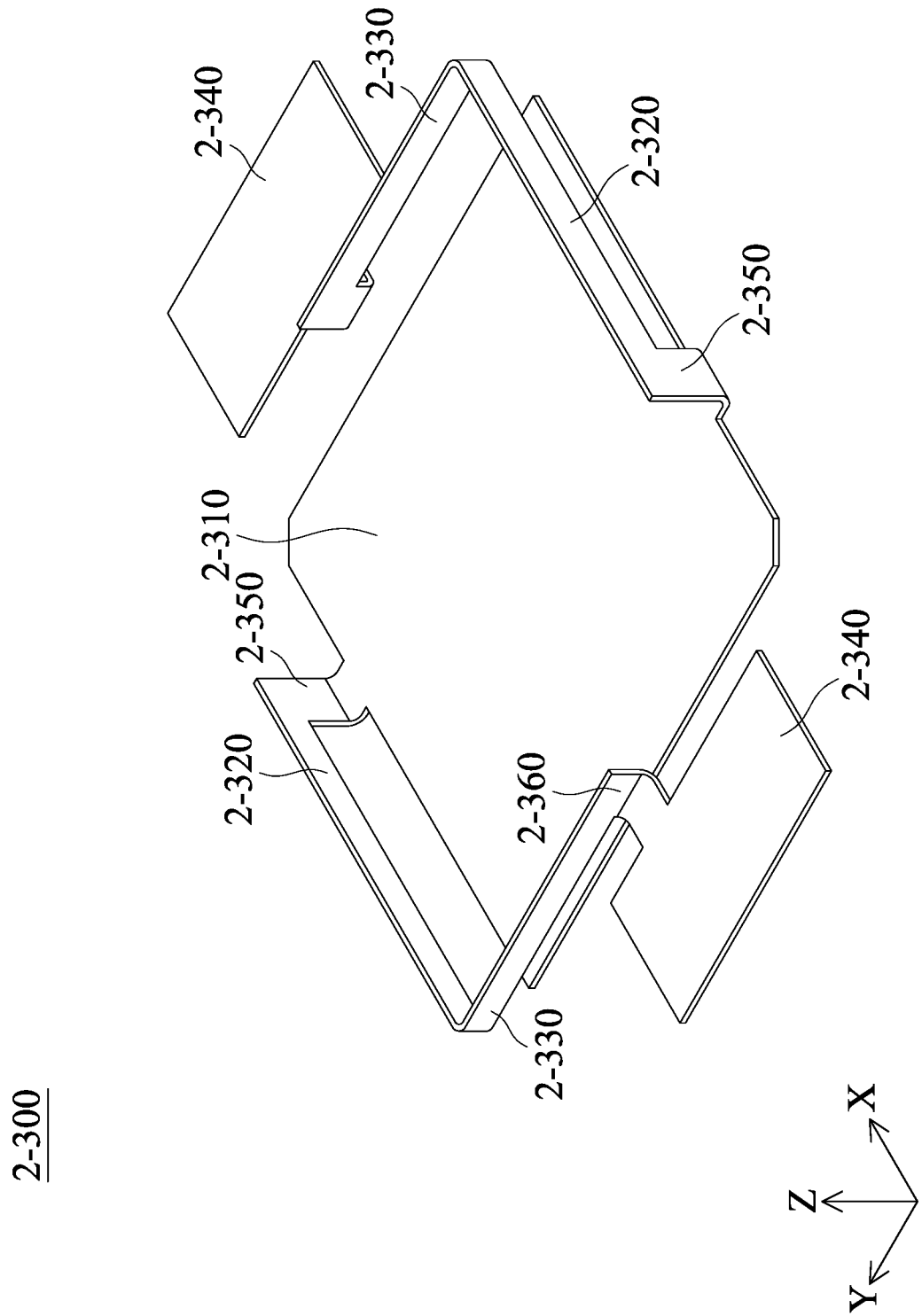
FIG. 13 is a schematic view of the circuit assembly.

FIG. 13 is a schematic view of the circuit assembly 2-300. As shown in FIG. 13, the circuit assembly 2-300 may include a first substrate 2-310, a first connecting portion 2-320, a second connecting portion 2-330, and a third connecting portion 2-340. The first connecting portion 2-320 may be connected to the first substrate 2-310 through a first transmission portion 2-350, the first connecting portion 2-320 may extend in the first extending direction (e.g. the X direction), and the first transmission portion 2-350 may extend in the Z direction. The second connecting portion 2-330 may be connected to the first connecting portion 2-320 and extending in the second extending direction (e.g. the Y direction). The third connecting portion 2-340 may be connected to the second connecting portion 2-330 through the second transmission portion 2-360.

It should be noted that the first extending direction and the second extending direction are different, such as may be perpendicular. Moreover, a normal direction of the first substrate 2-310 may extend in the third extending direction (the Z direction), and the third extending direction is different from the first and the second extending directions. The third connecting portion 2-340 may be plate-shaped, and the normal direction of the third connecting portion 2-340 may be different from the first extending direction and the second extending direction. The first transmission portion 2-350 and the second transmission portion 2-360 may extend in the third extending direction.

In some embodiments, the circuit assembly 2-300 may include a heat conductive element and a circuit element (not shown). The heat conductive element and the circuit element may include metal, and the heat conductive element and the circuit element are electrically isolated. The circuit element may be electrically connected to the electronic apparatus. For example, the heat conductive element may be disposed on the surface of the first connecting portion 2-320, the second connecting portion 2-330, and the third connecting portion 2-340, or the heat conductive element may be disposed in the first connecting portion 2-320, the second connecting portion 2-330, and the third connecting portion 2-340, depending on design requirement. The heat conductive element allows the first substrate 2-310 in direct contact with the first optical element 2-500 to dissipate the heat generated by the operation of the first optical element 2-500.

Refer to FIG. 10. In some embodiments, when viewed along the main axis 2-O, the case 2-110 is rectangular, and may include atop plate 2-111, a first sidewall 2-113 and a second sidewall 2-115 extending from the top plate 2-111. The first sidewall 2-113 may be adjacent to the second sidewall 2-115. Moreover, as shown in FIG. 12A and FIG. 12B, the first sidewall 2-113 may have a first opening 2-112, and the second sidewall 2-115 may have a second opening 2-114. The circuit assembly 2-300 may be connected to the electronic apparatus outside the optical element driving mechanism 2-100 through the second opening 2-114.

As shown in FIG. 12A, when viewed along the second extending direction (the Y direction), the first movable portion 2-400 may be exposed form the case 2-110 through the first opening 2-112, and the first transmission portion 2-350 of the circuit assembly 2-300 may be exposed from the case 2-110 of the first opening 2-112, but the first connecting portion 2-320 is not exposed from the case 2-110 by the first opening 2-112. Moreover, as shown in FIG. 12B, when viewed along the first extending direction (the X direction), the second transmission portion 2-360 may be exposed from the case 2-110 through the second opening 2-114, but the second connecting portion 2-330 is not exposed from the case 2-110 through the second opening 2-114, so the circuit assembly 2-300 may be protected.

The first opening 2-112 may have a height 2-H1 (e.g. the dimension in the Z direction) and a width 2-W1 (e.g. the dimension in the X direction), and the second opening 2-114 may have a height 2-H2 (e.g. the dimension in the Z direction) and a width 2-W2 (e.g. the dimension in the X direction). The height 2-H1 of the first opening 2-112 is less than the height 2-H2 of the second opening 2-114, and the height 2-H1 of the first opening 2-112 is greater than the width 2-W2 of the second opening 2-114. Therefore, circuit with different width may pass into the case 2-110.

Moreover, as shown in FIG. 11A, when viewed along the first extending direction (e.g. the X direction), the first substrate 2-310 does not overlap the heat dissipation assembly 2-210, and the first substrate 2-310 and the first movable portion 2-400 are disposed on opposite sides of the heat dissipation assembly 2-210. Moreover, the size of the heat dissipation assembly 2-210 is less than that of the first substrate 2-310. In other words, at least a portion of the first substrate 2-310 is exposed from the heat dissipation assembly 2-210 in the third extending direction (the Z direction).

Figure 14A:
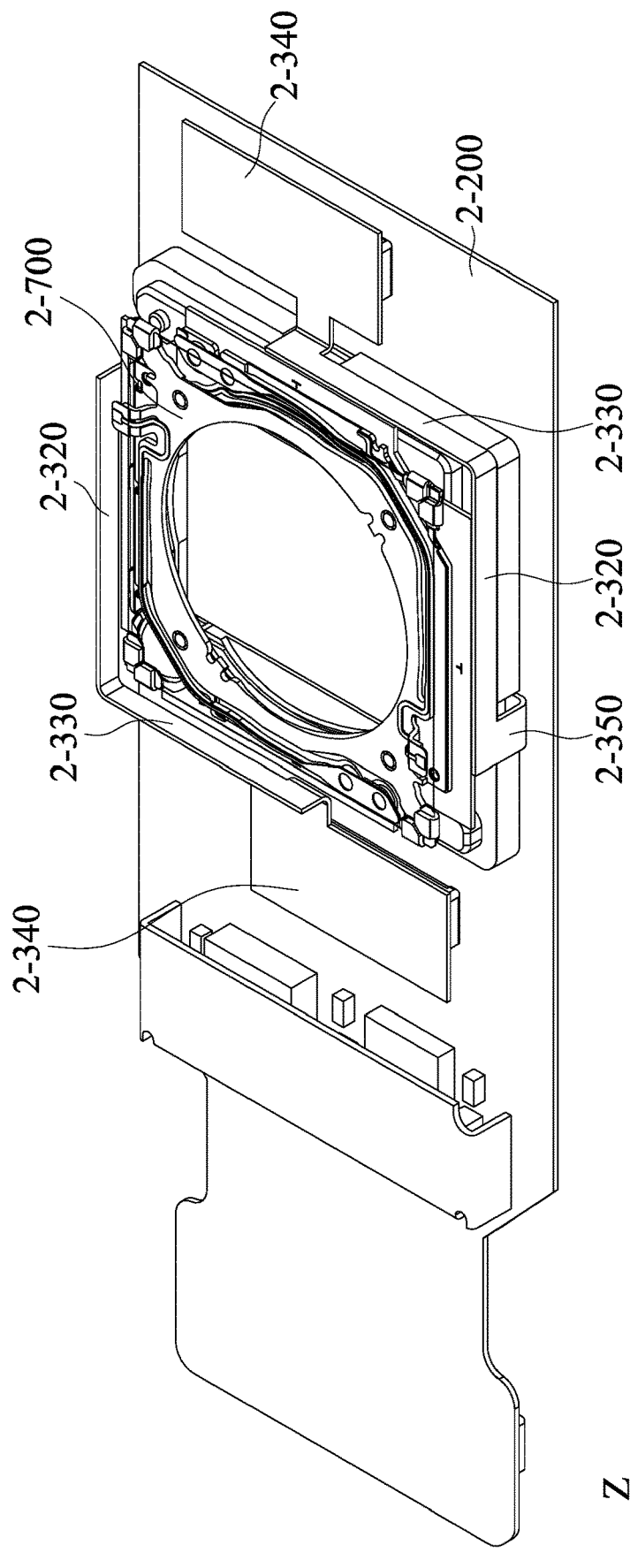
FIG. 14A is a schematic view of some elements of the optical element driving mechanism.
Figure 14B:
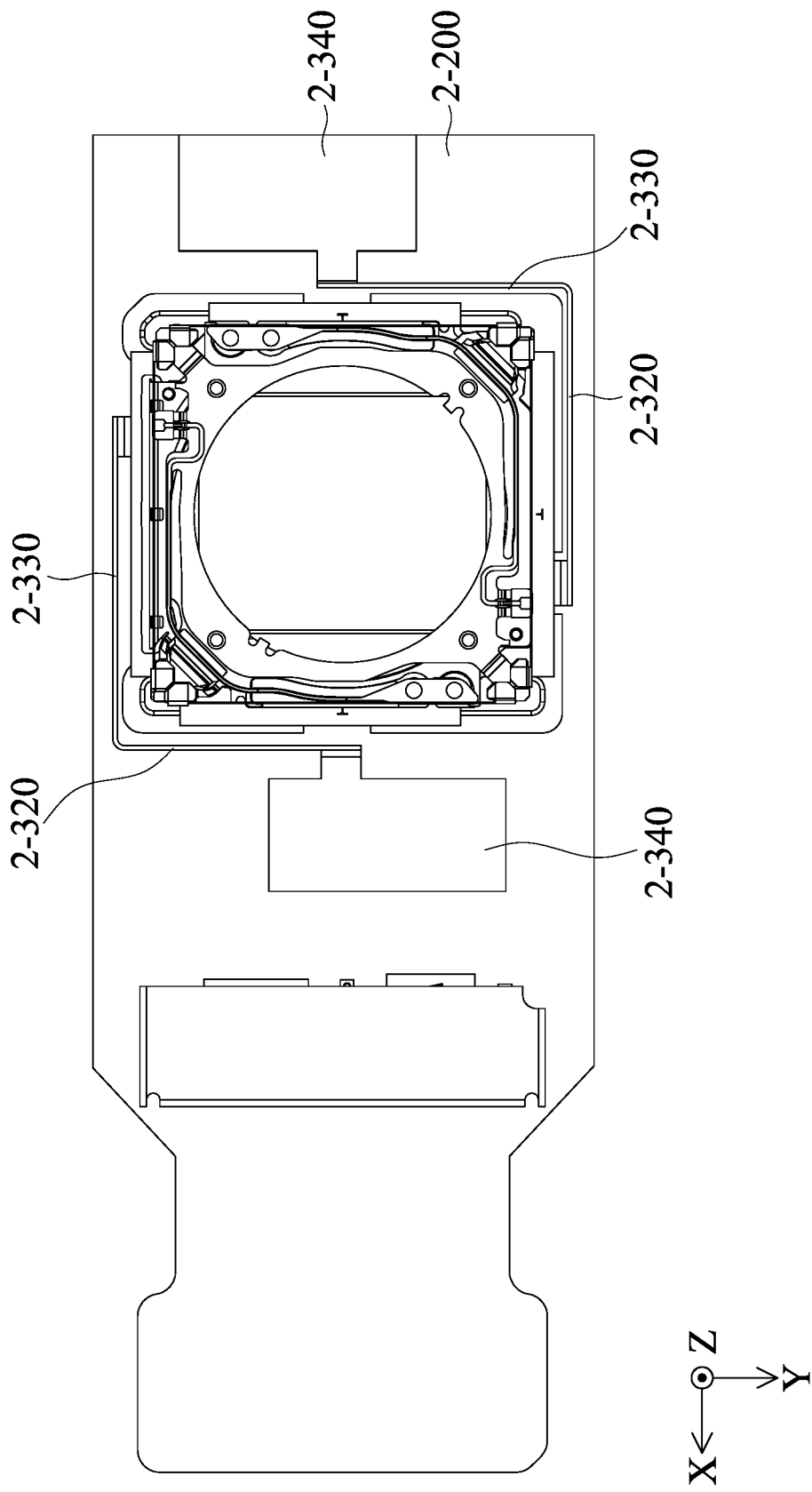
FIG. 14B is a schematic view of some elements of the optical element driving mechanism.
Figure 14C:
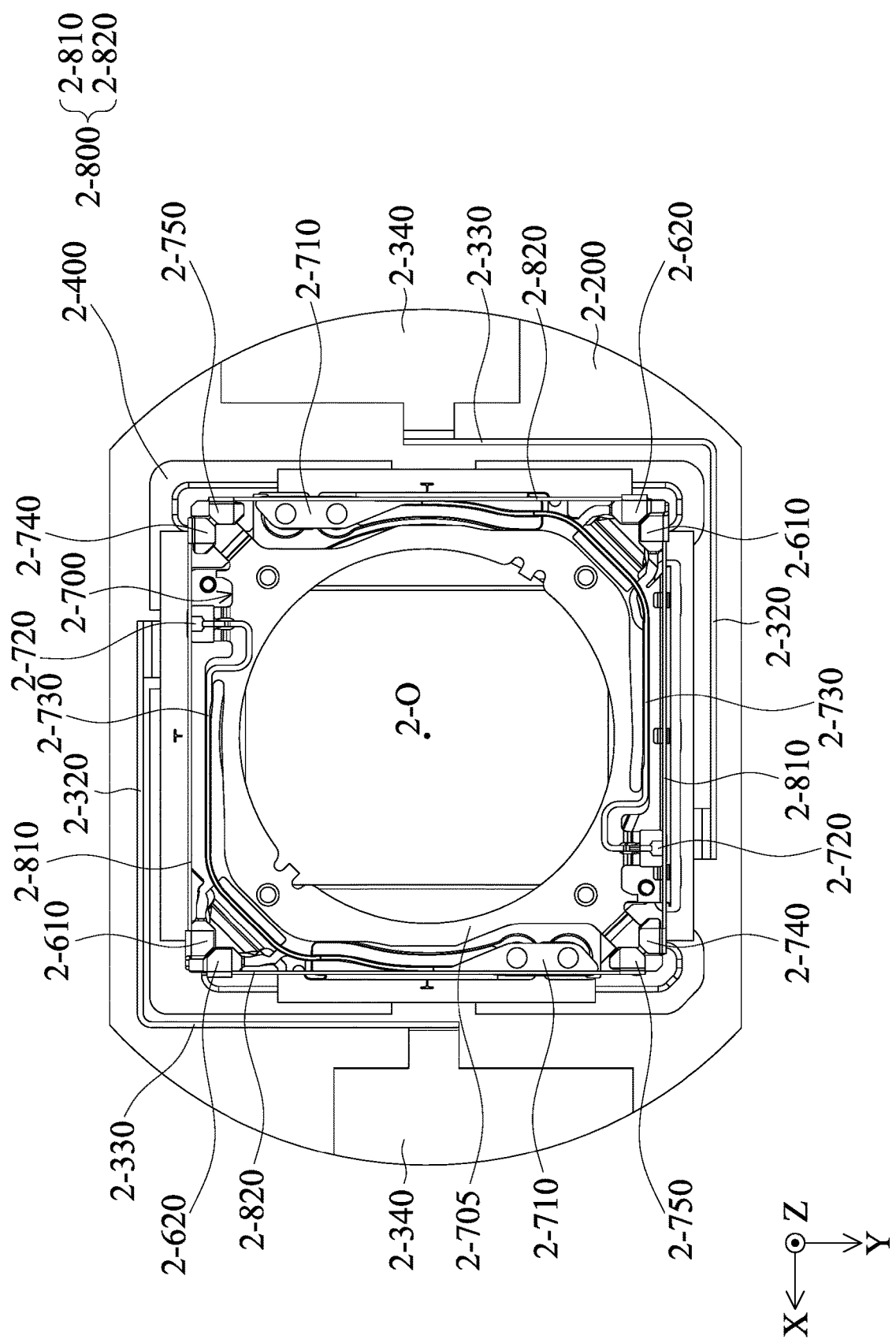
FIG. 14C is an enlarged view of FIG. 14B.
Figure 14D:
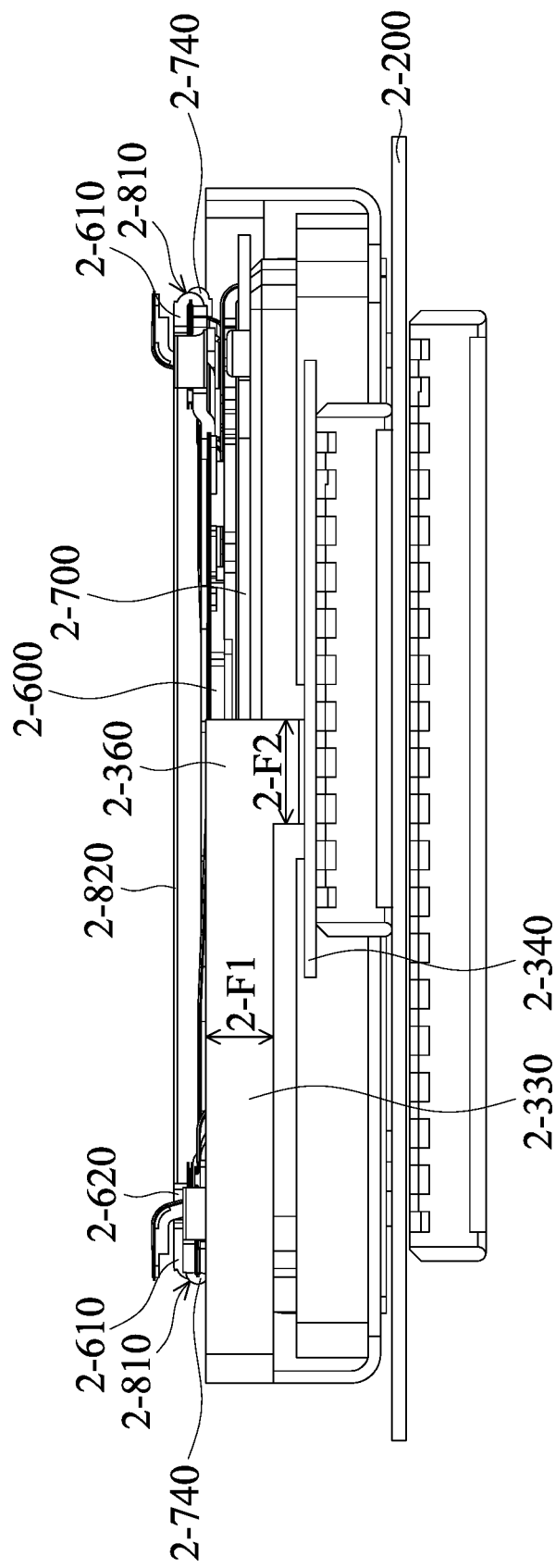
FIG. 14D is a side view of some elements of the optical element driving mechanism.
Figure 14E:
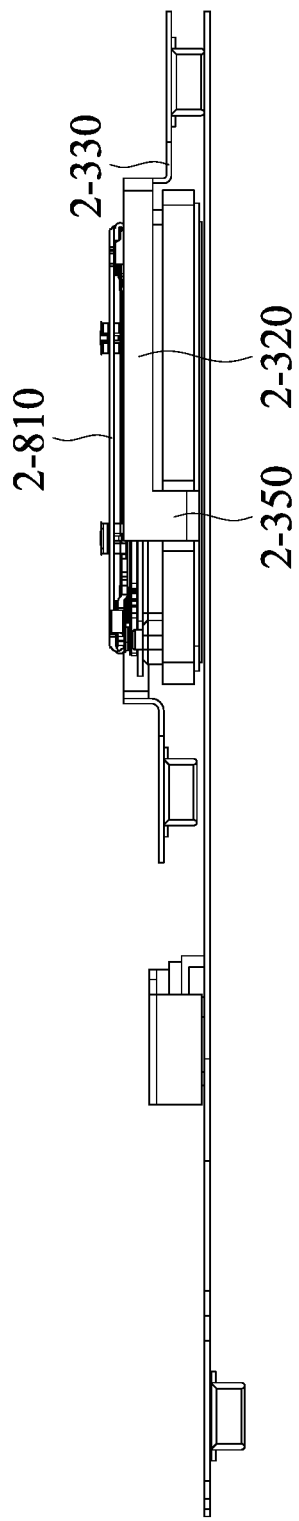
FIG. 14E is a side view of some elements of the optical element driving mechanism.
Figure 14F:
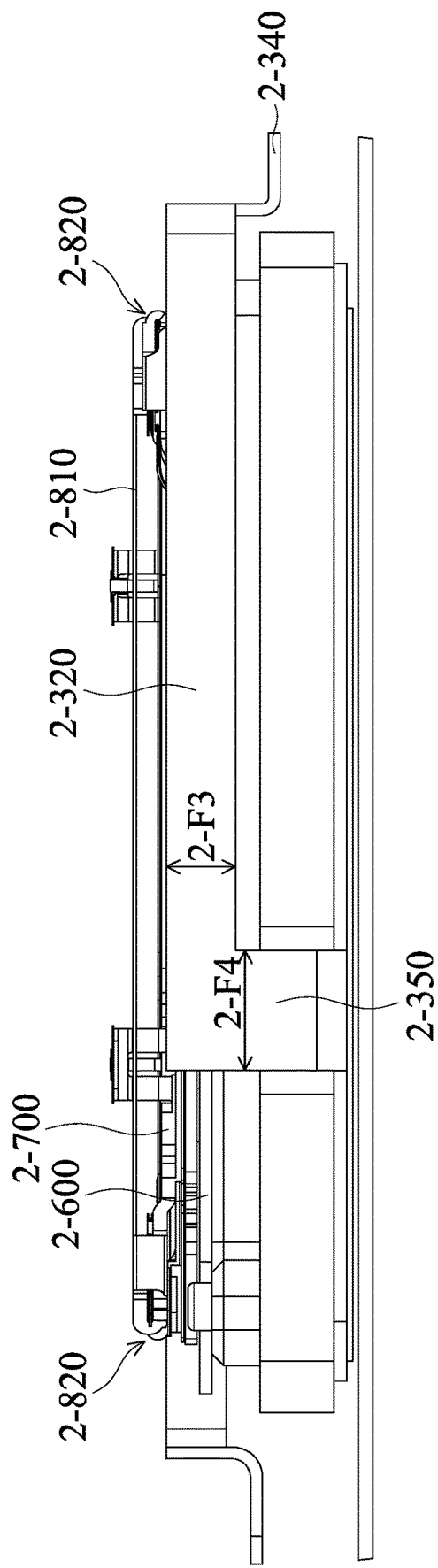
FIG. 14F is an enlarged view of FIG. 14E.

FIG. 14A is a schematic view of some elements of the optical element driving mechanism optical element driving mechanism 2-100. FIG. 14B is a schematic view of some elements of the optical element driving mechanism optical element driving mechanism 2-100. FIG. 14C is an enlarged view of FIG. 14B. FIG. 14D is a side view of some elements of the optical element driving mechanism optical element driving mechanism 2-100. FIG. 14E is a side view of some elements of the optical element driving mechanism optical element driving mechanism 2-100. FIG. 14F is an enlarged view of FIG. 14E, wherein the second optical assembly 2-105 is omitted to show other elements more clearly.

As shown in FIG. 14C, the resilient assembly 2-700 may include a main body 2-705, a fixed portion connecting portion 2-710, a movable portion connecting portion 2-720, and a resilient portion 2-730. The main body 2-705 of the resilient assembly 2-700 may be plate-shaped. The fixed portion connecting portion 2-710 may be affixed on the fixed portion 2-F, and the movable portion connecting portion 2-720 may be disposed on the main body 2-705 and affixed on the first movable portion 2-400. The fixed portion connecting portion 2-710 may be movably connected to the movable portion connecting portion 2-720 through the resilient portion 2-730.

As shown in FIG. 14C, in some embodiments, the first driving assembly 2-800 may include a first driving element 2-810 extending in the first extending direction (e.g. the X direction) and a second driving element 2-820 extending in the second extending direction (e.g. the Y direction). The first driving element 2-810 and the second driving element 2-820 may be used for driving the first movable portion 2-400 to move relative to the fixed portion 2-F. In some embodiments, the material of the first driving element 2-810 and the second driving element 2-820 may include shape memory alloy (SMA), and may be strip-shaped and extending in a direction. Shape memory alloy is an alloy that can eliminate the deformation in lower temperature by heating. When the shape memory alloy performs plastic deformation under its phase transition temperature, it may return to its original shape by heating.

The resilient assembly 2-700 may movably connected to the substrate 2-600 by the first driving element 2-810 and the second driving element 2-820. For example, the resilient assembly 2-700 may have a first driving element connecting portion 2-740 and a second driving element connecting portion 2-750. The first driving element connecting portion 2-740 is connected to the first driving element 2-810, and the second driving element connecting portion 2-750 is connected to the second driving element 2-820. For example, the first driving element 2-810 and the second driving element 2-820 may be clipped to the first driving element connecting portion 2-740 and the second driving element connecting portion 2-750, respectively.

Moreover, the substrate 2-600 may include a first driving element connecting portion 2-610 and a second driving element connecting portion 2-620 used for connecting to the first driving element 2-810 and the second driving element 2-820, respectively. For example, the first driving element 2-810 and the second driving element 2-820 may be clipped to the first driving element connecting portion 2-610 and the second driving element connecting portion 2-620, respectively. Therefore, an end of the second driving element 2-820 may be connected to the substrate 2-600, and another end of the second driving element 2-820 may be connected to the resilient assembly 2-700. When the first driving element 2-810 and the second driving element 2-820 deform, the substrate 2-600 may move relative to the resilient assembly 2-700, so the first movable portion 2-400 and the first optical element 2-500 disposed on the first movable portion 2-400 may move relative to the fixed portion 2-F to achieve optical image stabilization.

As shown in FIG. 14C, when viewed along the Z direction (the third extending direction), the first connecting portion 2-320, the second connecting portion 2-330, and the third connecting portion 2-340 of the circuit assembly 2-300 do not overlap the substrate 2-600 and the resilient assembly 2-700 to reduce the size of the optical element driving mechanism 2-100 in the Z direction, so miniaturization may be achieved.

As shown in FIG. 14D, when viewed along the X direction (the first extending direction), at least a portion of the second connecting portion 2-330 overlaps the substrate 2-600. Moreover, when viewed along the X direction (the first extending direction), at least a portion of the circuit assembly 2-300 overlaps the resilient assembly 2-700. For example, at least a portion of the second connecting portion 2-330 overlaps the resilient assembly 2-700. However, the third connecting portion 2-340 does not overlap the substrate 2-600 and the resilient assembly 2-700, and at least a portion of the resilient assembly 2-700 overlaps the first movable portion 2-400. When viewed along the X direction (the first extending direction), the second driving element 2-820 does not overlap the circuit assembly 2-300 and the first substrate 2-310, and at least a portion of the first driving element connecting portion 2-610 overlaps the resilient assembly 2-700. Therefore, the size of the optical element driving mechanism 2-100 in other directions may be reduced to achieve miniaturization.

Moreover, the second connecting portion 2-330 may have a width 2-F1, the second transmission portion 2-360 may have a width 2-F2, and the width 2-F1 and the width 2-F2 may be different. For example, the width 2-F2 may be greater than the width 2-F1, so the mechanic strength of the circuit assembly 2-300 in the bended portion may be enhanced.

As shown in FIG. 14F, when viewed along the second extending direction, the first connecting portion 2-320 at least partially overlaps the substrate 2-600 and the resilient assembly 2-700. The third connecting portion 2-340 does not overlap the first movable portion 2-400, the substrate 2-600, and the resilient assembly 2-700. Moreover, the second driving element 2-820 does not overlap the first driving element 2-810, and the first driving element 2-810 does not overlap the circuit assembly 2-300. Therefore, the size of the optical element driving mechanism 2-100 in other directions may be reduced to achieve miniaturization.

Moreover, the first connecting portion 2-320 may have a width 2-F3, the first transmission portion 2-350 may have a width 2-F4, and the width 2-F3 may be different from the width 2-F4 (e.g. the width 2-F4 may be greater than the width 2-F3). Therefore, the mechanical strength of the circuit assembly 2-300 in the bending portion may be enhanced.

In some embodiments, the coefficient of elasticity of the circuit assembly 2-300 may be different from that of the resilient assembly 2-700. For example, the coefficient of elasticity of the circuit assembly 2-300 may be less than that of the resilient assembly 2-700. Moreover, the coefficients of elasticity of the circuit assembly 2-300 in the first extending direction and the second extending direction are different. Therefore, the force to move the first movable portion 2-400 in different directions may be controlled.

Figure 15:
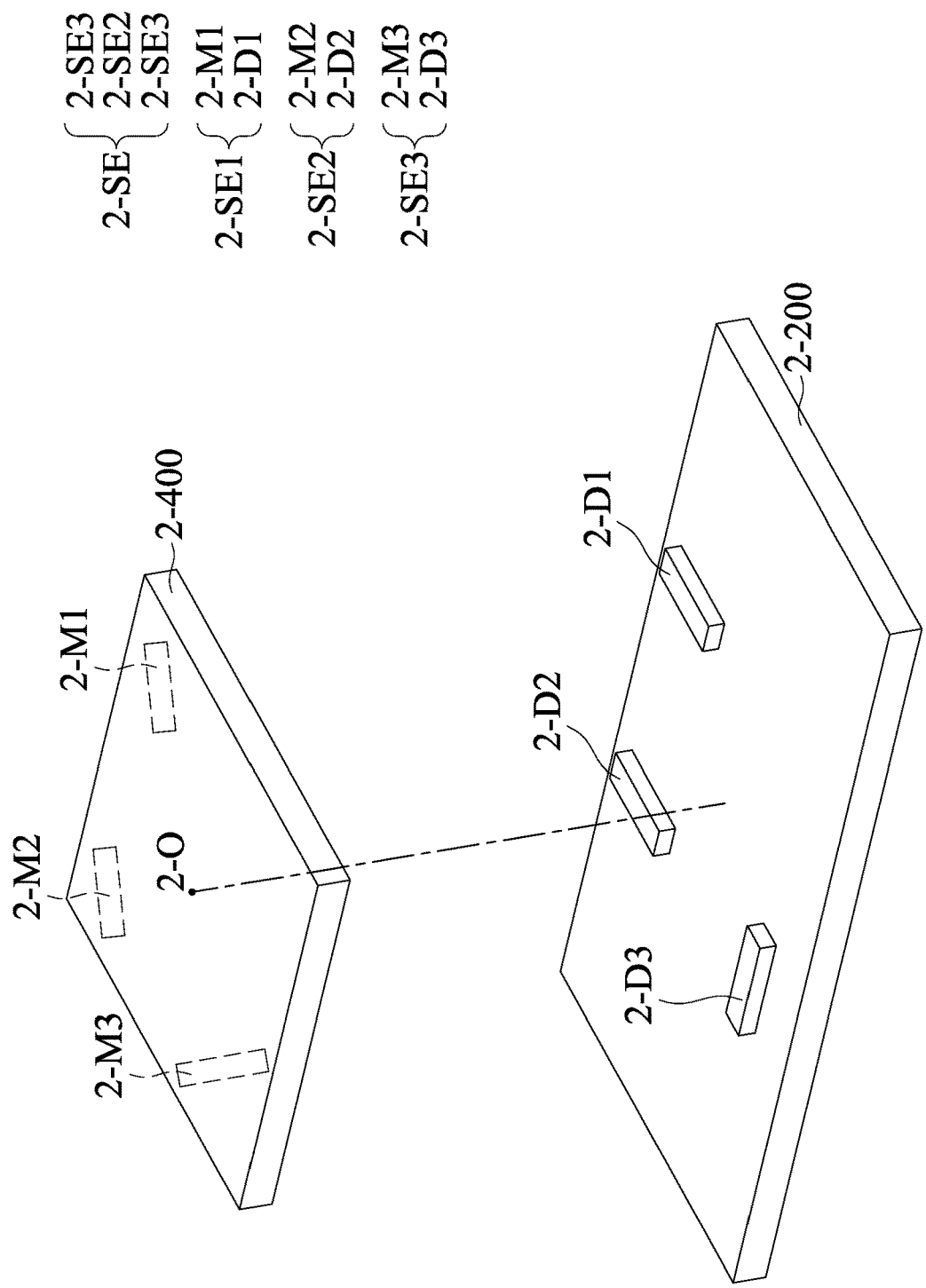
FIG. 15 is a schematic view of some elements of the optical element driving mechanism.

FIG. 15 is a schematic view of some elements of the optical element driving mechanism 2-100, wherein the third substrate 2-200, the first movable portion 2-400, a first sensing element 2-SE1 (which includes a first reference magnetic unit 2-M1 and a first magnetic sensing unit 2-D1), a second sensing element 2-SE2 (which includes a second reference magnetic unit 2-M2 and a second magnetic sensing unit 2-D2), and a third sensing element 2-SE3 (which includes a third reference magnetic unit 2-M3 and a third magnetic sensing unit 2-D3) disposed on the third substrate 2-200 and the first movable portion 2-400 are illustrated. The first sensing element 2-SE1, the second sensing element 2-SE2, and the third sensing element 2-SE3 may be called as a first position sensing assembly 2-SE used for detecting the movement of the first movable portion 2-400 relative to the 2-F. For example, the first position sensing assembly 2-SE may be used for detecting the movement of the first movable portion 2-400 relative to the 2-F in the direction that is perpendicular to the main axis 2-O, such as a translational movement in the XY plane. Alternatively, the first position sensing assembly 2-SE may be used for detecting the rotation of the first movable portion 2-400 with a first rotational axis, and the first rotational axis is parallel to the main axis 2-O.

In some embodiments, the first reference magnetic unit 2-M1, the second reference magnetic unit 2-M2, and the third reference magnetic unit 2-M3 are disposed on the first movable portion 2-400. The first magnetic sensing unit 2-D1, the second magnetic sensing unit 2-D2, and the third magnetic sensing unit 2-D3 are disposed on the third substrate 2-200 to detect the magnetic field strength in a direction that is parallel to the main axis 2-O. When the first movable portion 2-400 moves relative to the third substrate 2-200, the magnetic field generated by the first reference magnetic unit 2-M1, the second reference magnetic unit 2-M2, and the third reference magnetic unit 2-M3 relative to the first magnetic sensing unit 2-D1, the second magnetic sensing unit 2-D2, and the third magnetic sensing unit 2-D3 may change. The first magnetic sensing unit 2-D1, the second magnetic sensing unit 2-D2, and the third magnetic sensing unit 2-D3 may detect the variation to get the position of the first movable portion 2-400 relative to the third substrate 2-200. The first movable portion 2-400 may be controlled according to its position (e.g. by the 800) to achieve optical image stabilization.

Figure 16A:
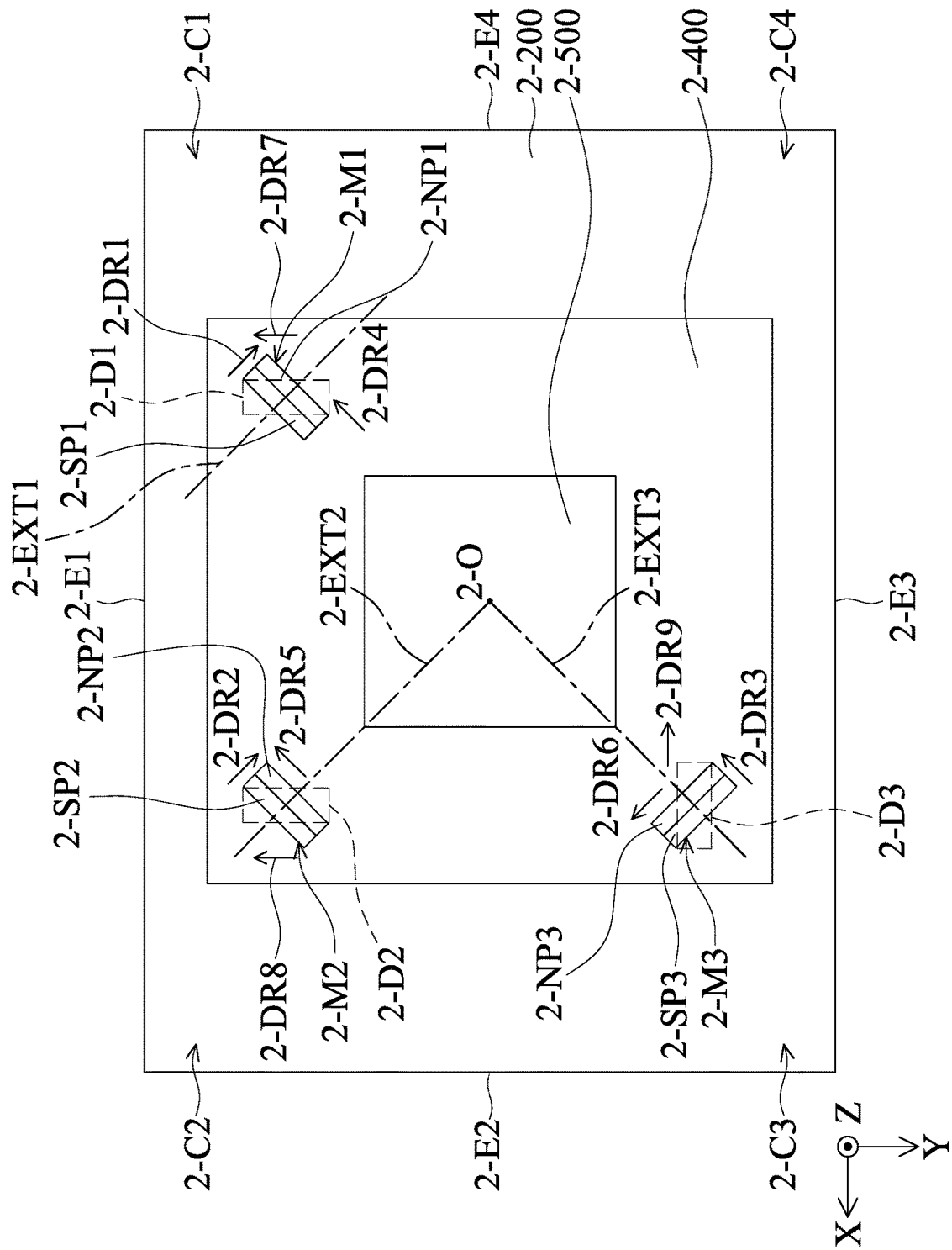
FIG. 16A is a schematic view of some elements of the optical element driving mechanism.

FIG. 16A is a schematic view of some elements of the optical element driving mechanism 2-100, wherein the position relationship between the first reference magnetic unit 2-M1, the second reference magnetic unit 2-M2, the third reference magnetic unit 2-M3, the first magnetic sensing unit 2-D1, the second magnetic sensing unit 2-D2, and the third magnetic sensing unit 2-D3 are shown. It should be noted that when viewed along the main axis 2-O, the first reference magnetic unit 2-M1 at least partially overlaps the first magnetic sensing unit 2-D1, the second reference magnetic unit 2-M2 at least partially overlaps the second magnetic sensing unit 2-D2, the third reference magnetic unit 2-M3 at least partially overlaps the third magnetic sensing unit 2-D3, so the magnetic field may be detected.

As shown in FIG. 16A, the first reference magnetic unit 2-M1 includes a first north pole 2-NP1 and a first south pole 2-SP1, the second reference magnetic unit 2-M2 includes a second north pole 2-NP2 and a second south pole 2-SP2, and the third reference magnetic unit 2-M3 includes a third north pole 2-NP3 and a third south pole 2-SP3. It should be noted that in this embodiment the reference magnetic units are rectangular, and the north pole and the S pole are arranged in the short axis direction. For example, in some embodiments, when viewed along the main axis 2-O (the Z direction), the first north pole 2-NP1 and the first south pole 2-SP1 are arranged along a first direction 2-DR1, the second north pole 2-NP2 and the second south pole 2-SP2 are arranged along a second direction 2-DR2, and the third north pole 2-NP3 and the third south pole 2-SP3 are arranged along a third direction 2-DR3.

It should be noted that at least one of the first direction 2-DR1, the second direction 2-DR2, and the third direction 2-DR3 is different from others. For example, in some embodiments, the first direction 2-DR1 and the second direction 2-DR2 may be parallel, and the third direction 2-DR3 may be perpendicular to the first direction 2-DR1 and the second direction 2-DR2. In other words, at least two of the first direction 2-DR1, the second direction 2-DR2, and the third direction 2-DR3 are parallel, and at least two of the first direction 2-DR1, the second direction 2-DR2, and the third direction 2-DR3 are perpendicular.

The main axis 2-O may pass the center of the first movable portion 2-400 and the 500 (i.e. a reference point). A connection 2-EXT1 passes the first north pole 2-NP1 and the first south pole 2-SP1, a connection 2-EXT2 passes the second north pole 2-NP2 and the second south pole 2-SP2, and a connection 2-EXT3 passes the third north pole 2-NP3 and the third south pole 2-SP3. At least one of the connection 2-EXT1, the connection 2-EXT2, and the connection 2-EXT3 does not pass the center of the 500 (i.e. does not interest the main axis 2-0). For example, in this embodiment, the connection 2-EXT1 does not interest the main axis 2-O, and the connection 2-EXT2 and the connection 2-EXT3 intersects the main axis 2-O. In other words, two of the connection 2-EXT1, the connection 2-EXT2, and the connection 2-EXT3 intersects the center of the 500, and the number of the connections that does not intersect the main axis 2-O is an odd number. Therefore, when the first movable portion 2-400 rotates relative to the third substrate 2-200 with the main axis 2-O as its rotational axis, at least one reference magnetic unit has greater magnetic field variation to enhance the detection.

Moreover, when viewed along the main axis 2-O, the first reference magnetic unit 2-M1, the second reference magnetic unit 2-M2, and the third reference magnetic unit 2-M3 may be strip-shaped, and a long axis of the first reference magnetic unit 2-M1 extends in a fourth direction 2-DR4, a long axis of the second reference magnetic unit 2-M2 extends in a fifth direction 2-DR5, and a long axis of the third reference magnetic unit 2-M3 extends in a sixth direction 2-DR6.

It should be noted that at least one of the fourth direction 2-DR4, the fifth direction 2-DR5, and the sixth direction 2-DR6 is different from others, and at least two of the fourth direction 2-DR4, the fifth direction 2-DR5, and the sixth direction 2-DR6 are parallel. For example, the fourth direction 2-DR4 and the fifth direction 2-DR5 may be parallel, and the sixth direction 2-DR6 may be not parallel to the fourth direction 2-DR4 and the fifth direction 2-DR5. Moreover, the fourth direction 2-DR4 is not parallel to the first direction 2-DR1, such as may be perpendicular.

Because the magnetic pole directions and the positions of the first reference magnetic unit 2-M1, the second reference magnetic unit 2-M2, and the third reference magnetic unit 2-M3 are not totally identical, each reference magnetic unit may provide magnetic field in different directions to detect the movement of the first movable portion 2-400 in different directions more efficiently.

In some embodiments, when viewed along the main axis 2-O, the first magnetic sensing unit 2-D1, the second magnetic sensing unit 2-D2, and the third magnetic sensing unit 2-D3 may be strip-shaped. The first magnetic sensing unit 2-D1 may extend in a seventh direction 2-DR7, the second magnetic sensing unit 2-D2 may extend in a eighth direction 2-DR8, and the third magnetic sensing unit 2-D3 may extend in a ninth direction 2-DR9.

It should be noted that at least one of the seventh direction 2-DR7, the eighth direction 2-DR8, and the ninth direction 2-DR9 is different from others, and at least two of the seventh direction 2-DR7, the eighth direction 2-DR8, and the ninth direction 2-DR9 are parallel. For example, the seventh direction 2-DR7 and the eighth direction 2-DR8 may be parallel, and the ninth direction 2-DR9 may be perpendicular to the seventh direction 2-DR7 and the eighth direction 2-DR8. Moreover, the seventh direction 2-DR7 is not parallel or not perpendicular to the first direction 2-DR1 and the fourth direction 2-DR4, the eighth direction 2-DR8 is not parallel or not perpendicular to the second direction 2-DR2 and the fifth direction 2-DR5, and the ninth direction 2-DR9 is not parallel or not perpendicular to the third direction 2-DR3 and the sixth direction 2-DR6.

In some embodiments, the 2-F (e.g. the third substrate 2-200) may include a first side 2-E1, a second side 2-E2, a third side 2-E3, and a fourth side 2-E4. The first side 2-E1 is parallel to the third side 2-E3, and the second side 2-E2 is parallel to the fourth side 2-E4. The second side 2-E2 is between the first side 2-E1 and the third side 2-E3, and the first side 2-E1 and the second side 2-E2 extend in different directions. For example, the first side 2-E1 is perpendicular to the second side 2-E2, but it is not limited thereto. Moreover, the first direction 2-DR1 is not parallel or not perpendicular to the first side 2-E1.

When viewed along the main axis 2-O, the first magnetic sensing unit 2-D1 is at a first corner 2-C1 that formed by the first side 2-E1 and the fourth side 2-E4, the second magnetic sensing unit 2-D21 is at a second corner 2-C2 that formed by the first side 2-E1 and the second side 2-E2, the third magnetic sensing unit 2-D3 is at a third corner 2-C3 that formed by the second side 2-E2 and the third side 2-E3, and no magnetic sensing unit is disposed at the fourth corner 2-C4 that formed by the third side 2-E3 and the fourth side 2-E4. In other words, the magnetic sensing units may be disposed on different corners of the 2-F to detect the magnetic field variation in different positions more efficiently. Furthermore, the 500 does not overlap the 2-SE when viewed along the main axis 2-O, and the 500 at least partially overlaps the 2-SE in a direction that is perpendicular to the main axis 2-O (not shown). Therefore, the size of the optical element driving mechanism 2-100 in the Z direction may be reduced to achieve miniaturization.

Figure 16B:
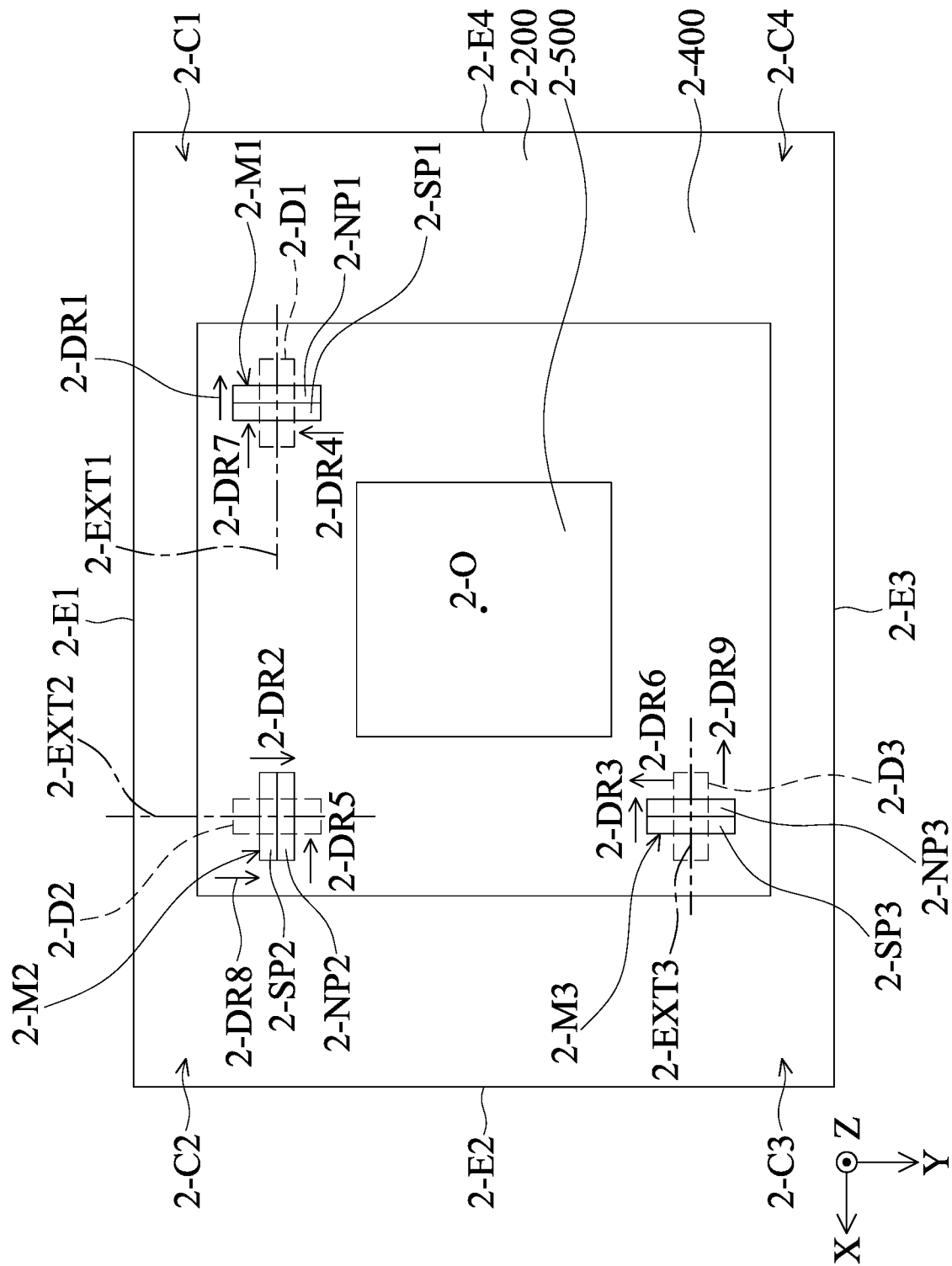
FIG. 16B is a schematic view of some elements of the optical element driving mechanism.

However, the present disclosure is not limited thereto. For example, FIG. 16B is a schematic view of some elements of the optical element driving mechanism 2-100. It should be noted that the elements are not arranged in an identical manner to the previous embodiments.

FIG. 16B shows the position relationship between the first reference magnetic unit 2-M1, the second reference magnetic unit 2-M2, the third reference magnetic unit 2-M3, the first magnetic sensing unit 2-D1, the second magnetic sensing unit 2-D2, and the third magnetic sensing unit 2-D3 in other embodiments. It should be noted that when viewed along the main axis 2-O, the first reference magnetic unit 2-M1 at least partially overlaps the first magnetic sensing unit 2-D1, the second reference magnetic unit 2-M2 at least partially overlaps the second magnetic sensing unit 2-D2, the third reference magnetic unit 2-M3 at least partially overlaps the third magnetic sensing unit 2-D3, so the magnetic field may be detected.

As shown in FIG. 16B, the first reference magnetic unit 2-M1 includes a first north pole 2-NP1 and a first south pole 2-SP1, the second reference magnetic unit 2-M2 includes a second north pole 2-NP2 and a second south pole 2-SP2, and the third reference magnetic unit 2-M3 includes a third north pole 2-NP3 and a third south pole 2-SP3. It should be noted that in this embodiment the reference magnetic units are rectangular, and the north pole and the S pole are arranged in the short axis direction. For example, in some embodiments, when viewed along the main axis 2-O (the Z direction), the first north pole 2-NPT and the first south pole 2-SP1 are arranged along a first direction 2-DR1, the second north pole 2-NP2 and the second south pole 2-SP2 are arranged along a second direction 2-DR2, and the third north pole 2-NP3 and the third south pole 2-SP3 are arranged along a third direction 2-DR3.

It should be noted that at least one of the first direction 2-DR1, the second direction 2-DR2, and the third direction 2-DR3 is different from others. For example, in some embodiments, the first direction 2-DR1 and the third direction 2-DR3 may be parallel, and the second direction 2-DR2 may be perpendicular to the first direction 2-DR1 and the third direction 2-DR3. In other words, at least two of the first direction 2-DR1, the second direction 2-DR2, and the third direction 2-DR3 are parallel, and at least two of the first direction 2-DR1, the second direction 2-DR2, and the third direction 2-DR3 are perpendicular.

The main axis 2-O may pass the center of the first movable portion 2-400 and the 500 (i.e. a reference point). A connection 2-EXT1 passes the first north pole 2-NP1 and the first south pole 2-SP1, a connection 2-EXT2 passes the second north pole 2-NP2 and the second south pole 2-SP2, and a connection 2-EXT3 passes the third north pole 2-NP3 and the third south pole 2-SP3. At least one of the connection 2-EXT1, the connection 2-EXT2, and the connection 2-EXT3 does not pass the center of the 500 (i.e. does not interest the main axis 2-0). For example, in this embodiment, the connection 2-EXT1, the connection 2-EXT2, and the connection 2-EXT3 do not interest the main axis 2-O, and the number of the connections that does not intersect the main axis 2-O is an odd number. Therefore, when the first movable portion 2-400 rotates relative to the third substrate 2-200 with the main axis 2-0 as its rotational axis, at least one reference magnetic unit has greater magnetic field variation to enhance the detection.

Moreover, when viewed along the main axis 2-O, the first reference magnetic unit 2-M1, the second reference magnetic unit 2-M2, and the third reference magnetic unit 2-M3 may be strip-shaped, and a long axis of the first reference magnetic unit 2-M1 extends in a fourth direction 2-DR4, a long axis of the second reference magnetic unit 2-M2 extends in a fifth direction 2-DR5, and a long axis of the third reference magnetic unit 2-M3 extends in a sixth direction 2-DR6.

It should be noted that at least one of the fourth direction 2-DR4, the fifth direction 2-DR5, and the sixth direction 2-DR6 is different from others, and at least two of the fourth direction 2-DR4, the fifth direction 2-DR5, and the sixth direction 2-DR6 are parallel. For example, the fourth direction 2-DR4 and the sixth direction 2-DR6 may be parallel, and the fifth direction 2-DR5 may be not parallel to the fourth direction 2-DR4 and the sixth direction 2-DR6. Moreover, the fourth direction 2-DR4 is not parallel to the first direction 2-DR1, such as may be perpendicular.

Because the magnetic pole directions and the positions of the first reference magnetic unit 2-M1, the second reference magnetic unit 2-M2, and the third reference magnetic unit 2-M3 are not totally identical, each reference magnetic unit may provide magnetic field in different directions to detect the movement of the first movable portion 2-400 in different directions more efficiently.

In some embodiments, when viewed along the main axis 2-O, the first magnetic sensing unit 2-D1, the second magnetic sensing unit 2-D2, and the third magnetic sensing unit 2-D3 may be strip-shaped. The first magnetic sensing unit 2-D1 may extend in a seventh direction 2-DR7, the second magnetic sensing unit 2-D2 may extend in a eighth direction 2-DR8, and the third magnetic sensing unit 2-D3 may extend in a ninth direction 2-DR9.

It should be noted that at least one of the seventh direction 2-DR7, the eighth direction 2-DR8, and the ninth direction 2-DR9 is different from others, and at least two of the seventh direction 2-DR7, the eighth direction 2-DR8, and the ninth direction 2-DR9 are parallel. For example, the seventh direction 2-DR7 and the ninth direction 2-DR9 may be parallel, and the eighth direction 2-DR8 may be perpendicular to the seventh direction 2-DR7 and the ninth direction 2-DR9. Moreover, the seventh direction 2-DR7 may be parallel to the first direction 2-DR1 and perpendicular to the fourth direction 2-DR4, the eighth direction 2-DR8 may be parallel to the second direction 2-DR2 and perpendicular to the fifth direction 2-DR5, the ninth direction 2-DR9 may be parallel to the third direction 2-DR3 and perpendicular to the sixth direction 2-DR6.

In some embodiments, the 2-F (e.g. the third substrate 2-200) may include a first side 2-E1, a second side 2-E2, a third side 2-E3, and a fourth side 2-E4. In some embodiments, the first side 2-E1 is parallel to the third side 2-E3, and the second side 2-E2 is parallel to the fourth side 2-E4. The second side 2-E2 is between the first side 2-E1 and the third side 2-E3, and the first side 2-E1 and the second side 2-E2 extend in different directions. For example, the first side 2-E1 is perpendicular to the second side 2-E2, but it is not limited thereto. Moreover, the first direction 2-DR1 is not parallel or not perpendicular to the first side 2-E1.

When viewed along the main axis 2-O, the first magnetic sensing unit 2-D1 is at a first corner 2-C1 that formed by the first side 2-E1 and the fourth side 2-E4, the second magnetic sensing unit 2-D21 is at a second corner 2-C2 that formed by the first side 2-E1 and the second side 2-E2, the third magnetic sensing unit 2-D3 is at a third corner 2-C3 that formed by the second side 2-E2 and the third side 2-E3, and no magnetic sensing unit is disposed at the fourth corner 2-C4 that formed by the third side 2-E3 and the fourth side 2-E4. In other words, the magnetic sensing units may be disposed on different corners of the 2-F to detect the magnetic field variation in different positions more efficiently. Furthermore, the 500 does not overlap the 2-SE when viewed along the main axis 2-O, and the 500 at least partially overlaps the 2-SE in a direction that is perpendicular to the main axis 2-O (not shown). Therefore, the size of the optical element driving mechanism 2-100 in the Z direction may be reduced to achieve miniaturization. It should be noted that the direction of the north pole and the S pole in the embodiments may be interchanged, depending on design requirement.

In some embodiments, the first magnetic element 150 may be omitted, and the first coil 140 may interact with the first reference magnetic unit 2-M1, the second reference magnetic unit 2-M2, and the third reference magnetic unit 2-M3 to generate a driving force for driving the second movable portion 130 to move relative to the first movable portion 2-400. Therefore, required elements may be reduced to achieve miniaturization.

Figure 16C:
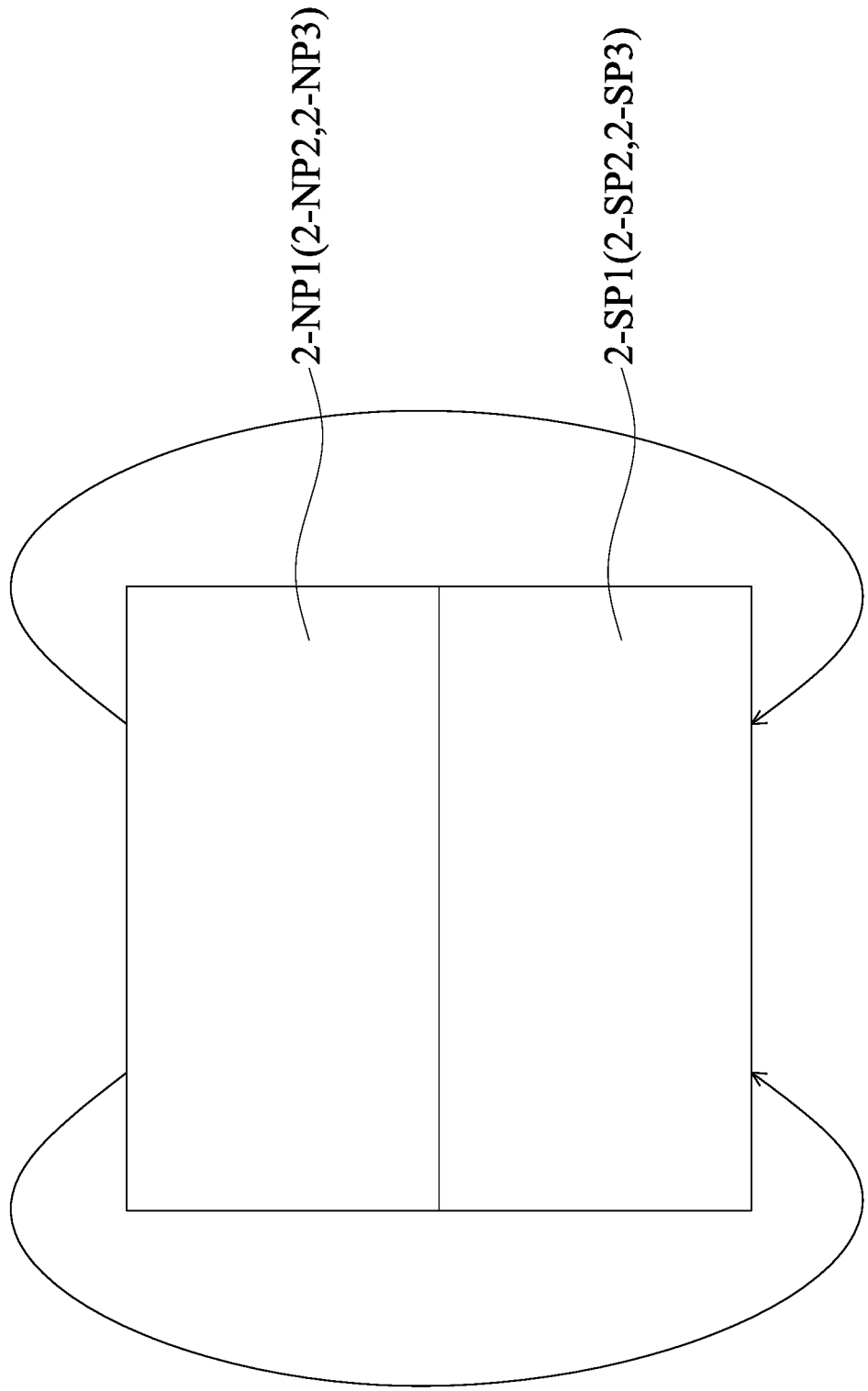
FIG. 16C is a schematic view of the reference magnetic unit.

FIG. 16C is a schematic view of the reference magnetic unit. As shown in FIG. 16C, the magnetic line of force of the reference magnetic unit may start from the north pole (e.g. the first north pole 2-NP1, the second north pole 2-NP2, or the third north pole 2-NP3) to the south pole (e.g. the first south pole 2-SP1, the second south pole 2-SP2, or the third south pole 2-SP3).

Figure 17:
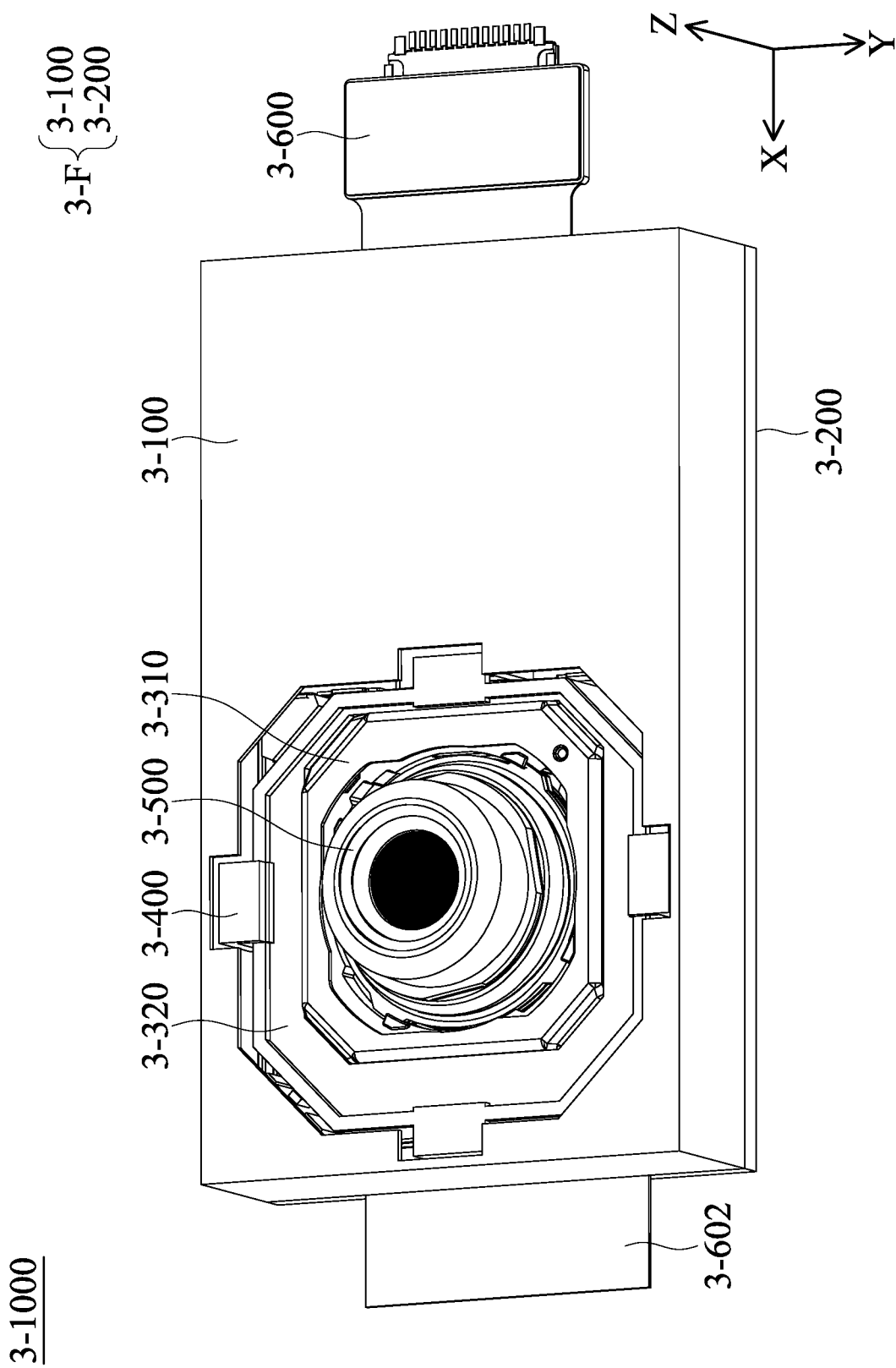
FIG. 17 is a perspective view of an optical system in some embodiments of the present disclosure.
Figure 18:
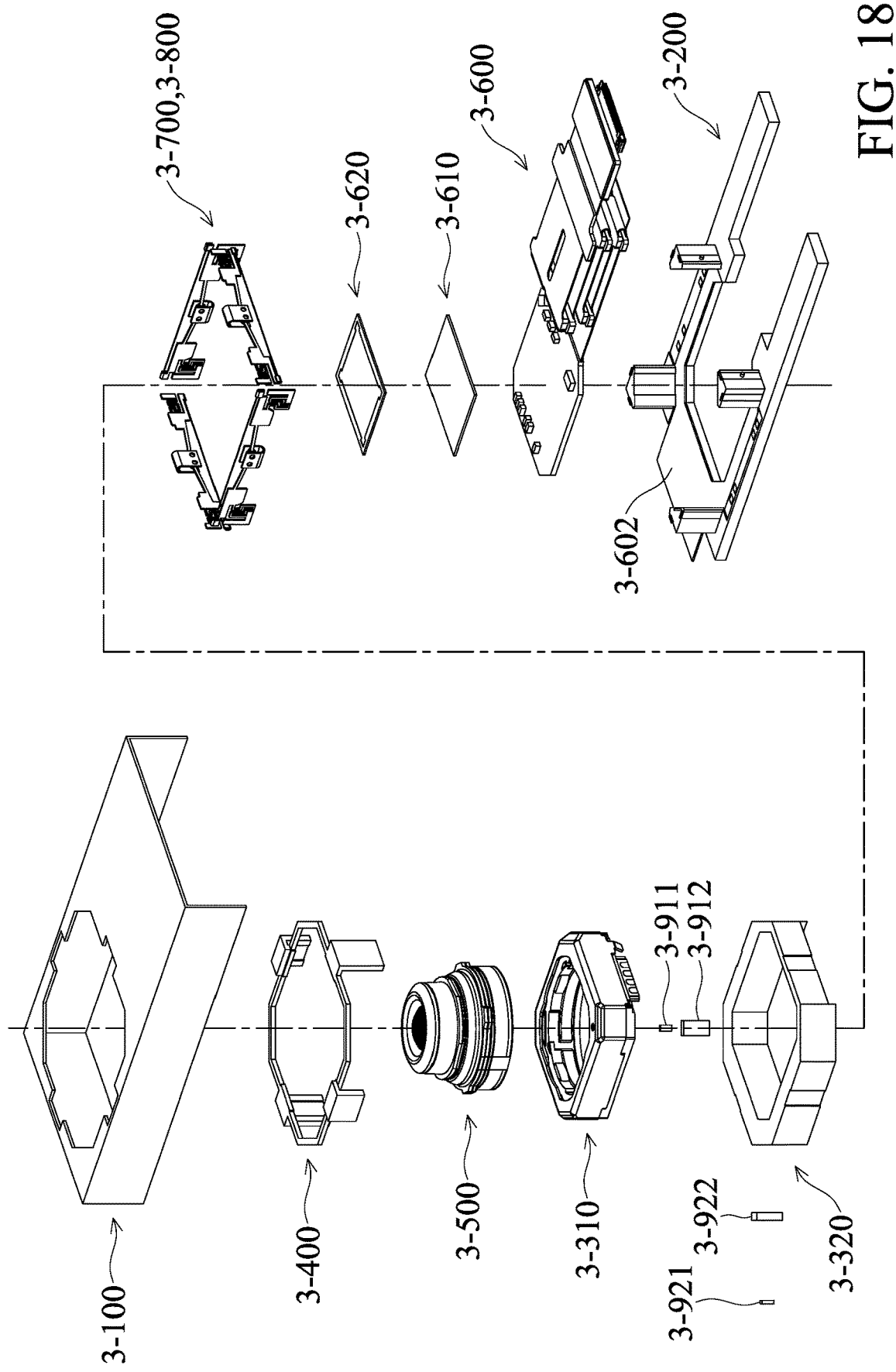
FIG. 18 is an exploded view of the optical system.
Figure 19:
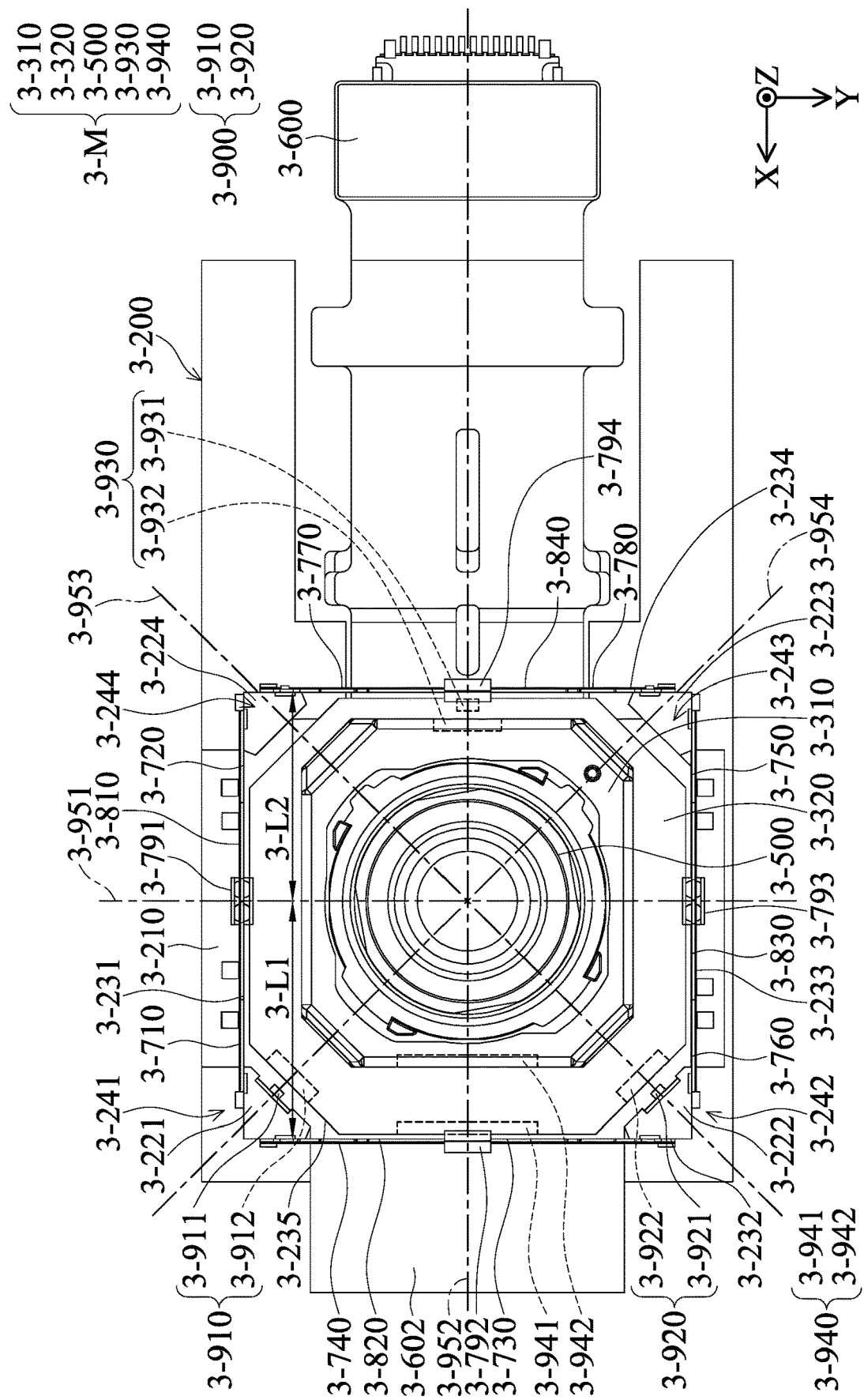
FIG. 19 is a top view of the optical system.
Figure 20A:
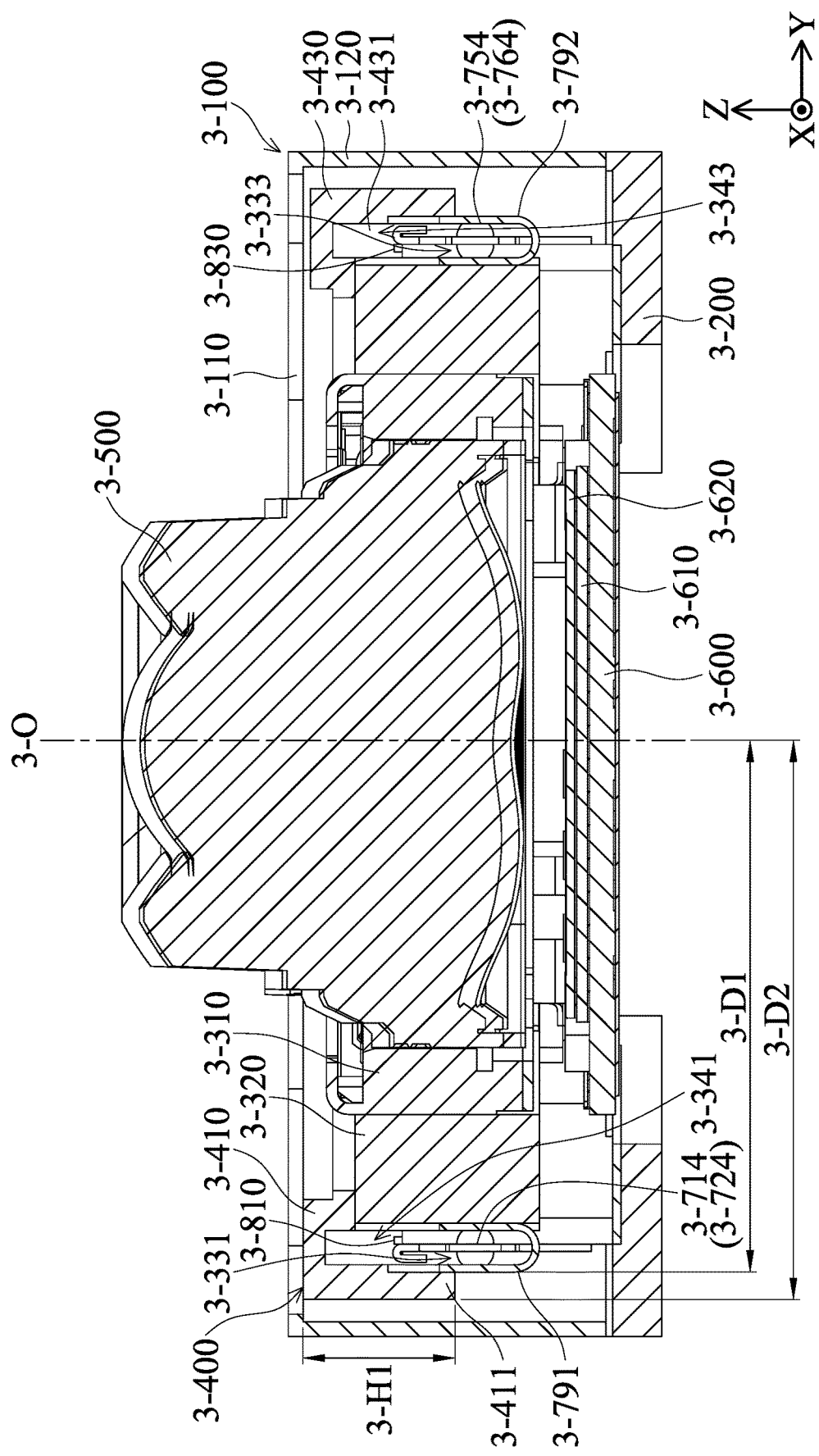
FIG. 20A is a cross-sectional view of the optical system illustrated along a first rotational axis.
Figure 20B:
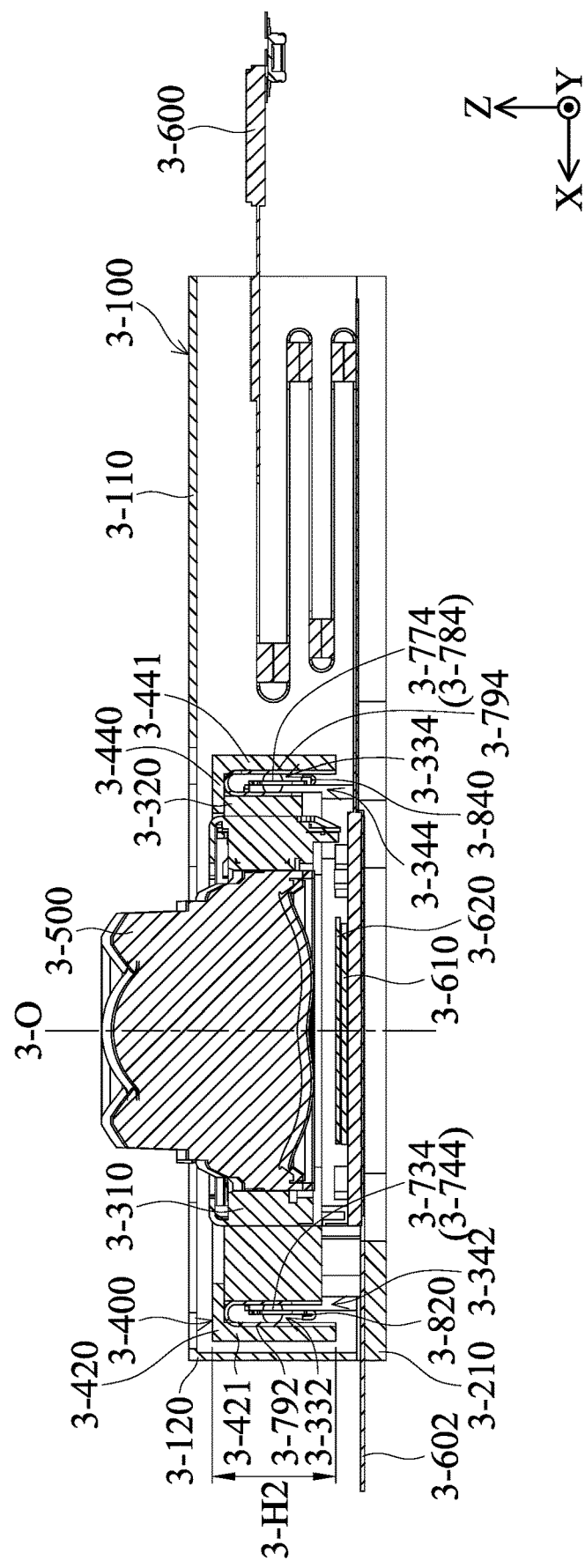
FIG. 20B is a cross-sectional view of the optical system illustrated along a second rotational axis.

FIG. 17 is a perspective view of the optical system 3-1000 in some embodiments of the present disclosure. FIG. 18 is an exploded view of the optical system 3-1000. FIG. 19 is a top view of the optical system 3-1000. FIG. 20A is a cross-sectional view of the optical system 3-1000 illustrated along a first rotational axis 3-951 in FIG. 19. FIG. 20B is a cross-sectional view of the optical system 3-1000 illustrated along the second rotational axis 3-952 in FIG. 19.

In some embodiments, the optical system 3-1000 mainly includes a case 3-100, a circuit module 3-200, a movable portion 3-400, an external circuit 3-600, an optical sensor 3-610, a light filter 3-620, a transmission assembly 3-700, and a driving assembly 3-800 arranged along an optical axis 3-O. The optical system 3-1000 may be disposed on an electronic apparatus, such as may be disposed on a cell phone, a tablet, or a notebook, but the present disclosure is not limited thereto.

The optical system 3-1000 may be used for driving an optical module 3-M. For example, the optical module 3-M may include a holder 3-310, a frame 3-320, an optical element 3-500, a second sensing module (includes a combination of a third sensing assembly 3-930 and a holder driving mechanism 3-940, the third sensing assembly 3-930 includes a third sensing element 3-931 and a third reference element 3-932). Alternatively, the optical system 3-1000 may be used for driving an optical element, such as a lens, a mirror, a prism, a beam splitter, and aperture, a liquid lens, an image sensor, a camera module, or a ranging module. It should be noted that the optical element is not limited to the element related to visible light. Other element related to invisible light (e.g. infrared or ultraviolet) may be also included in the present disclosure. In some embodiments, the optical module 3-M and the movable portion 3-400 may be called as a movable portion, which is movable relative to the fixed portion 3-F.

In some embodiments, the holder driving mechanism 3-940 may be disposed in the frame 3-320. The holder driving mechanism 3-940 is used for driving the holder 3-310 and the optical element 3-500 which is connected to the holder 3-310 to move relative to the frame 3-320 in the X, Y, or Z directions. The transmission assembly 3-700 and the driving assembly 3-800 may be used for driving the movable portion 3-400 and the optical module 3-M affixed on the movable portion 3-400 to move relative to the case 3-100 and the circuit module 3-200. The movable portion 3-400 may be affixed on the frame 3-320. The case 3-100 and the circuit module 3-200 may be called as the fixed portion 3-F. The case 3-100 may include atop portion 3-110 and a sidewall 3-120 connected to each other and are plate-shaped. The fixed portion 3-F may be affixed on the electronic apparatus.

The optical axis 3-O may be defined as an optical axis passing through the center of the optical element 3-500. The optical axis 3-O is perpendicular to the top portion 3-110 and parallel to the sidewall 3-120. The optical element 3-500 may perform focus to the optical sensor 3-610 along the optical axis 3-O. In some embodiments, the holder 3-310 has a through hole, and the optical element 3-500 may be affixed in the through hole to move with the holder 3-310. In other words, the holder 3-310 may be used for holding the optical element 3-500. The holder driving mechanism 3-940 includes a first holder driving element 3-941 and a second holder driving element 3-942 used for driving the holder 3-310 to move relative to the frame 3-320. The first holder driving element 3-941 may be a magnetic element, and the second holder driving element 3-942 may be a coil. The first holder driving element 3-941 and the second holder driving element 3-942 may be respectively disposed on the fixed portion 3-F and the holder 3-310, or their position may be interchanged, depending on design requirement. It should be noted that the interaction between the first holder driving element 3-941 and the second holder driving element 3-942 may generate a magnetic force to move the optical element 3-500 on the holder 3-310 relative to the fixed portion 3-F, so auto focus (AF) or optical image stabilization (OIS) may be achieved. In some embodiments, the holder driving mechanism 3-940 may also include piezoelectric elements or shape memory alloy elements.

In this embodiments, the optical module 3-M and the optical element 3-500 disposed in the optical module 3-M are movably disposed in the fixed portion 3-F. When current is passed to the second holder driving element 3-942, the second holder driving element 3-942 may interact with the magnetic field of the first holder driving element 3-941 to generate an electromagnetic force to move the holder 3-310 and the optical element 3-500 along the optical axis 3-O relative to the fixed portion 3-F to achieve auto focus.

In some embodiments, a first sensing module 3-900 may be disposed in the optical system 3-1000 used for detect of the position of the optical module 3-M relative to the fixed portion 3-F. The first sensing module 3-900 may include a first sensing assembly 3-910 and a second sensing assembly 3-920. The first sensing assembly 3-910 may include a first sensing element 3-911 and a first reference element 3-912, and the second sensing assembly 3-920 may include a second sensing element 3-921 and a second reference element 3-922. The first sensing assembly 3-910 and the second sensing assembly 3-920 may be used for detecting the movement of the movable portion 3-400 or the optical module 3-M relative to the fixed portion 3-F.

The first sensing element 3-911 or the second sensing element 3-921 may include a Hall sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate Sensor.

The first reference element 3-912 and the second reference element 3-922 may be magnets used for generating a reference magnetic field. The first sensing element 3-911 and the second sensing element 3-921 respectively correspond to the first reference element 3-912 and the second reference element 3-922, such as arranged along the radius direction of the optical element 3-500. When viewed along the optical axis 3-O, a first corner 3-241 and a second corner 3-242 of the fixed portion 3-F at opposite ends of the second side 3-232.

The first sensing element 3-911 and the second sensing element 3-921 may be used for respectively detecting the reference magnetic field generated by the first reference element 3-912 and the second reference element 3-922, thereby providing a first sensing signal and a second sensing signal (such as to a process unit of the electronic apparatus) to achieve the movement or the position of the movable portion 3-400 or the optical module 3-M relative to the fixed portion 3-F.

For example, the first sensing module 3-900 may be used for detecting the movement of the movable portion 3-400 or the holder 3-310 relative to the fixed portion 3-F in different dimensions, such as the lateral movements in the X direction (first dimension), in the Y direction (second dimension), or in the Z direction (third dimension), or a rotation with the Z axis as its rotational axis (fourth dimension), but the present disclosure is not limited thereto.

The external circuit 3-600 may be a flexible printed circuit (FPC), which may be affixed on the circuit module 3-200 by gluing. In this embodiment, the external circuit 3-600 is electrically connected to other electronic elements inside or outside the optical system 3-1000. For example, The external circuit 3-600 may provide electronic signal to the holder driving mechanism 3-940 of the optical module 3-M to control the movement of the holder 3-310 in the X, Y or Z direction, and thus achieving auto focus (AF) or optical image stabilization (OIS). The optical sensor 3-610 may be used for receiving an optical signal and providing an image signal.

The light filter 3-620 may only allow light with specific wavelength to pass through, and filtering light having other wavelength. In other words, electromagnetic wave with specific wavelength may be filtered. For example, the light filter 3-620 may filter infrared and allow visible light to pass through, but it is not limited thereto. The light filter 3-620 may correspond to the optical sensor 3-610. Therefore, the light detected by the optical sensor 3-610 may more similar to what eyes receive.

In some embodiments, the driving assembly 3-800 may be used for driving the movable portion 3-400 or the optical module 3-M to move relative to the fixed portion 3-F. In some embodiments, the material of the driving assembly 3-800 may include shape memory alloy (SMA), may be strip-shaped and extending in a direction. Shape memory allow is an alloy that can eliminate the deformation in lower temperature by heating. When the shape memory alloy performs plastic deformation under its phase transition temperature, it may return to its original shape by heating.

Figure 22:
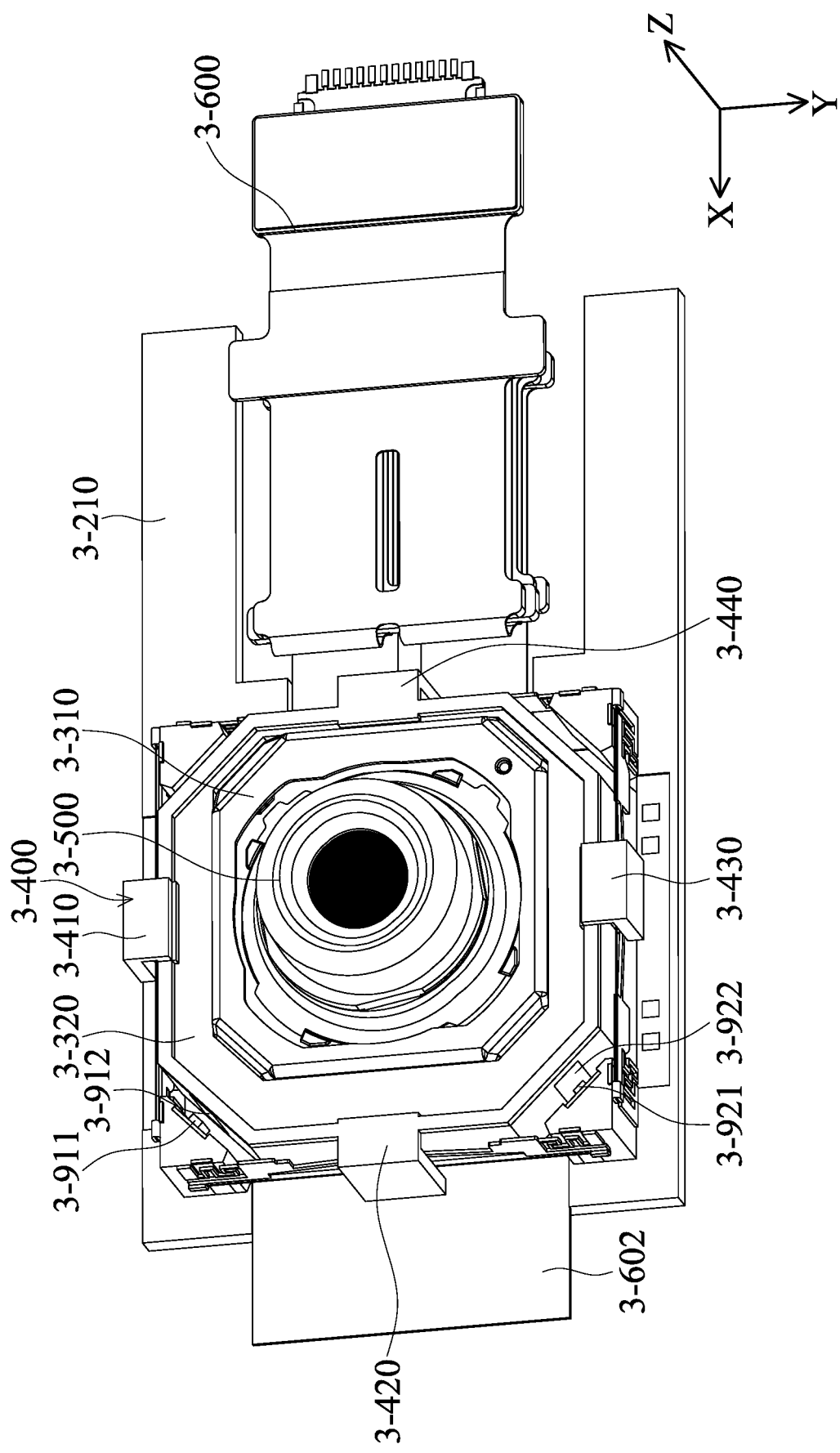
FIG. 22 is a schematic view of some elements of the optical system.
Figure 23:
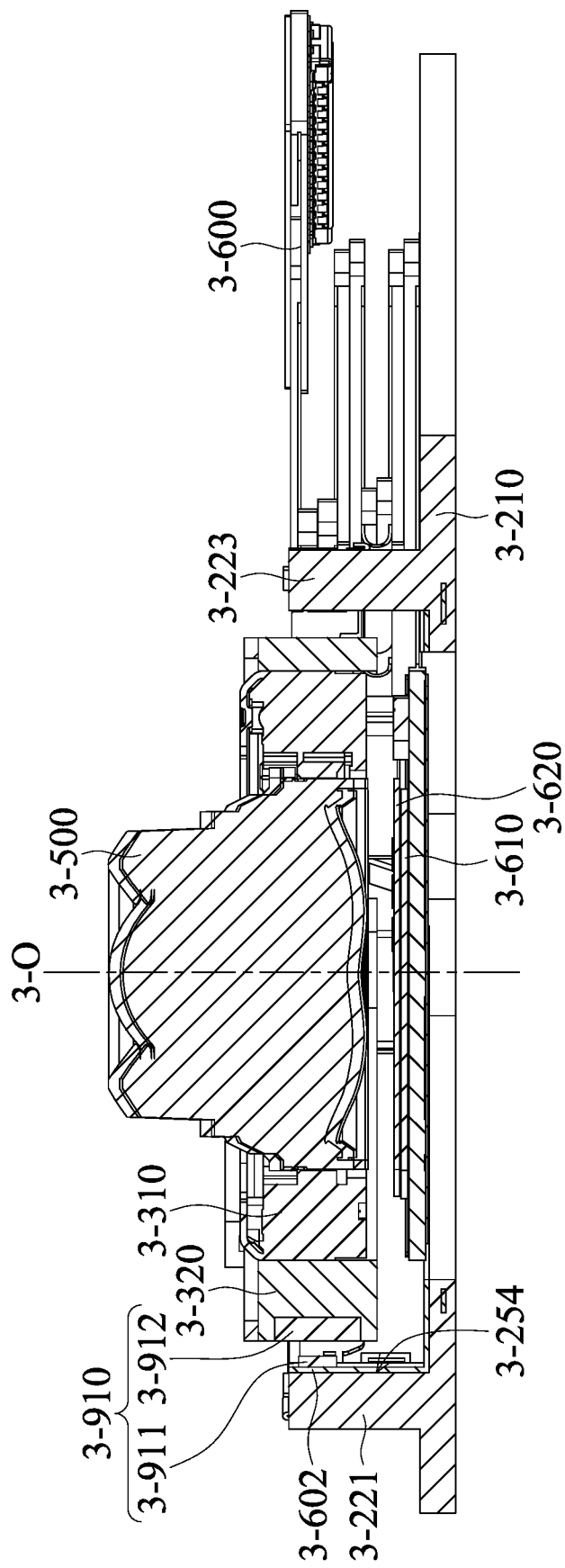
FIG. 23 is a cross-sectional view of the optical system illustrated along a fourth rotational axis in FIG. 19.
Figure 24:
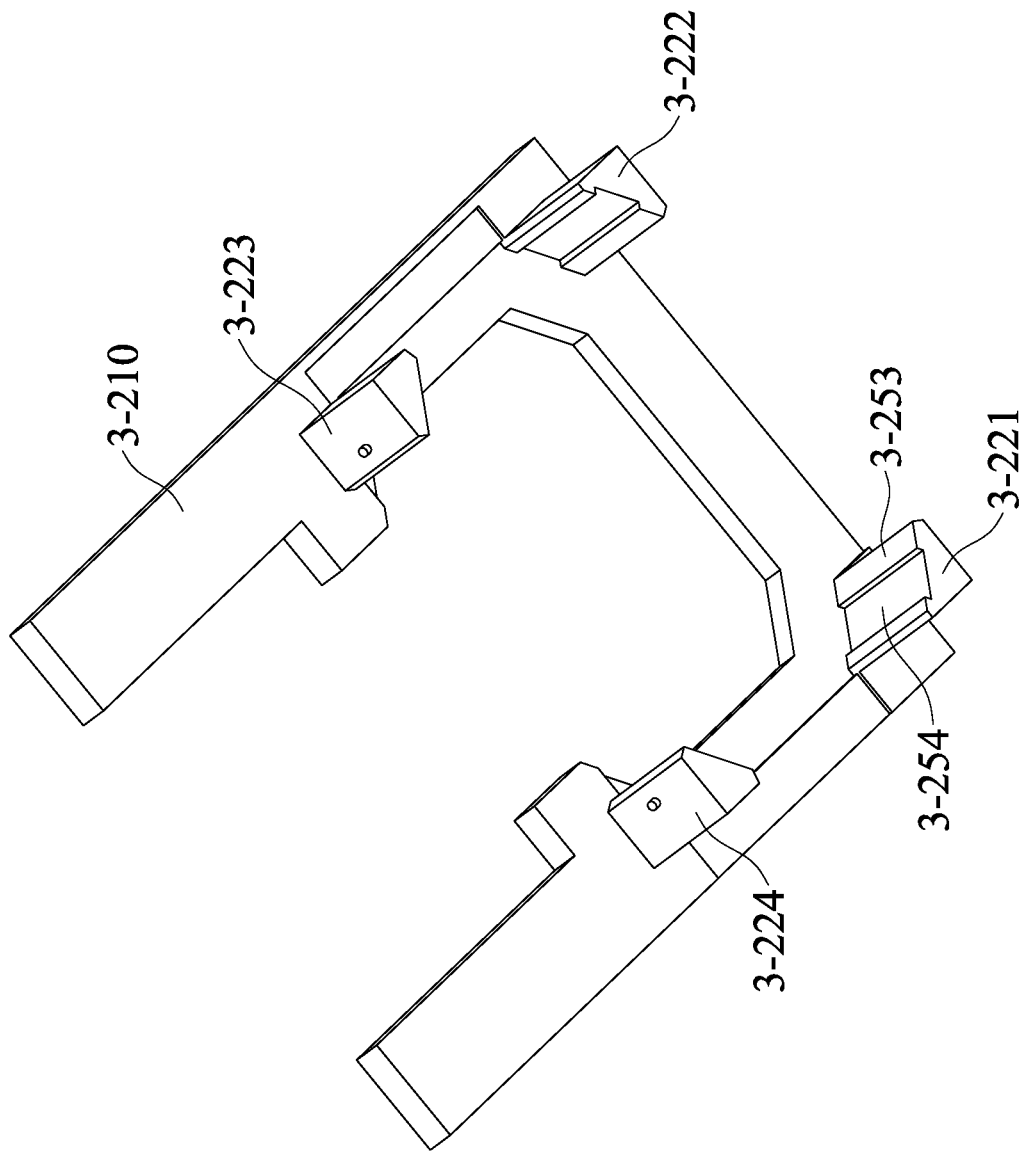
FIG. 24 is a schematic view of the circuit module.

FIG. 21A to FIG. 21D are schematic views of some elements of the optical system 3-1000 when viewed in different direction, wherein the case 3-100 and the movable portion 3-400 are omitted for simplicity. FIG. 22 is a schematic view of some elements of the optical system 3-1000, wherein the case 3-100 is omitted. FIG. 23 is a cross-sectional view illustrated along the fourth rotational axis 3-954 of FIG. 19. FIG. 24 is a schematic view of the circuit module 3-200.

The circuit module 3-200 may include a main body 3-210 and a first protruding portion 3-221, a second protruding portion 3-222, a third protruding portion 3-223, and a fourth protruding portion 3-224 extending from the main body 3-210 in the Z direction (the direction that the optical axis 3-O extends). The main body 3-210 may be plate-shaped, and may be perpendicular to the optical axis 3-O. Moreover, the circuit module 3-200 may have a first metal element 3-261, a second metal element 3-262, a third metal element 3-263, a fourth metal element 3-264, a fifth metal element 3-265, a sixth metal element 3-266, a seventh metal element 3-267, and an eighth metal element 3-268. For example, a portion of the first metal element 3-261 and the second metal element 3-262 may be embedded in the first protruding portion 3-221, and another portion of the first metal element 3-261 and the second metal element 3-262 may be exposed from the first protruding portion 3-221. A portion of the third metal element 3-263 and the fourth metal element 3-264 may be embedded in the second protruding portion 3-222, and another portion of the third metal element 3-263 and the fourth metal element 3-264 may be exposed from the second protruding portion 3-222. A portion of the fifth metal element 3-265 and the sixth metal element 3-266 may be embedded in the third protruding portion 3-223, and another portion of the fifth metal element 3-265 and the sixth metal element 3-266 may be exposed from the third protruding portion 3-223. A portion of the seventh metal element 3-267 and the eighth metal element 3-268 may be embedded in the fourth protruding portion 3-224, and another portion of the seventh metal element 3-267 and the eighth metal element 3-268 may be exposed from the fourth protruding portion 3-224.

Figure 21A:
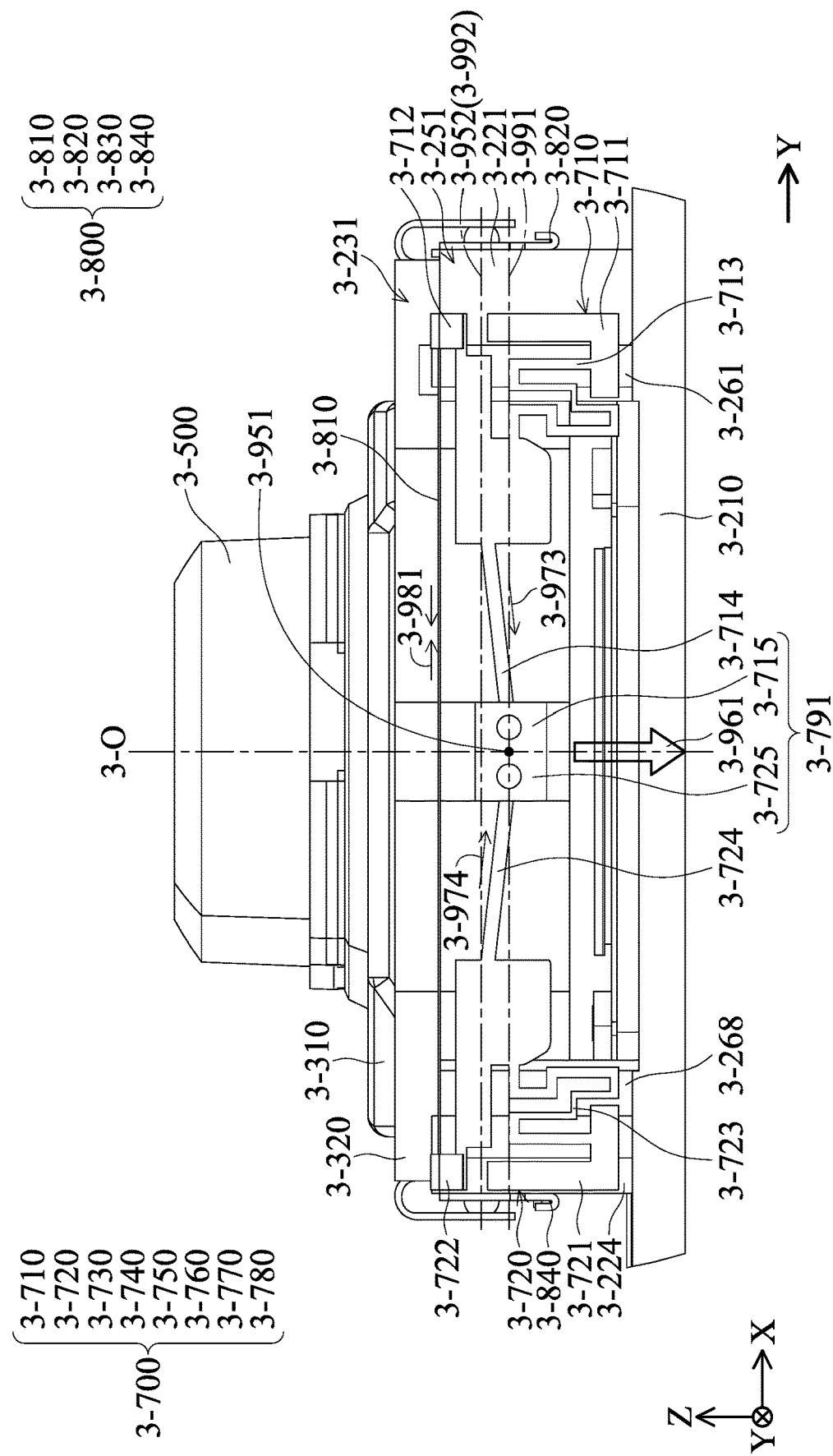
FIG. 21A to FIG. 21D are schematic views of some elements of the optical system illustrated along different directions.
Figure 21B:
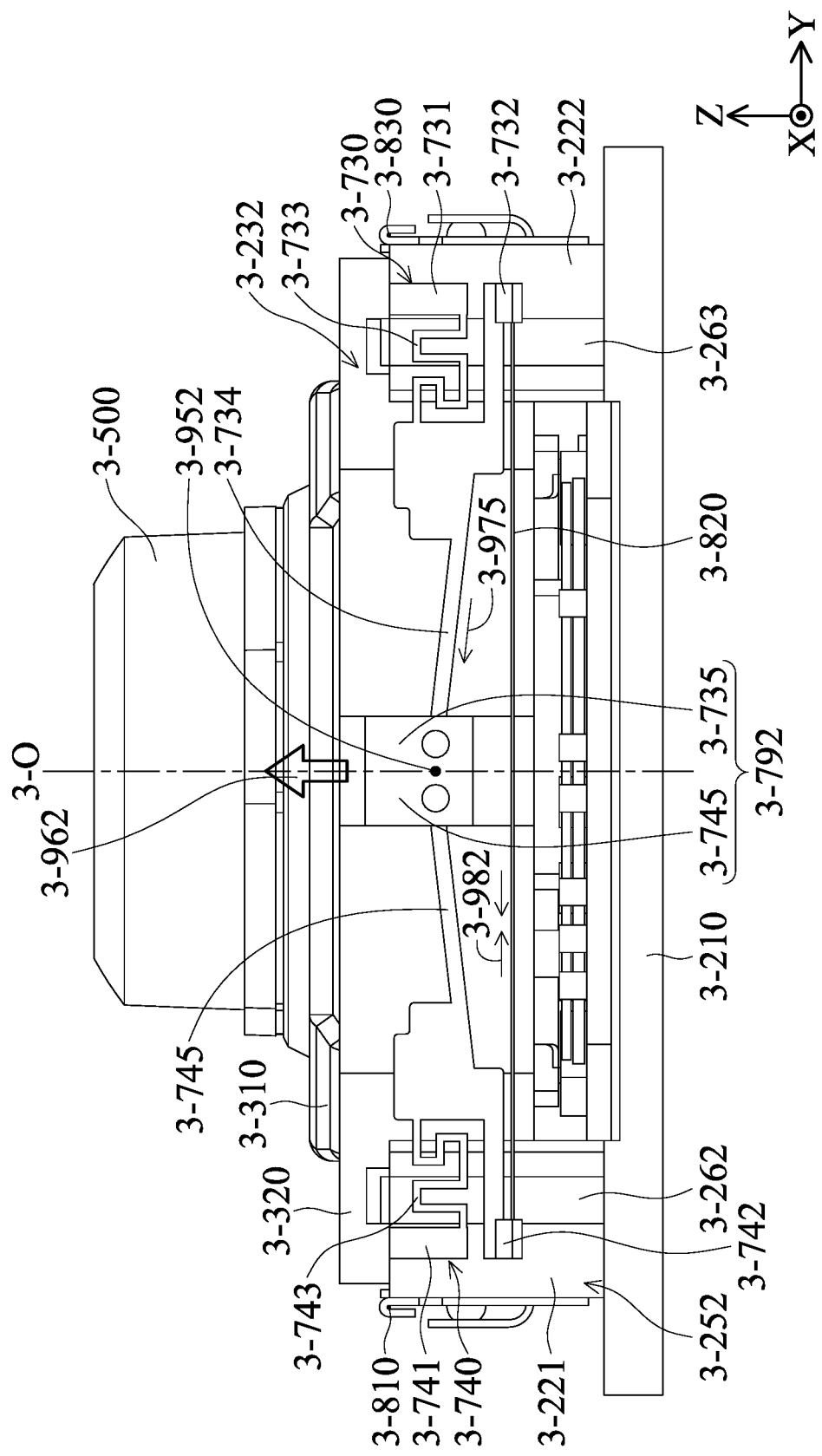

For example, as shown in FIG. 21A and FIG. 21B, the first metal element 3-261 may be partially exposed from a first surface 3-251 of the first protruding portion 3-221, and the second metal element 3-262 may be partially exposed from a second surface 3-252 of the first protruding portion 3-221. Other metal elements and protruding portions may have similar relationships, and are not repeated.

The transmission assembly 3-700 may include a first transmission element 3-710, a second transmission element 3-720, a third transmission element 3-730, a fourth transmission element 3-740, a fifth transmission element 3-750, a sixth transmission element 3-760, a seventh transmission element 3-770, and an eighth transmission element 3-780, and may be used for adjusting the direction of force applied to the optical module 3-M or the movable portion 3-400 by the transmission assembly 3-700. The driving assembly 3-800 may include a first driving element 3-810, a second driving element 3-820, a third driving element 3-830, and a fourth driving element 3-840.

The first driving element 3-810 may be used for directly or indirectly generating a first driving force 3-961 (e.g. a force to the −Z direction) to move the movable portion 3-400 or the optical module 3-M relative to the fixed portion 3-F. The material of the first driving element 3-810 may include shape memory alloy, so the first transmission element 3-710 and the second transmission element 3-720 may be driven by heating the first driving element 3-810. The first driving element 3-810 may be strip-shaped extending a first direction (e.g. the X direction).

The second driving element 3-820 may be used for directly or indirectly generating a second driving force 3-962 (e.g. a force to the +Z direction) to move the movable portion 3-400 or the optical module 3-M relative to the fixed portion 3-F. The material of the second driving element 3-820 may include shape memory alloy, so the third transmission element 3-730 and the fourth transmission element 3-740 may be driven by heating the second driving element 3-820. The second driving element 3-820 may be strip-shaped extending a first direction (e.g. the Y direction).

The third driving element 3-830 may be used for directly or indirectly generating a third driving force 3-963 (e.g. a force to the −Z direction) to move the movable portion 3-400 or the optical module 3-M relative to the fixed portion 3-F. The material of the third driving element 3-830 may include shape memory alloy, so the fifth transmission element 3-750 and the sixth transmission element 3-760 may be driven by heating the third driving element 3-830. The third driving element 3-830 may be strip-shaped extending a first direction (e.g. the X direction).

The fourth driving element 3-840 may be used for directly or indirectly generating a fourth driving force 3-964 (e.g. a force to the +Z direction) to move the movable portion 3-400 or the optical module 3-M relative to the fixed portion 3-F. The material of the fourth driving element 3-840 may include shape memory alloy, so the seventh transmission element 3-770 and the eighth transmission element 3-780 may be driven by heating the fourth driving element 3-840. The fourth driving element 3-840 may be strip-shaped extending a first direction (e.g. the Y direction).

The first driving element 3-810, the second driving element 3-820, the third driving element 3-830, and the fourth driving element 3-840 may generate a contraction force in one direction, and the contraction force may be transferred to the first driving force 3-961, the second driving force 3-962, the third driving force 3-963 and the fourth driving force 3-964 by the transmission elements. For example, the first driving force 3-961 is a combined force of the first force 3-981 generated by the first driving element 3-810 transferred through the first transmission element 3-710 and the second transmission element 3-720, and other driving forces and contraction forces may have similar relationship, which is not repeated.

It should be noted that the first direction and the second direction are not parallel to the optical axis 3-O, and the first direction and the second direction are not parallel, such as the first direction and the second direction are perpendicular. Moreover, the first driving element 3-810 and the third driving element 3-830 may at an identical height in the Z direction, and the second driving element 3-820 and the fourth driving element 3-840 may at an identical height in the Z direction. The height of the first driving element 3-810 and the third driving element 3-830 may be different to the height of the second driving element 3-820 and the fourth driving element 3-840. In other words, the first driving element 3-810 and the third driving element 3-830 do not overlap the second driving element 3-820 and the fourth driving element 3-840 when viewed in any direction that is perpendicular to the optical axis 3-O.

The first driving element 3-810 and the third driving element 3-830 may arranged in a direction that is perpendicular to the second rotational axis 3-952, and second driving element 3-820 and the fourth driving element 3-840 may arranged in a direction that is perpendicular to the first rotational axis 3-951.

As shown in FIG. 19, when viewed along the optical axis 3-O, the optical module 3-M is polygonal (e.g. octagonal). The frame 3-320 of the optical module 3-M may have a first side 3-231, a second side 3-232, a third side 3-233, a fourth side 3-234, and a fifth side 3-235. The first side 3-231 and the second side 3-232 extend in different directions, and the third side 3-233 and the fourth side 3-234 extend in different directions. The first driving element 3-810 is at the first side 3-231, the second driving element 3-820 is at the second side 3-232, the third driving element 3-830 is at the third side 3-233, and the fourth driving element 3-840 is at the fourth side 3-234. Moreover, the external circuit 3-600 and the third sensing assembly 3-930 are at the fourth side 3-234, and the holder driving mechanism 3-940 is not at the fourth side 3-234, such may at the first side 3-231. The fifth side 3-235 corresponds to the first corner 3-241.

As shown in FIG. 21A, the first transmission element 3-710 may be used for transferring a first force 3-981 (e.g. a contraction force) generated by the first driving element 3-810 to the first driving force 3-961. The direction of the first force 3-981 is parallel to the first direction (the X direction), and is different to the direction of the first driving force 3-961. For example, the direction of the first driving force 3-961 may be perpendicular to the first direction, and may be parallel to the optical axis 3-O.

The first transmission element 3-710 may include a first fixed portion connecting 3-711, a first driving element connecting portion 3-712, a first resilient portion 3-713, a first transmission portion 3-714, and a first receiving portion 3-715. The first fixed portion connecting portion 3-711 may be affixed on the fixed portion 3-F, such as connected to the first surface 3-251 of the first protruding portion 3-221 of the circuit module 3-200. The first surface 3-251 is parallel to the optical axis 3-O. The first fixed portion connecting portion 3-711 may be electrically connected to the first metal element 3-261 exposed from the first surface 3-251. The first driving element connecting portion 3-712 may be affixed to the first driving element 3-810. The first driving element connecting portion 3-712 may be movably connected to the first fixed portion connecting portion 3-711 through the first resilient portion 3-713. The first transmission portion 3-714 is connected to the first resilient portion 3-713, and is used to conduct the first driving force 3-961 to the movable portion 3-400 or the optical module 3-M. The first receiving portion 3-715 is affixed on the movable portion 3-400 and the optical module 3-M, and corresponds to the first transmission portion 3-714.

In some embodiments, the first fixed portion connecting portion 3-711, the first driving element connecting portion 3-712, the first resilient portion 3-713, and the first transmission portion 3-714 may be formed as one piece. The first receiving portion 3-715 is movable relative to the first transmission portion 3-714. In other words, the first receiving portion 3-715 and the first transmission portion 3-714 are not formed as one piece. For example, as shown in FIG. 20A, a ball is at the end of the first transmission portion 3-714, the ball may be clipped by the first receiving portion 3-715, and the first receiving portion 3-715 is connect to the ball by friction. The first receiving portion 3-715 may have recesses or openings to accommodate the ball, so the movable range of the first transmission portion 3-714 relative to the first receiving portion 3-715 may be limited. Therefore, the first receiving portion 3-715 is movable relative to the first transmission portion 3-714.

The first transmission element 3-710 (e.g. the first fixed portion connecting portion 3-711) may be plate-shaped and is not perpendicular to the optical axis 3-O, such as parallel to the optical axis 3-O. The material of the first fixed portion connecting portion 3-711 may include metal and may be different from the material of the first driving element 3-810. The first transmission portion 3-714 may be strip-shaped and extend to the third direction 3-973. The third direction 3-973 is not parallel or not perpendicular to the first direction (the X direction).

As shown in FIG. 21A, the first transmission portion 3-714 is at the first side 3-231, and at least a portion of the first transmission portion 3-714 overlaps the first receiving portion 3-715 in the direction that the optical axis 3-O extends (the Z direction).

As shown in FIG. 21A, the second transmission element 3-720 may be used for transferring a first force 3-981 (e.g. a contraction force) generated by the first driving element 3-810 to the first driving force 3-961. The second transmission element 3-720 may include a second fixed portion connecting portion 3-721, a second driving element connecting portion 3-722, a second resilient portion 3-723, a second transmission portion 3-724, and a second receiving portion 3-725. The second fixed portion connecting portion 3-721 may be affixed on the fixed portion 3-F, such as connected to the fourth protruding portion 3-224 of the circuit module 3-200. The second fixed portion connecting portion 3-721 may be electrically connected to the eighth metal element 3-268 of the fourth protruding portion 3-224. The second driving element connecting portion 3-722 may be affixed on the first driving element 3-810. The second driving element connecting portion 3-722 may be movably connected to the second fixed portion connecting portion 3-721 through the second resilient portion 3-723. The second transmission portion 3-724 is connected to the second resilient portion 3-723, and is used to conduct the first driving force 3-961 to the movable portion 3-400 or the optical module 3-M. The second receiving portion 3-725 is affixed on the movable portion 3-400 and the optical module 3-M, and corresponds to the second transmission portion 3-724.

In some embodiments, the second fixed portion connecting portion 3-721, the second driving element connecting portion 3-722, the second resilient portion 3-723, and the second transmission portion 3-724 may be formed as one piece. The second receiving portion 3-725 is movable relative to the second transmission portion 3-724. In other words, the second receiving portion 3-725 and the second transmission portion 3-724 are not formed as one piece. For example, as shown in FIG. 20A, a ball is at the end of the second transmission portion 3-724, the ball may be clipped by the second receiving portion 3-725, and the second receiving portion 3-725 connects to the ball by friction. The second receiving portion 3-725 may have recesses or openings to accommodate the ball, so the movable range of the second transmission portion 3-724 relative to the second receiving portion 3-725 may be limited. Therefore, the second receiving portion 3-725 is movable relative to the second transmission portion 3-724.

The second transmission element 3-720 (e.g. the second fixed portion connecting portion 3-721) may be plate-shaped and is not perpendicular to the optical axis 3-O, such as parallel to the optical axis 3-O. The material of the second fixed portion connecting portion 3-721 may include metal and may be different from the material of the first driving element 3-810. The second transmission portion 3-724 may be strip-shaped and extend to the fourth direction 3-974. The fourth direction 3-974 is not parallel nor perpendicular to the first direction (the X direction).

As shown in FIG. 21A, the second transmission portion 3-724 is at the first side 3-231, and at least a portion of the second transmission portion 3-724 overlaps the second receiving portion 3-725 in the direction that the optical axis 3-O extends (the Z direction).

The first receiving portion 3-715 and the second receiving portion 3-725 may be formed as one piece, and may be called as a first integrated receiving portion 3-791. Moreover, at least a portion of the first driving element connecting portion 3-712 overlaps the second driving element connecting portion 3-722 in the first direction. The material of the first integrated receiving portion 3-791 includes metal.

It should be noted that the first driving element connecting portion 3-712, the first driving element 3-810, and the second driving element connecting portion 3-722 may be electrically with each other to form a first electrical connection path. Moreover, the first fixed portion connecting portion 3-711, the first resilient portion 3-713, the first transmission portion 3-714, the first receiving portion 3-715 of the first transmission element 3-710 and the second receiving portion 3-725 of the second transmission element 3-720 (i.e. the first integrated receiving portion 3-791), the second transmission portion 3-724, the second resilient portion 3-723, and the second fixed portion connecting portion 3-721 may be electrically connected to each other in order to form a second electrical connection path. The second electrical connection path does not pass through the first electrical connection path. In other words, the first electrical connection path and the second electrical connection path are connected in parallel. Moreover, the resistance of the first electrical connection path is less than the resistance of the second electrical connection path to ensure current mainly passing through the first driving element 3-810 to allow the first driving element 3-810 being heated and thus deformed. Other driving elements and transmission elements may have similar relationships, and is not repeated.

As shown in FIG. 21B, the third transmission element 3-730 may be used for transferring a second force 3-982 (e.g. a contraction force) generated by the second driving element 3-820 to the second driving force 3-962. The third transmission element 3-730 may include a third fixed portion connecting portion 3-731, a third driving element connecting portion 3-732, a third resilient portion 3-733, a third transmission portion 3-734, and a third receiving portion 3-735. The third fixed portion connecting portion 3-731 may be affixed on the fixed portion 3-F, such as connected to the second protruding portion 3-222 of the circuit module 3-200. The third fixed portion connecting portion 3-731 may be electrically connected to the third metal element 3-263 of the second protruding portion 3-222. The third driving element connecting portion 3-732 may be affixed on the second driving element 3-820. The third driving element connecting portion 3-732 may be movably connected to the third fixed portion connecting portion 3-731 through the third resilient portion 3-733. The third transmission portion 3-734 is connected to the third resilient portion 3-733, and is used to conduct the second driving force 3-962 to the movable portion 3-400 or the optical module 3-M. The third receiving portion 3-735 is affixed on the movable portion 3-400 and the optical module 3-M, and corresponds to the third transmission portion 3-734.

In some embodiments, the third fixed portion connecting portion 3-731, the third driving element connecting portion 3-732, the third resilient portion 3-733, and the third transmission portion 3-734 may be formed as one piece. The third receiving portion 3-735 is movable relative to the third transmission portion 3-734. In other words, the third receiving portion 3-735 and the third transmission portion 3-734 are not formed as one piece. For example, as shown in FIG. 20B, a ball is at the end of the third transmission portion 3-734, the ball may be clipped by the third receiving portion 3-735, and the third receiving portion 3-735 connects to the ball by friction. The third receiving portion 3-735 may have recesses or openings to accommodate the ball, so the movable range of the third transmission portion 3-734 relative to the third receiving portion 3-735 may be limited. Therefore, the third receiving portion 3-735 is movable relative to the third transmission portion 3-734.

The third transmission element 3-730 (e.g. the third fixed portion connecting portion 3-731) may be plate-shaped and is not perpendicular to the optical axis 3-O, such as parallel to the optical axis 3-O. The material of the third fixed portion connecting portion 3-731 may include metal and may be different from the material of the third driving element 3-830. The third transmission portion 3-734 may be strip-shaped and extend to the fifth direction 3-975. The fifth direction 3-975 is not parallel nor perpendicular to the first direction (the X direction), the second direction (the Y direction), the third direction 3-973, and the fourth direction 3-974.

As shown in FIG. 21A, the third transmission portion 3-734 is at the second side 3-232, and at least a portion of the third transmission portion 3-734 overlaps the third receiving portion 3-735 in the direction that the optical axis 3-O extends (the Z direction). Moreover, in any direction perpendicular to the optical axis 3-O, the first driving element connecting portion 3-712 does not overlap the third driving element connecting portion 3-732. In other words, the first driving element connecting portion 3-712 and the third driving element connecting portion 3-732 are at different heights.

As shown in FIG. 21B, the fourth transmission element 3-740 may be used for transferring a second force 3-982 (e.g. a contraction force) generated by the second driving element 3-820 to the second driving force 3-962. The fourth transmission element 3-740 may include a fourth fixed portion connecting portion 3-741, a fourth driving element connecting portion 3-742, a fourth resilient portion 3-743, a fourth transmission portion 3-744, and a fourth receiving portion 3-745. The fourth fixed portion connecting portion 3-741 may be affixed on the fixed portion 3-F, such as connected to the first protruding portion 3-221 of the circuit module 3-200. The fourth fixed portion connecting portion 3-741 may be electrically connected to the second surface 3-252 of the second metal element 3-262 of the first protruding portion 3-221. The fourth driving element connecting portion 3-742 may be affixed on the second driving element 3-820. The fourth driving element connecting portion 3-742 may be movably connected to the fourth fixed portion connecting portion 3-741 through the fourth resilient portion 3-743. The fourth transmission portion 3-744 is connected to the fourth resilient portion 3-743, and is used to conduct the second driving force 3-962 to the movable portion 3-400 or the optical module 3-M. The fourth receiving portion 3-745 is affixed on the movable portion 3-400 and the optical module 3-M, and corresponds to the fourth transmission portion 3-744.

In some embodiments, the fourth fixed portion connecting portion 3-741, the fourth driving element connecting portion 3-742, the fourth resilient portion 3-743, and the fourth transmission portion 3-744 may be formed as one piece. The fourth receiving portion 3-745 is movable relative to the fourth transmission portion 3-744. In other words, the fourth receiving portion 3-745 and the fourth transmission portion 3-744 are not formed as one piece. For example, as shown in FIG. 20B, a ball is at the end of the fourth transmission portion 3-744, the ball may be clipped by the fourth receiving portion 3-745, and the fourth receiving portion 3-745 connects to the ball by friction. The fourth receiving portion 3-745 may have recesses or openings to accommodate the ball, so the movable range of the fourth transmission portion 3-744 relative to the fourth receiving portion 3-745 may be limited. Therefore, the fourth receiving portion 3-745 is movable relative to the fourth transmission portion 3-744.

The fourth transmission element 3-740 (e.g. the fourth fixed portion connecting portion 3-741) may be plate-shaped and is not perpendicular to the optical axis 3-O, such as parallel to the optical axis 3-O. The material of the fourth fixed portion connecting portion 3-741 may include metal and may be different from the material of the third driving element 3-830.

As shown in FIG. 21B, the fourth transmission portion 3-744 is at the second side 3-232, and at least a portion of the fourth transmission portion 3-744 overlaps the fourth receiving portion 3-745 in the direction that the optical axis 3-O extends (the Z direction).

The third receiving portion 3-735 and the fourth receiving portion 3-745 may be formed as one piece, and may be called as a second integrated receiving portion 3-792. Moreover, at least a portion of the third driving element connecting portion 3-732 overlaps the fourth driving element connecting portion 3-742 in the second direction. The material of the second integrated receiving portion 3-792 may include metal.

Figure 21C:
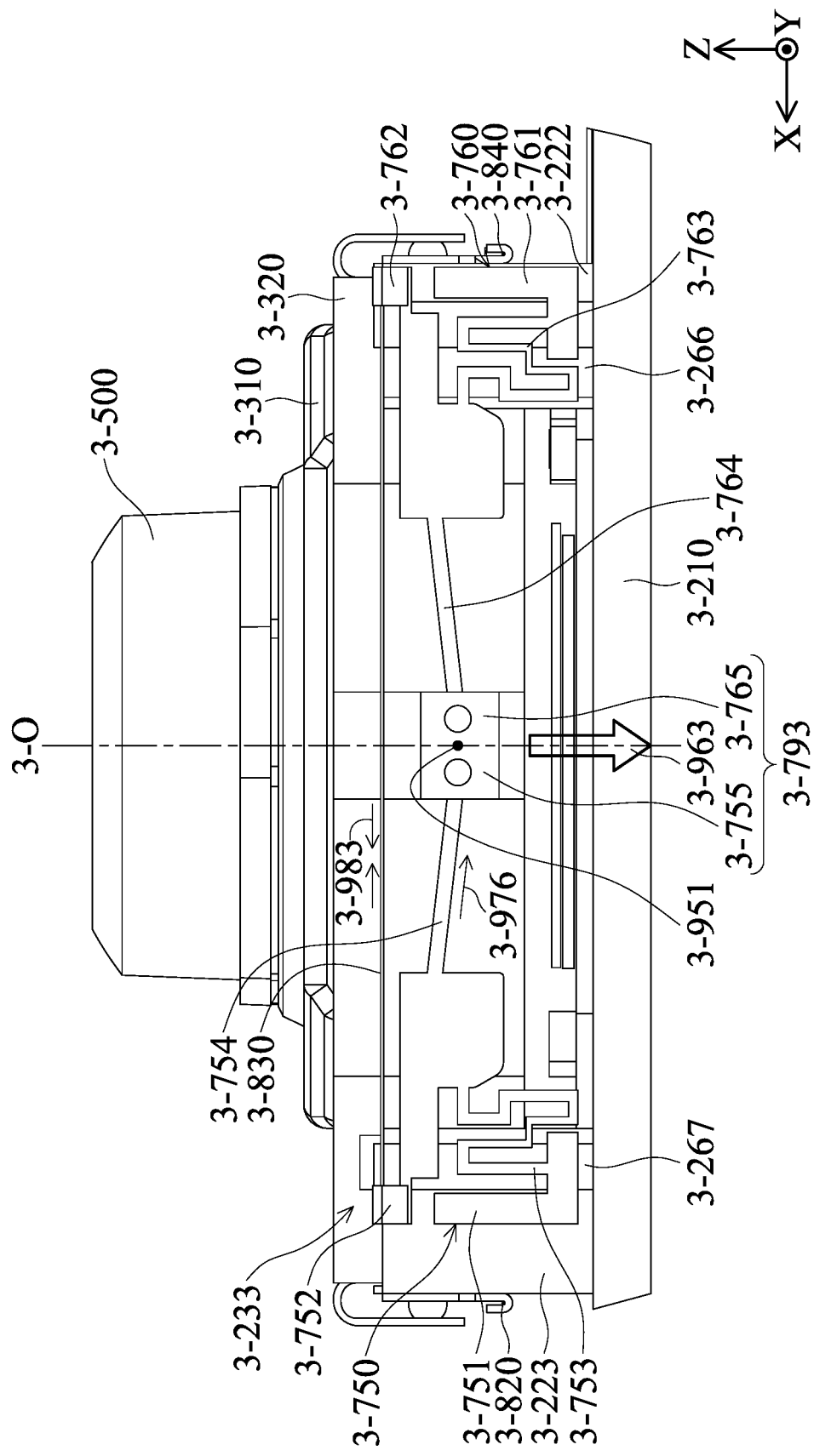

As shown in FIG. 21C, the fifth transmission element 3-750 may be used for transferring a third force 3-983 (e.g. a contraction force) generated by the third driving element 3-830 to the third driving force 3-963. The fifth transmission element 3-750 may include a fifth fixed portion connecting portion 3-751, a fifth driving element connecting portion 3-752, a fifth resilient portion 3-753, a fifth transmission portion 3-754, and a fifth receiving portion 3-755. The fifth fixed portion connecting portion 3-751 may be affixed on the fixed portion 3-F, such as connected to the third protruding portion 3-223 of the circuit module 3-200. The fifth fixed portion connecting portion 3-751 may be electrically connected to the seventh metal element 3-267 of the third protruding portion 3-223. The fifth driving element connecting portion 3-752 may be affixed on the third driving element 3-830. The fifth driving element connecting portion 3-752 may be movably connected to the fifth fixed portion connecting portion 3-751 through the fifth resilient portion 3-753. The fifth transmission portion 3-754 is connected to the fifth resilient portion 3-753, and is used to conduct the third driving force 3-963 to the movable portion 3-400 or the optical module 3-M. The fifth receiving portion 3-755 is affixed on the movable portion 3-400 and the optical module 3-M, and corresponds to the fifth transmission portion 3-754.

In some embodiments, the fifth fixed portion connecting portion 3-751, the fifth driving element connecting portion 3-752, the fifth resilient portion 3-753, and the fifth transmission portion 3-754 may be formed as one piece. The fifth receiving portion 3-755 is movable relative to the fifth transmission portion 3-754. In other words, the fifth receiving portion 3-755 and the fifth transmission portion 3-754 are not formed as one piece. For example, as shown in FIG. 20A, a ball is at the end of the fifth transmission portion 3-754, the ball may be clipped by the fifth receiving portion 3-755, and the fifth receiving portion 3-755 connects to the ball by friction. The fifth receiving portion 3-755 may have recesses or openings to accommodate the ball, so the movable range of the fifth transmission portion 3-754 relative to the fifth receiving portion 3-755 may be limited. Therefore, the fifth receiving portion 3-755 is movable relative to the fifth transmission portion 3-754.

The fifth transmission element 3-750 (e.g. the fifth fixed portion connecting portion 3-751) may be plate-shaped and is not perpendicular to the optical axis 3-O, such as parallel to the optical axis 3-O. The material of the fifth fixed portion connecting portion 3-751 may include metal and may be different from the material of the third driving element 3-830. The fifth transmission portion 3-754 may be strip-shaped and extend to the fifth direction 3-975. The sixth direction 3-976 is not parallel or not perpendicular to the third direction 3-973, the fourth direction 3-974, and the fifth direction 3-975.

As shown in FIG. 21C, the fifth transmission portion 3-754 is at the third side 3-233, and at least a portion of the fifth transmission portion 3-754 overlaps the fifth receiving portion 3-755 in the direction that the optical axis 3-O extends (the Z direction). Moreover, in any direction perpendicular to the optical axis 3-O, the second driving element 3-820 does not overlap the third driving element 3-830. In other words, the second driving element 3-820 and the third driving element 3-830 are at different heights. In some embodiments, in the second direction (the Y direction) that is perpendicular to the optical axis 3-O, the first driving element 3-810 overlaps the third driving element 3-830. In other words, the first driving element 3-810 and the third driving element 3-830 are at an identical height.

As shown in FIG. 21C, the sixth transmission element 3-760 may be used for transferring a third force 3-983 (e.g. a contraction force) generated by the third driving element 3-830 to the third driving force 3-963. The sixth transmission element 3-760 may include a sixth fixed portion connecting portion 3-761, a sixth driving element connecting portion 3-762, a sixth resilient portion 3-763, a sixth transmission portion 3-764, and a sixth receiving portion 3-765. The sixth fixed portion connecting portion 3-761 may be affixed on the fixed portion 3-F, such as connected to the first protruding portion 3-221 of the circuit module 3-200. The sixth fixed portion connecting portion 3-761 may be electrically connected to the sixth metal element 3-266 of the first protruding portion 3-221. The sixth driving element connecting portion 3-762 may be affixed on the second driving element 3-820. The sixth driving element connecting portion 3-762 may be movably connected to the sixth fixed portion connecting portion 3-761 through the sixth resilient portion 3-763. The sixth transmission portion 3-764 is connected to the sixth resilient portion 3-763, and is used to conduct the second driving force 3-962 to the movable portion 3-400 or the optical module 3-M. The sixth receiving portion 3-765 is affixed on the movable portion 3-400 and the optical module 3-M, and corresponds to the sixth transmission portion 3-764.

In some embodiments, the sixth fixed portion connecting portion 3-761, the sixth driving element connecting portion 3-762, the sixth resilient portion 3-763, and the sixth transmission portion 3-764 may be formed as one piece. The sixth receiving portion 3-765 is movable relative to the sixth transmission portion 3-764. In other words, the sixth receiving portion 3-765 and the sixth transmission portion 3-764 are not formed as one piece. For example, as shown in FIG. 20A, a ball is at the end of the sixth transmission portion 3-764, the ball may be clipped by the sixth receiving portion 3-765, and the sixth receiving portion 3-765 connects to the ball by friction. The sixth receiving portion 3-765 may have recesses or openings to accommodate the ball, so the movable range of the sixth transmission portion 3-764 relative to the sixth receiving portion 3-765 may be limited. Therefore, the sixth receiving portion 3-765 is movable relative to the sixth transmission portion 3-764.

The sixth transmission element 3-760 (e.g. the sixth fixed portion connecting portion 3-761) may be plate-shaped and is not perpendicular to the optical axis 3-O, such as parallel to the optical axis 3-O. The material of the sixth fixed portion connecting portion 3-761 may include metal and may be different from the material of the third driving element 3-830.

As shown in FIG. 21C, the sixth transmission portion 3-764 is at the second side 3-232, and at least a portion of the sixth transmission portion 3-764 overlaps the sixth receiving portion 3-765 when viewed along the optical axis 3-O (the Z direction).

The fifth receiving portion 3-755 and the sixth receiving portion 3-765 may be formed as one piece, and may be called as a third integrated receiving portion 3-793. In the first direction (the X direction), at least a portion of the fifth driving element connecting portion 3-752 overlaps the sixth driving element connecting portion 3-762. The material of the third integrated receiving portion 3-793 may include metal.

Figure 21D:
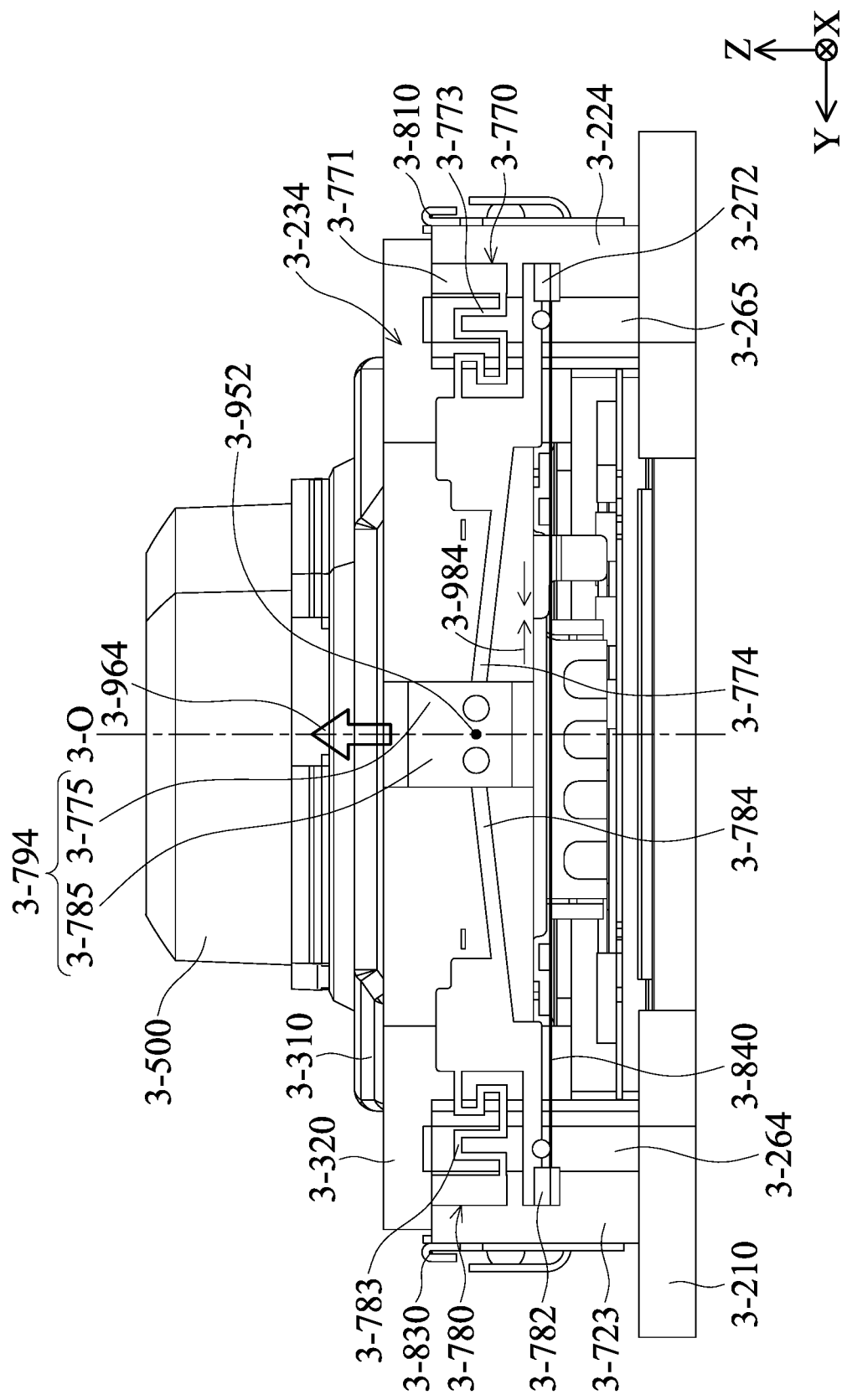

As shown in FIG. 21D, the seventh transmission element 3-770 may be used for transferring a fourth force 3-984 (e.g. a contraction force) generated by the fourth driving element 3-840 to the fourth driving force 3-964. The seventh transmission element 3-770 may include a seventh fixed portion connecting portion 3-771, a seventh driving element connecting portion 3-772, a seventh resilient portion 3-773, a seventh transmission portion 3-774, and a seventh receiving portion 3-775. The seventh fixed portion connecting portion 3-771 may be affixed on the fixed portion 3-F, such as connected to the fourth protruding portion 3-224 of the circuit module 3-200. The seventh fixed portion connecting portion 3-771 may be electrically connected to the fifth metal element 3-265 of the fourth protruding portion 3-224. The seventh driving element connecting portion 3-772 may be affixed on the fourth driving element 3-840. The seventh driving element connecting portion 3-772 may be movably connected to the seventh fixed portion connecting portion 3-771 through the seventh resilient portion 3-773. The seventh transmission portion 3-774 is connected to the seventh resilient portion 3-773, and is used to conduct the fourth driving force 3-964 to the movable portion 3-400 or the optical module 3-M. The seventh receiving portion 3-775 is affixed on the movable portion 3-400 and the optical module 3-M, and corresponds to the seventh transmission portion 3-774.

In some embodiments, the seventh fixed portion connecting portion 3-771, the seventh driving element connecting portion 3-772, the seventh resilient portion 3-773, and the seventh transmission portion 3-774 may be formed as one piece. The seventh receiving portion 3-775 is movable relative to the seventh transmission portion 3-774. In other words, the seventh receiving portion 3-775 and the seventh transmission portion 3-774 are not formed as one piece. For example, as shown in FIG. 20B, a ball is at the end of the seventh transmission portion 3-774, the ball may be clipped by the seventh receiving portion 3-775, and the seventh receiving portion 3-775 connects to the ball by friction. The seventh receiving portion 3-775 may have recesses or openings to accommodate the ball, so the movable range of the seventh transmission portion 3-774 relative to the seventh receiving portion 3-775 may be limited. Therefore, the seventh receiving portion 3-775 is movable relative to the seventh transmission portion 3-774.

The seventh transmission element 3-770 (e.g. the seventh fixed portion connecting portion 3-771) may be plate-shaped and is not perpendicular to the optical axis 3-O, such as parallel to the optical axis 3-O. The material of the seventh fixed portion connecting portion 3-771 may include metal and may be different from the material of the fourth driving element 3-840.

As shown in FIG. 21D, the seventh transmission portion 3-774 is at the third side 3-233, and at least a portion of the seventh transmission portion 3-774 overlaps the seventh receiving portion 3-775 in the direction that the optical axis 3-O extends (the Z direction). The fourth side 3-234 is not parallel to the third side 3-233, such as perpendicular to the third side 3-233.

As shown in FIG. 21D, the eighth transmission element 3-780 may be used for transferring a fourth force 3-984 (e.g. a contraction force) generated by the fourth driving element 3-840 to the fourth driving force 3-964. The eighth transmission element 3-780 may include an eighth fixed portion connecting portion 3-781, an eighth driving element connecting portion 3-782, an eighth resilient portion 3-783, an eighth transmission portion 3-784, and an eighth receiving portion 3-785. The eighth fixed portion connecting portion 3-781 may be affixed on the fixed portion 3-F, such as connected to the third protruding portion 3-223 of the circuit module 3-200. The eighth fixed portion connecting portion 3-781 may be electrically connected to the fourth metal element 3-264 of the third protruding portion 3-223. The eighth driving element connecting portion 3-782 may be affixed on the second driving element 3-820. The eighth driving element connecting portion 3-782 may be movably connected to the eighth fixed portion connecting portion 3-781 through the eighth resilient portion 3-783. The eighth transmission portion 3-784 is connected to the eighth resilient portion 3-783, and is used to conduct the second driving force 3-962 to the movable portion 3-400 or the optical module 3-M. The eighth receiving portion 3-785 is affixed on the movable portion 3-400 and the optical module 3-M, and corresponds to the eighth transmission portion 3-784.

In some embodiments, the eighth fixed portion connecting portion 3-781, the eighth driving element connecting portion 3-782, the eighth resilient portion 3-783, and the eighth transmission portion 3-784 may be formed as one piece. The eighth receiving portion 3-785 is movable relative to the eighth transmission portion 3-784. In other words, the eighth receiving portion 3-785 and the eighth transmission portion 3-784 are not formed as one piece. For example, as shown in FIG. 20B, a ball is at the end of the eighth transmission portion 3-784, the ball may be clipped by the eighth receiving portion 3-785, and the eighth receiving portion 3-785 connects to the ball by friction. The eighth receiving portion 3-785 may have recesses or openings to accommodate the ball, so the movable range of the eighth transmission portion 3-784 relative to the eighth receiving portion 3-785 may be limited. Therefore, the eighth receiving portion 3-785 is movable relative to the eighth transmission portion 3-784.

The eighth transmission element 3-780 (e.g. the eighth fixed portion connecting portion 3-781) may be plate-shaped and is not perpendicular to the optical axis 3-O, such as parallel to the optical axis 3-O. The material of the eighth fixed portion connecting portion 3-781 may include metal and may be different from the material of the fourth driving element 3-840.

As shown in FIG. 21D, the eighth transmission portion 3-784 is at the second side 3-232, and at least a portion of the eighth transmission portion 3-784 overlaps the eighth receiving portion 3-785 when viewed along the optical axis 3-O (the Z direction).

The seventh receiving portion 3-775 and the eighth receiving portion 3-785 may be formed as one piece, and may be called as a fourth integrated receiving portion 3-794. In the first direction (the X direction), at least a portion of the seventh driving element connecting portion 3-772 overlaps the eighth driving element connecting portion 3-782. The material of the fourth integrated receiving portion 3-794 may include metal.

As shown in FIG. 19, the distance between the fourth transmission element 3-740 and the first transmission element 3-710 is less than the distance between the first transmission element 3-710 and the second transmission element 3-720. In some embodiments, the shortest distance between the first transmission element 3-710 and the fourth transmission element 3-740 is different from the shortest distance between the second transmission element 3-720 and the third transmission element 3-730, such as the shortest distance between the first transmission element 3-710 and the fourth transmission element 3-740 may be less than the shortest distance between the second transmission element 3-720 and the third transmission element 3-730. Moreover, the shortest distance between the first integrated receiving portion 3-791 and the third transmission element 3-730 is different from the shortest distance between the first integrated receiving portion 3-791 and the fourth transmission element 3-740, such as the shortest distance between the first integrated receiving portion 3-791 and the third transmission element 3-730 may be higher than the shortest distance between the first integrated receiving portion 3-791 and the fourth transmission element 3-740.

As shown in FIG. 20A and FIG. 20B, the first integrated receiving portion 3-791 may have a first opening 3-331, the second integrated receiving portion 3-792 may have a second opening 3-332, the third integrated receiving portion 3-793 may have a third opening 3-333, and the fourth integrated receiving portion 3-794 may have a fourth opening 3-334. The first opening 3-331 and the third opening 3-333 are oriented to the +Z direction, and the second opening 3-332 and the fourth opening 3-334 are oriented to the −Z direction, i.e. toward opposite directions. In other words, the first opening 3-331 is oriented to the first driving element 3-810, the second opening 3-332 is oriented to the second driving element 3-820, the third opening 3-333 is oriented to the third driving element 3-830, the fourth opening 3-334 is oriented to the fourth driving element 3-840.

In some embodiments, in any direction that is perpendicular to the optical axis 3-O, the first opening 3-331 does not overlap the first driving element 3-810, the second opening 3-332 does not overlap the second driving element 3-820, the third opening 3-333 does not overlap the third driving element 3-830, the fourth opening 3-334 does not overlap the fourth driving element 3-840 (i.e. at different heights). Moreover, as shown in FIG. 21A to FIG. 21D, in a direction that is perpendicular to the optical axis 3-O, at least a portion of the first opening 3-331 overlaps the second driving element 3-820, and at least a portion of the second opening 3-332 overlaps the first driving element 3-810.

In some embodiments, the first opening 3-331 is used for accommodating the first transmission portion 3-714 and the second transmission portion 3-724, the second opening 3-332 is used for accommodating the third transmission portion 3-734 and the fourth transmission portion 3-744, the third opening 3-333 is used for accommodating the fifth transmission portion 3-754 and the sixth transmission portion 3-764, the fourth opening 3-334 is used for accommodating the seventh transmission portion 3-774 and the eighth transmission portion 3-784.

In some embodiments, the movable portion 3-400 includes a first protect element 3-410, a second protect element 3-420, a third protect element 3-430, and a fourth protect element 3-440, which respectively correspond to the first integrated receiving portion 3-791, the second integrated receiving portion 3-792, the third integrated receiving portion 3-793, and the fourth integrated receiving portion 3-794, such as overlap each other in a direction that is perpendicular to the optical axis 3-O to protect the first integrated receiving portion 3-791, the second integrated receiving portion 3-792, the third integrated receiving portion 3-793, and the fourth integrated receiving portion 3-794. In some embodiments, the material of the first protect element 3-410, the second protect element 3-420, the third protect element 3-430, and the fourth protect element 3-440 are different from the material of the first integrated receiving portion 3-791, the second integrated receiving portion 3-792, the third integrated receiving portion 3-793, and the fourth integrated receiving portion 3-794. For example, the material of the first protect element 3-410, the second protect element 3-420, the third protect element 3-430, and the fourth protect element 3-440 may include plastic.

In some embodiments, the first protect element 3-410, the second protect element 3-420, the third protect element 3-430, and the fourth protect element 3-440 may respectively have a opening structure 3-341, a opening structure 3-342, a opening structure 3-343, and a opening structure 3-344 oriended to the −Z direction, and respectively have a first protect sidewall 3-411, a second protect sidewall 3-421, a third protect sidewall 3-431, a fourth protect sidewall 3-441 extended in the Z direction (parallel to the optical axis 3-O), which respectively correspond to the first driving element 3-810, the second driving element 3-820, the third driving element 3-830, and the fourth driving element 3-840, i.e. partially overlap each other in a direction that is perpendicular to the optical axis 3-O.

It should be noted that in a direction that is perpendicular to the optical axis 3-O, the maximum distance 3-D2 between the first protect sidewall 3-411 and the optical axis 3-O is higher than the maximum distance 3-D1 between the first integrated receiving portion 3-791 and the optical axis 3-O. Other protective sidewalls and integrated receiving portions may have similar relationships. Moreover, in the direction that the optical axis 3-O extends, the maximum dimension 3-H1 of the first protect sidewall 3-411 is different from the maximum dimension 3-H2 of the second protect sidewall 3-421. When viewed along a direction that is perpendicular to the optical axis 3-O, at least a portion of the first protect sidewall 3-411 overlaps the first driving element 3-810 to protect the first driving element 3-810. Other protective sidewalls and driving assemblies may have similar relationships, and is not repeated.

Because the direction of the first driving force 3-961 an the third driving force 3-963 are oriented to the −Z direction and applied on opposite sides of the movable portion 3-400 and the optical module 3-M, the direction of the second driving force 3-962 an the fourth driving force 3-964 are oriented to the +Z direction and applied on opposite sides of the movable portion 3-400 and the optical module 3-M, when one of the driving force (e.g. the first driving force 3-961) is applied to the movable portion 3-400 and the optical module 3-M, the driving element at the opposite side does not generate any driving force, or generate a third driving force 3-963 different from (e.g. less than) the first driving force 3-961. At this moment, the driving elements at adjacent sides may generate driving forces different from (e.g. less than) the first driving force 3-961, such as the second driving force 3-962 and the fourth driving force 3-964 at a same time to balance the whole structure. At this moment, the second driving force 3-962 may be identical to the fourth driving force 3-964 and parallel to the fourth driving force 3-964, and may be different from the first driving force 3-961. Therefore, the movable portion 3-400 and the optical module 3-M may rotate in a specific direction.

The movable portion 3-400 and the optical module 3-M may be driven by the driving assembly 3-800 to rotate in various directions, such as may rotate using the first rotational axis 3-951, the second rotational axis 3-952, the third rotational axis 3-953, or the fourth rotational axis 3-954 to achieve optical image stabilization.

In some embodiments, the first driving force 3-961 is applied to the first integrated receiving portion 3-791, and the second driving force 3-962 is applied to the second integrated receiving portion 3-792. The second rotational axis 3-952 passes through the first integrated receiving portion 3-791 and the first rotational axis 3-951 passes through the second integrated receiving portion 3-792. When viewed along the optical axis 3-O, a connection between the first integrated receiving portion 3-791 and the optical axis 3-O is not parallel to the connection between the second integrated receiving portion 3-792 and the optical axis 3-O.

In some embodiments, the distance 3-L1 between the first rotational axis 3-951 and the second side 3-232 is different from the distance between the distance 3-L2 between the first rotational axis 3-951 and the fourth side 3-234, such as the distance 3-L1 between the first rotational axis 3-951 and the second side 3-232 is higher than the distance between the distance 3-L2 between the first rotational axis 3-951 and the fourth side 3-234.

As shown in FIG. 21A, a first virtual plane 3-991 and a second virtual plane 3-992 that are perpendicular to the optical axis 3-O may be defined. The first virtual plane 3-991 is parallel to and not interest to the second virtual plane 3-992. The first rotational axis 3-951 may be in the first virtual plane 3-991, and the second rotational axis 3-952 may be in the second virtual plane 3-992.

As shown in FIG. 24, the first protruding portion 3-221 has a third surface 3-253 and a fourth surface 3-254 that are not parallel to the first surface 3-251 and the second surface 3-252. The fourth surface 3-254 is in a recess structure on the third surface 3-253. Moreover, as shown in FIG. 22 and FIG. 23, the first sensing assembly 3-910 (which includes a first sensing element 3-911 and a first reference element 3-912) is disposed on the fourth surface 3-254. For example, the circuit element 3-602 may be disposed between the fourth surface 3-254 and the first sensing assembly 3-910, and in contact with the fourth surface 3-254 and the first sensing assembly 3-910.

The first sensing assembly 3-910 may be used for detecting the movement of the movable portion 3-400 or the optical module 3-M relative to the fixed portion 3-F. Furthermore, the second sensing assembly 3-920 (which includes a second sensing element 3-921 and a second reference element 3-922) and the second protruding portion 3-222 may have similar position relationship between the first sensing assembly 3-910 and the first protruding portion 3-221, and it is not repeated.

Figure 25:
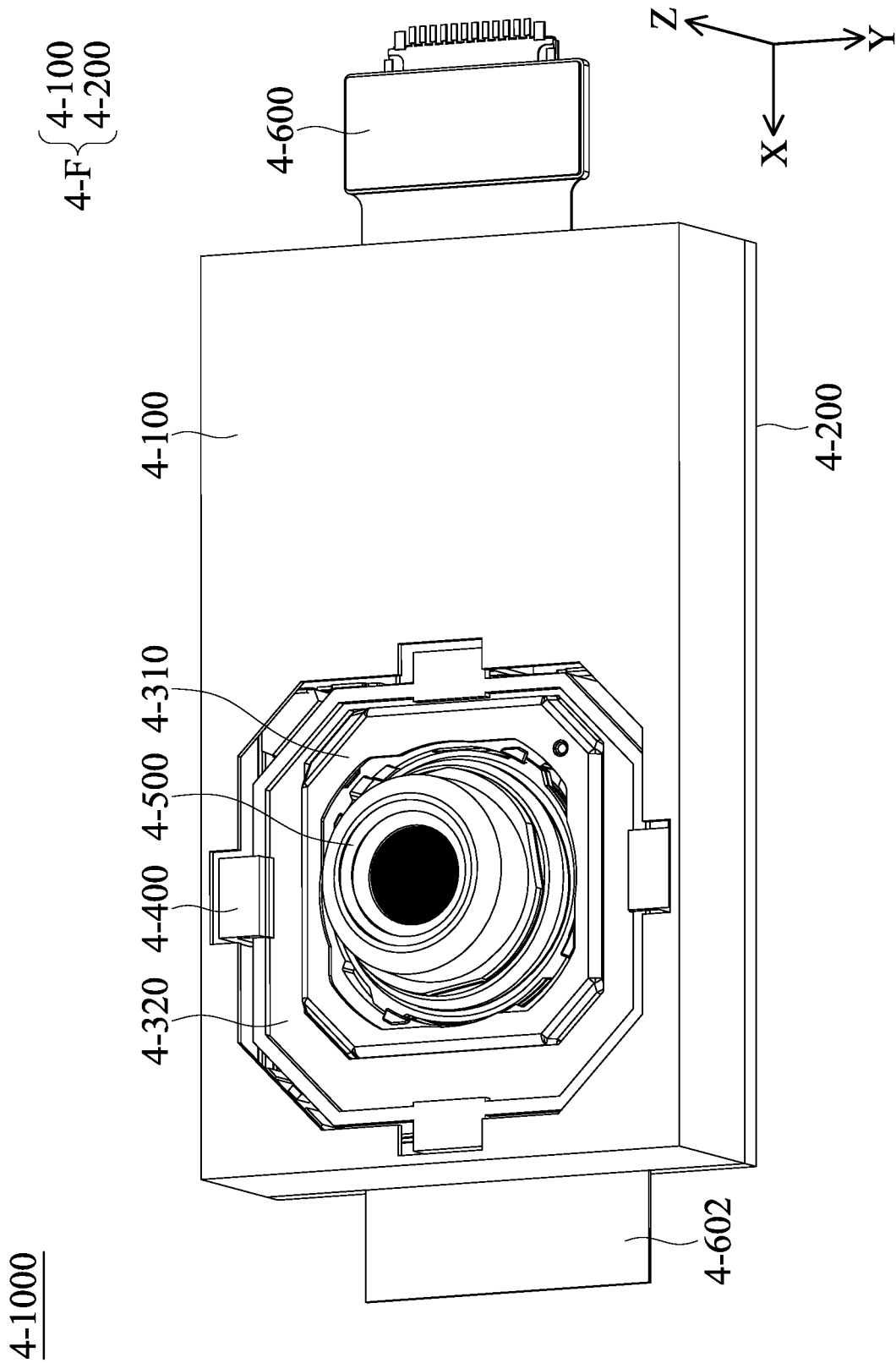
FIG. 25 is a perspective view of an optical system in some embodiments of the present disclosure.
Figure 26:
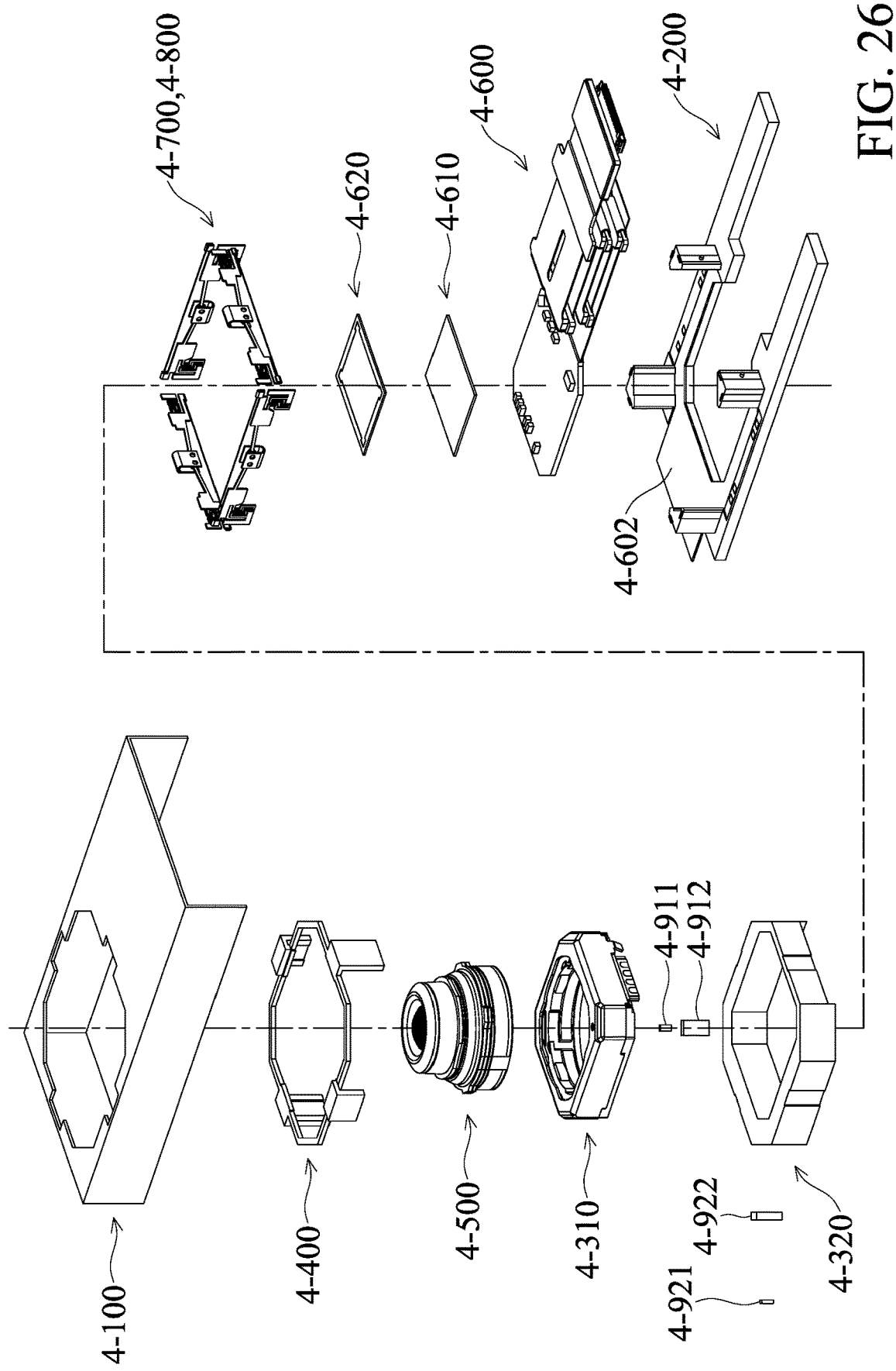
FIG. 26 is an exploded view of the optical system.
Figure 27:
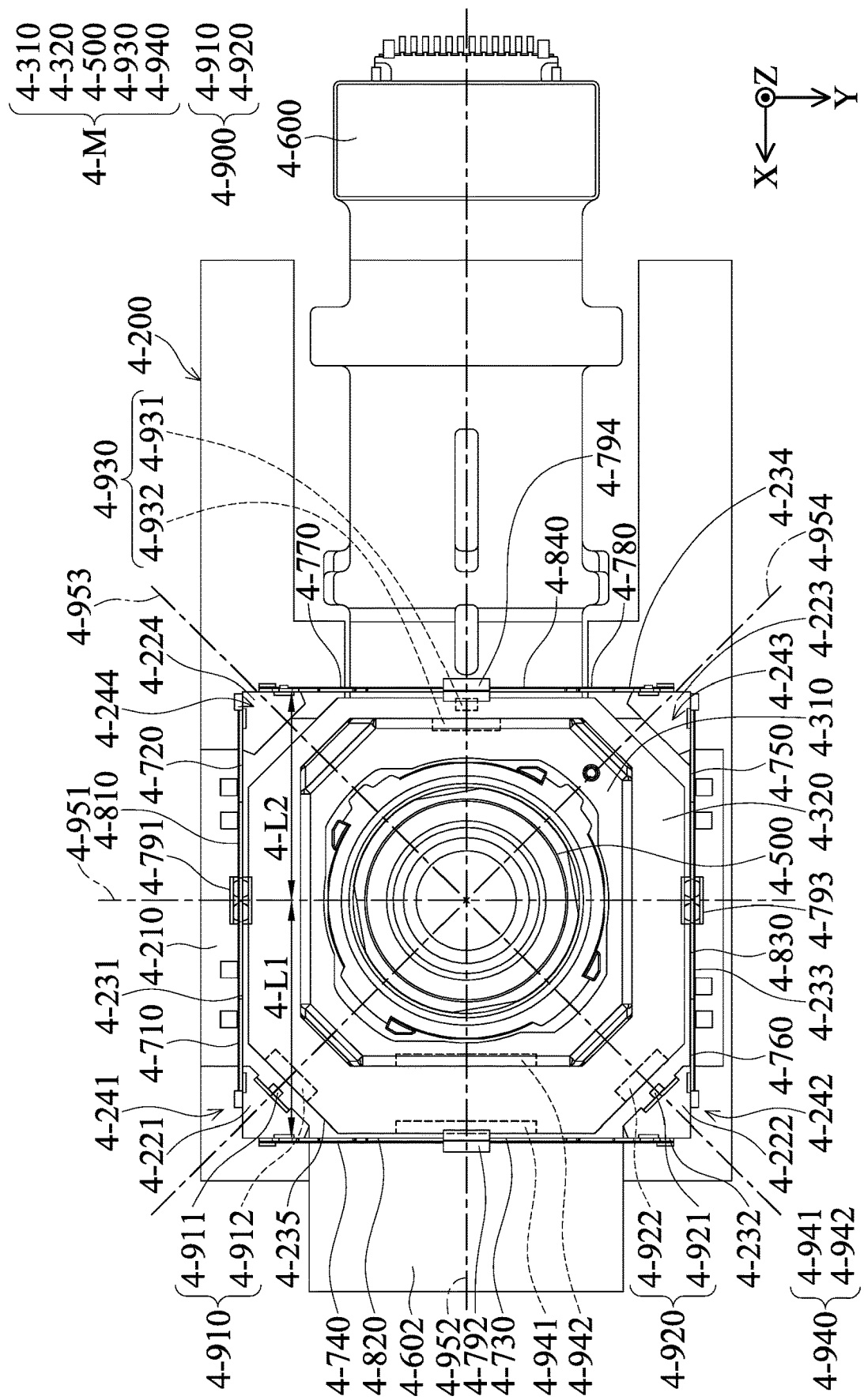
FIG. 27 is a top view of the optical system.
Figure 28A:
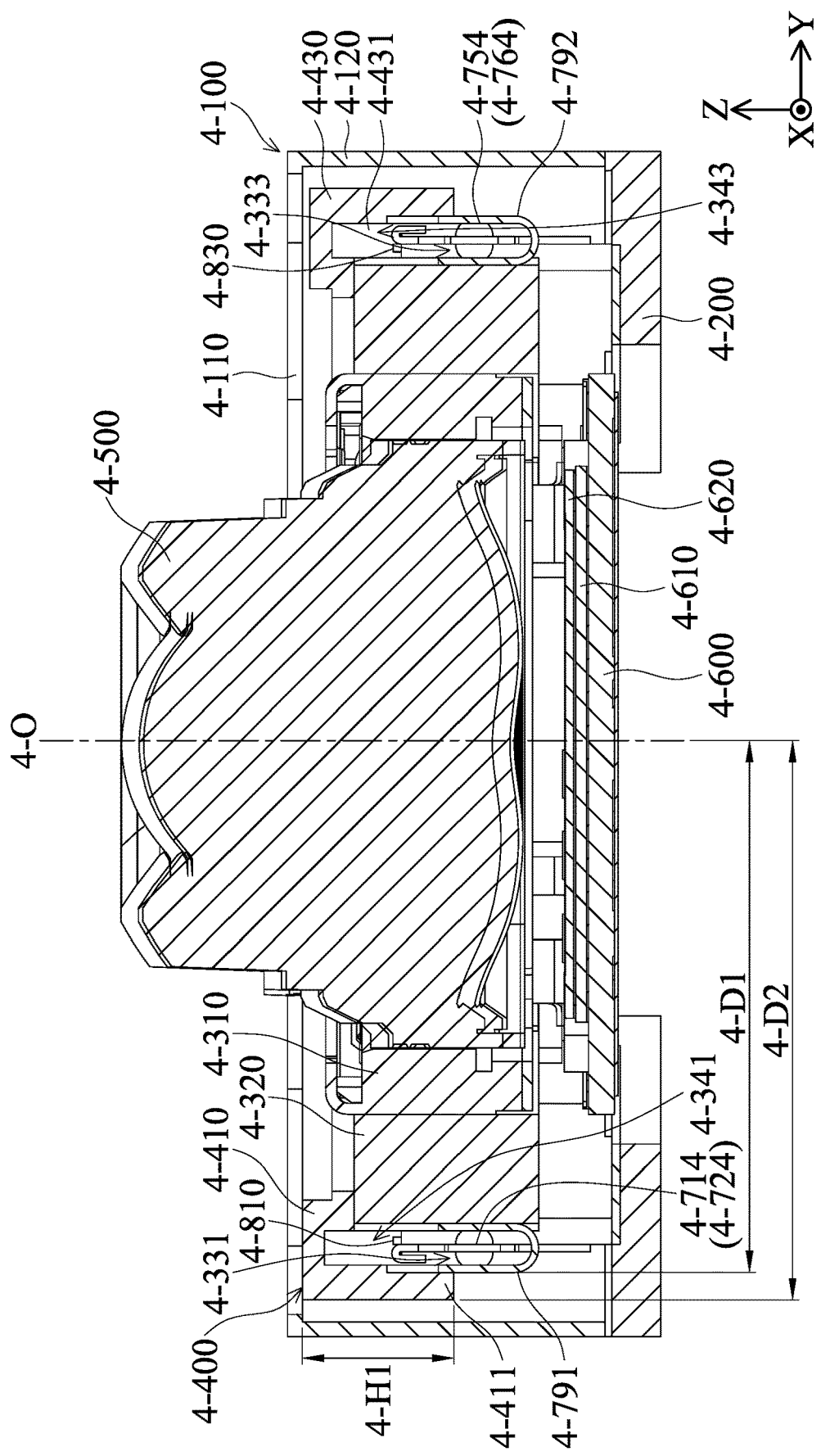
FIG. 28A is a cross-sectional view of the optical system illustrated along a first rotational axis.
Figure 28B:
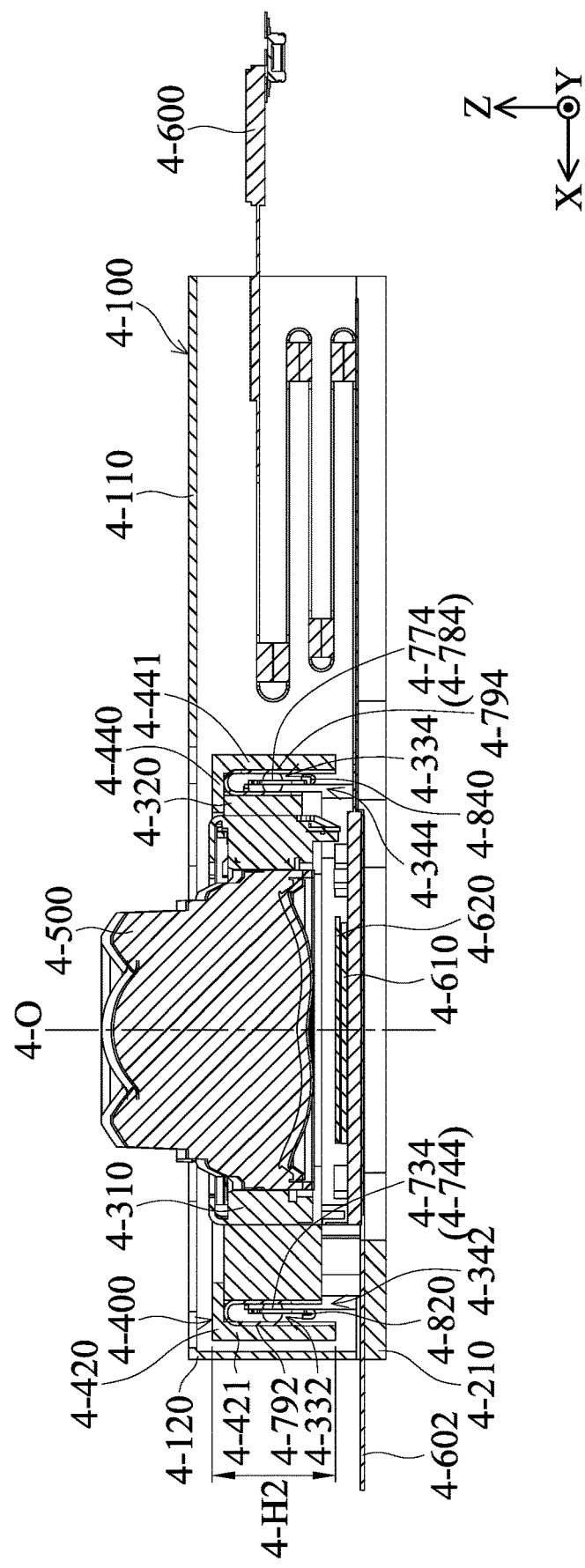
FIG. 28B is a cross-sectional view of the optical system illustrated along a second rotational axis.

FIG. 25 is a perspective view of the optical system 4-1000 in some embodiments of the present disclosure. FIG. 26 is an exploded view of the optical system 4-1000. FIG. 27 is a top view of the optical system 4-1000. FIG. 28A is a cross-sectional view of the optical system 4-1000 illustrated along a first rotational axis 4-951 in FIG. 27. FIG. 28B is a cross-sectional view of the optical system 4-1000 illustrated along the second rotational axis 4-952 in FIG. 27.

In some embodiments, the optical system 4-1000 mainly includes a case 4-100, a circuit module 4-200, a movable portion 4-400, an external circuit 4-600, an optical sensor 4-610, a light filter 4-620, a transmitting assembly 4-700, and a driving assembly 4-800 arranged along an optical axis 4-O. The optical system 4-1000 may be disposed on an electronic apparatus, such as may be disposed on a cell phone, a tablet, or a notebook, but the present disclosure is not limited thereto.

The optical system 4-1000 may be used for driving an optical module 4-M. For example, the optical module 4-M may include a holder 4-310, a frame 4-320, an optical element 4-500, a second sensing module (includes a combination of a third sensing assembly 4-930 and a holder driving mechanism 4-940, the third sensing assembly 4-930 includes a third sensing element 4-931 and a third reference element 4-932). Alternatively, the optical system 4-1000 may be used for driving an optical element, such as a lens, a mirror, a prism, a beam splitter, and aperture, a liquid lens, an image sensor, a camera module, or a ranging module. It should be noted that the optical element is not limited to the element related to visible light. Other element related to invisible light (e.g. infrared or ultraviolet) may be also included in the present disclosure. In some embodiments, the optical module 4-M and the movable portion 4-400 may be called as a movable portion, which is movable relative to the fixed portion 4-F.

In some embodiments, the holder driving mechanism 4-940 may be disposed in the frame 4-320. The holder driving mechanism 4-940 is used for driving the holder 4-310 and the optical element 4-500 which is connected to the holder 4-310 to move relative to the frame 4-320 in the X, Y, or Z directions. The transmitting assembly 4-700 and the driving assembly 4-800 may be used for driving the movable portion 4-400 and the optical module 4-M affixed on the movable portion 4-400 to move relative to the case 4-100 and the circuit module 4-200. The movable portion 4-400 may be affixed on the frame 4-320. The case 4-100 and the circuit module 4-200 may be called as the fixed portion 4-F. The case 4-100 may include atop portion 4-110 and a sidewall 4-120 connected to each other and are plate-shaped. The fixed portion 4-F may be affixed on the electronic apparatus.

The optical axis 4-O may be defined as an optical axis passing through the center of the optical element 4-500. The optical axis 4-O is perpendicular to the top portion 4-110 and parallel to the sidewall 4-120. The optical element 4-500 may perform focus to the optical sensor 4-610 along the optical axis 4-O. In some embodiments, the holder 4-310 has a through hole, and the optical element 4-500 may be affixed in the through hole to move with the holder 4-310. In other words, the holder 4-310 may be used for holding the optical element 4-500. The holder driving mechanism 4-940 includes a first holder driving element 4-941 and a second holder driving element 4-942 used for driving the holder 4-310 to move relative to the frame 4-320. The first holder driving element 4-941 may be a magnetic element, and the second holder driving element 4-942 may be a coil. The first holder driving element 4-941 and the second holder driving element 4-942 may be respectively disposed on the fixed portion 4-F and the holder 4-310, or their position may be interchanged, depending on design requirement. It should be noted that the interaction between the first holder driving element 4-941 and the second holder driving element 4-942 may generate a magnetic force to move the optical element 4-500 on the holder 4-310 relative to the fixed portion 4-F, so auto focus (AF) or optical image stabilization (OIS) may be achieved. In some embodiments, the holder driving mechanism 4-940 may also include piezoelectric elements or shape memory alloy elements.

In this embodiments, the optical module 4-M and the optical element 4-500 disposed in the optical module 4-M are movably disposed in the fixed portion 4-F. When current is passed to the second holder driving element 4-942, the second holder driving element 4-942 may interact with the magnetic field of the first holder driving element 4-941 to generate an electromagnetic force to move the holder 4-310 and the optical element 4-500 along the optical axis 4-O relative to the fixed portion 4-F to achieve auto focus.

In some embodiments, a first sensing module 4-900 may be disposed in the optical system 4-1000 used for detect of the position of the optical module 4-M relative to the fixed portion 4-F. The first sensing module 4-900 may include a first sensing assembly 4-910 and a second sensing assembly 4-920. The first sensing assembly 4-910 may include a first sensing element 4-911 and a first reference element 4-912, and the second sensing assembly 4-920 may include a second sensing element 4-921 and a second reference element 4-922. The first sensing assembly 4-910 and the second sensing assembly 4-920 may be used for detecting the movement of the movable portion 4-400 or the optical module 4-M relative to the fixed portion 4-F.

The first sensing element 4-911 or the second sensing element 4-921 may include a Hall sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate Sensor.

The first reference element 4-912 and the second reference element 4-922 may be magnets used for generating a reference magnetic field. The first sensing element 4-911 and the second sensing element 4-921 respectively correspond to the first reference element 4-912 and the second reference element 4-922, such as arranged along the radius direction of the optical element 4-500. It should be noted that the first reference element 4-912 and the first sensing element 4-911 are arranged in a direction that is not parallel to the optical axis 4-O, such as perpendicular to the optical axis 4-O. The fixed portion 4-F includes a first corner 4-241, a second corner 4-242, a third corner 4-243, and a fourth corner 4-244. The second reference element 4-922 and the second sensing element 4-921 are arranged in a direction that is not parallel to the optical axis 4-O, such as perpendicular to the optical axis 4-O. When viewed along the optical axis 4-O, the first sensing assembly 4-910 is at a first corner 4-241 of the fixed portion 4-F, and the second sensing assembly 4-920 is at a second corner 4-242 of the fixed portion 4-F. The first corner 4-241 and the second corner 4-242 are at opposite ends of the second side 4-232.

The first sensing element 4-911 and the second sensing element 4-921 may be used for respectively detecting the reference magnetic field generated by the first reference element 4-912 and the second reference element 4-922, thereby providing a first sensing signal and a second sensing signal (such as to a process unit of the electronic apparatus) to achieve the movement or the position of the movable portion 4-400 or the optical module 4-M relative to the fixed portion 4-F.

For example, the first sensing module 4-900 may be used for detecting the movement of the movable portion 4-400 or the holder 4-310 relative to the fixed portion 4-F in different dimensions, such as the lateral movements in the X direction (first dimension), in the Y direction (second dimension), or in the Z direction (third dimension), or a rotation with the Z axis as its rotational axis (fourth dimension), but the present disclosure is not limited thereto.

The external circuit 4-600 may be a flexible printed circuit (FPC), which may be affixed on the circuit module 4-200 by gluing. In this embodiment, the external circuit 4-600 is electrically connected to other electronic elements inside or outside the optical system 4-1000. For example, The external circuit 4-600 may provide electronic signal to the holder driving mechanism 4-940 of the optical module 4-M to control the movement of the holder 4-310 in the X, Y or Z direction, and thus achieving auto focus (AF) or optical image stabilization (OIS). The optical sensor 4-610 may be used for receiving an optical signal and providing an image signal.

The light filter 4-620 may only allow light with specific wavelength to pass through, and filtering light having other wavelength. In other words, electromagnetic wave with specific wavelength may be filtered. For example, the light filter 4-620 may filter infrared and allow visible light to pass through, but it is not limited thereto. The light filter 4-620 may correspond to the optical sensor 4-610. Therefore, the light detected by the optical sensor 4-610 may more similar to what eyes receive.

In some embodiments, the driving assembly 4-800 may be used for driving the movable portion 4-400 or the optical module 4-M to move relative to the fixed portion 4-F. In some embodiments, the material of the driving assembly 4-800 may include shape memory alloy (SMA), may be strip-shaped and extending in a direction. Shape memory allow is an alloy that can eliminate the deformation in lower temperature by heating. When the shape memory alloy performs plastic deformation under its phase transition temperature, it may return to its original shape by heating.

Figure 30:
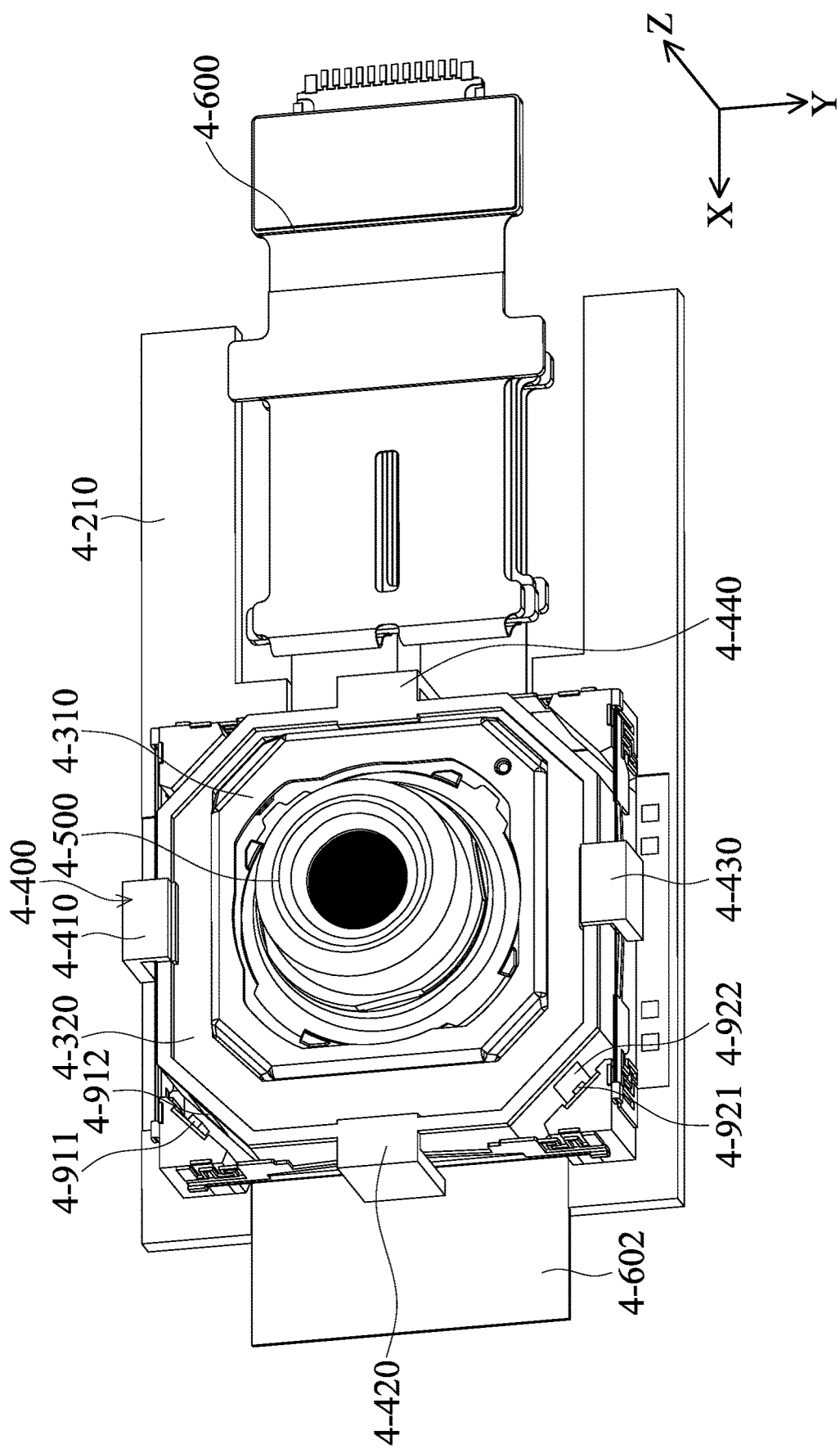
FIG. 30 is a schematic view of some elements of the optical system.
Figure 31:
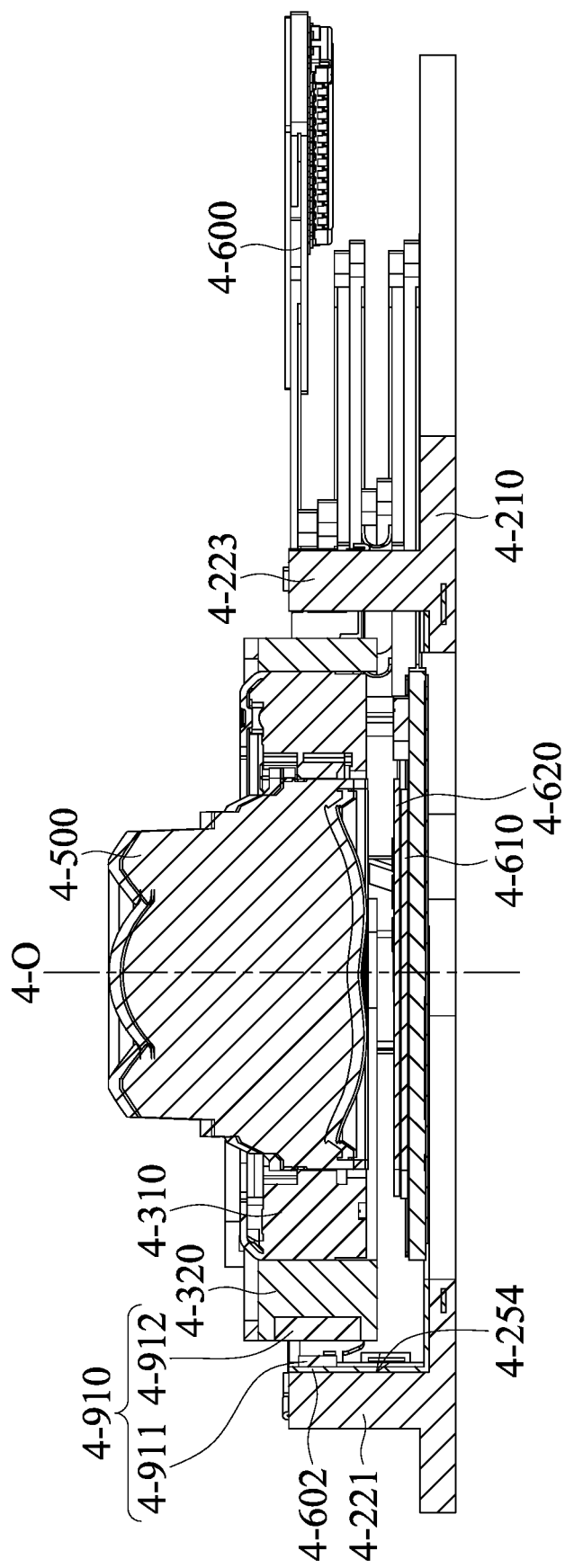
FIG. 31 is a cross-sectional view of the optical system illustrated along a fourth rotational axis in FIG. 27.
Figure 32:
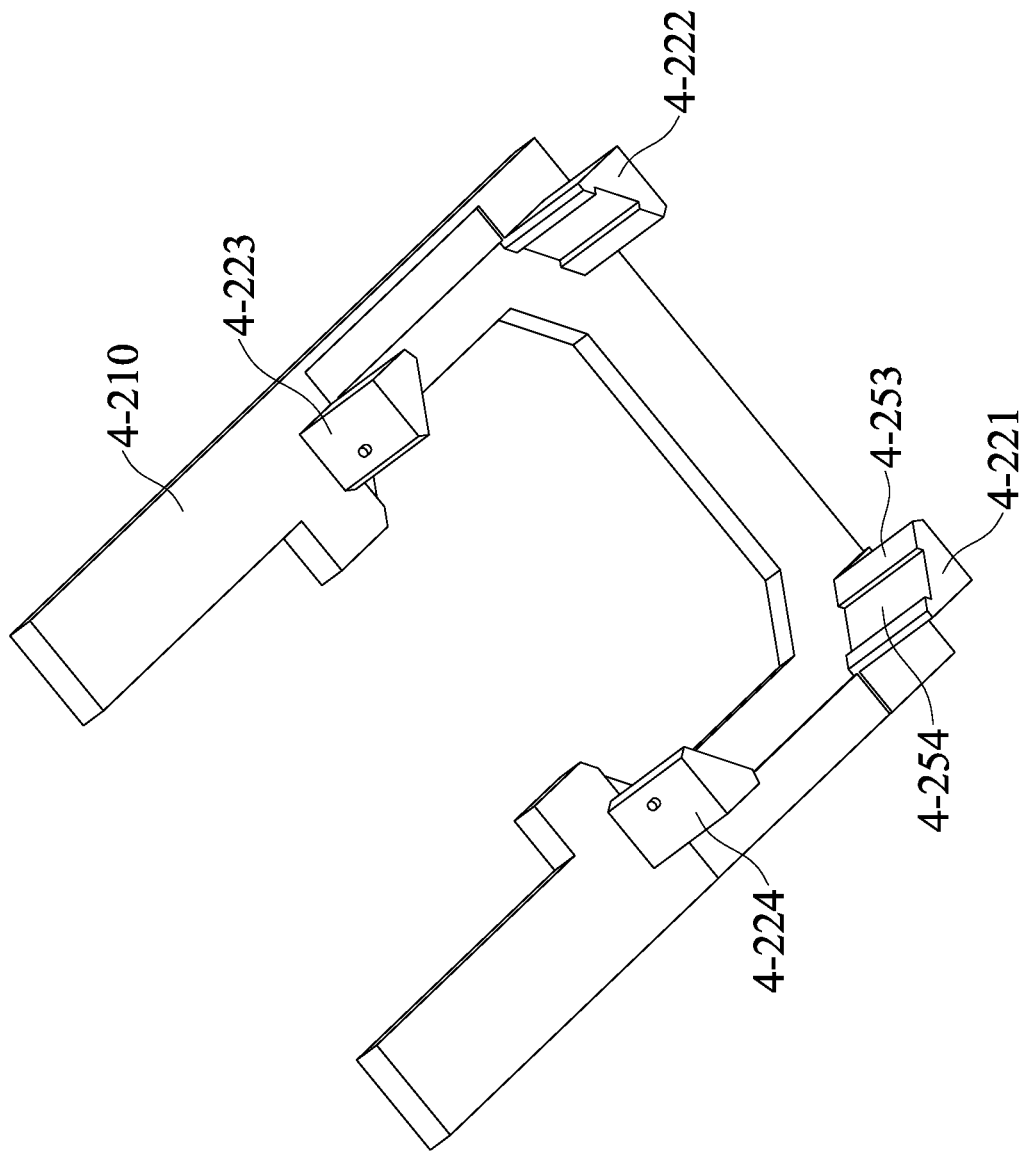
FIG. 32 is a schematic view of the circuit module.

FIG. 29A to FIG. 29D are schematic views of some elements of the optical system 4-1000 when viewed in different direction, wherein the case 4-100 and the movable portion 4-400 are omitted for simplicity. FIG. 30 is a schematic view of some elements of the optical system 4-1000, wherein the case 4-100 is omitted. FIG. 31 is a cross-sectional view illustrated along the fourth rotational axis 4-954 of FIG. 27. FIG. 32 is a schematic view of the circuit module 4-200.

The circuit module 4-200 may include a main body 4-210 and a first protruding portion 4-221, a second protruding portion 4-222, a third protruding portion 4-223, and a fourth protruding portion 4-224 extending from the main body 4-210 in the Z direction (the direction that the optical axis 4-O extends). The main body 4-210 may be plate-shaped, and may be perpendicular to the optical axis 4-O. Moreover, the circuit module 4-200 may have a first metal element 4-261, a second metal element 4-262, a third metal element 4-263, a fourth metal element 4-264, a fifth metal element 4-265, a sixth metal element 4-266, a seventh metal element 4-267, and an eighth metal element 4-268. For example, a portion of the first metal element 4-261 and the second metal element 4-262 may be embedded in the first protruding portion 4-221, and another portion of the first metal element 4-261 and the second metal element 4-262 may be exposed from the first protruding portion 4-221. A portion of the third metal element 4-263 and the fourth metal element 4-264 may be embedded in the second protruding portion 4-222, and another portion of the third metal element 4-263 and the fourth metal element 4-264 may be exposed from the second protruding portion 4-222. A portion of the fifth metal element 4-265 and the sixth metal element 4-266 may be embedded in the third protruding portion 4-223, and another portion of the fifth metal element 4-265 and the sixth metal element 4-266 may be exposed from the third protruding portion 4-223. A portion of the seventh metal element 4-267 and the eighth metal element 4-268 may be embedded in the fourth protruding portion 4-224, and another portion of the seventh metal element 4-267 and the eighth metal element 4-268 may be exposed from the fourth protruding portion 4-224.

Figure 29A:
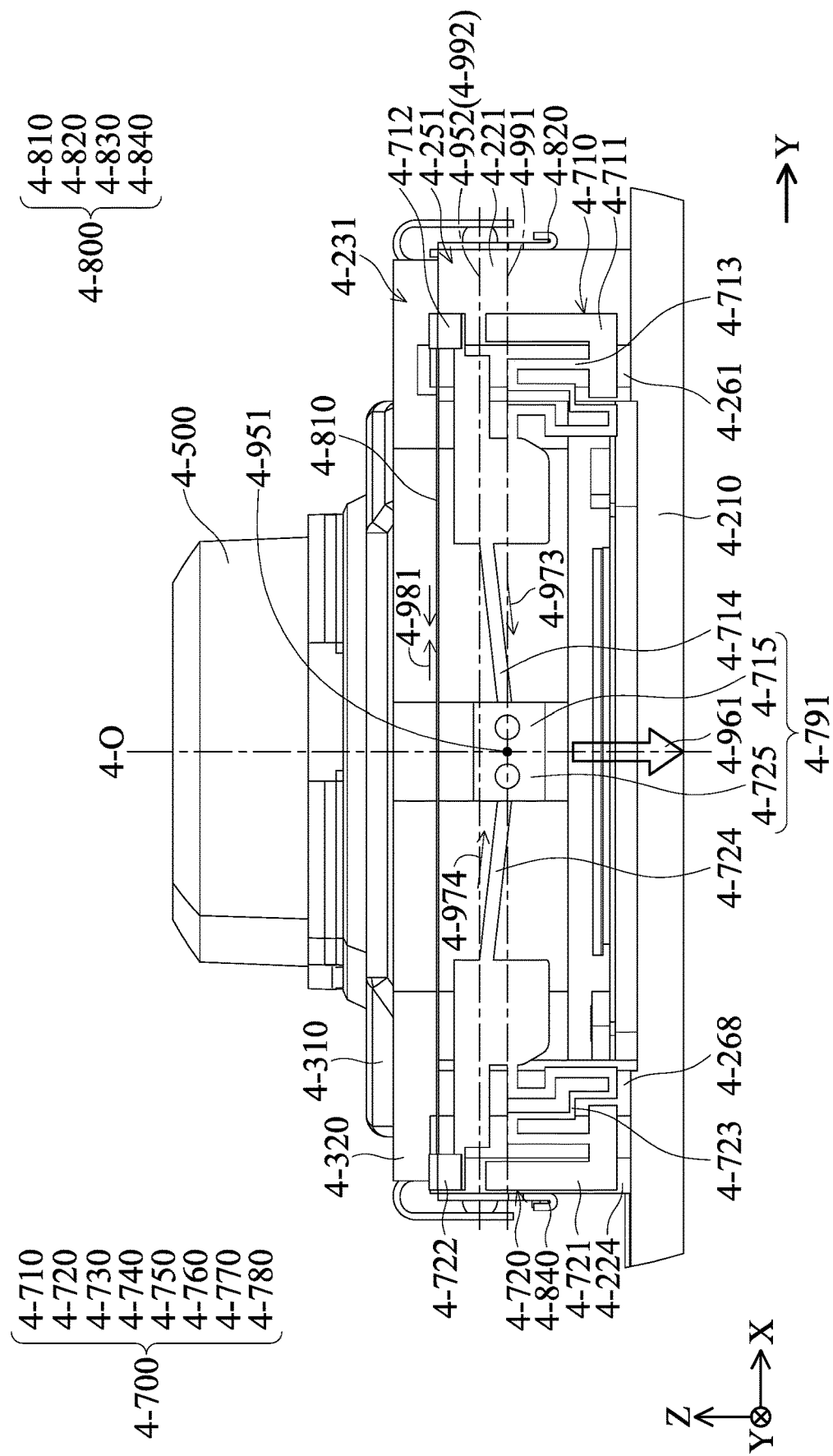
FIG. 29A to FIG. 29D are schematic views of some elements of the optical system illustrated along different directions.
Figure 29B:
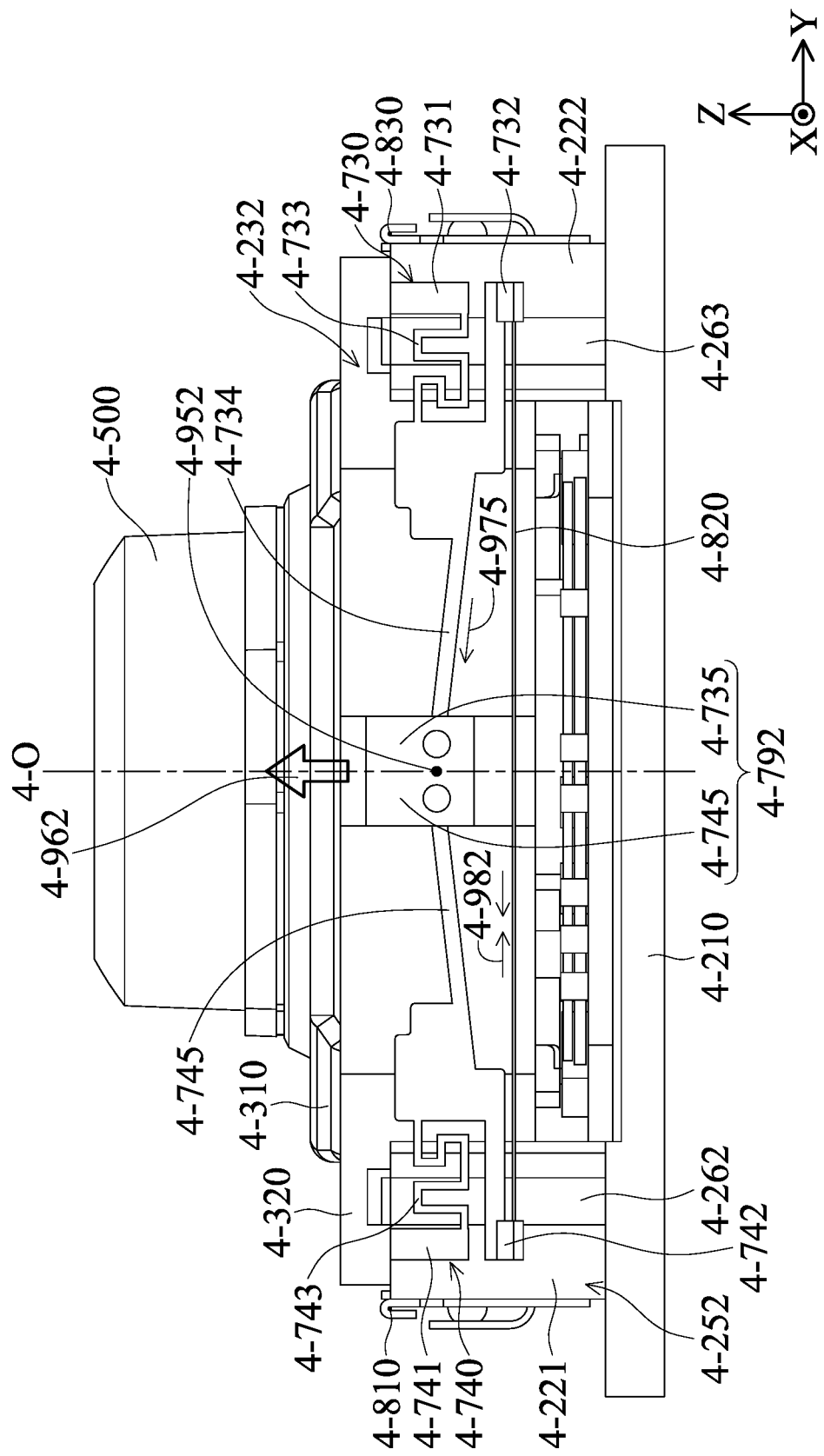

For example, as shown in FIG. 29A and FIG. 29B, the first metal element 4-261 may be partially exposed from a first surface 4-251 of the first protruding portion 4-221, and the second metal element 4-262 may be partially exposed from a second surface 4-252 of the first protruding portion 4-221. Other metal elements and protruding portions may have similar relationships, and are not repeated.

The transmitting assembly 4-700 may include a first transmitting element 4-710, a second transmitting element 4-720, a third transmitting element 4-730, a fourth transmitting element 4-740, a fifth transmitting element 4-750, a sixth transmitting element 4-760, a seventh transmitting element 4-770, and an eighth transmitting element 4-780, and may be used for adjusting the direction of force applied to the optical module 4-M or the movable portion 4-400 by the transmitting assembly 4-700. The driving assembly 4-800 may include a first driving element 4-810, a second driving element 4-820, a third driving element 4-830, and a fourth driving element 4-840.

The first driving element 4-810 may be used for directly or indirectly generating a first driving force 4-961 (e.g. a force to the −Z direction) to move the movable portion 4-400 or the optical module 4-M relative to the fixed portion 4-F. The material of the first driving element 4-810 may include shape memory alloy, so the first transmitting element 4-710 and the second transmitting element 4-720 may be driven by heating the first driving element 4-810. The first driving element 4-810 may be strip-shaped extending a first direction (e.g. the X direction).

The second driving element 4-820 may be used for directly or indirectly generating a second driving force 4-962 (e.g. a force to the +Z direction) to move the movable portion 4-400 or the optical module 4-M relative to the fixed portion 4-F. The material of the second driving element 4-820 may include shape memory alloy, so the third transmitting element 4-730 and the fourth transmitting element 4-740 may be driven by heating the second driving element 4-820. The second driving element 4-820 may be strip-shaped extending a first direction (e.g. the Y direction).

The third driving element 4-830 may be used for directly or indirectly generating a third driving force 4-963 (e.g. a force to the −Z direction) to move the movable portion 4-400 or the optical module 4-M relative to the fixed portion 4-F. The material of the third driving element 4-830 may include shape memory alloy, so the fifth transmitting element 4-750 and the sixth transmitting element 4-760 may be driven by heating the third driving element 4-830. The third driving element 4-830 may be strip-shaped extending a first direction (e.g. the X direction).

The fourth driving element 4-840 may be used for directly or indirectly generating a fourth driving force 4-964 (e.g. a force to the +Z direction) to move the movable portion 4-400 or the optical module 4-M relative to the fixed portion 4-F. The material of the fourth driving element 4-840 may include shape memory alloy, so the seventh transmitting element 4-770 and the eighth transmitting element 4-780 may be driven by heating the fourth driving element 4-840. The fourth driving element 4-840 may be strip-shaped extending a first direction (e.g. the Y direction).

The first driving element 4-810, the second driving element 4-820, the third driving element 4-830, and the fourth driving element 4-840 may generate a contraction force in one direction, and the contraction force may be transferred to the first driving force 4-961, the second driving force 4-962, the third driving force 4-963 and the fourth driving force 4-964 by the transmission elements. For example, the first driving force 4-961 is a combined force of the first force 4-981 generated by the first driving element 4-810 transferred through the first transmitting element 4-710 and the second transmitting element 4-720, and other driving forces and contraction forces may have similar relationship, which is not repeated.

It should be noted that the first direction and the second direction are not parallel to the optical axis 4-O, and the first direction and the second direction are not parallel, such as the first direction and the second direction are perpendicular. Moreover, the first driving element 4-810 and the third driving element 4-830 may at an identical height in the Z direction, and the second driving element 4-820 and the fourth driving element 4-840 may at an identical height in the Z direction. The height of the first driving element 4-810 and the third driving element 4-830 may be different to the height of the second driving element 4-820 and the fourth driving element 4-840. In other words, the first driving element 4-810 and the third driving element 4-830 do not overlap the second driving element 4-820 and the fourth driving element 4-840 when viewed in any direction that is perpendicular to the optical axis 4-O.

The first driving element 4-810 and the third driving element 4-830 may arranged in a direction that is perpendicular to the second rotational axis 4-952, and second driving element 4-820 and the fourth driving element 4-840 may arranged in a direction that is perpendicular to the first rotational axis 4-951.

As shown in FIG. 27, when viewed along the optical axis 4-O, the optical module 4-M is polygonal (e.g. octagonal). The frame 4-320 of the optical module 4-M may have a first side 4-231, a second side 4-232, a third side 4-233, a fourth side 4-234, and a fifth side 4-235. The first side 4-231 and the second side 4-232 extend in different directions, and the third side 4-233 and the fourth side 4-234 extend in different directions. The first driving element 4-810 is at the first side 4-231, the second driving element 4-820 is at the second side 4-232, the third driving element 4-830 is at the third side 4-233, and the fourth driving element 4-840 is at the fourth side 4-234. Moreover, the external circuit 4-600 and the third sensing assembly 4-930 are at the fourth side 4-234, and the holder driving mechanism 4-940 is not at the fourth side 4-234, such may at the first side 4-231. The fifth side 4-235 corresponds to the first corner 4-241.

As shown in FIG. 29A, the first transmitting element 4-710 may be used for transferring a first force 4-981 (e.g. a contraction force) generated by the first driving element 4-810 to the first driving force 4-961. The direction of the first force 4-981 is parallel to the first direction (the X direction), and is different to the direction of the first driving force 4-961. For example, the direction of the first driving force 4-961 may be perpendicular to the first direction, and may be parallel to the optical axis 4-O.

The first transmitting element 4-710 may include a first fixed portion connecting portion 4-711, a first driving element connecting portion 4-712, a first resilient portion 4-713, a first transmitting portion 4-714, and a first receiving portion 4-715. The first fixed portion connecting portion 4-711 may be affixed on the fixed portion 4-F, such as connected to the first surface 4-251 of the first protruding portion 4-221 of the circuit module 4-200. The first surface 4-251 is parallel to the optical axis 4-O. The first fixed portion connecting portion 4-711 may be electrically connected to the first metal element 4-261 exposed from the first surface 4-251. The first driving element connecting portion 4-712 may be affixed to the first driving element 4-810. The first driving element connecting portion 4-712 may be movably connected to the first fixed portion connecting portion 4-711 through the first resilient portion 4-713. The first transmitting portion 4-714 is connected to the first resilient portion 4-713, and is used to conduct the first driving force 4-961 to the movable portion 4-400 or the optical module 4-M. The first receiving portion 4-715 is affixed on the movable portion 4-400 and the optical module 4-M, and corresponds to the first transmitting portion 4-714.

In some embodiments, the first fixed portion connecting portion 4-711, the first driving element connecting portion 4-712, the first resilient portion 4-713, and the first transmitting portion 4-714 may be formed as one piece. The first receiving portion 4-715 is movable relative to the first transmitting portion 4-714. In other words, the first receiving portion 4-715 and the first transmitting portion 4-714 are not formed as one piece. For example, as shown in FIG. 28A, a ball is at the end of the first transmitting portion 4-714, the ball may be clipped by the first receiving portion 4-715, and the first receiving portion 4-715 is connect to the ball by friction. The first receiving portion 4-715 may have recesses or openings to accommodate the ball, so the movable range of the first transmitting portion 4-714 relative to the first receiving portion 4-715 may be limited. Therefore, the first receiving portion 4-715 is movable relative to the first transmitting portion 4-714.

The first transmitting element 4-710 (e.g. the first fixed portion connecting portion 4-711) may be plate-shaped and is not perpendicular to the optical axis 4-O, such as parallel to the optical axis 4-O. The material of the first fixed portion connecting portion 4-711 may include metal and may be different from the material of the first driving element 4-810. The first transmitting portion 4-714 may be strip-shaped and extend to the third direction 4-973. The third direction 4-973 is not parallel or not perpendicular to the first direction (the X direction).

As shown in FIG. 29A, the first transmitting portion 4-714 is at the first side 4-231, and at least a portion of the first transmitting portion 4-714 overlaps the first receiving portion 4-715 in the direction that the optical axis 4-O extends (the Z direction).

As shown in FIG. 29A, the second transmitting element 4-720 may be used for transferring a first force 4-981 (e.g. a contraction force) generated by the first driving element 4-810 to the first driving force 4-961. The second transmitting element 4-720 may include a second fixed portion connecting portion 4-721, a second driving element connecting portion 4-722, a second resilient portion 4-723, a second transmitting portion 4-724, and a second receiving portion 4-725. The second fixed portion connecting portion 4-721 may be affixed on the fixed portion 4-F, such as connected to the fourth protruding portion 4-224 of the circuit module 4-200. The second fixed portion connecting portion 4-721 may be electrically connected to the eighth metal element 4-268 of the fourth protruding portion 4-224. The second driving element connecting portion 4-722 may be affixed on the first driving element 4-810. The second driving element connecting portion 4-722 may be movably connected to the second fixed portion connecting portion 4-721 through the second resilient portion 4-723. The second transmitting portion 4-724 is connected to the second resilient portion 4-723, and is used to conduct the first driving force 4-961 to the movable portion 4-400 or the optical module 4-M. The second receiving portion 4-725 is affixed on the movable portion 4-400 and the optical module 4-M, and corresponds to the second transmitting portion 4-724.

In some embodiments, the second fixed portion connecting portion 4-721, the second driving element connecting portion 4-722, the second resilient portion 4-723, and the second transmitting portion 4-724 may be formed as one piece. The second receiving portion 4-725 is movable relative to the second transmitting portion 4-724. In other words, the second receiving portion 4-725 and the second transmitting portion 4-724 are not formed as one piece. For example, as shown in FIG. 28A, a ball is at the end of the second transmitting portion 4-724, the ball may be clipped by the second receiving portion 4-725, and the second receiving portion 4-725 connects to the ball by friction. The second receiving portion 4-725 may have recesses or openings to accommodate the ball, so the movable range of the second transmitting portion 4-724 relative to the second receiving portion 4-725 may be limited. Therefore, the second receiving portion 4-725 is movable relative to the second transmitting portion 4-724.

The second transmitting element 4-720 (e.g. the second fixed portion connecting portion 4-721) may be plate-shaped and is not perpendicular to the optical axis 4-O, such as parallel to the optical axis 4-O. The material of the second fixed portion connecting portion 4-721 may include metal and may be different from the material of the first driving element 4-810. The second transmitting portion 4-724 may be strip-shaped and extend to the fourth direction 4-974. The fourth direction 4-974 is not parallel nor perpendicular to the first direction (the X direction).

As shown in FIG. 29A, the second transmitting portion 4-724 is at the first side 4-231, and at least a portion of the second transmitting portion 4-724 overlaps the second receiving portion 4-725 in the direction that the optical axis 4-O extends (the Z direction).

The first receiving portion 4-715 and the second receiving portion 4-725 may be formed as one piece, and may be called as a first integrated receiving portion 4-791. Moreover, at least a portion of the first driving element connecting portion 4-712 overlaps the second driving element connecting portion 4-722 in the first direction. The material of the first integrated receiving portion 4-791 includes metal.

It should be noted that the first driving element connecting portion 4-712, the first driving element 4-810, and the second driving element connecting portion 4-722 may be electrically with each other to form a first electrical connection path. Moreover, the first fixed portion connecting portion 4-711, the first resilient portion 4-713, the first transmitting portion 4-714, the first receiving portion 4-715 of the first transmitting element 4-710 and the second receiving portion 4-725 of the second transmitting element 4-720 (i.e. the first integrated receiving portion 4-791), the second transmitting portion 4-724, the second resilient portion 4-723, and the second fixed portion connecting portion 4-721 may be electrically connected to each other in order to form a second electrical connection path. The second electrical connection path does not pass through the first electrical connection path. In other words, the first electrical connection path and the second electrical connection path are connected in parallel. Moreover, the resistance of the first electrical connection path is less than the resistance of the second electrical connection path to ensure current mainly passing through the first driving element 4-810 to allow the first driving element 4-810 being heated and thus deformed. Other driving elements and transmission elements may have similar relationships, and is not repeated.

As shown in FIG. 29B, the third transmitting element 4-730 may be used for transferring a second force 4-982 (e.g. a contraction force) generated by the second driving element 4-820 to the second driving force 4-962. The third transmitting element 4-730 may include a third fixed portion connecting portion 4-731, a third driving element connecting portion 4-732, a third resilient portion 4-733, a third transmitting portion 4-734, and a third receiving portion 4-735. The third fixed portion connecting portion 4-731 may be affixed on the fixed portion 4-F, such as connected to the second protruding portion 4-222 of the circuit module 4-200. The third fixed portion connecting portion 4-731 may be electrically connected to the third metal element 4-263 of the second protruding portion 4-222. The third driving element connecting portion 4-732 may be affixed on the second driving element 4-820. The third driving element connecting portion 4-732 may be movably connected to the third fixed portion connecting portion 4-731 through the third resilient portion 4-733. The third transmitting portion 4-734 is connected to the third resilient portion 4-733, and is used to conduct the second driving force 4-962 to the movable portion 4-400 or the optical module 4-M. The third receiving portion 4-735 is affixed on the movable portion 4-400 and the optical module 4-M, and corresponds to the third transmitting portion 4-734.

In some embodiments, the third fixed portion connecting portion 4-731, the third driving element connecting portion 4-732, the third resilient portion 4-733, and the third transmitting portion 4-734 may be formed as one piece. The third receiving portion 4-735 is movable relative to the third transmitting portion 4-734. In other words, the third receiving portion 4-735 and the third transmitting portion 4-734 are not formed as one piece. For example, as shown in FIG. 28B, a ball is at the end of the third transmitting portion 4-734, the ball may be clipped by the third receiving portion 4-735, and the third receiving portion 4-735 connects to the ball by friction. The third receiving portion 4-735 may have recesses or openings to accommodate the ball, so the movable range of the third transmitting portion 4-734 relative to the third receiving portion 4-735 may be limited. Therefore, the third receiving portion 4-735 is movable relative to the third transmitting portion 4-734.

The third transmitting element 4-730 (e.g. the third fixed portion connecting portion 4-731) may be plate-shaped and is not perpendicular to the optical axis 4-O, such as parallel to the optical axis 4-O. The material of the third fixed portion connecting portion 4-731 may include metal and may be different from the material of the third driving element 4-830. The third transmitting portion 4-734 may be strip-shaped and extend to the fifth direction 4-975. The fifth direction 4-975 is not parallel nor perpendicular to the first direction (the X direction), the second direction (the Y direction), the third direction 4-973, and the fourth direction 4-974.

As shown in FIG. 29A, the third transmitting portion 4-734 is at the second side 4-232, and at least a portion of the third transmitting portion 4-734 overlaps the third receiving portion 4-735 in the direction that the optical axis 4-O extends (the Z direction). Moreover, in any direction perpendicular to the optical axis 4-O, the first driving element connecting portion 4-712 does not overlap the third driving element connecting portion 4-732. In other words, the first driving element connecting portion 4-712 and the third driving element connecting portion 4-732 are at different heights.

As shown in FIG. 29B, the fourth transmitting element 4-740 may be used for transferring a second force 4-982 (e.g. a contraction force) generated by the second driving element 4-820 to the second driving force 4-962. The fourth transmitting element 4-740 may include a fourth fixed portion connecting portion 4-741, a fourth driving element connecting portion 4-742, a fourth resilient portion 4-743, a fourth transmitting portion 4-744, and a fourth receiving portion 4-745. The fourth fixed portion connecting portion 4-741 may be affixed on the fixed portion 4-F, such as connected to the first protruding portion 4-221 of the circuit module 4-200. The fourth fixed portion connecting portion 4-741 may be electrically connected to the second surface 4-252 of the second metal element 4-262 of the first protruding portion 4-221. The fourth driving element connecting portion 4-742 may be affixed on the second driving element 4-820. The fourth driving element connecting portion 4-742 may be movably connected to the fourth fixed portion connecting portion 4-741 through the fourth resilient portion 4-743. The fourth transmitting portion 4-744 is connected to the fourth resilient portion 4-743, and is used to conduct the second driving force 4-962 to the movable portion 4-400 or the optical module 4-M. The fourth receiving portion 4-745 is affixed on the movable portion 4-400 and the optical module 4-M, and corresponds to the fourth transmitting portion 4-744.

In some embodiments, the fourth fixed portion connecting portion 4-741, the fourth driving element connecting portion 4-742, the fourth resilient portion 4-743, and the fourth transmitting portion 4-744 may be formed as one piece. The fourth receiving portion 4-745 is movable relative to the fourth transmitting portion 4-744. In other words, the fourth receiving portion 4-745 and the fourth transmitting portion 4-744 are not formed as one piece. For example, as shown in FIG. 28B, a ball is at the end of the fourth transmitting portion 4-744, the ball may be clipped by the fourth receiving portion 4-745, and the fourth receiving portion 4-745 connects to the ball by friction. The fourth receiving portion 4-745 may have recesses or openings to accommodate the ball, so the movable range of the fourth transmitting portion 4-744 relative to the fourth receiving portion 4-745 may be limited. Therefore, the fourth receiving portion 4-745 is movable relative to the fourth transmitting portion 4-744.

The fourth transmitting element 4-740 (e.g. the fourth fixed portion connecting portion 4-741) may be plate-shaped and is not perpendicular to the optical axis 4-O, such as parallel to the optical axis 4-O. The material of the fourth fixed portion connecting portion 4-741 may include metal and may be different from the material of the third driving element 4-830.

As shown in FIG. 29B, the fourth transmitting portion 4-744 is at the second side 4-232, and at least a portion of the fourth transmitting portion 4-744 overlaps the fourth receiving portion 4-745 in the direction that the optical axis 4-O extends (the Z direction).

The third receiving portion 4-735 and the fourth receiving portion 4-745 may be formed as one piece, and may be called as a second integrated receiving portion 4-792. Moreover, at least a portion of the third driving element connecting portion 4-732 overlaps the fourth driving element connecting portion 4-742 in the second direction. The material of the second integrated receiving portion 4-792 may include metal.

Figure 29C:
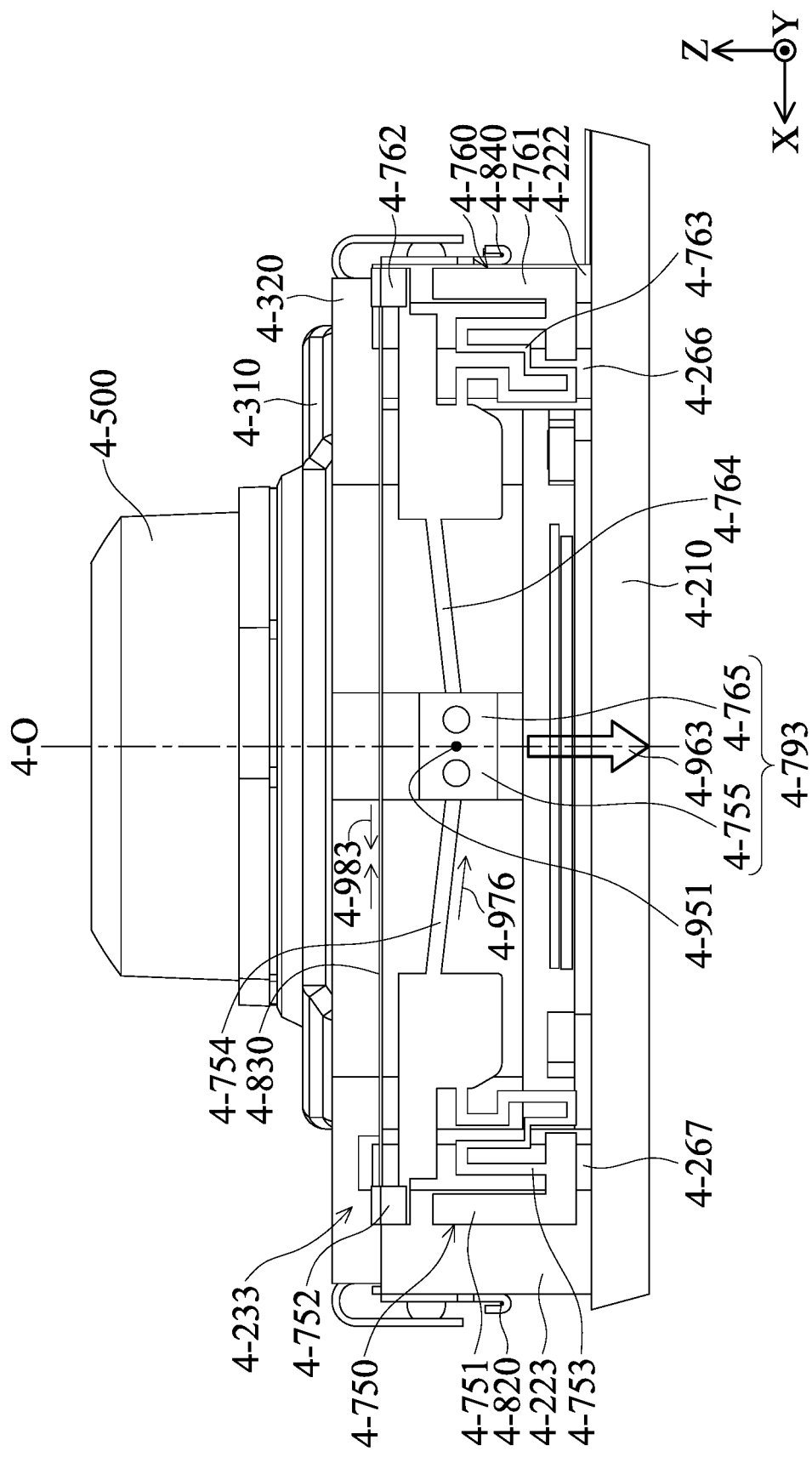

As shown in FIG. 29C, the fifth transmitting element 4-750 may be used for transferring a third force 4-983 (e.g. a contraction force) generated by the third driving element 4-830 to the third driving force 4-963. The fifth transmitting element 4-750 may include a fifth fixed portion connecting portion 4-751, a fifth driving element connecting portion 4-752, a fifth resilient portion 4-753, a fifth transmitting portion 4-754, and a fifth receiving portion 4-755. The fifth fixed portion connecting portion 4-751 may be affixed on the fixed portion 4-F, such as connected to the third protruding portion 4-223 of the circuit module 4-200. The fifth fixed portion connecting portion 4-751 may be electrically connected to the seventh metal element 4-267 of the third protruding portion 4-223. The fifth driving element connecting portion 4-752 may be affixed on the third driving element 4-830. The fifth driving element connecting portion 4-752 may be movably connected to the fifth fixed portion connecting portion 4-751 through the fifth resilient portion 4-753. The fifth transmitting portion 4-754 is connected to the fifth resilient portion 4-753, and is used to conduct the third driving force 4-963 to the movable portion 4-400 or the optical module 4-M. The fifth receiving portion 4-755 is affixed on the movable portion 4-400 and the optical module 4-M, and corresponds to the fifth transmitting portion 4-754.

In some embodiments, the fifth fixed portion connecting portion 4-751, the fifth driving element connecting portion 4-752, the fifth resilient portion 4-753, and the fifth transmitting portion 4-754 may be formed as one piece. The fifth receiving portion 4-755 is movable relative to the fifth transmitting portion 4-754. In other words, the fifth receiving portion 4-755 and the fifth transmitting portion 4-754 are not formed as one piece. For example, as shown in FIG. 28A, a ball is at the end of the fifth transmitting portion 4-754, the ball may be clipped by the fifth receiving portion 4-755, and the fifth receiving portion 4-755 connects to the ball by friction. The fifth receiving portion 4-755 may have recesses or openings to accommodate the ball, so the movable range of the fifth transmitting portion 4-754 relative to the fifth receiving portion 4-755 may be limited. Therefore, the fifth receiving portion 4-755 is movable relative to the fifth transmitting portion 4-754.

The fifth transmitting element 4-750 (e.g. the fifth fixed portion connecting portion 4-751) may be plate-shaped and is not perpendicular to the optical axis 4-O, such as parallel to the optical axis 4-O. The material of the fifth fixed portion connecting portion 4-751 may include metal and may be different from the material of the third driving element 4-830. The fifth transmitting portion 4-754 may be strip-shaped and extend to the fifth direction 4-975. The sixth direction 4-976 is not parallel or not perpendicular to the third direction 4-973, the fourth direction 4-974, and the fifth direction 4-975.

As shown in FIG. 29C, the fifth transmitting portion 4-754 is at the third side 4-233, and at least a portion of the fifth transmitting portion 4-754 overlaps the fifth receiving portion 4-755 in the direction that the optical axis 4-O extends (the Z direction). Moreover, in any direction perpendicular to the optical axis 4-O, the second driving element 4-820 does not overlap the third driving element 4-830. In other words, the second driving element 4-820 and the third driving element 4-830 are at different heights. In some embodiments, in the second direction (the Y direction) that is perpendicular to the optical axis 4-O, the first driving element 4-810 overlaps the third driving element 4-830. In other words, the first driving element 4-810 and the third driving element 4-830 are at an identical height.

As shown in FIG. 29C, the sixth transmitting element 4-760 may be used for transferring a third force 4-983 (e.g. a contraction force) generated by the third driving element 4-830 to the third driving force 4-963. The sixth transmitting element 4-760 may include a sixth fixed portion connecting portion 4-761, a sixth driving element connecting portion 4-762, a sixth resilient portion 4-763, a sixth transmitting portion 4-764, and a sixth receiving portion 4-765. The sixth fixed portion connecting portion 4-761 may be affixed on the fixed portion 4-F, such as connected to the first protruding portion 4-221 of the circuit module 4-200. The sixth fixed portion connecting portion 4-761 may be electrically connected to the sixth metal element 4-266 of the first protruding portion 4-221. The sixth driving element connecting portion 4-762 may be affixed on the second driving element 4-820. The sixth driving element connecting portion 4-762 may be movably connected to the sixth fixed portion connecting portion 4-761 through the sixth resilient portion 4-763. The sixth transmitting portion 4-764 is connected to the sixth resilient portion 4-763, and is used to conduct the second driving force 4-962 to the movable portion 4-400 or the optical module 4-M. The sixth receiving portion 4-765 is affixed on the movable portion 4-400 and the optical module 4-M, and corresponds to the sixth transmitting portion 4-764.

In some embodiments, the sixth fixed portion connecting portion 4-761, the sixth driving element connecting portion 4-762, the sixth resilient portion 4-763, and the sixth transmitting portion 4-764 may be formed as one piece. The sixth receiving portion 4-765 is movable relative to the sixth transmitting portion 4-764. In other words, the sixth receiving portion 4-765 and the sixth transmitting portion 4-764 are not formed as one piece. For example, as shown in FIG. 28A, a ball is at the end of the sixth transmitting portion 4-764, the ball may be clipped by the sixth receiving portion 4-765, and the sixth receiving portion 4-765 connects to the ball by friction. The sixth receiving portion 4-765 may have recesses or openings to accommodate the ball, so the movable range of the sixth transmitting portion 4-764 relative to the sixth receiving portion 4-765 may be limited. Therefore, the sixth receiving portion 4-765 is movable relative to the sixth transmitting portion 4-764.

The sixth transmitting element 4-760 (e.g. the sixth fixed portion connecting portion 4-761) may be plate-shaped and is not perpendicular to the optical axis 4-O, such as parallel to the optical axis 4-O. The material of the sixth fixed portion connecting portion 4-761 may include metal and may be different from the material of the third driving element 4-830.

As shown in FIG. 29C, the sixth transmitting portion 4-764 is at the second side 4-232, and at least a portion of the sixth transmitting portion 4-764 overlaps the sixth receiving portion 4-765 when viewed along the optical axis 4-O (the Z direction).

The fifth receiving portion 4-755 and the sixth receiving portion 4-765 may be formed as one piece, and may be called as a third integrated receiving portion 4-793. In the first direction (the X direction), at least a portion of the fifth driving element connecting portion 4-752 overlaps the sixth driving element connecting portion 4-762. The material of the third integrated receiving portion 4-793 may include metal.

Figure 29D:
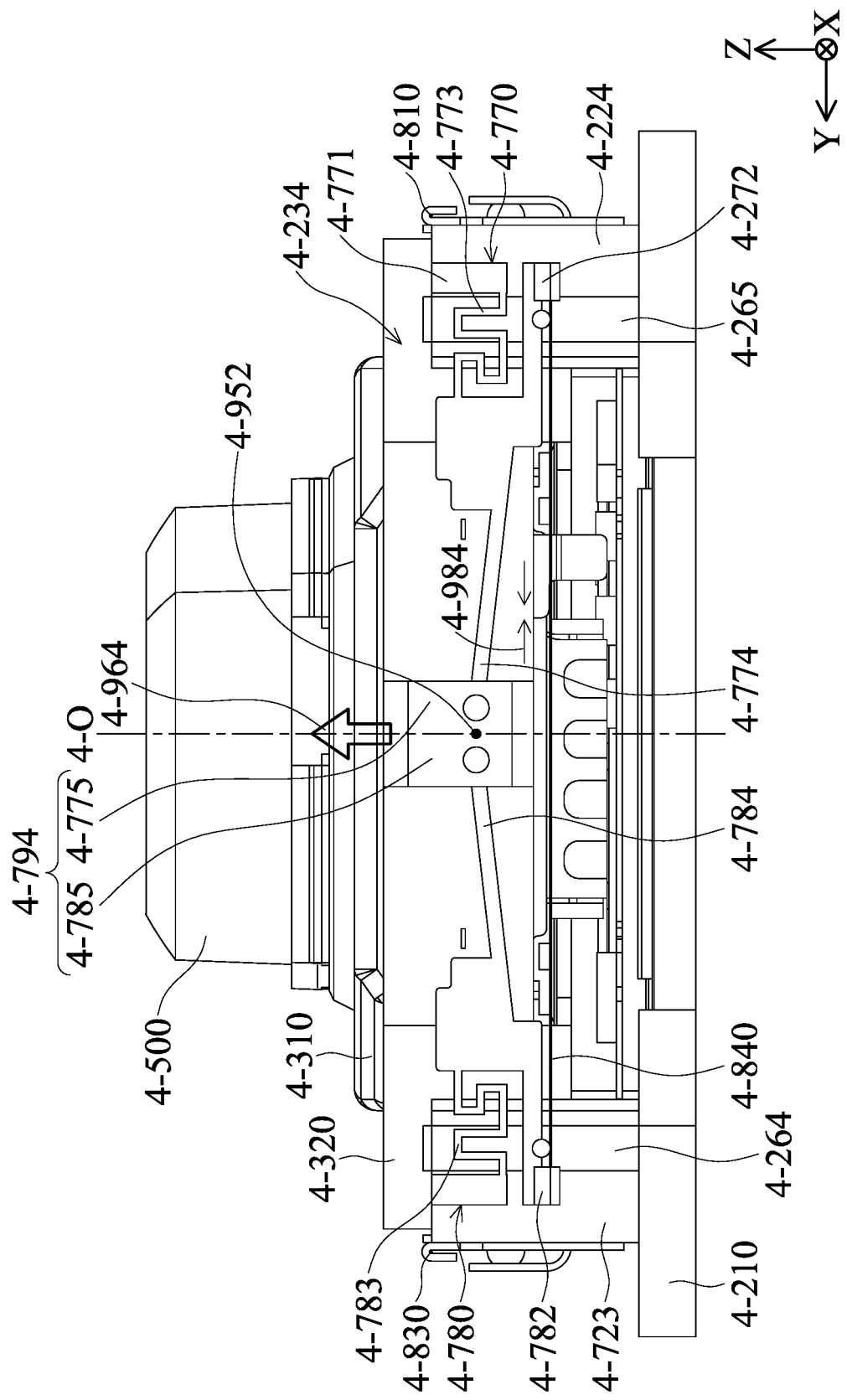

As shown in FIG. 29D, the seventh transmitting element 4-770 may be used for transferring a fourth force 4-984 (e.g. a contraction force) generated by the fourth driving element 4-840 to the fourth driving force 4-964. The seventh transmitting element 4-770 may include a seventh fixed portion connecting portion 4-771, a seventh driving element connecting portion 4-772, a seventh resilient portion 4-773, a seventh transmitting portion 4-774, and a seventh receiving portion 4-775. The seventh fixed portion connecting portion 4-771 may be affixed on the fixed portion 4-F, such as connected to the fourth protruding portion 4-224 of the circuit module 4-200. The seventh fixed portion connecting portion 4-771 may be electrically connected to the fifth metal element 4-265 of the fourth protruding portion 4-224. The seventh driving element connecting portion 4-772 may be affixed on the fourth driving element 4-840. The seventh driving element connecting portion 4-772 may be movably connected to the seventh fixed portion connecting portion 4-771 through the seventh resilient portion 4-773. The seventh transmitting portion 4-774 is connected to the seventh resilient portion 4-773, and is used to conduct the fourth driving force 4-964 to the movable portion 4-400 or the optical module 4-M. The seventh receiving portion 4-775 is affixed on the movable portion 4-400 and the optical module 4-M, and corresponds to the seventh transmitting portion 4-774.

In some embodiments, the seventh fixed portion connecting portion 4-771, the seventh driving element connecting portion 4-772, the seventh resilient portion 4-773, and the seventh transmitting portion 4-774 may be formed as one piece. The seventh receiving portion 4-775 is movable relative to the seventh transmitting portion 4-774. In other words, the seventh receiving portion 4-775 and the seventh transmitting portion 4-774 are not formed as one piece. For example, as shown in FIG. 28B, a ball is at the end of the seventh transmitting portion 4-774, the ball may be clipped by the seventh receiving portion 4-775, and the seventh receiving portion 4-775 connects to the ball by friction. The seventh receiving portion 4-775 may have recesses or openings to accommodate the ball, so the movable range of the seventh transmitting portion 4-774 relative to the seventh receiving portion 4-775 may be limited. Therefore, the seventh receiving portion 4-775 is movable relative to the seventh transmitting portion 4-774.

The seventh transmitting element 4-770 (e.g. the seventh fixed portion connecting portion 4-771) may be plate-shaped and is not perpendicular to the optical axis 4-O, such as parallel to the optical axis 4-O. The material of the seventh fixed portion connecting portion 4-771 may include metal and may be different from the material of the fourth driving element 4-840.

As shown in FIG. 29D, the seventh transmitting portion 4-774 is at the third side 4-233, and at least a portion of the seventh transmitting portion 4-774 overlaps the seventh receiving portion 4-775 in the direction that the optical axis 4-O extends (the Z direction). The fourth side 4-234 is not parallel to the third side 4-233, such as perpendicular to the third side 4-233.

As shown in FIG. 29D, the eighth transmitting element 4-780 may be used for transferring a fourth force 4-984 (e.g. a contraction force) generated by the fourth driving element 4-840 to the fourth driving force 4-964. The eighth transmitting element 4-780 may include an eighth fixed portion connecting portion 4-781, an eighth driving element connecting portion 4-782, an eighth resilient portion 4-783, an eighth transmitting portion 4-784, and an eighth receiving portion 4-785. The eighth fixed portion connecting portion 4-781 may be affixed on the fixed portion 4-F, such as connected to the third protruding portion 4-223 of the circuit module 4-200. The eighth fixed portion connecting portion 4-781 may be electrically connected to the fourth metal element 4-264 of the third protruding portion 4-223. The eighth driving element connecting portion 4-782 may be affixed on the second driving element 4-820. The eighth driving element connecting portion 4-782 may be movably connected to the eighth fixed portion connecting portion 4-781 through the eighth resilient portion 4-783. The eighth transmitting portion 4-784 is connected to the eighth resilient portion 4-783, and is used to conduct the second driving force 4-962 to the movable portion 4-400 or the optical module 4-M. The eighth receiving portion 4-785 is affixed on the movable portion 4-400 and the optical module 4-M, and corresponds to the eighth transmitting portion 4-784.

In some embodiments, the eighth fixed portion connecting portion 4-781, the eighth driving element connecting portion 4-782, the eighth resilient portion 4-783, and the eighth transmitting portion 4-784 may be formed as one piece. The eighth receiving portion 4-785 is movable relative to the eighth transmitting portion 4-784. In other words, the eighth receiving portion 4-785 and the eighth transmitting portion 4-784 are not formed as one piece. For example, as shown in FIG. 28B, a ball is at the end of the eighth transmitting portion 4-784, the ball may be clipped by the eighth receiving portion 4-785, and the eighth receiving portion 4-785 connects to the ball by friction. The eighth receiving portion 4-785 may have recesses or openings to accommodate the ball, so the movable range of the eighth transmitting portion 4-784 relative to the eighth receiving portion 4-785 may be limited. Therefore, the eighth receiving portion 4-785 is movable relative to the eighth transmitting portion 4-784.

The eighth transmitting element 4-780 (e.g. the eighth fixed portion connecting portion 4-781) may be plate-shaped and is not perpendicular to the optical axis 4-O, such as parallel to the optical axis 4-O. The material of the eighth fixed portion connecting portion 4-781 may include metal and may be different from the material of the fourth driving element 4-840.

As shown in FIG. 29D, the eighth transmitting portion 4-784 is at the second side 4-232, and at least a portion of the eighth transmitting portion 4-784 overlaps the eighth receiving portion 4-785 when viewed along the optical axis 4-O (the Z direction).

The seventh receiving portion 4-775 and the eighth receiving portion 4-785 may be formed as one piece, and may be called as a fourth integrated receiving portion 4-794. In the first direction (the X direction), at least a portion of the seventh driving element connecting portion 4-772 overlaps the eighth driving element connecting portion 4-782. The material of the fourth integrated receiving portion 4-794 may include metal.

As shown in FIG. 27, the distance between the fourth transmitting element 4-740 and the first transmitting element 4-710 is less than the distance between the first transmitting element 4-710 and the second transmitting element 4-720. In some embodiments, the shortest distance between the first transmitting element 4-710 and the fourth transmitting element 4-740 is different from the shortest distance between the second transmitting element 4-720 and the third transmitting element 4-730, such as the shortest distance between the first transmitting element 4-710 and the fourth transmitting element 4-740 may be less than the shortest distance between the second transmitting element 4-720 and the third transmitting element 4-730. Moreover, the shortest distance between the first integrated receiving portion 4-791 and the third transmitting element 4-730 is different from the shortest distance between the first integrated receiving portion 4-791 and the fourth transmitting element 4-740, such as the shortest distance between the first integrated receiving portion 4-791 and the third transmitting element 4-730 may be higher than the shortest distance between the first integrated receiving portion 4-791 and the fourth transmitting element 4-740.

As shown in FIG. 28A and FIG. 28B, the first integrated receiving portion 4-791 may have a first opening 4-331, the second integrated receiving portion 4-792 may have a second opening 4-332, the third integrated receiving portion 4-793 may have a third opening 4-333, and the fourth integrated receiving portion 4-794 may have a fourth opening 4-334. The first opening 4-331 and the third opening 4-333 are oriented to the +Z direction, and the second opening 4-332 and the fourth opening 4-334 are oriented to the −Z direction, i.e. toward opposite directions. In other words, the first opening 4-331 is oriented to the first driving element 4-810, the second opening 4-332 is oriented to the second driving element 4-820, the third opening 4-333 is oriented to the third driving element 4-830, the fourth opening 4-334 is oriented to the fourth driving element 4-840.

In some embodiments, in any direction that is perpendicular to the optical axis 4-O, the first opening 4-331 does not overlap the first driving element 4-810, the second opening 4-332 does not overlap the second driving element 4-820, the third opening 4-333 does not overlap the third driving element 4-830, the fourth opening 4-334 does not overlap the fourth driving element 4-840 (i.e. at different heights). Moreover, as shown in FIG. 29A to FIG. 29D, in a direction that is perpendicular to the optical axis 4-O, at least a portion of the first opening 4-331 overlaps the second driving element 4-820, and at least a portion of the second opening 4-332 overlaps the first driving element 4-810.

In some embodiments, the first opening 4-331 is used for accommodating the first transmitting portion 4-714 and the second transmitting portion 4-724, the second opening 4-332 is used for accommodating the third transmitting portion 4-734 and the fourth transmitting portion 4-744, the third opening 4-333 is used for accommodating the fifth transmitting portion 4-754 and the sixth transmitting portion 4-764, the fourth opening 4-334 is used for accommodating the seventh transmitting portion 4-774 and the eighth transmitting portion 4-784.

In some embodiments, the movable portion 4-400 includes a first protect element 4-410, a second protect element 4-420, a third protect element 4-430, and a fourth protect element 4-440, which respectively correspond to the first integrated receiving portion 4-791, the second integrated receiving portion 4-792, the third integrated receiving portion 4-793, and the fourth integrated receiving portion 4-794, such as overlap each other in a direction that is perpendicular to the optical axis 4-O to protect the first integrated receiving portion 4-791, the second integrated receiving portion 4-792, the third integrated receiving portion 4-793, and the fourth integrated receiving portion 4-794. In some embodiments, the material of the first protect element 4-410, the second protect element 4-420, the third protect element 4-430, and the fourth protect element 4-440 are different from the material of the first integrated receiving portion 4-791, the second integrated receiving portion 4-792, the third integrated receiving portion 4-793, and the fourth integrated receiving portion 4-794. For example, the material of the first protect element 4-410, the second protect element 4-420, the third protect element 4-430, and the fourth protect element 4-440 may include plastic.

In some embodiments, the first protect element 4-410, the second protect element 4-420, the third protect element 4-430, and the fourth protect element 4-440 may respectively have a opening structure 4-341, a opening structure 4-342, a opening structure 4-343, and a opening structure 4-344 oriended to the −Z direction, and respectively have a first protect sidewall 4-411, a second protect sidewall 4-421, a third protect sidewall 4-431, a fourth protect sidewall 4-441 extended in the Z direction (parallel to the optical axis 4-O), which respectively correspond to the first driving element 4-810, the second driving element 4-820, the third driving element 4-830, and the fourth driving element 4-840, i.e. partially overlap each other in a direction that is perpendicular to the optical axis 4-O.

It should be noted that in a direction that is perpendicular to the optical axis 4-O, the maximum distance 4-D2 between the first protect sidewall 4-411 and the optical axis 4-O is higher than the maximum distance 4-D1 between the first integrated receiving portion 4-791 and the optical axis 4-O. Other protective sidewalls and integrated receiving portions may have similar relationships. Moreover, in the direction that the optical axis 4-O extends, the maximum dimension 4-H1 of the first protect sidewall 4-411 is different from the maximum dimension 4-H2 of the second protect sidewall 4-421. When viewed along a direction that is perpendicular to the optical axis 4-O, at least a portion of the first protect sidewall 4-411 overlaps the first driving element 4-810 to protect the first driving element 4-810. Other protective sidewalls and driving assemblies may have similar relationships, and is not repeated.

Because the direction of the first driving force 4-961 an the third driving force 4-963 are oriented to the −Z direction and applied on opposite sides of the movable portion 4-400 and the optical module 4-M, the direction of the second driving force 4-962 an the fourth driving force 4-964 are oriented to the +Z direction and applied on opposite sides of the movable portion 4-400 and the optical module 4-M, when one of the driving force (e.g. the first driving force 4-961) is applied to the movable portion 4-400 and the optical module 4-M, the driving element at the opposite side does not generate any driving force, or generate a third driving force 4-963 different from (e.g. less than) the first driving force 4-961. At this moment, the driving elements at adjacent sides may generate driving forces different from (e.g. less than) the first driving force 4-961, such as the second driving force 4-962 and the fourth driving force 4-964 at a same time to balance the whole structure. At this moment, the second driving force 4-962 may be identical to the fourth driving force 4-964 and parallel to the fourth driving force 4-964, and may be different from the first driving force 4-961. Therefore, the movable portion 4-400 and the optical module 4-M may rotate in a specific direction.

The movable portion 4-400 and the optical module 4-M may be driven by the driving assembly 4-800 to rotate in various directions, such as may rotate using the first rotational axis 4-951, the second rotational axis 4-952, the third rotational axis 4-953, or the fourth rotational axis 4-954 to achieve optical image stabilization.

In some embodiments, the first driving force 4-961 is applied to the first integrated receiving portion 4-791, and the second driving force 4-962 is applied to the second integrated receiving portion 4-792. The second rotational axis 4-952 passes through the first integrated receiving portion 4-791 and the first rotational axis 4-951 passes through the second integrated receiving portion 4-792. When viewed along the optical axis 4-O, a connection between the first integrated receiving portion 4-791 and the optical axis 4-O is not parallel to the connection between the second integrated receiving portion 4-792 and the optical axis 4-O.

In some embodiments, the first rotational axis 4-951, the second rotational axis 4-952, the third rotational axis 4-953, and the fourth rotational axis 4-954 intersect the optical axis of the optical element 4-500 (or the optical axis 4-0) and do not parallel to the optical axis of the optical element 4-500 (or the optical axis 4-O), but do not pass through the center of the fixed portion 4-F. For example, as shown in FIG. 27, the first rotational axis 4-951 may be parallel to the first side 4-231, and the second rotational axis 4-952 may be parallel to the second side 4-232. The distance 4-L1 between the first rotational axis 4-951 and the second side 4-232 is different from the distance between the distance 4-L2 between the first rotational axis 4-951 and the fourth side 4-234, such as the distance 4-L1 between the first rotational axis 4-951 and the second side 4-232 is higher than the distance between the distance 4-L2 between the first rotational axis 4-951 and the fourth side 4-234. Moreover, the first rotational axis 4-951 may be perpendicular to the second rotational axis 4-952.

As shown in FIG. 29A, a first virtual plane 4-991 and a second virtual plane 4-992 that are perpendicular to the optical axis 4-O may be defined. The first virtual plane 4-991 is parallel to and not interest to the second virtual plane 4-992. The first rotational axis 4-951 may be in the first virtual plane 4-991, and the second rotational axis 4-952 may be in the second virtual plane 4-992. In other words, when viewed in a direction that is perpendicular to the optical axis 4-O, the first rotational axis 4-951 does not overlap the second rotational axis 4-952. Moreover, the first rotational axis 4-951 may pass through a connection between the balls at ends of the first transmitting portion 4-714 and the second transmitting portion 4-724, and pass through a connection between the balls at ends of the fifth transmitting portion 4-754 and the sixth transmitting portion 4-764. In other words, the first rotational axis 4-951 is between the first transmitting portion 4-714 and the second transmitting portion 4-724 and does not overlap the first transmitting portion 4-714 or the second transmitting portion 4-724. It should be noted that in the Z direction, the center of mass of the movable portion 4-400 plus the optical module 4-M is between the first virtual plane 4-991 and the second virtual plane 4-992 to allow the movable portion 4-400 and the optical module 4-M being driven by the driving assembly 4-800.

As shown in FIG. 32, the first protruding portion 4-221 has a third surface 4-253 and a fourth surface 4-254 that are not parallel to the first surface 4-251 and the second surface 4-252. The fourth surface 4-254 is in a recess structure on the third surface 4-253. Moreover, as shown in FIG. 30 and FIG. 31, the first sensing assembly 4-910 (which includes a first sensing element 4-911 and a first reference element 4-912) is disposed on the fourth surface 4-254. For example, the circuit element 4-602 may be disposed between the fourth surface 4-254 and the first sensing assembly 4-910, and in contact with the fourth surface 4-254 and the first sensing assembly 4-910.

The first sensing assembly 4-910 may be used for detecting the movement of the movable portion 4-400 or the optical module 4-M relative to the fixed portion 4-F. Furthermore, the second sensing assembly 4-920 (which includes a second sensing element 4-921 and a second reference element 4-922) and the second protruding portion 4-222 may have similar position relationship between the first sensing assembly 4-910 and the first protruding portion 4-221, and it is not repeated.

The first sensing assembly 4-910 may be used for detecting the rotational movement of the movable portion 4-400 and the optical module 4-M relative to the fixed portion 4-F with the third rotational axis 4-953 as their rotational axis. The second sensing assembly 4-920 may be used for detecting the rotational movement of the movable portion 4-400 and the optical module 4-M relative to the fixed portion 4-F with the fourth rotational axis 4-954 as their rotational axis. The third rotational axis 4-953 is not parallel to the first rotational axis 4-951 or the second rotational axis 4-952, the fourth rotational axis 4-954 is not parallel to the first rotational axis 4-951 or the second rotational axis 4-952, and the third rotational axis 4-953 is not parallel to the fourth rotational axis 4-954.

In some embodiments, the second sensing module may be used for detecting the movement of the holder 4-310 relative to the frame 4-320. The third reference element 4-932 of the third sensing assembly 4-930 may be a magnet used for generating a magnetic field. The third sensing element 4-931 may correspond to the third reference element 4-932, and may be used for detecting the magnetic field generated by the third reference element 4-932. The third sensing element 4-931 and the third reference element 4-932 may be respectively disposed at the fixed portion 4-F and the optical module 4-M or the movable portion 4-400, or their position may be interchanged. In some embodiments, the second sensing module may include additional combinations of sensing elements and reference elements.

In some embodiments, the third reference element 4-932 and the third sensing element 4-931 may arrange at a direction that is not parallel to the optical axis 4-O. For example, the third reference element 4-932 and the third sensing element 4-931 may arrange in a direction that is perpendicular to the optical axis 4-O. Moreover, the third reference element 4-932 and the third sensing element 4-931 may arrange in a direction that is not parallel or perpendicular to a direction that the first reference element 4-912 and the first sensing element 4-911 arrange. The third reference element 4-932 and the third sensing element 4-931 may arrange in a direction that is not parallel or perpendicular to a direction that the first reference element 4-912 and the second sensing element 4-921 arrange.

Figure 33:
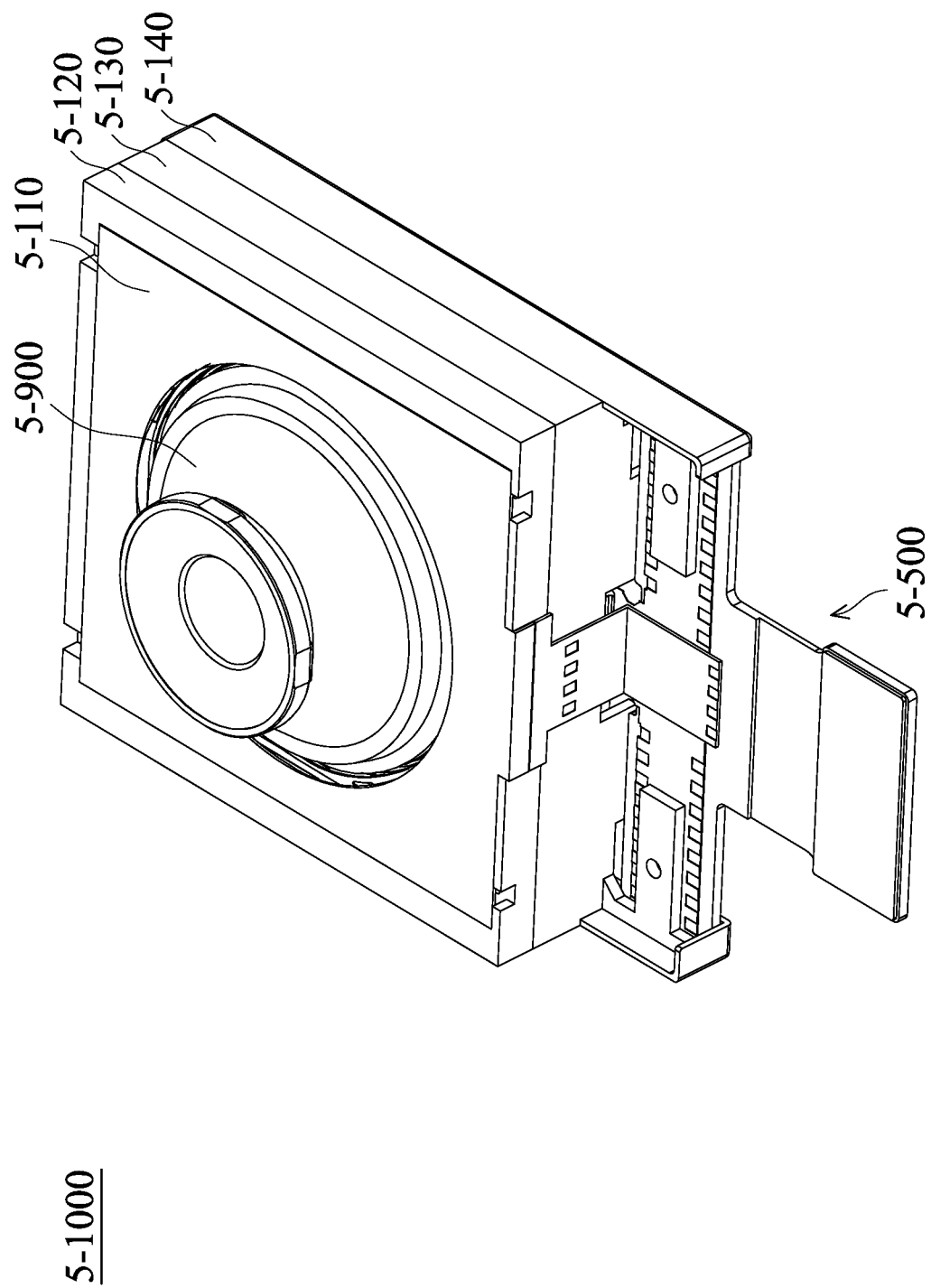
FIG. 33 is a perspective view of an optical system in some embodiments of the present disclosure.
Figure 34:
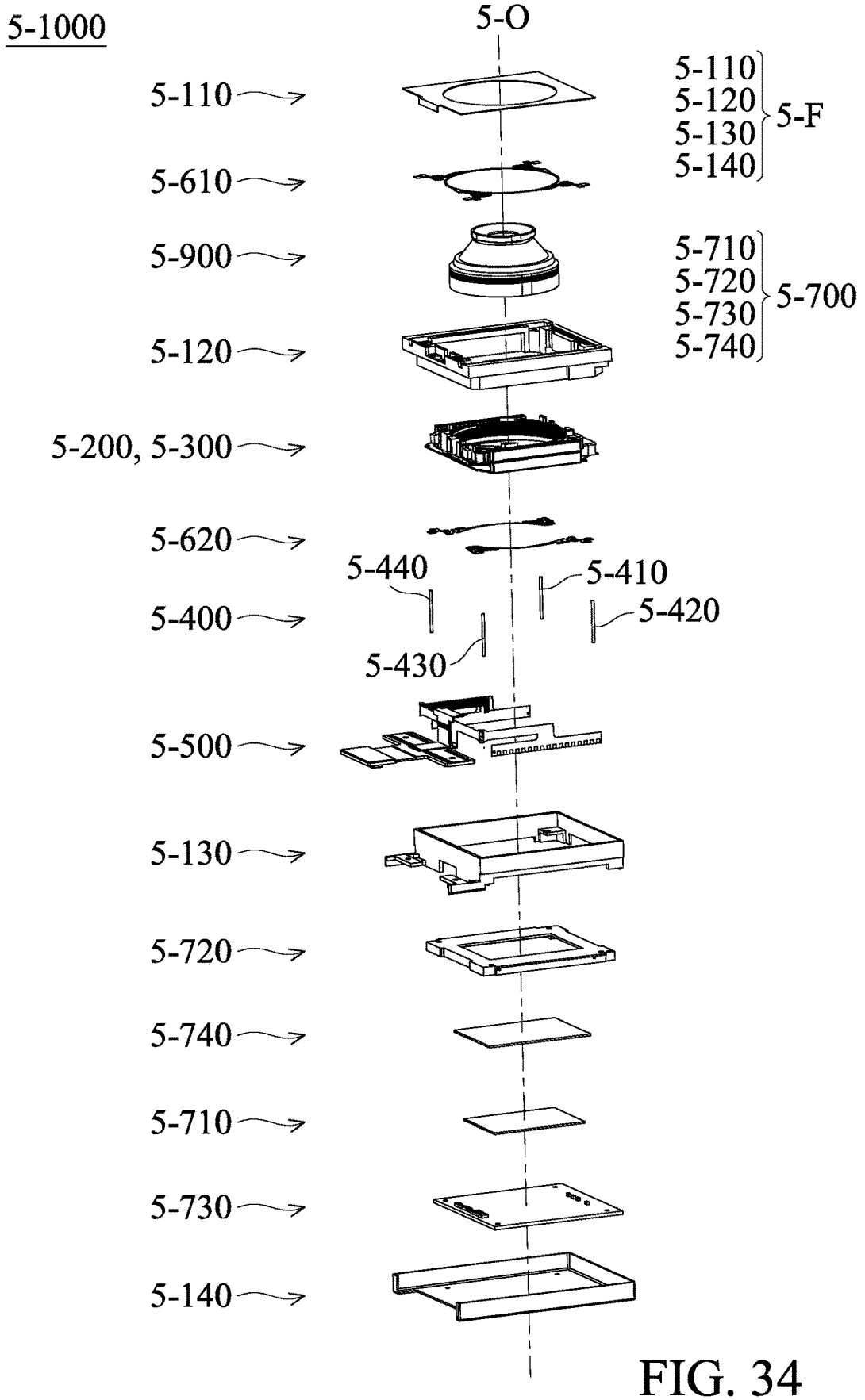
FIG. 34 is an exploded view of the optical system.
Figure 35:
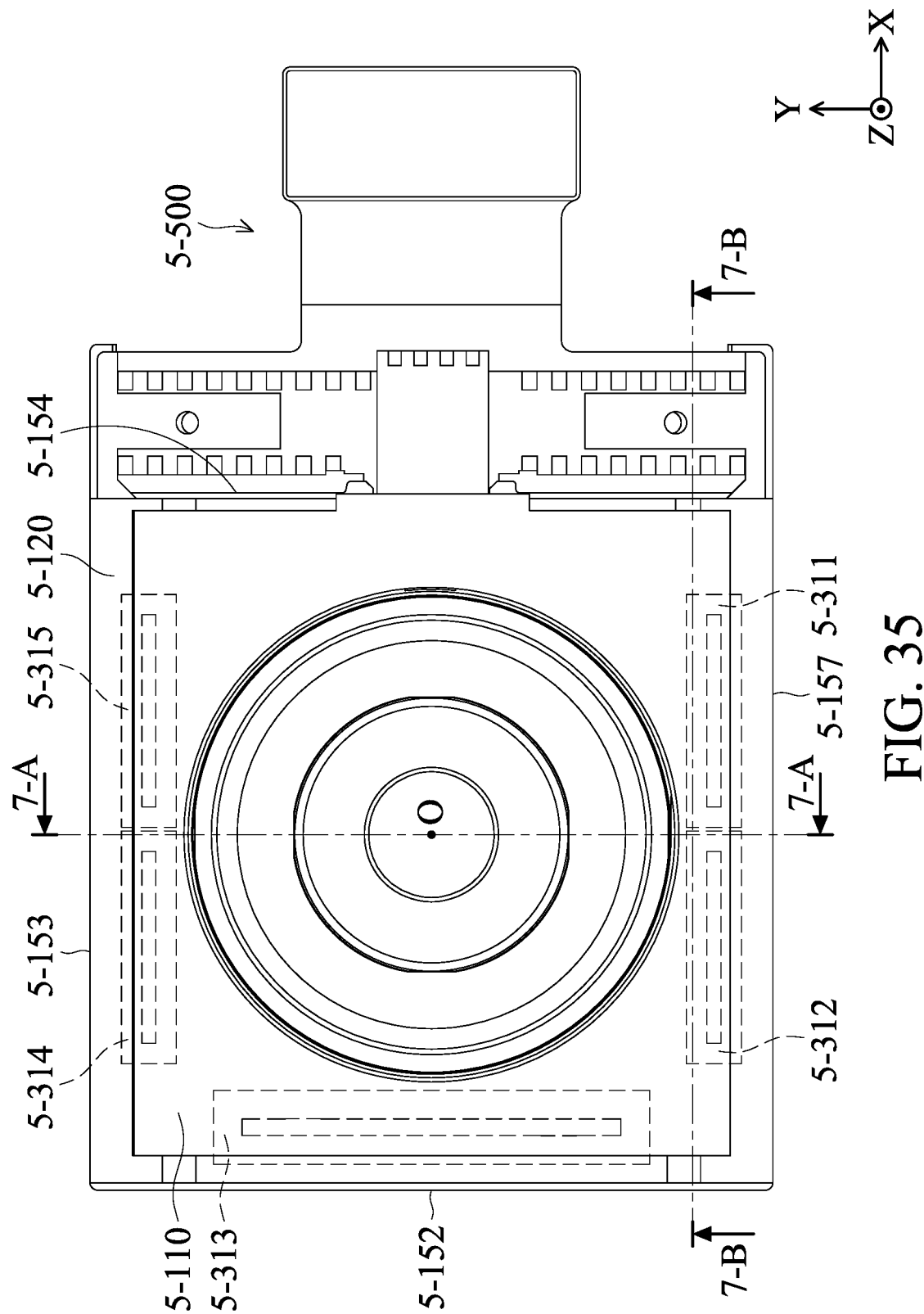
FIG. 35 is atop view of the optical system.
Figure 36A:
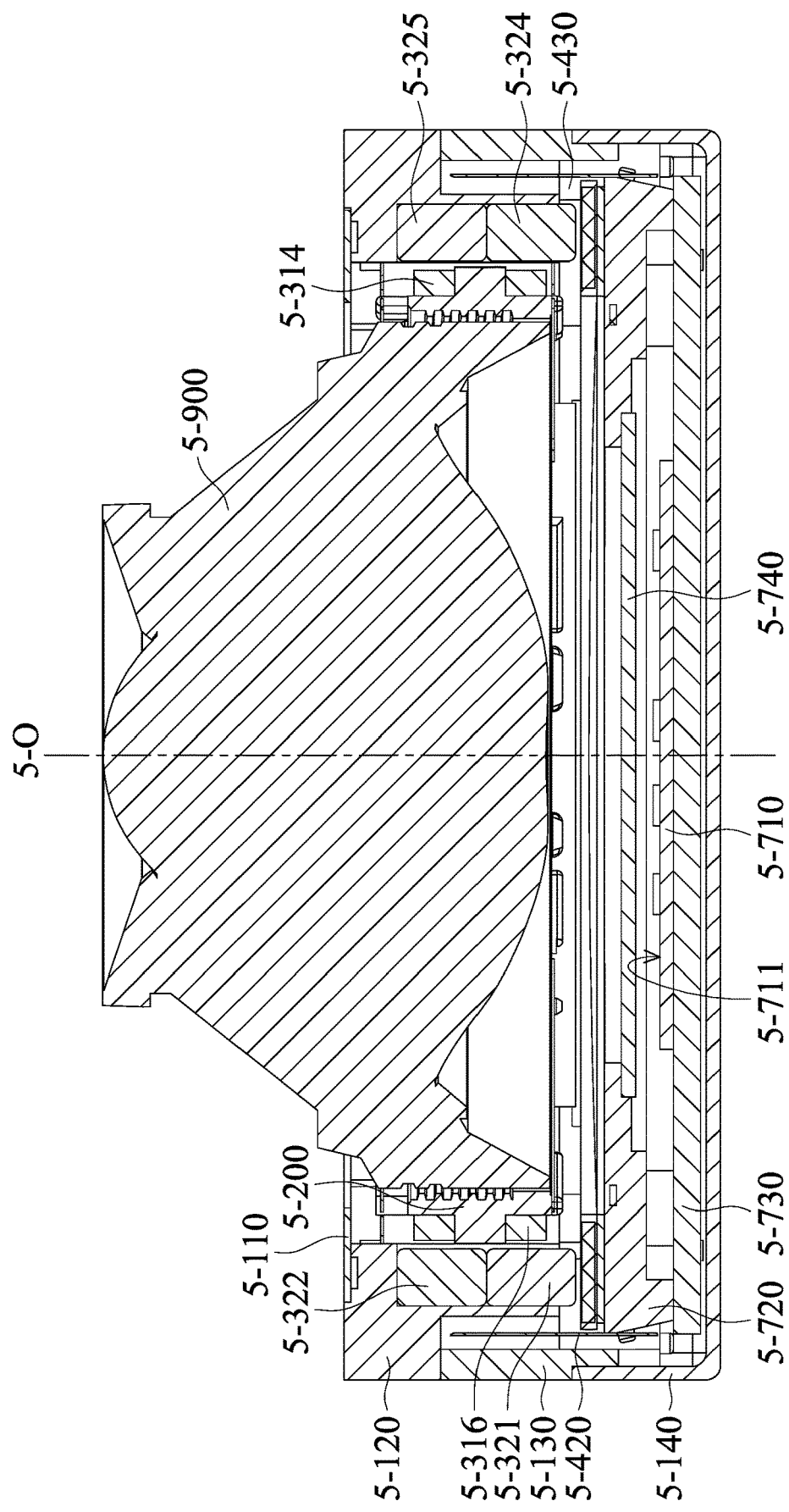
FIG. 36A is a cross-sectional view of the optical system illustrated along a line 5-A-5-A in FIG. 35.
Figure 36B:
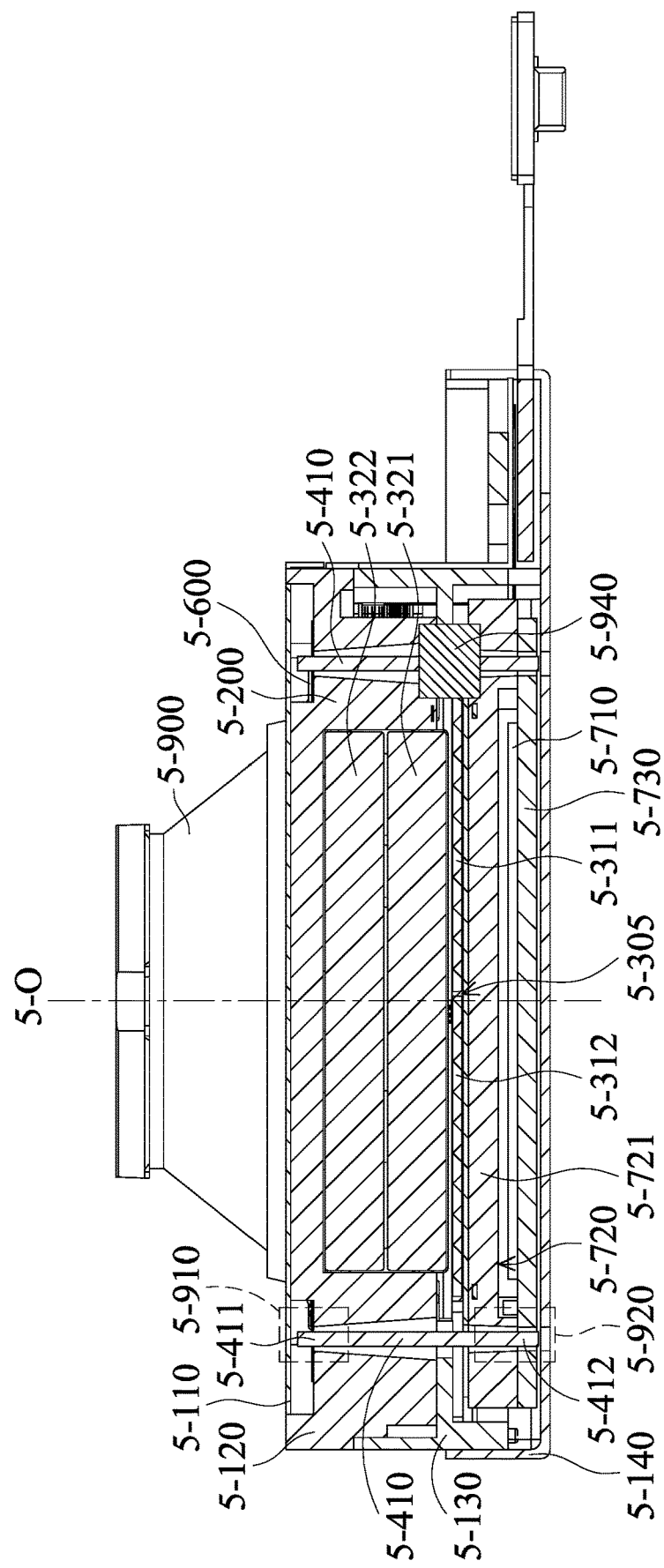
FIG. 36B is a cross-sectional view of the optical system illustrated along a line 5-B-5-B in FIG. 35.
Figure 37:
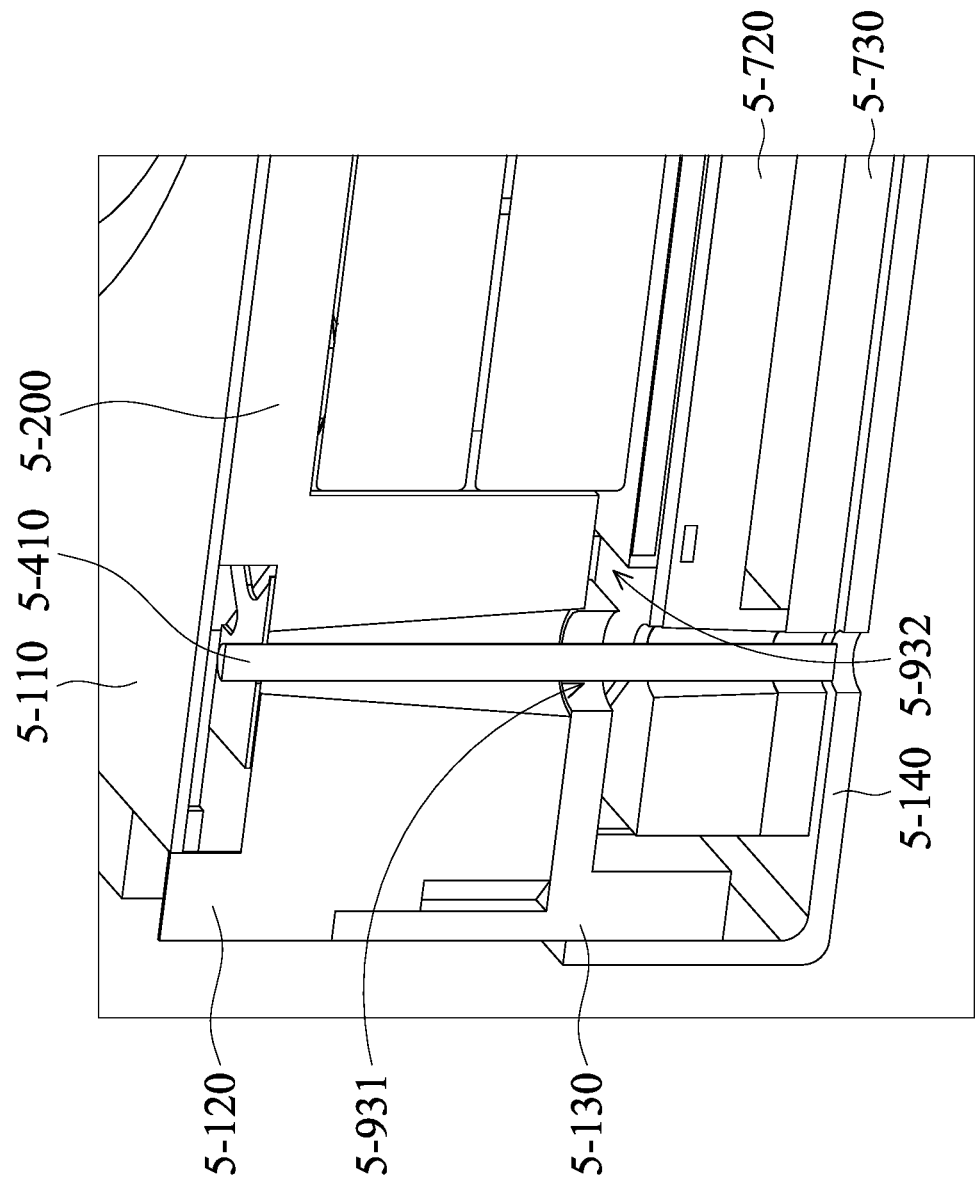
FIG. 37 is a perspective cross-sectional view of the optical system illustrated along a line 5-B-5-B in FIG. 35.
Figure 38B:
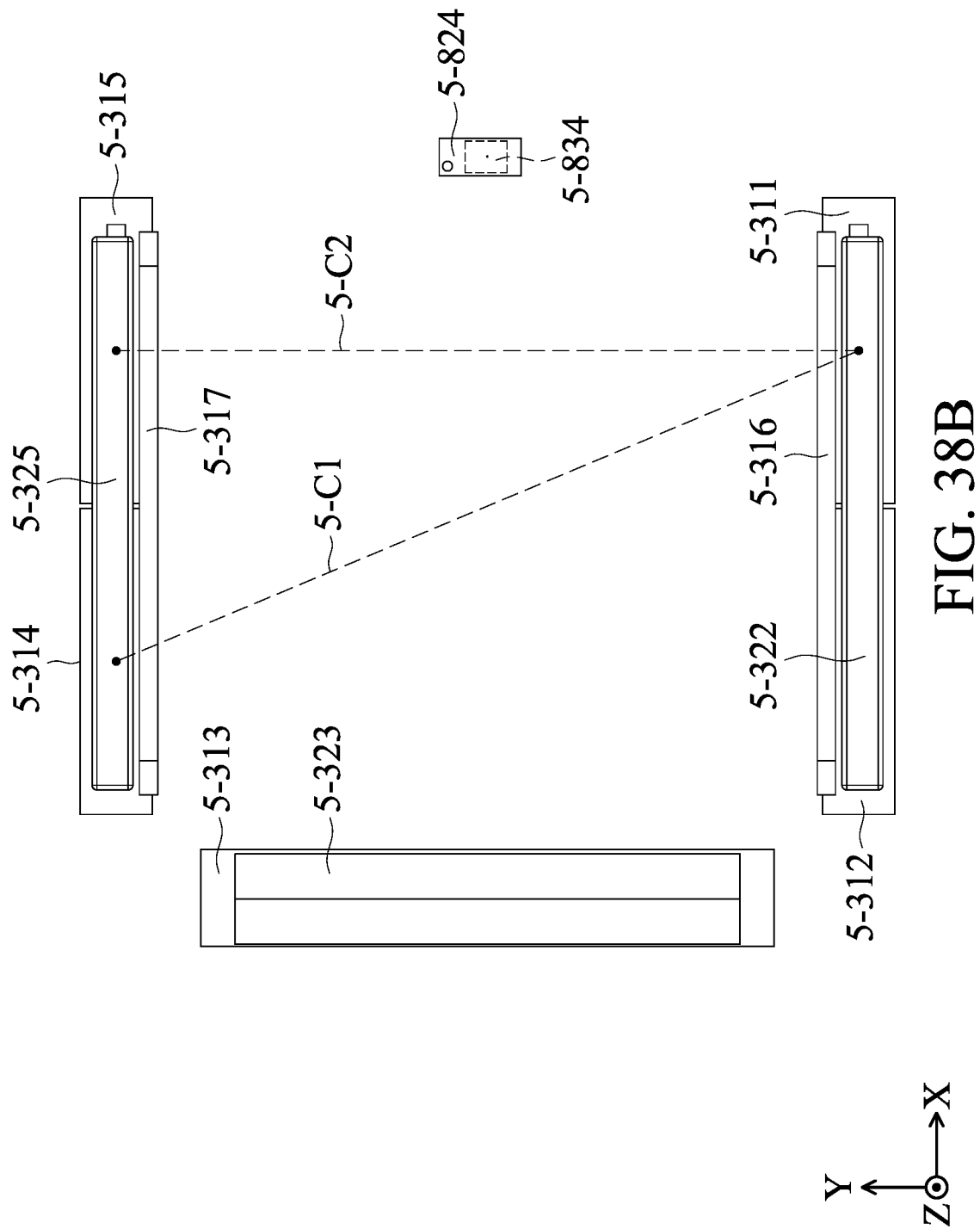
Figure 38C:
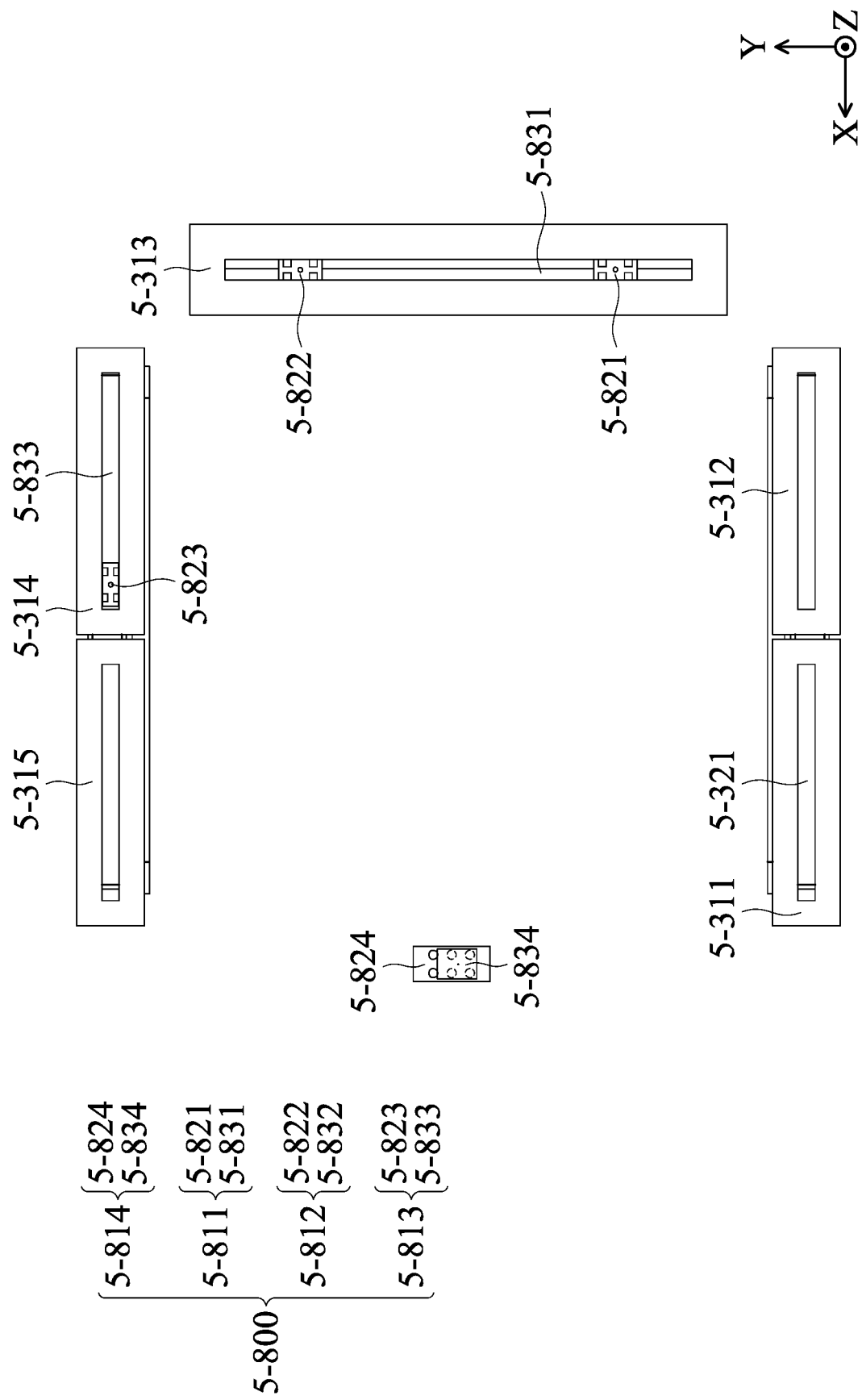

FIG. 33 is a perspective view of an optical system 5-1000 in some embodiments of the present disclosure. FIG. 34 is an exploded view of the optical system 5-1000. FIG. 35 is a top view of the optical system 5-1000. FIG. 36A is a cross-sectional view of the optical system 5-1000 illustrated along a line 5-A-5-A in FIG. 35. FIG. 36B is a cross-sectional view of the optical system 5-1000 illustrated along a line 5-B-5-B in FIG. 35. FIG. 37 is a perspective cross-sectional view of the optical system 5-1000 illustrated along a line 5-B-5-B in FIG. 35. FIG. 38A, FIG. 38B, FIG. 38C, FIG. 38D, and FIG. 38E are schematic views of some elements of the optical system 5-1000. FIG. 39 is a schematic view of the electronic device 5-2000.

In some embodiments, the optical system 5-1000 mainly includes a top plate 5-110, a frame 5-120, a case 5-130, a bottom plate 5-140, a holder 5-200, a first driving assembly 5-300, a coil substrate 5-305, an intermediate module 5-400, a circuit module 5-500, a second resilient 5-610, and a third resilient 5-620 arranged in a main axis 5-O. The optical system 5-1000 may be disposed on a electronic device 5-2000 (FIG. 39), such as may be disposed on a cell phone, a tablet, or a notebook, but the present disclosure it not limited thereto.

The optical system 5-1000 may be used for driving a first optical element 5-900, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. In some embodiments, the first optical element 5-900 may has a first lens.

In some embodiments, the top plate 5-110, the frame 5-120, the case 5-130, and the bottom plate 5-140 may be called as a fixed portion 5-F affixed on the electronic device 5-2000. The electronic device 5-2000 may be a cell phone, a tablet, or a notebook.

In some embodiments, the optical sensor 5-710, the case body 5-720, the bottom 5-730, and the second optical element 5-740 may be called as an optical module 5-700, and the holder 5-200 may be called as movable portion 5-200, the movable portion 5-200 may be used for connecting to the optical module 5-700, and may be used for holding the first optical element 5-900 to move relative to the fixed portion 5-F or relative to the optical sensor 5-710 of the optical module 5-700.

The first driving assembly 5-300 may include a combination of magnets and coils, or may include piezoelectric elements or shape memory alloy elements, so the holder 5-200 and the first optical element 5-900 disposed in the holder 5-200 may move relative to the fixed portion 5-F or relative to the optical module 5-700. Therefore, auto focus (AF) or optical image stabilization may be achieved.

As shown in FIG. 38A to FIG. 38E, a first coil 5-311, a second coil 5-312, a third coil 5-313, a fourth coil 5-314, and a fifth coil 5-315 may be embedded in the coil substrate 5-305. The first coil 5-311 and the second coil 5-312 may correspond to a first magnetic unit 5-331, the third coil 5-313 may correspond to a third magnetic element 5-323, and the fourth coil 5-314 and the fifth coil 5-315 may correspond to a second magnetic unit 5-332, such as may overlap each other in the Z direction. The first magnetic unit 5-331 includes a first magnetic element 5-321 and a second magnetic element 5-322, the second magnetic unit 5-332 includes a fourth magnetic element 5-324 and a fifth magnetic element 5-325 that may arrange in the Z direction. The first magnetic element 5-321, the second magnetic element 5-322, the third magnetic element 5-323, the fourth magnetic element 5-324, and the fifth magnetic element 5-325 may be magnets to generate a magnetic field. When current is passed through the first coil 5-311, the second coil 5-312, the third coil 5-313, the fourth coil 5-314, or the fifth coil 5-315, they may interact with the magnetic field to generate a driving force, so the movable portion 5-200 may be driven to move relative to the fixed portion 5-F.

In some embodiments, the first coil 5-311, the second coil 5-312, the third coil 5-313, and the fourth coil 5-314 may be electrically isolated, so the first coil 5-311, the second coil 5-312, the third coil 5-313, and the fourth coil 5-314 may be controlled separately to provide driving forces with different directions to the movable portion 5-200, such as to achieve translational movement in the X, the Y, or the Z direction, or rotation relative to the X, the Y, or the Z axis. Moreover, the fifth coil 5-315 may be electrically isolated to the second coil 5-312, the third coil 5-313, and the fourth coil 5-314, but be electrically connected to the first coil 5-311 to increase the driving force.

As shown in FIG. 37B, when viewed in the Z direction, a connection 5-C1 between the center of the first coil 5-311 and the center of the fourth coil 5-314 is not perpendicular or not parallel to a first direction (the X direction) or a second direction (the Y direction). Moreover, a connection 5-C2 between the center of the first coil 5-311 and the center of the fifth coil 5-315 may be parallel to the first direction (the X direction). In other words, the first coil 5-311 and the fifth coil 5-315 may arrange in the Y direction.

As shown in FIG. 35, when viewed along the main axis 5-O, the fixed portion 5-F is polygonal and has a first side 5-151, a second side 5-152, a third side 5-153, and a fourth side 5-154 that arrange in a counterclockwise manner. The first coil 5-311 and the second coil 5-312 are at the first side 5-151 of the fixed portion 5-F, the third coil 5-313 is at the second side 5-152 of the fixed portion 5-F, the fourth coil 5-314 and the fifth coil 5-315 is at the third side 5-153 of the fixed portion 5-F. The first side 5-151 extends in the first direction (the X direction), the second side 5-152 extends in the second direction (the Y direction), the third side 5-153 is parallel to the first side 5-151, the fourth side 5-154 is parallel to the second side 5-152. The first side 5-151 is between the second side 5-152 and the fourth side 5-154, and the second side 5-152 is between the first side 5-151 and the third side 5-153.

Figure 38D:
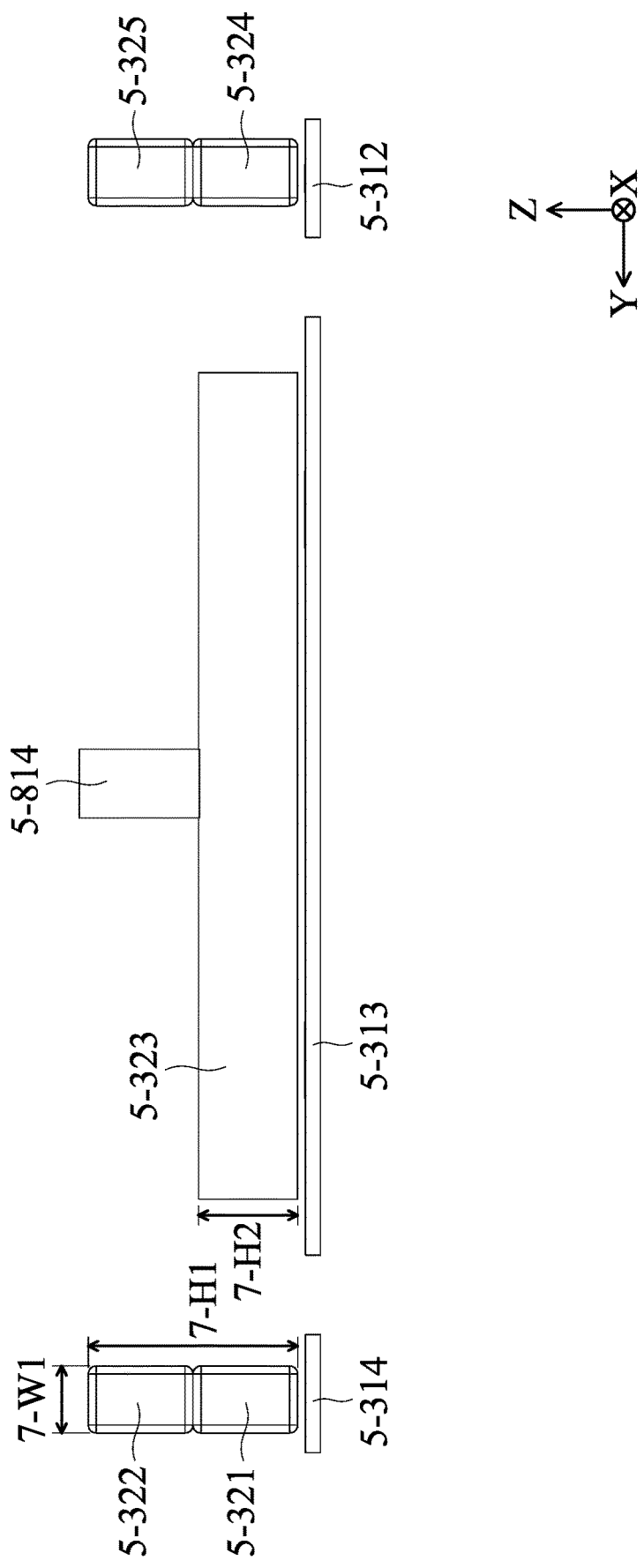
Figure 38E:
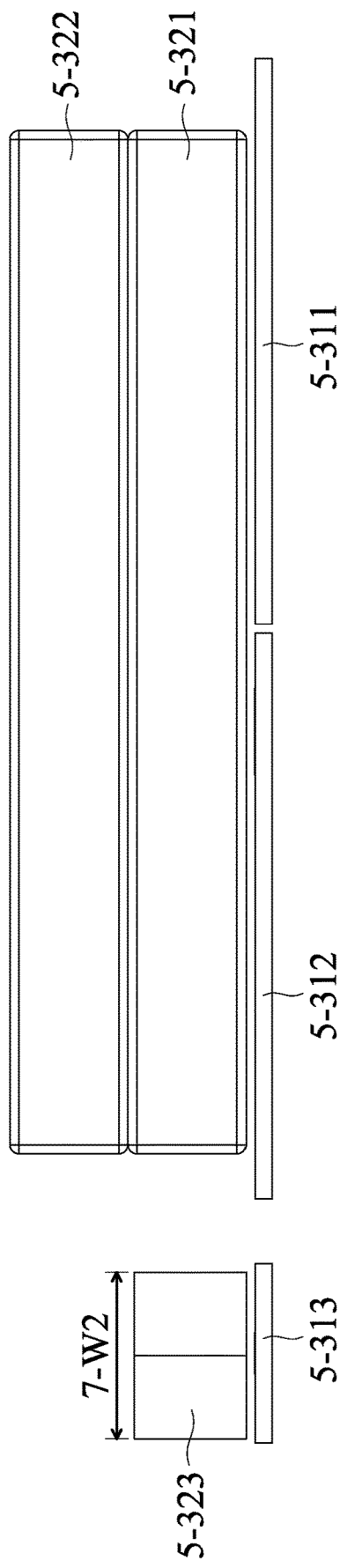
Figure 39:
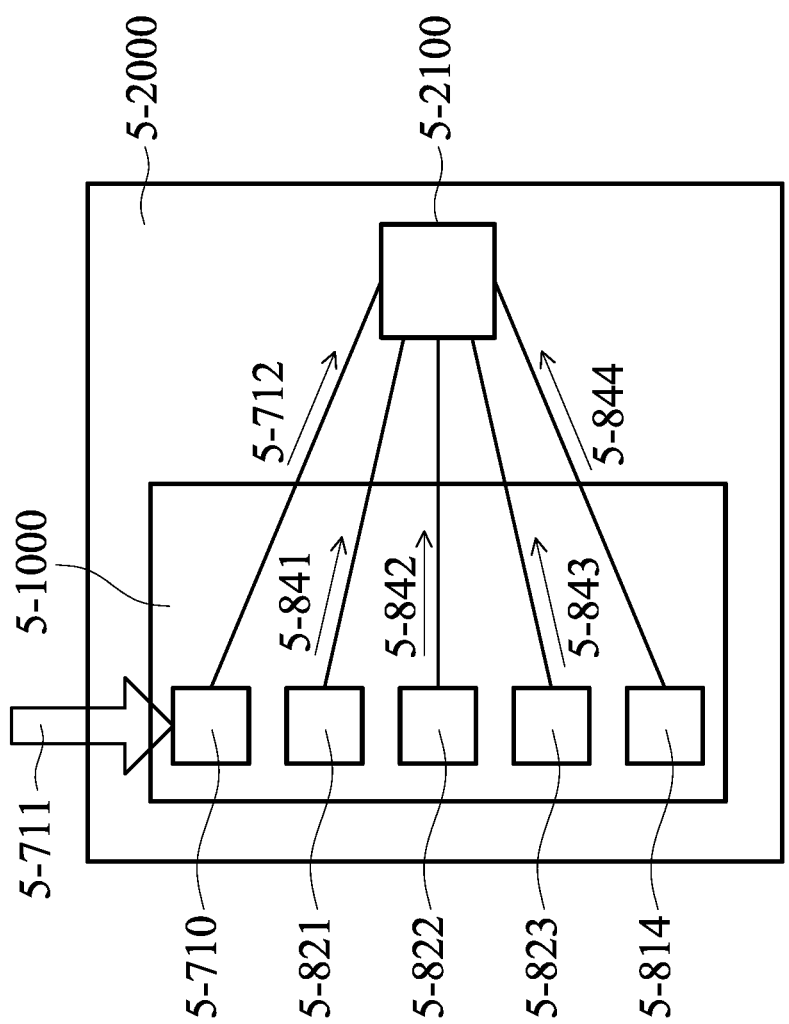
FIG. 39 is a schematic view of the electronic device.

As shown in FIG. 38D and FIG. 38E, a maximum dimension 5-H1 (height) of the first magnetic unit 5-331 is different from a maximum dimension 5-H2 of the third magnetic element 5-323 in the direction that the main axis 5-O extends (i.e. the Z direction). For example, the maximum dimension 5-H1 may be greater than the maximum dimension 5-H2. Moreover, a maximum dimension 5-W1 of the first magnetic unit 5-331 in the second direction (the Y direction) is different from a maximum dimension 5-W2 of the third magnetic element 5-323 in the first direction (the X direction), such as the maximum dimension 5-W1 may be less than the maximum dimension 5-W2.

The optical system 5-1000 may have a second driving assembly 5-340 used for driving the movable portion 5-200 to move relative to the fixed portion 5-F. The first driving assembly 5-300 and the second driving assembly 5-340 may drive the movable portion 5-200 in different directions. The second driving assembly 5-340 may include a sixth coil 5-316 and a seventh coil 5-317 respectively correspond to the first magnetic unit 5-331 and the second magnetic unit 5-332, such as at least partially overlap each other in the Y direction. When viewed along the main axis 5-O, the sixth coil 5-316 may be at the first side 5-151, and the seventh coil 5-317 may be at the third side 5-153.

The intermediate module 5-400, the second resilient 5-610, and the third resilient 5-620 may be disposed between the fixed portion 5-F and the movable portion 5-200 to movably connect the fixed portion 5-F and the movable portion 5-200, so the movable portion 5-200 may be movably connected to the fixed portion 5-F. The intermediate module 5-400 may include a first resilient element 5-410, and the first resilient element 5-410 may be a suspension wire. In some embodiments, the second resilient 5-610 and the third resilient 5-620 may be springs which are plate-shaped and perpendicular to the main axis 5-O. The intermediate module 5-400, the second resilient 5-610, and the third resilient 5-620 may include metal for electrically connected to the electronic elements in the optical system 5-1000, such as the first driving assembly 5-300 or the circuit module 5-500.

The circuit module 5-500 may be a flexible printed circuit which may be affixed on the fixed portion 5-F by glue. In this embodiment, the circuit module 5-500 is electrically connected to other electronic elements inside or outside the optical system 5-1000. For example, electrical signal may be transferred through the circuit module 5-500 to the first driving assembly 5-300 or the second driving assembly 5-340 to control the movement of the holder 5-200 in the X, the Y, or the Z direction, so auto focus or optical image stabilization may be achieved. As shown in FIG. 39, the 710 may receive an optical signal 5-711 and provide an image signal 5-712 to a control unit 5-2100 of the electronic device 5-2000.

As shown in FIG. 36B and FIG. 37, the first resilient element 5-410 of the intermediate module 5-400 is strip-shaped and extends along the main axis 5-O (the Z direction). The fixed portion 5-F includes a first disposing portion 5-910, a second disposing portion 5-920, and a first end 5-411 of the first resilient element 5-410 is disposed on the first disposing portion 5-910, a second end 5-412 of the first resilient element 5-410 is disposed on the second disposing portion 5-920. The first disposing portion 5-910 has a recessed structure and is formed between the frame 5-120 and the top plate 5-110 of the fixed portion 5-F. The top plate 5-110 is plate-shaped and perpendicular to the main axis 5-O. The second disposing portion 5-920 may include a recessed structure or a through hole which is formed on the bottom plate 5-140 of the fixed portion 5-F. At least a portion of the frame 5-120 is between the top plate 5-110 and the bottom plate 5-140.

Moreover, as shown in FIG. 37, the fixed portion 5-F may include a first avoid portion 5-931 and a second avoid portion 5-932 to accommodate a portion of the first resilient element 5-410, so the first resilient element 5-410 may pass through the fixed portion 5-F. The first avoid portion 5-931 may at the case 5-130 of the fixed portion 5-F, and the second avoid portion 5-932 may at the movable portion 5-200. The first avoid portion 5-931 and the second avoid portion 5-932 may have shrinking structure, and the first avoid portion 5-931 and the second avoid portion 5-932 may shrink in different directions (e.g. opposite directions).

In some embodiments, as shown in FIG. 36B, a first damping element 5-940 may be provided in the optical system 5-1000, such may be directly disposed on the first resilient element 5-410 to reduce the vibration of the first resilient element 5-410, so the abnormal movement of the movable portion 5-200 relative to the fixed portion 5-F may be suppressed. The first damping element 5-940 may include gel or resin. In some embodiments, the first damping element 5-940 may be in direct contact with the fixed portion 5-F and/or the movable portion 5-200. Moreover, in some embodiments, the first damping element 5-940 may be in direct contact with the first avoid portion 5-931 and/or the second avoid portion 5-932 to fill the space in the optical system 5-1000, so the abnormal movement of the movable portion 5-200 relative to the fixed portion 5-F may be suppressed.

The optical sensor 5-710 and the second optical element 5-740 of the optical module 5-700 may be disposed in an accommodating space formed by the case body 5-720 and the bottom 5-730. For example, the optical sensor 5-710 and the case body 5-720 may be affixed on the bottom 5-730. The case body 5-720 may include a case body 5-720 which is plate-shaped and perpendicular to the main axis 5-O. The optical sensor 5-710 may position between the top cover 5-721 and the bottom 5-730 in the direction that the main axis 5-0 extends (the Z direction).

The second optical element 5-740 may be a light filter which may only specific light to pass through and achieve the optical sensor 5-710. Other light with undesired wavelength may be removed. For example, the second optical element 5-740 may remove infrared and allow visible light to pass through, but the present is not limited thereto. In some embodiments, the second optical element 5-740 may correspond the optical sensor 5-710. Therefore, the light received by the optical sensor 5-710 may be closer to the light received by eyes.

In some embodiments, as shown in FIG. 38C, a position sensing module 5-800 may be provided in the optical system 5-1000 to detect the movement of the movable portion 5-200 relative to the fixed portion 5-F. In some embodiments, the position sensing module 5-800 may include a first position sensing assembly 5-811, a second sensing assembly 5-812, a third sensing assembly 5-813, and a fourth sensing assembly 5-814. The first position sensing assembly 5-811 may include a first sensing element 5-821 and a first reference element 5-831, the second sensing assembly 5-812 may include a second sensing element 5-822 and a second reference element 5-832, the third sensing assembly 5-813 may include a third sensing element 5-823 and a third reference element 5-833, and the fourth sensing assembly 5-814 may include a fourth sensing element 5-824 and a fourth reference element 5-834.

The first sensing element 5-821, the second sensing element 5-822, the third sensing element 5-823, and the fourth sensing element 5-824 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The first reference element 5-831, the second reference element 5-832, the third reference element 5-833, and the fourth reference element 5-834 may be magnets which may be disposed on the movable portion 5-200. The first sensing element 5-821, the second sensing element 5-822, the third sensing element 5-823, and the fourth sensing element 5-824 may be disposed on the fixed portion 5-F to detect the magnetic field change of the first reference element 5-831, the second reference element 5-832, the third reference element 5-833, and the fourth reference element 5-834 when the holder 5-200 moves relative to the fixed portion 5-F. Therefore, the position of the movable portion 5-200 relative to the fixed portion 5-F may be received, and a first sensing signal 5-841, a second sensing signal 5-842, a third sensing signal 5-843, and a fourth sensing signal 5-844 may be provided to the control unit 5-2100 of the electronic device 5-2000 by the first sensing element 5-821, the second sensing element 5-822, the third sensing element 5-823, and the fourth sensing element 5-824, respectively. The control unit 5-2100 may be used for receiving the first sensing signal 5-841, the second sensing signal 5-842, the third sensing signal 5-843, and the fourth sensing signal 5-844 to analyze the movement of the movable portion 5-200 relative to the fixed portion 5-F. For example, the control unit 5-2100 may analyze the translational movement of the movable portion 5-200 relative to the fixed portion 5-F or the rotation of the movable portion 5-200 with a first rotational axis (the main axis 5-0). The main axis 5-O may be perpendicular to an optical signal 5-711 of the optical sensor 5-710 (FIG. 36A).

In some embodiments, the position of the first reference element 5-831, the second reference element 5-832, the third reference element 5-833, or the fourth reference element 5-834 may be interchanged with the position of the first sensing element 5-821, the second sensing element 5-822, the third sensing element 5-823, or the fourth sensing element 5-824, depending on design requirement.

When viewed along the main axis 5-O, the first position sensing assembly 5-811 and the second sensing assembly 5-812 are arranged in a direction that is not parallel or not perpendicular to a direction that the second sensing assembly 5-812 and the third sensing assembly 5-813 arrange. For example, the first position sensing assembly 5-811 and the second sensing assembly 5-812 may arrange in the Y direction (i.e. perpendicular to the first direction). The second sensing assembly 5-812 and the third sensing assembly 5-813 may arrange in a direction that is not parallel or not perpendicular to the Y axis. As a result, the movement of the movable portion 5-200 in different directions may be detected. In some embodiments, the first position sensing assembly 5-811 and the second sensing assembly 5-812 may arrange in the X direction (i.e. parallel to the first direction).

In some embodiments, the first reference element 5-831, the second reference element 5-832, and the third magnetic element 5-323 may be formed as one piece, or they may be an identical element. The third reference element 5-833 and the fourth magnetic element 5-324 may be formed as one piece, or they may be an identical element. Therefore, required space may be reduced to achieve miniaturization.

As shown in FIG. 38C, when viewed along the main axis 5-O, at least a portion of the first sensing element 5-821 is in the third coil 5-313, at least a portion of the second sensing element 5-822 is in the third coil 5-313, and at least a portion of the third sensing element 5-823 is in the fourth coil 5-314. Therefore, required space may be reduced to achieve miniaturization.

Figure 40:
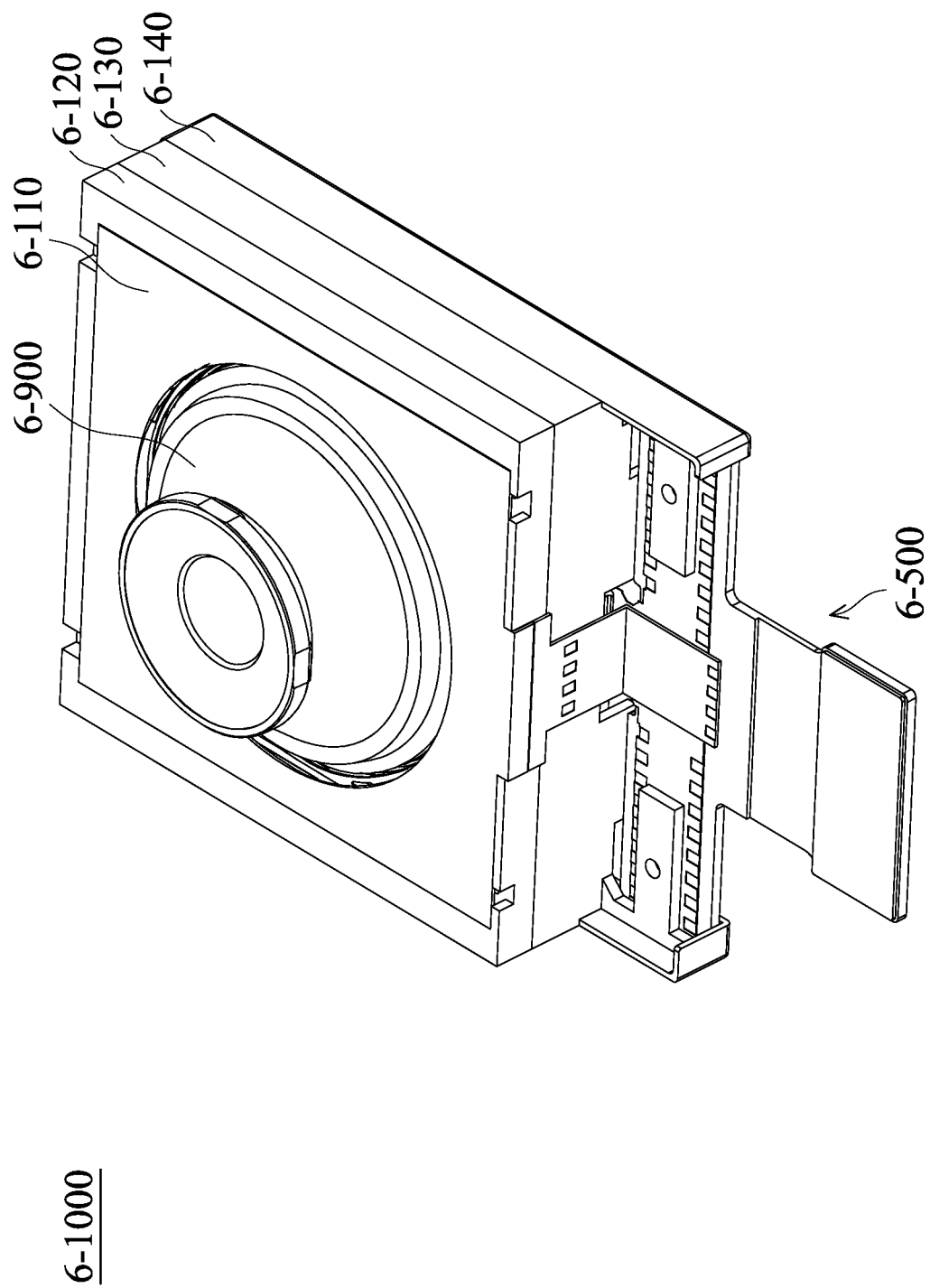
FIG. 40 is a perspective view of an optical system in some embodiments of the present disclosure.
Figure 41:
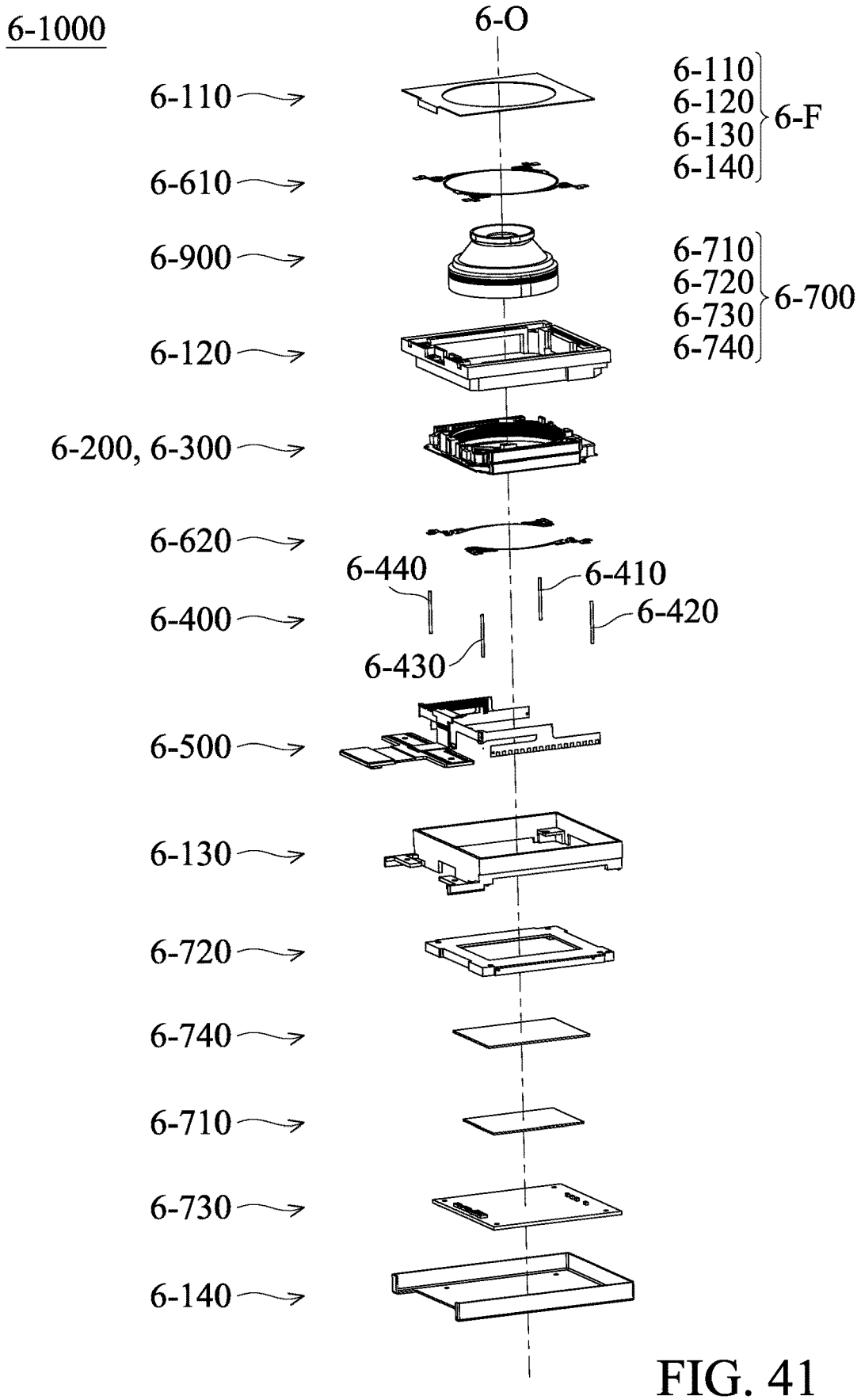
FIG. 41 is an exploded view of the optical system.
Figure 42:
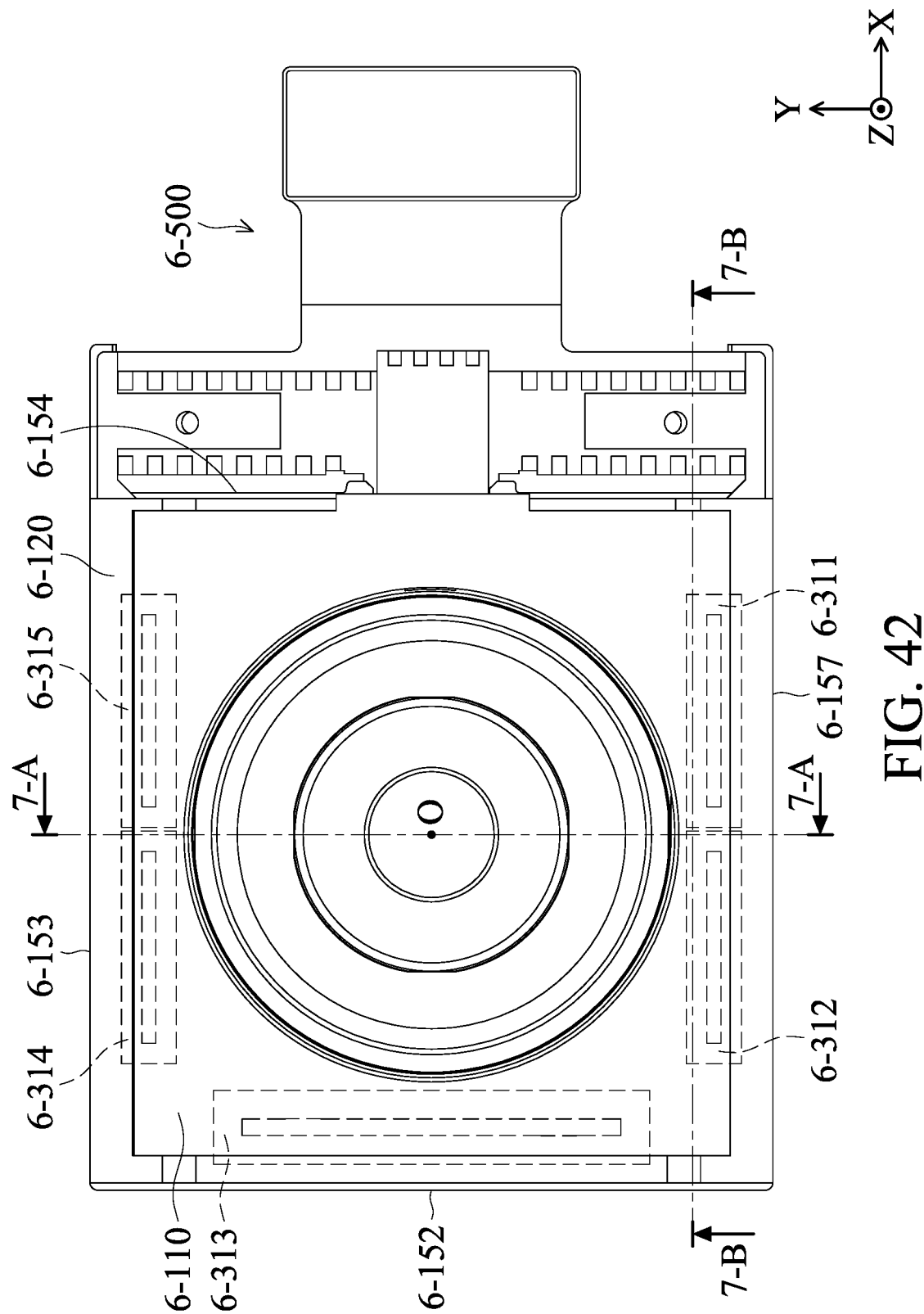
FIG. 42 is a top view of the optical system.
Figure 43A:
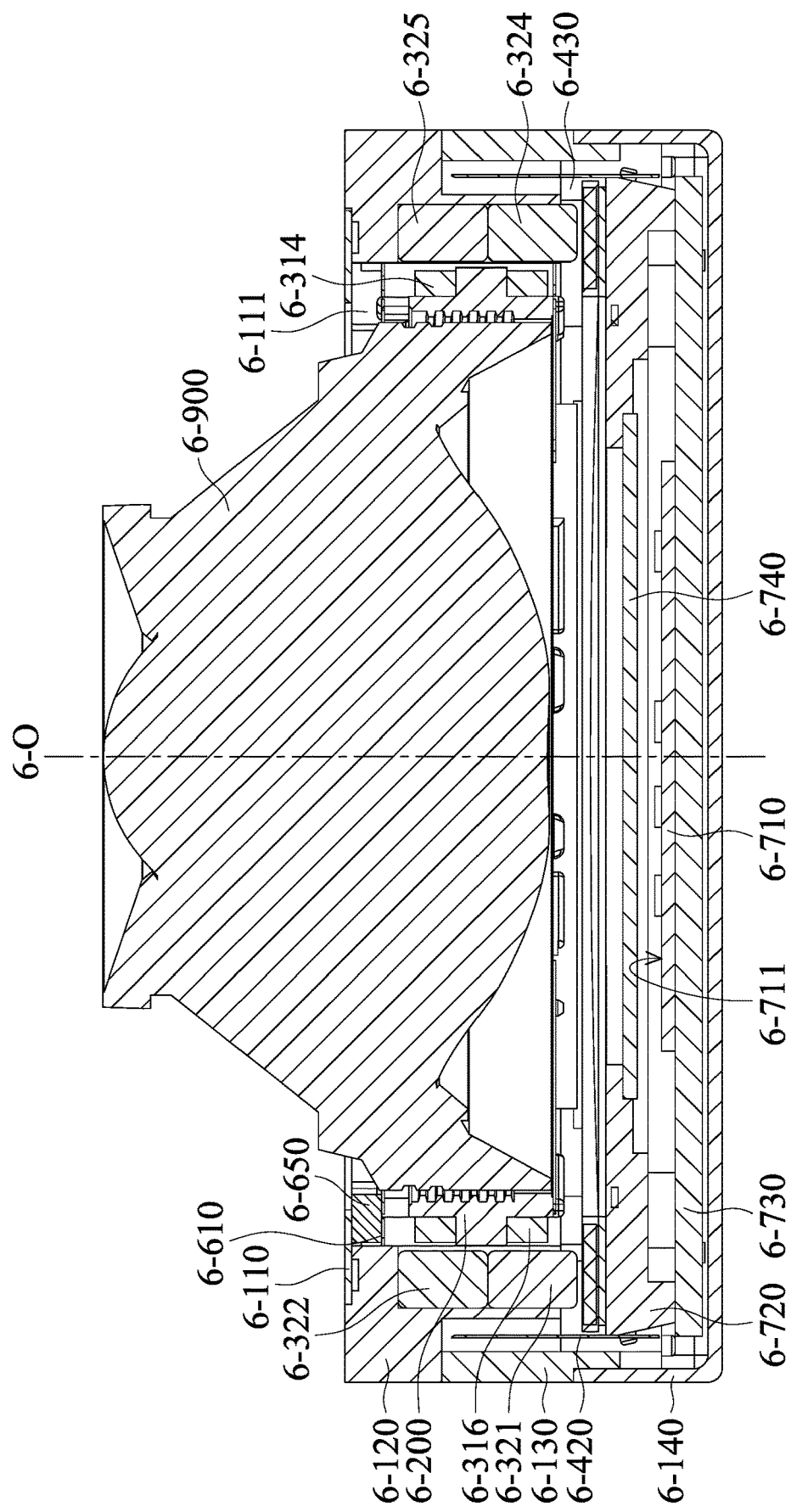
FIG. 43A is a cross-sectional view of the optical system illustrated along a line 6-A-6-A in FIG. 42.
Figure 43B:
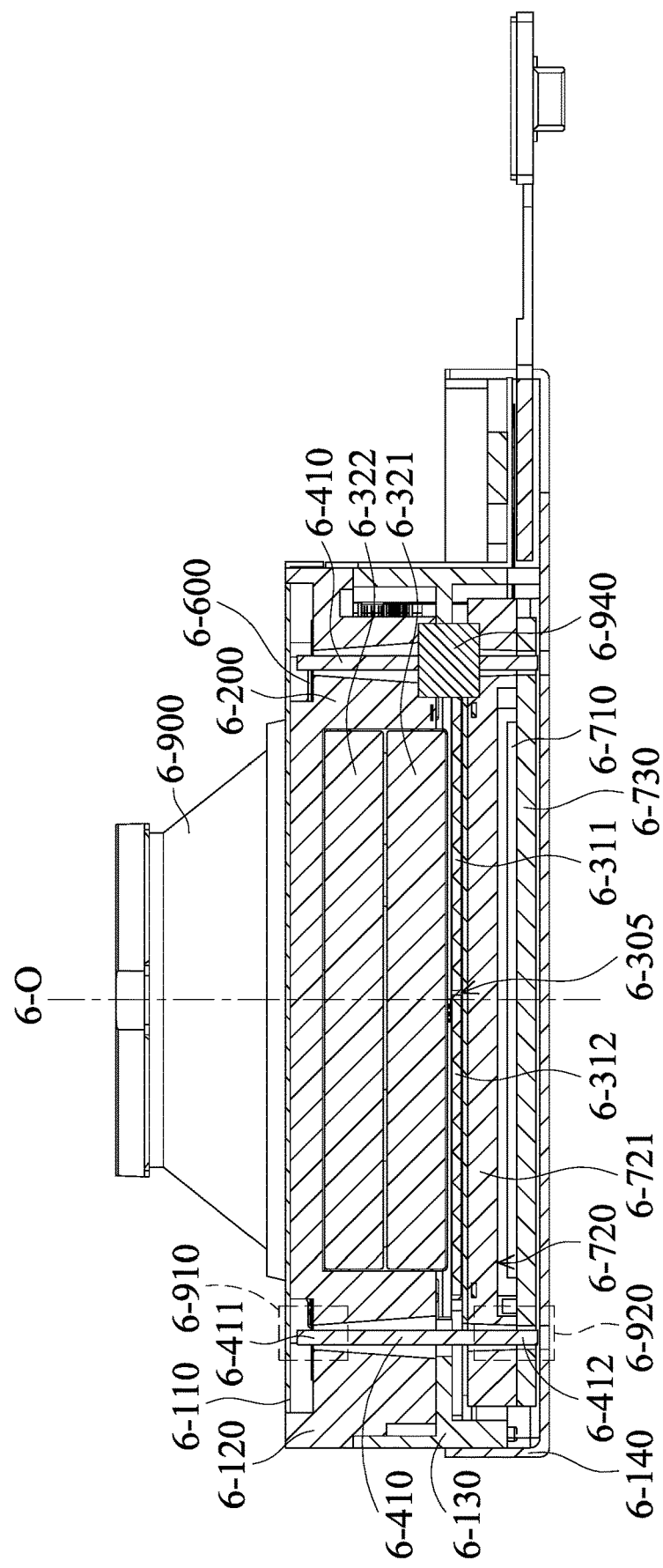
FIG. 43B is a cross-sectional view of the optical system illustrated along a line 6-B-6-B in FIG. 42.
Figure 44A:
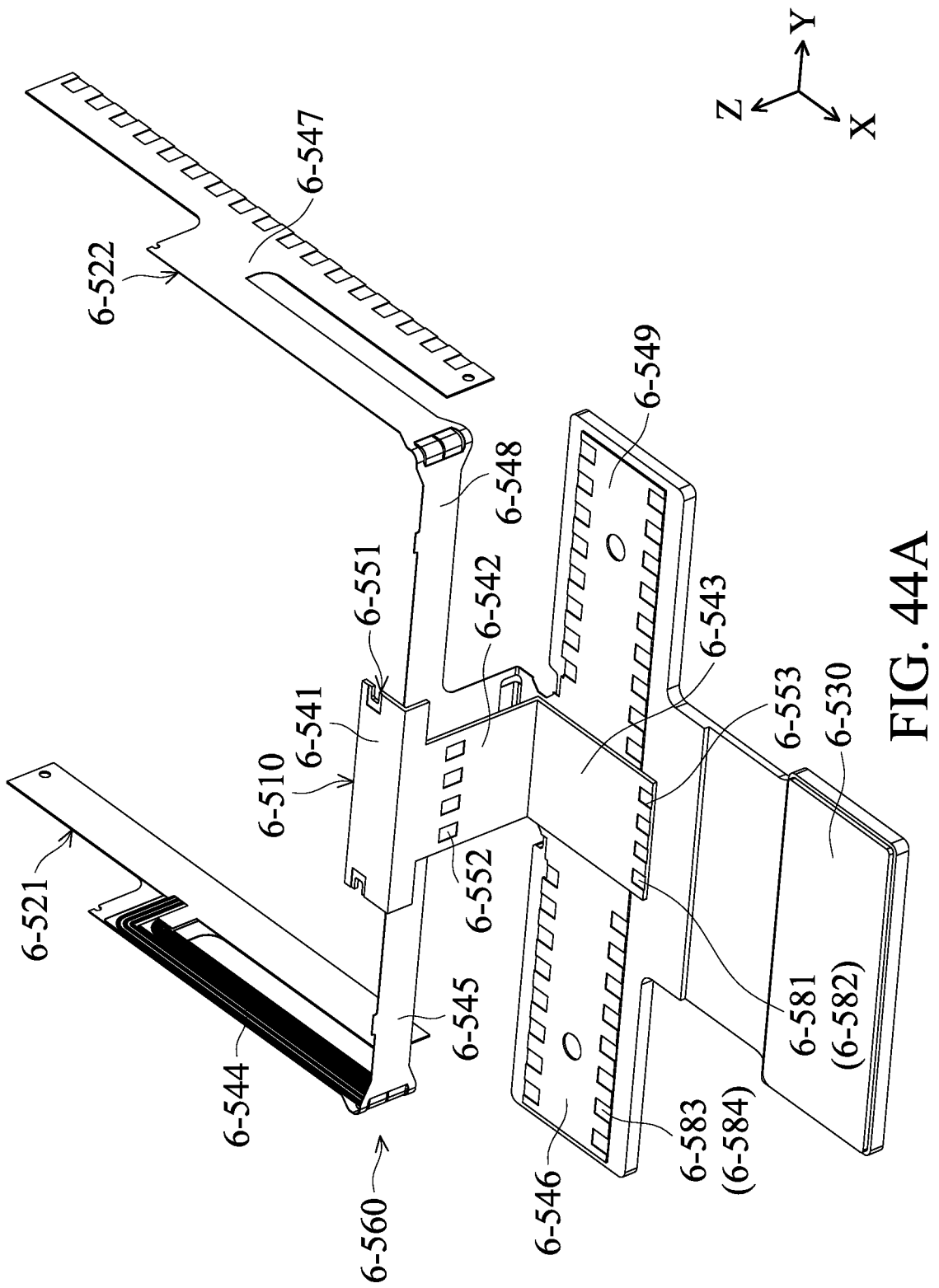
FIG. 44A, FIG. 44B, FIG. 44C, FIG. 44D, FIG. 44E, FIG. 44F, FIG. 44G, FIG. 44H, FIG. 44I, FIG. 44J are schematic views of the circuit assembly in some embodiments.

FIG. 40 is a perspective view of an optical system 6-1000 in some embodiments of the present disclosure. FIG. 41 is an exploded view of the optical system 6-1000. FIG. 42 is a top view of the optical system 6-1000. FIG. 43A is a cross-sectional view of the optical system 6-1000 illustrated along a line 6-A-6-A in FIG. 42. FIG. 43B is a cross-sectional view of the optical system 6-1000 illustrated along a line 6-B-6-B in FIG. 42. FIG. 44 is a perspective cross-sectional view of the optical system 6-1000 illustrated along a line 6-B-6-B in FIG. 42. FIG. 45A, FIG. 45B, FIG. 45C, FIG. 45D, and FIG. 45E are schematic views of some elements of the optical system 6-1000. FIG. 46 is a schematic view of the electronic device 6-2000.

In some embodiments, the optical system 6-1000 mainly includes a top plate 6-110, a frame 6-120, a case 6-130, a bottom plate 6-140, a holder 6-200, a first driving assembly 6-300, a coil substrate 6-305, an intermediate module 6-400, a circuit module 6-500, a second resilient 6-610, and a third resilient 6-620 arranged in a main axis 6-O. The optical system 6-1000 may be disposed on a electronic device 6-2000 (FIG. 46), such as may be disposed on a cell phone, a tablet, or a notebook, but the present disclosure it not limited thereto.

The optical system 6-1000 may be used for driving a first optical element 6-900, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. In some embodiments, the first optical element 6-900 may has a first lens.

In some embodiments, the top plate 6-110, the frame 6-120, the case 6-130, and the bottom plate 6-140 may be called as a fixed portion 6-F affixed on the electronic device 6-2000. The electronic device 6-2000 may be a cell phone, a tablet, or a notebook.

In some embodiments, the optical sensor 6-710, the case body 6-720, the bottom 6-730, and the second optical element 6-740 may be called as an optical module 6-700, and the holder 6-200 may be called as movable portion 6-200, the movable portion 6-200 may be used for connecting to the optical module 6-700, and may be used for holding the first optical element 6-900 to move relative to the fixed portion 6-F or relative to the optical sensor 6-710 of the optical module 6-700.

The first driving assembly 6-300 may include a combination of magnets and coils, or may include piezoelectric elements or shape memory alloy elements, so the holder 6-200 and the first optical element 6-900 disposed in the holder 6-200 may move relative to the fixed portion 6-F or relative to the optical module 6-700. Therefore, auto focus (AF) or optical image stabilization may be achieved.

As shown in FIG. 45A to FIG. 45E, a first coil 6-311, a second coil 6-312, a third coil 6-313, a fourth coil 6-314, and a fifth coil 6-315 may be embedded in the coil substrate 6-305. The first coil 6-311 and the second coil 6-312 may correspond to a first magnetic unit 6-331, the third coil 6-313 may correspond to a third magnetic element 6-323, and the fourth coil 6-314 and the fifth coil 6-315 may correspond to a second magnetic unit 6-332, such as may overlap each other in the Z direction. The first magnetic unit 6-331 includes a first magnetic element 6-321 and a second magnetic element 6-322, the second magnetic unit 6-332 includes a fourth magnetic element 6-324 and a fifth magnetic element 6-325 that may arrange in the Z direction. The first magnetic element 6-321, the second magnetic element 6-322, the third magnetic element 6-323, the fourth magnetic element 6-324, and the fifth magnetic element 6-325 may be magnets to generate a magnetic field. When current is passed through the first coil 6-311, the second coil 6-312, the third coil 6-313, the fourth coil 6-314, or the fifth coil 6-315, they may interact with the magnetic field to generate a driving force, so the movable portion 6-200 may be driven to move relative to the fixed portion 6-F.

In some embodiments, the first coil 6-311, the second coil 6-312, the third coil 6-313, and the fourth coil 6-314 may be electrically isolated, so the first coil 6-311, the second coil 6-312, the third coil 6-313, and the fourth coil 6-314 may be controlled separately to provide driving forces with different directions to the movable portion 6-200, such as to achieve translational movement in the X, the Y, or the Z direction, or rotation relative to the X, the Y, or the Z axis. Moreover, the fifth coil 6-315 may be electrically isolated to the second coil 6-312, the third coil 6-313, and the fourth coil 6-314, but be electrically connected to the first coil 6-311 to increase the driving force.

Figure 44B:
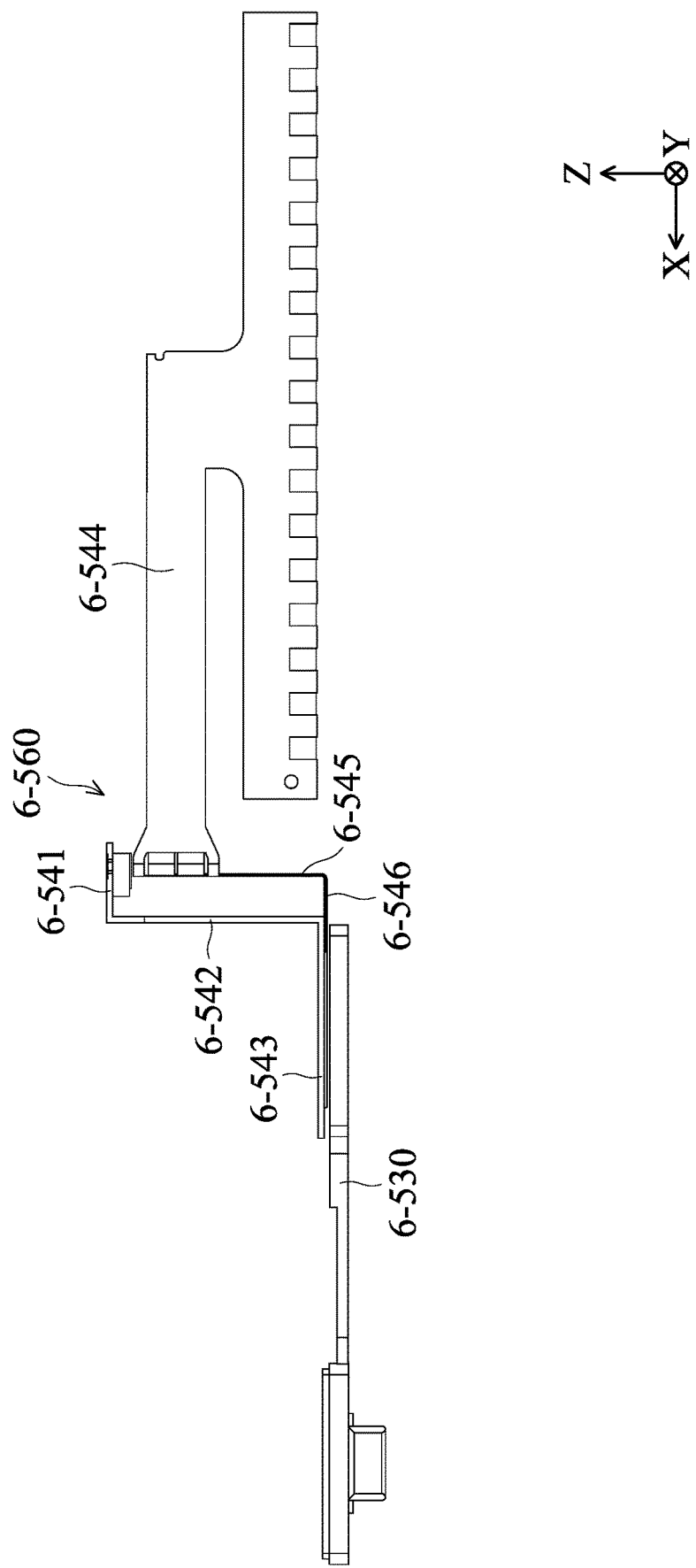
Figure 45B:
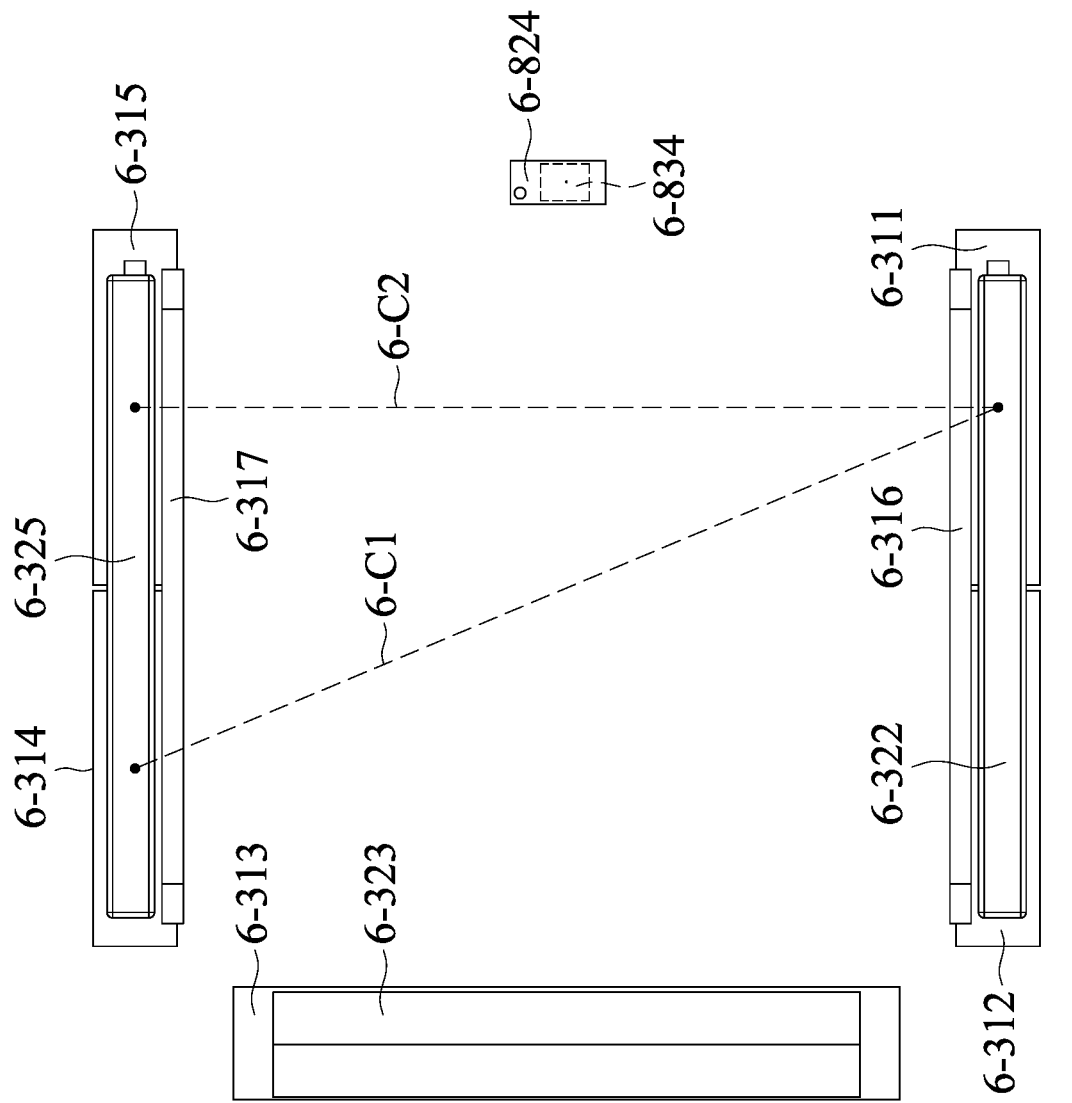
Figure 45C:
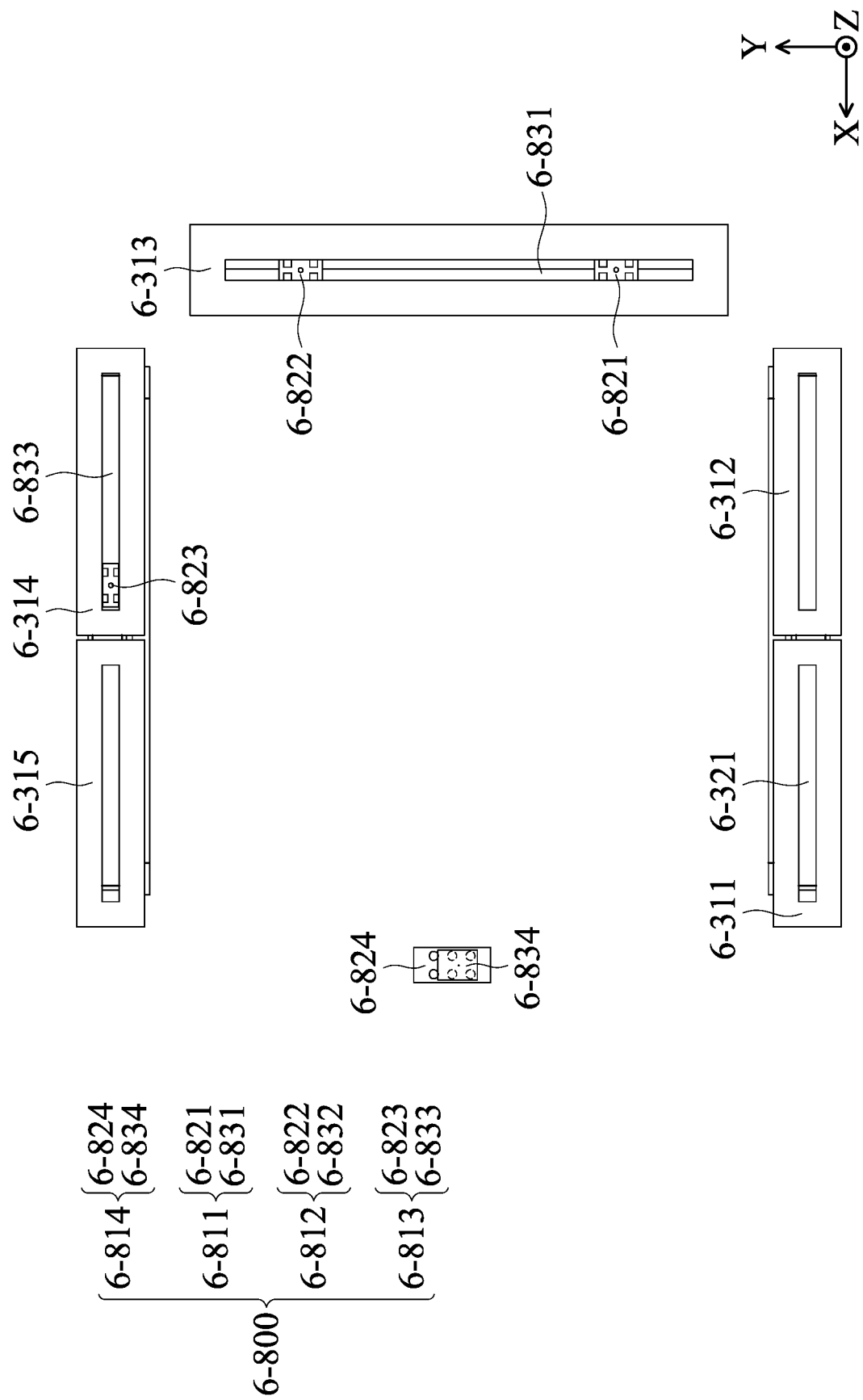

As shown in FIG. 44B, when viewed in the Z direction, a connection 6-C1 between the center of the first coil 6-311 and the center of the fourth coil 6-314 is not perpendicular or not parallel to a first direction (the X direction) or a second direction (the Y direction). Moreover, a connection 6-C2 between the center of the first coil 6-311 and the center of the fifth coil 6-315 may be parallel to the first direction (the X direction). In other words, the first coil 6-311 and the fifth coil 6-315 may arrange in the Y direction.

As shown in FIG. 42, when viewed along the main axis 6-O, the fixed portion 6-F is polygonal and has a first side 6-151, a second side 6-152, a third side 6-153, and a fourth side 6-154 that arrange in a counterclockwise manner. The first coil 6-311 and the second coil 6-312 are at the first side 6-151 of the fixed portion 6-F, the third coil 6-313 is at the second side 6-152 of the fixed portion 6-F, the fourth coil 6-314 and the fifth coil 6-315 is at the third side 6-153 of the fixed portion 6-F. The first side 6-151 extends in the first direction (the X direction), the second side 6-152 extends in the second direction (the Y direction), the third side 6-153 is parallel to the first side 6-151, the fourth side 6-154 is parallel to the second side 6-152. The first side 6-151 is between the second side 6-152 and the fourth side 6-154, and the second side 6-152 is between the first side 6-151 and the third side 6-153.

Figure 45D:
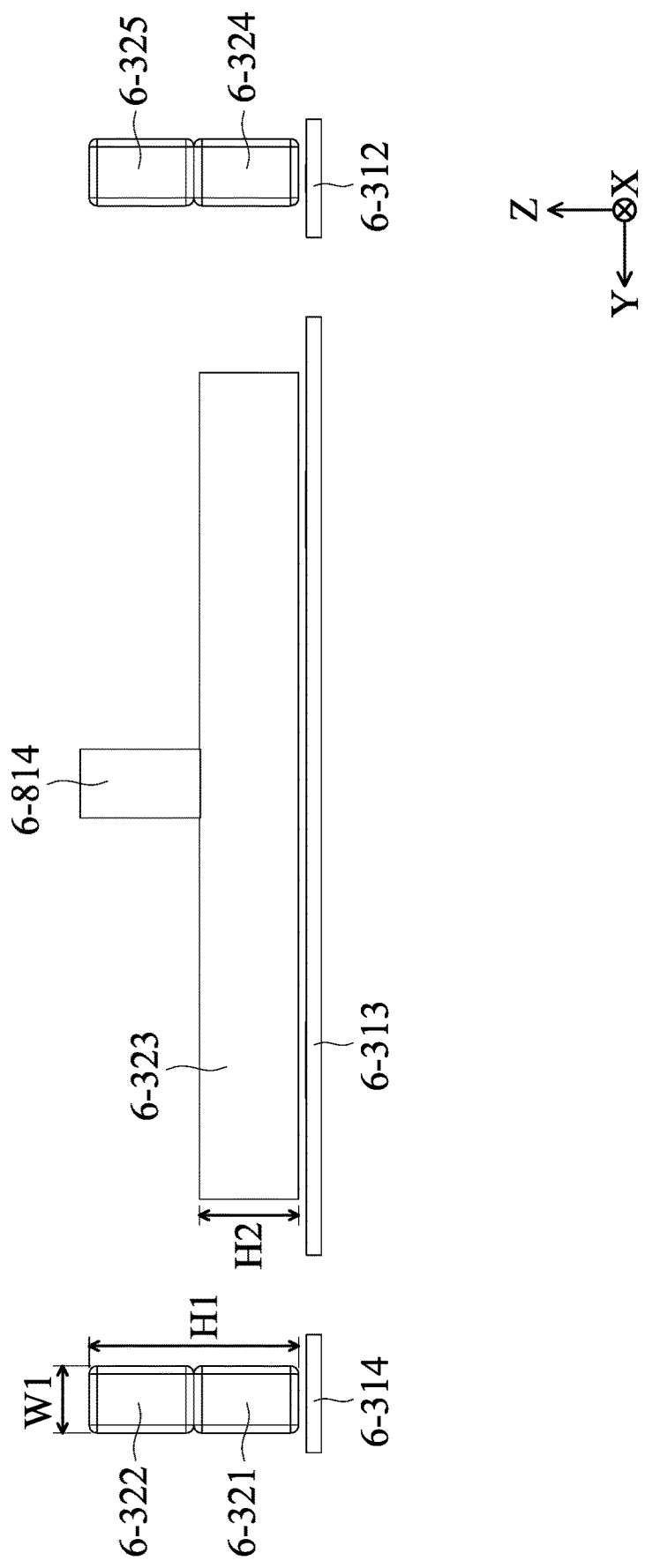
Figure 45E:
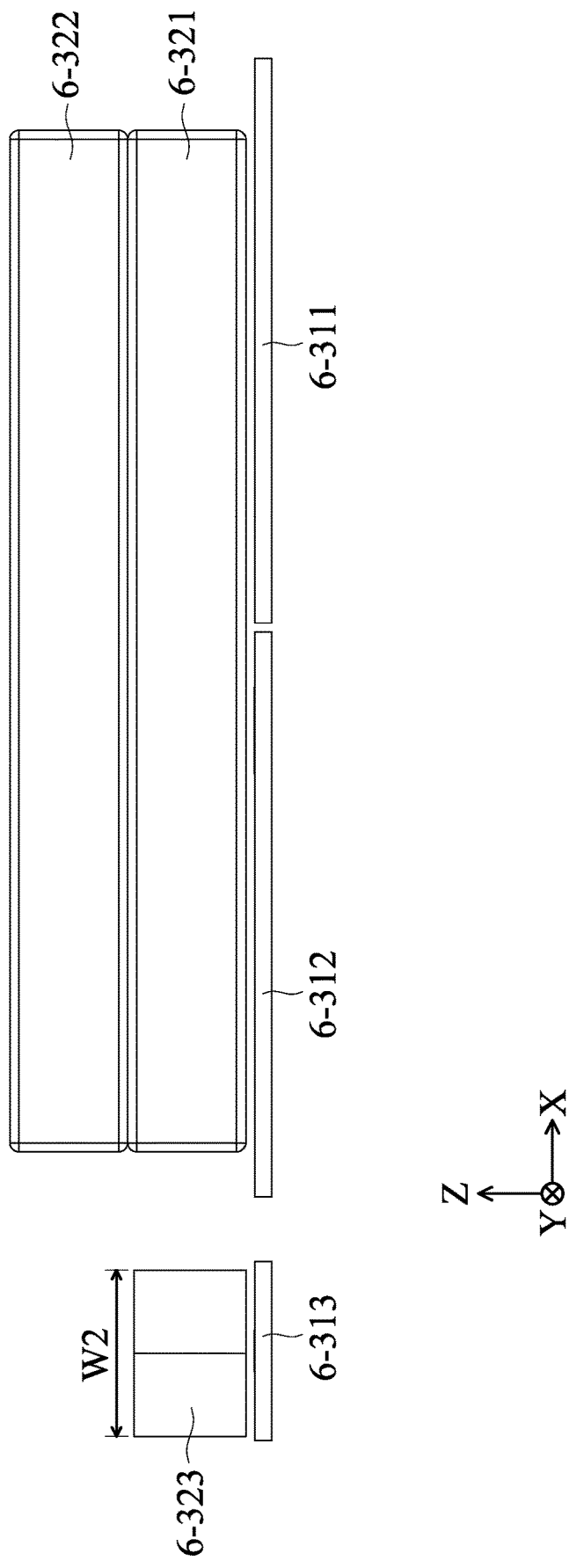
Figure 46:
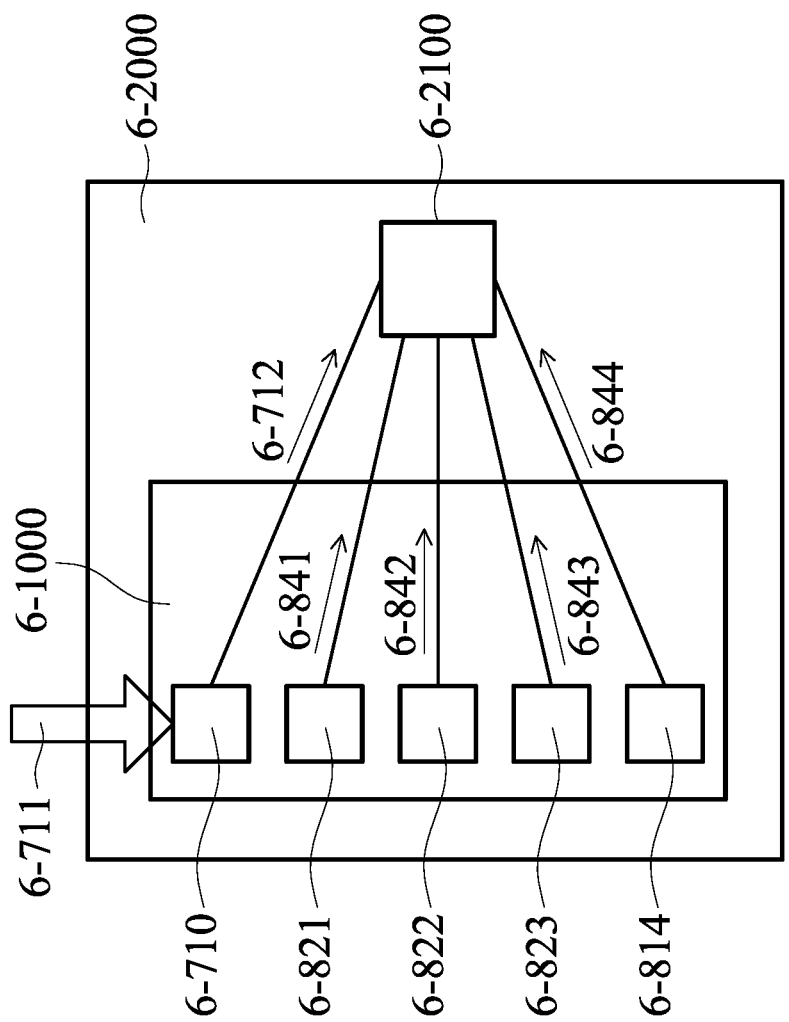
FIG. 46 is a schematic view of the electronic device.

As shown in FIG. 45D and FIG. 45E, a maximum dimension 6-H1 (height) of the first magnetic unit 6-331 is different from a maximum dimension 6-H2 of the third magnetic element 6-323 in the direction that the main axis 6-O extends (i.e. the Z direction). For example, the maximum dimension 6-H1 may be greater than the maximum dimension 6-H2. Moreover, a maximum dimension 6-W1 of the first magnetic unit 6-331 in the second direction (the Y direction) is different from a maximum dimension 6-W2 of the third magnetic element 6-323 in the first direction (the X direction), such as the maximum dimension 6-W1 may be less than the maximum dimension 6-W2.

The optical system 6-1000 may have a second driving assembly 6-340 used for driving the movable portion 6-200 to move relative to the fixed portion 6-F. The first driving assembly 6-300 and the second driving assembly 6-340 may drive the movable portion 6-200 in different directions. The second driving assembly 6-340 may include a sixth coil 6-316 and a seventh coil 6-317 respectively correspond to the first magnetic unit 6-331 and the second magnetic unit 6-332, such as at least partially overlap each other in the Y direction. When viewed along the main axis 6-O, the sixth coil 6-316 may be at the first side 6-151, and the seventh coil 6-317 may be at the third side 6-153.

The intermediate module 6-400, the second resilient 6-610, and the third resilient 6-620 may be disposed between the fixed portion 6-F and the movable portion 6-200 to movably connect the fixed portion 6-F and the movable portion 6-200, so the movable portion 6-200 may be movably connected to the fixed portion 6-F. The intermediate module 6-400 may include a first resilient element 6-410, and the first resilient element 6-410 may be a suspension wire. The second resilient 6-610 and the third resilient 6-620 may be springs which are plate-shaped and perpendicular to the main axis 6-O. The intermediate module 6-400, the second resilient 6-610, and the third resilient 6-620 may include metal for electrically connected to the electronic elements in the optical system 6-1000, such as the first driving assembly 6-300 or the circuit module 6-500. In some embodiments, a first adhesive 6-650 may be disposed in the optical system 6-1000, such as may in direct contact with the top case 6-110, the frame 6-120, or the second resilient element 6-610 to fix the positions of the elements.

The circuit module 6-500 may be a flexible printed circuit which may be affixed on the fixed portion 6-F by glue. In this embodiment, the circuit module 6-500 is electrically connected to other electronic elements inside or outside the optical system 6-1000. For example, electrical signal may be transferred through the circuit module 6-500 to the first driving assembly 6-300 or the second driving assembly 6-340 to control the movement of the holder 6-200 in the X, the Y, or the Z direction, so auto focus or optical image stabilization may be achieved. As shown in FIG. 46, the 710 may receive an optical signal 6-711 and provide an image signal 6-712 to a control unit 6-2100 of the electronic device 6-2000.

FIG. 44A, FIG. 44B, FIG. 44C, FIG. 44D, FIG. 44E, FIG. 44F, FIG. 44G, FIG. 44H, FIG. 44I, FIG. 44J are schematic views of the circuit assembly 6-500 in some embodiments. The circuit assembly 6-500 may include a first circuit assembly 6-510, a second circuit assembly 6-520, and a third circuit assembly 6-530. The first circuit assembly 6-510 and the second circuit assembly 6-520 may be electrically connected to the optical module, and the third circuit assembly 6-530 may be electrically connected to the electronic device 6-2000. For example, in some embodiments, the first circuit assembly 6-510 may be electrically connected to the fourth sensing assembly 6-814 and the second driving assembly 6-340. In some embodiments, the second driving assembly 6-340 may be electrically connected to the first circuit assembly 6-510 through the second resilient element 6-610 and the third resilient element 6-620. Moreover, the first driving assembly 6-300 may be electrically connected to the first circuit assembly 6-510 through the first resilient element 6-410 or the second resilient element 6-610. In other embodiments, the first driving assembly 6-300 may be electrically connected to the electronic device 6-2000 through the second circuit assembly 6-520, depending on design requirement. In some embodiments, the second driving assembly may be electrically connected to the first circuit assembly 6-510 through the circuit unit (not shown) embedded in the frame 6-120.

In some embodiments, as shown in FIG. 44A, the first circuit assembly 6-510 may include a first portion 6-541, a second portion 6-542, and a third portion 6-543. The third portion 6-543 may be electrically connected to the first portion 6-541 through the second portion 6-542. The first portion 6-541 is plate shaped and is not parallel to the main axis 6-O, such as may be perpendicular. The second portion 6-542 is plate shaped and is not perpendicular to the main axis 6-O, such as may be parallel. Moreover, the first portion 6-541 is not parallel to the second portion 6-542. The third portion 6-543 may be plate shaped and may be not parallel to the main axis 6-O, such as may be perpendicular. Moreover, the first portion 6-541 is parallel to the third portion 6-543. Furthermore, as shown in FIG. 44F, the first portion 6-541 may at least partially overlap the fourth sensing assembly 6-814 (includes the fourth sensing element 6-824 and the fourth reference element 6-834). For example, the fourth sensing assembly 6-814 may be disposed at the fourth side 6-154.

In some embodiments, the first circuit assembly 6-510 may further include an internal connecting portion, a testing connecting portion 6-552, and an external connecting portion 6-553. The internal connecting portion, the testing connecting portion 6-552, and the external connecting portion 6-553 may be ports for electrical connection. In some embodiments, the internal connecting portion may be disposed at the first portion 6-541, and the first portion 6-541 may be electrically connected to the first driving assembly 6-300 or the second driving assembly 6-340 through the internal connecting portion. The testing connecting portion 6-552 may be disposed on the first portion 6-541, and may be electrically connected to an external test apparatus (not shown). Therefore, the optical system 6-1000 may be tested before being assembled. The external connecting portion 6-553 may be disposed on the third portion 6-543 to be electrically connected to the electronic device 6-2000.

In some embodiments, the second circuit assembly 6-520 may include a first circuit element 6-521 and a second circuit element 6-522. The first circuit element 6-521 may include a fourth portion 6-544, a fifth portion 6-545, and a third portion 6-543, wherein the sixth portion 6-546 may be electrically connected to the fourth portion 6-544 through the fifth portion 6-545, so the first circuit element 6-521 may be electrically connected to the optical module 6-700. In some embodiments, the fourth portion 6-544 is plate shaped and is not perpendicular to the main axis 6-O, such as may be parallel. The fifth portion 6-545 is plate shaped and is not perpendicular to the main axis 6-O, such as may be parallel. The sixth portion 6-546 is plate shaped and is not parallel to the main axis 6-O, such as may be perpendicular. Moreover, in some embodiments, the fourth portion 6-544 may be parallel to the first direction (the X direction), the fifth portion 6-545 may be parallel to the second direction (the Y direction), and the fourth portion 6-544 may be not parallel to the fifth portion 6-545. The fifth portion 6-545 may be perpendicular to the sixth portion 6-546. The fourth portion 6-544 and the fifth portion 6-545 may include metal to conduct current.

Moreover, as shown in FIG. 44A, the second circuit assembly 6-520 may include a first bending portion 6-560, and the fourth portion 6-544 is electrically and physically connected to the fifth portion 6-545 through the first bending portion 6-560. The first bending portion 6-560 may include an enlarged portion 6-561, a first connecting portion 6-562, a second connecting portion 6-563, and a first opening 6-564 on the enlarged portion 6-561. In the direction that the main axis 6-O extends, the maximum size (width) of the enlarged portion 6-561 may be greater than that of the fourth portion 6-544.

Figure 44C:
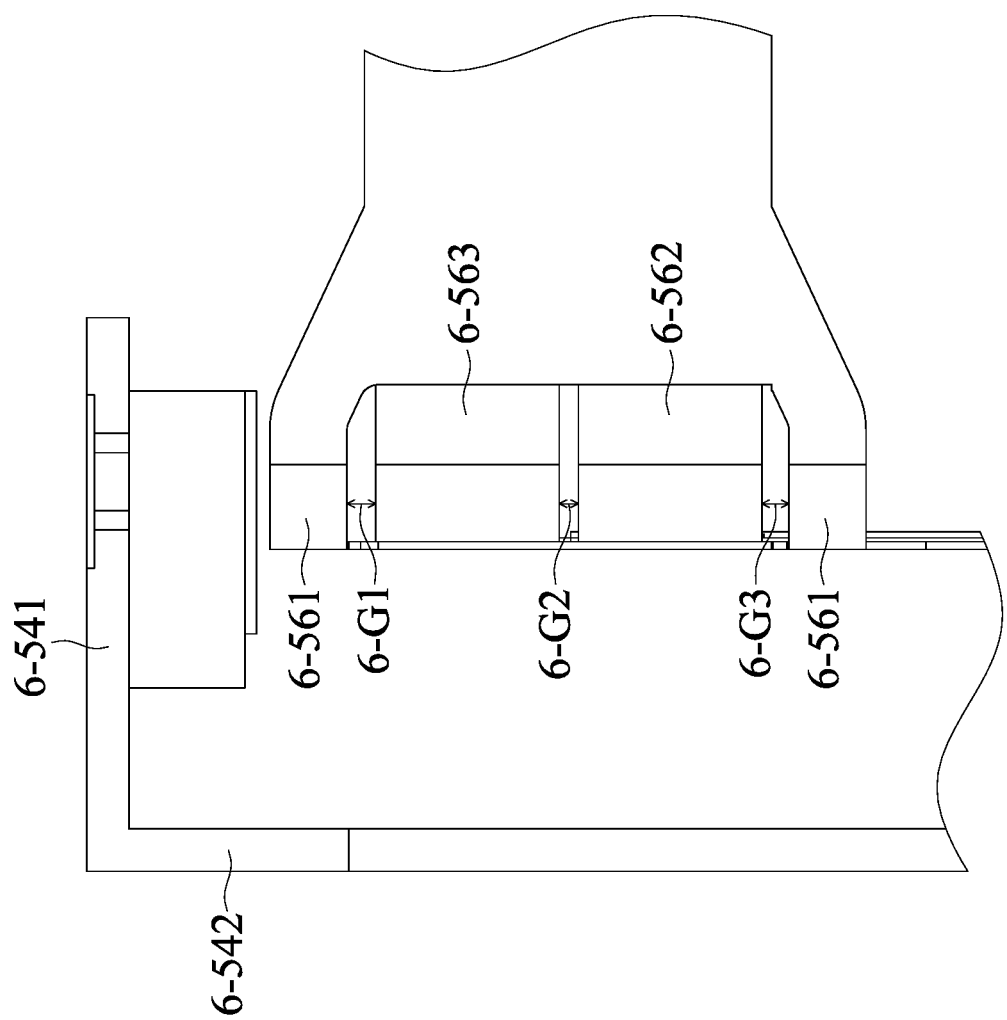
Figure 44D:
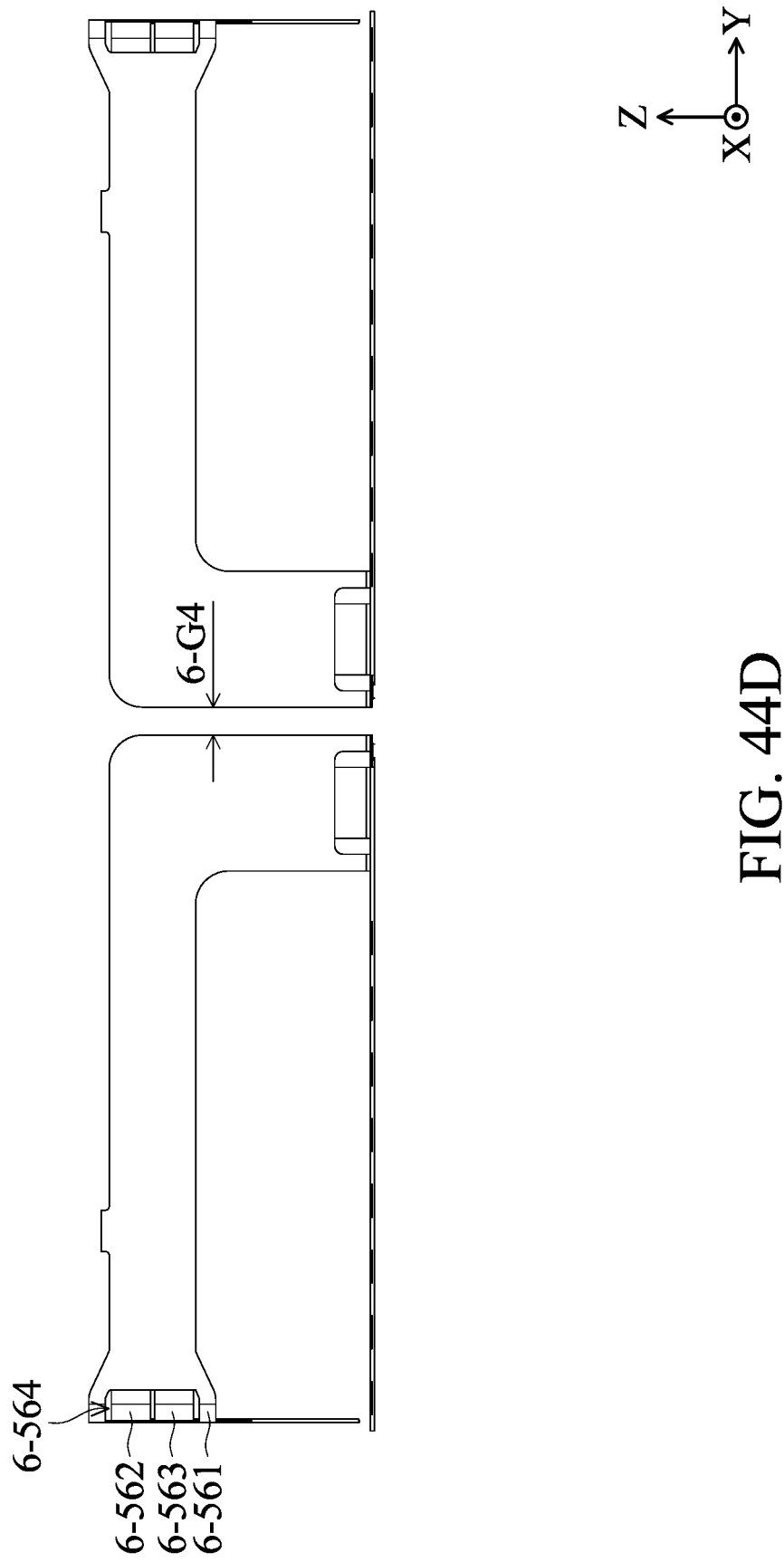
Figure 44E:
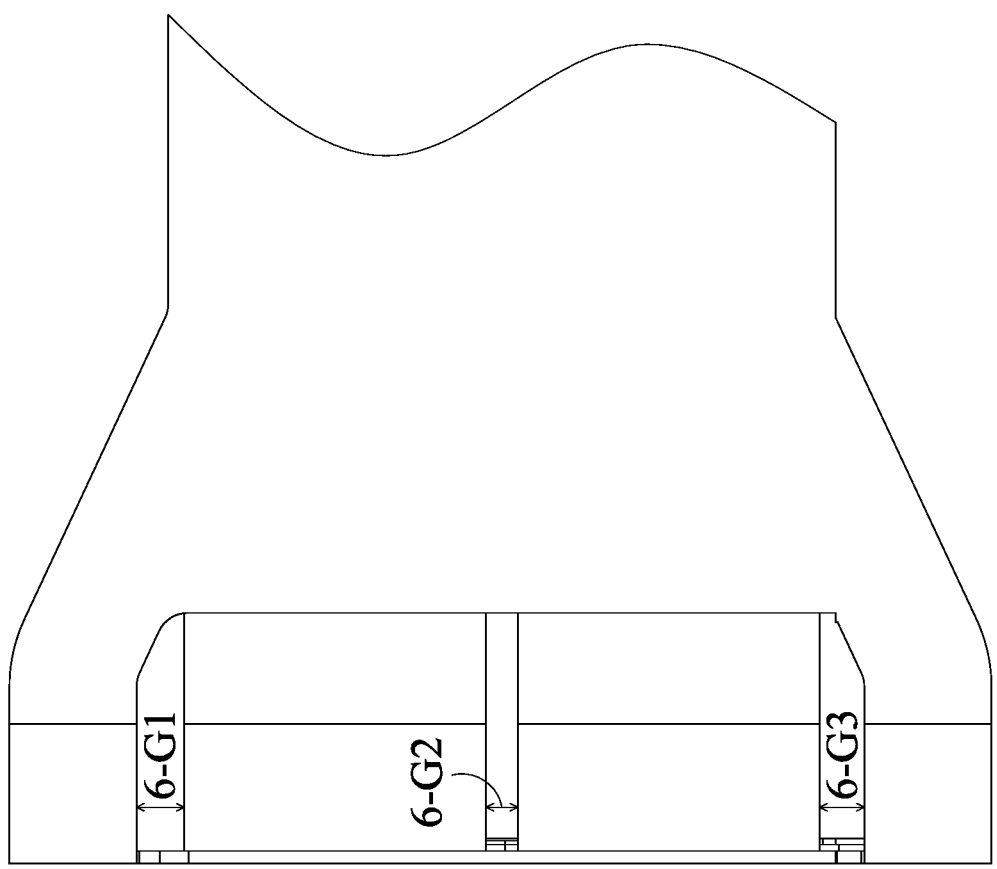
Figure 44F:
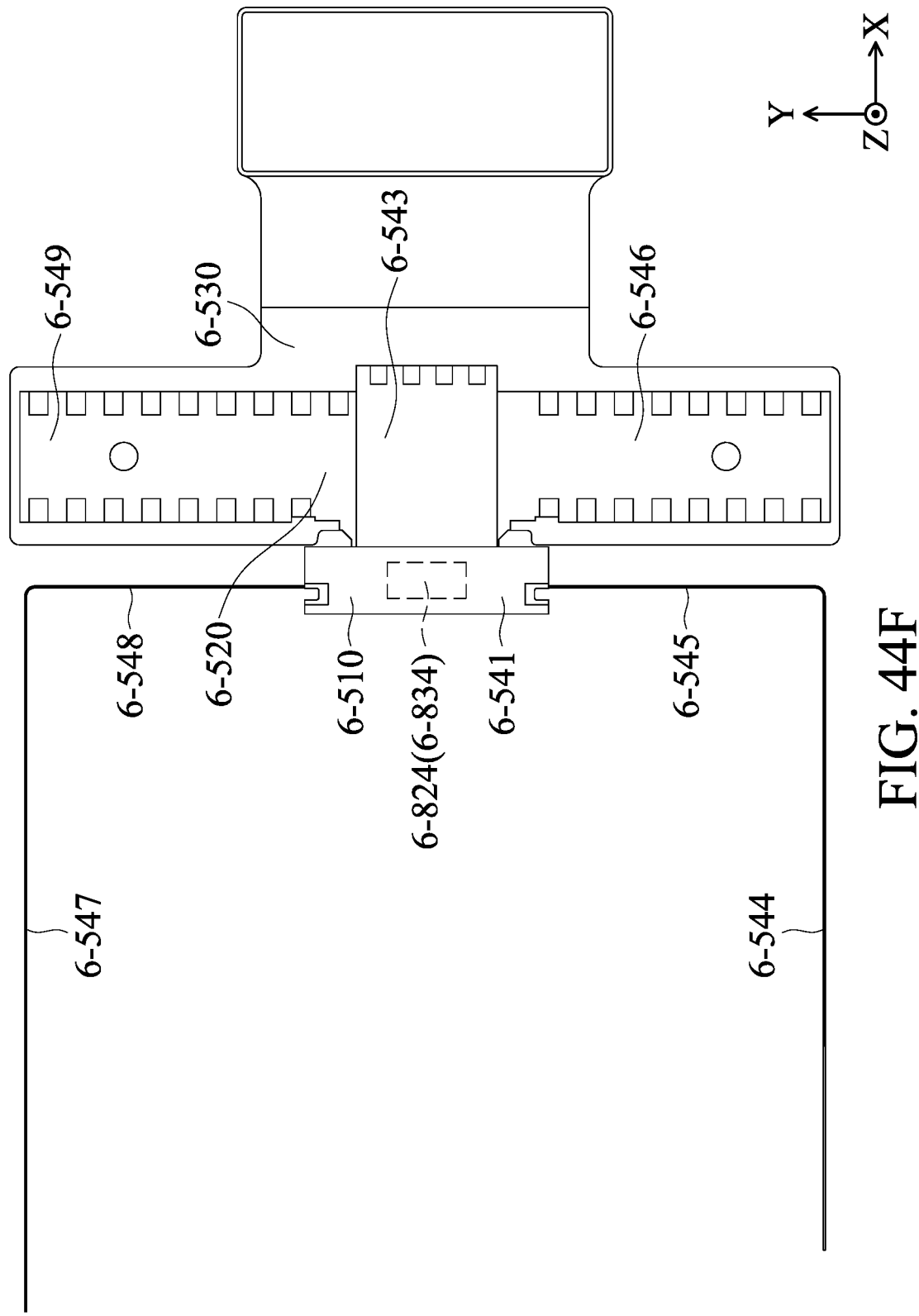
Figure 44G:
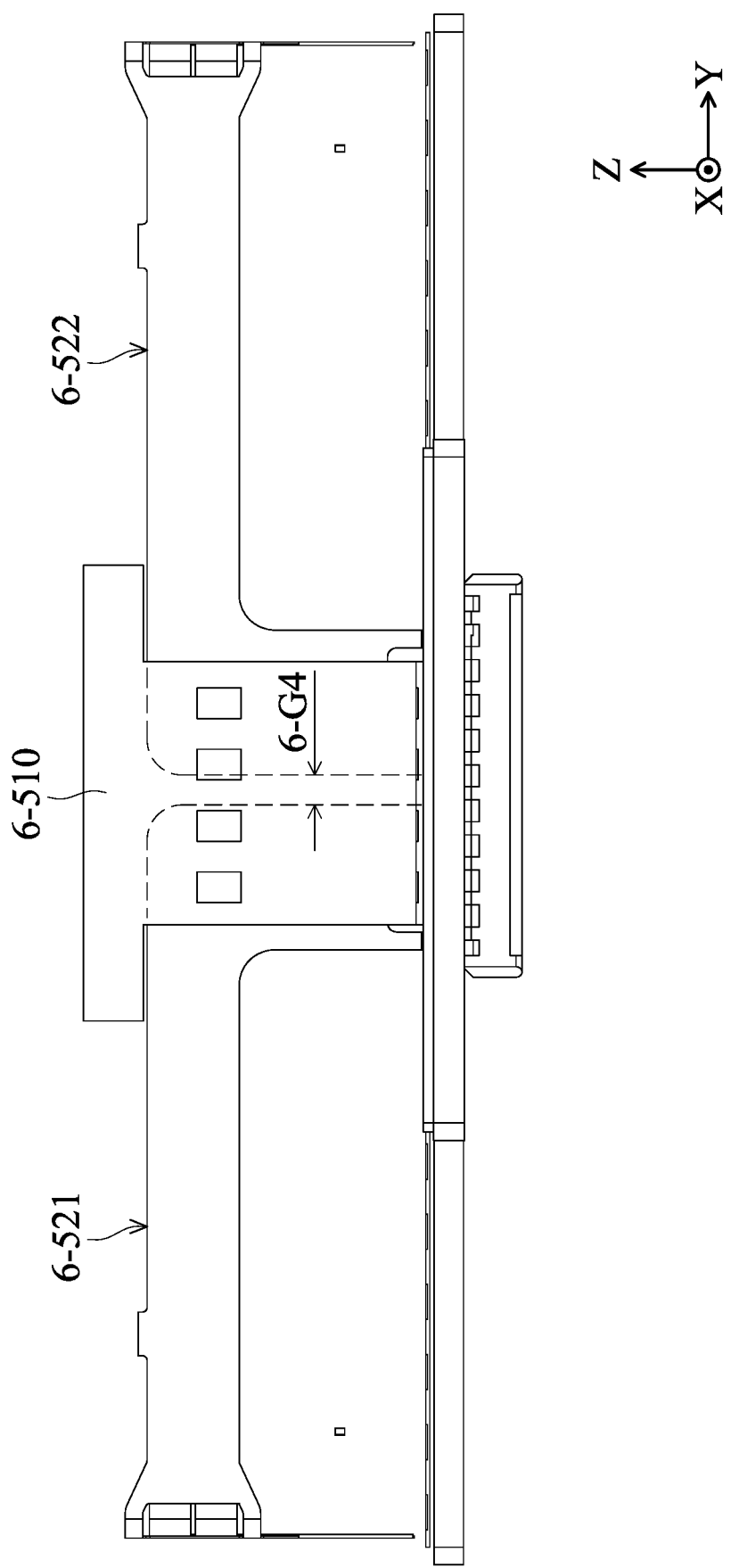
Figure 44H:
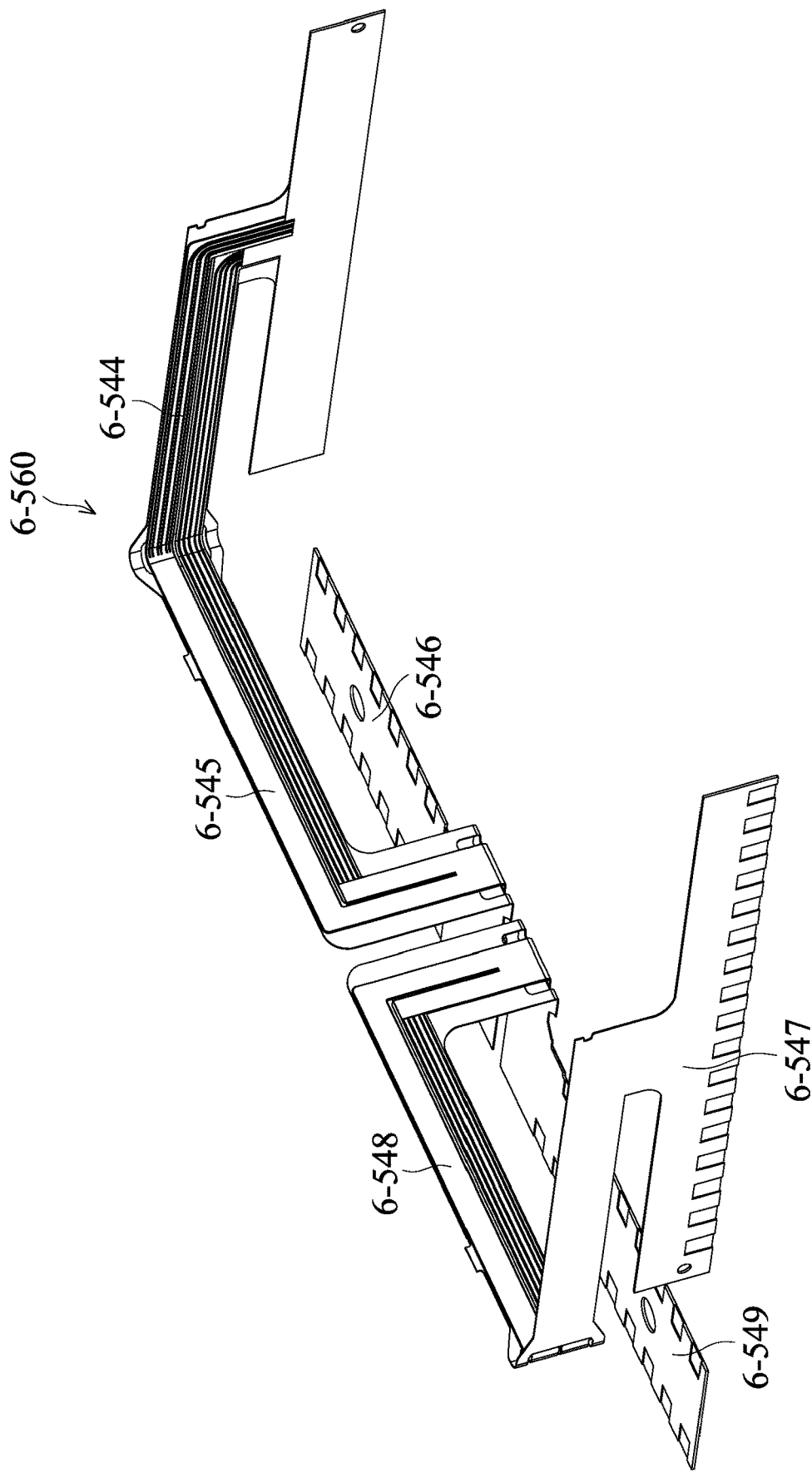
Figure 44I:
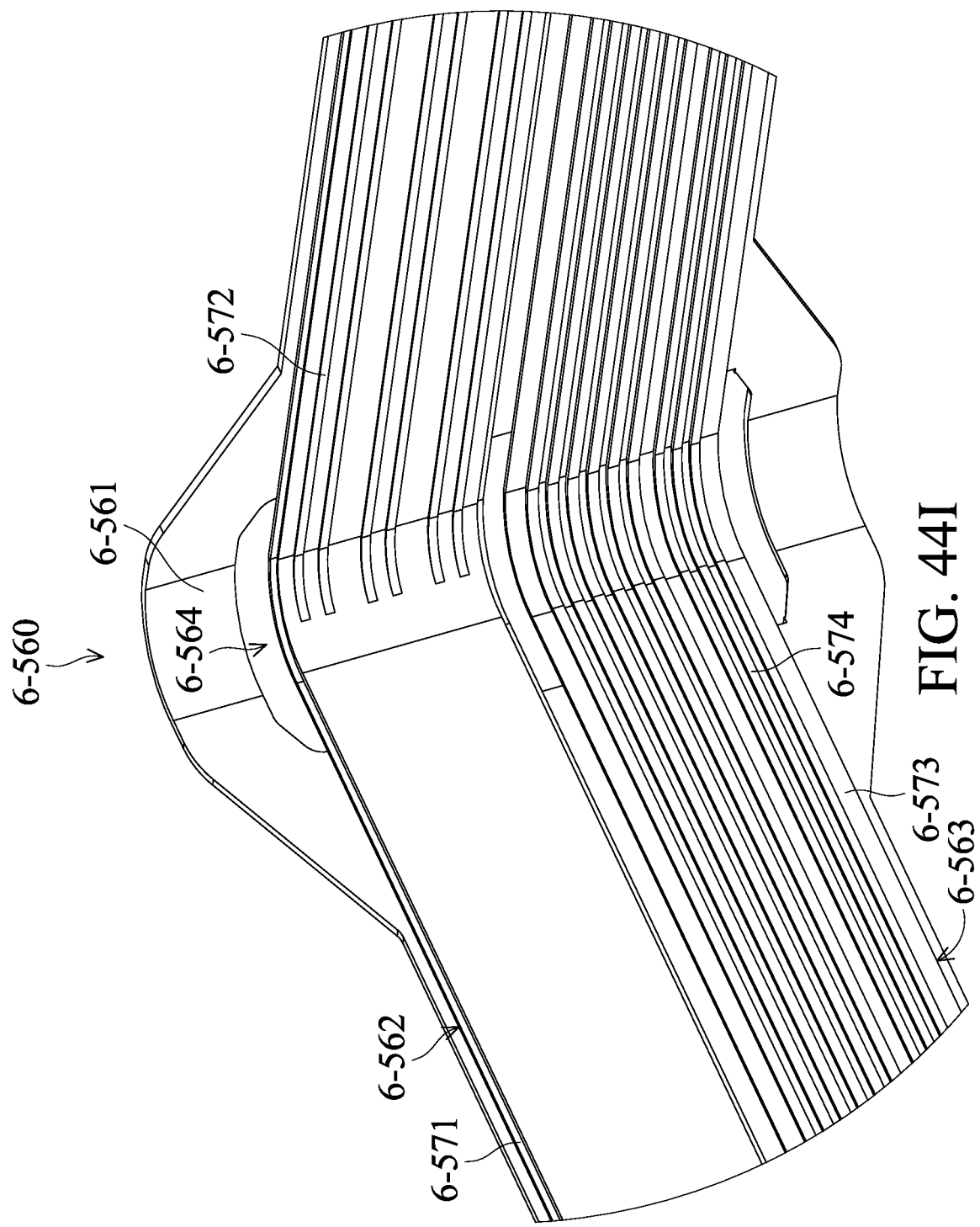
Figure 44J:
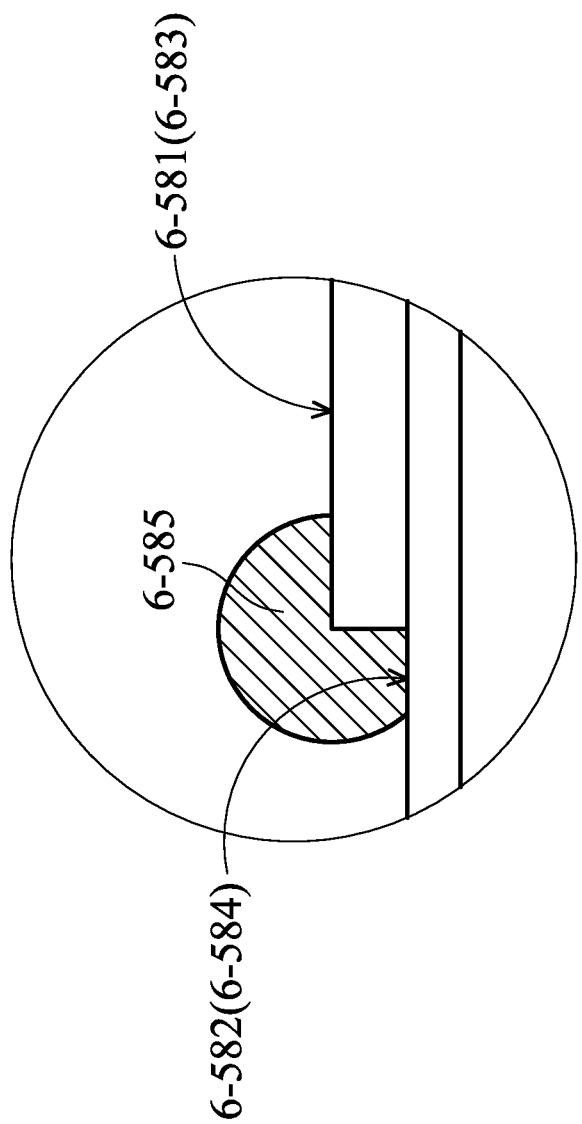
Figure 44K:
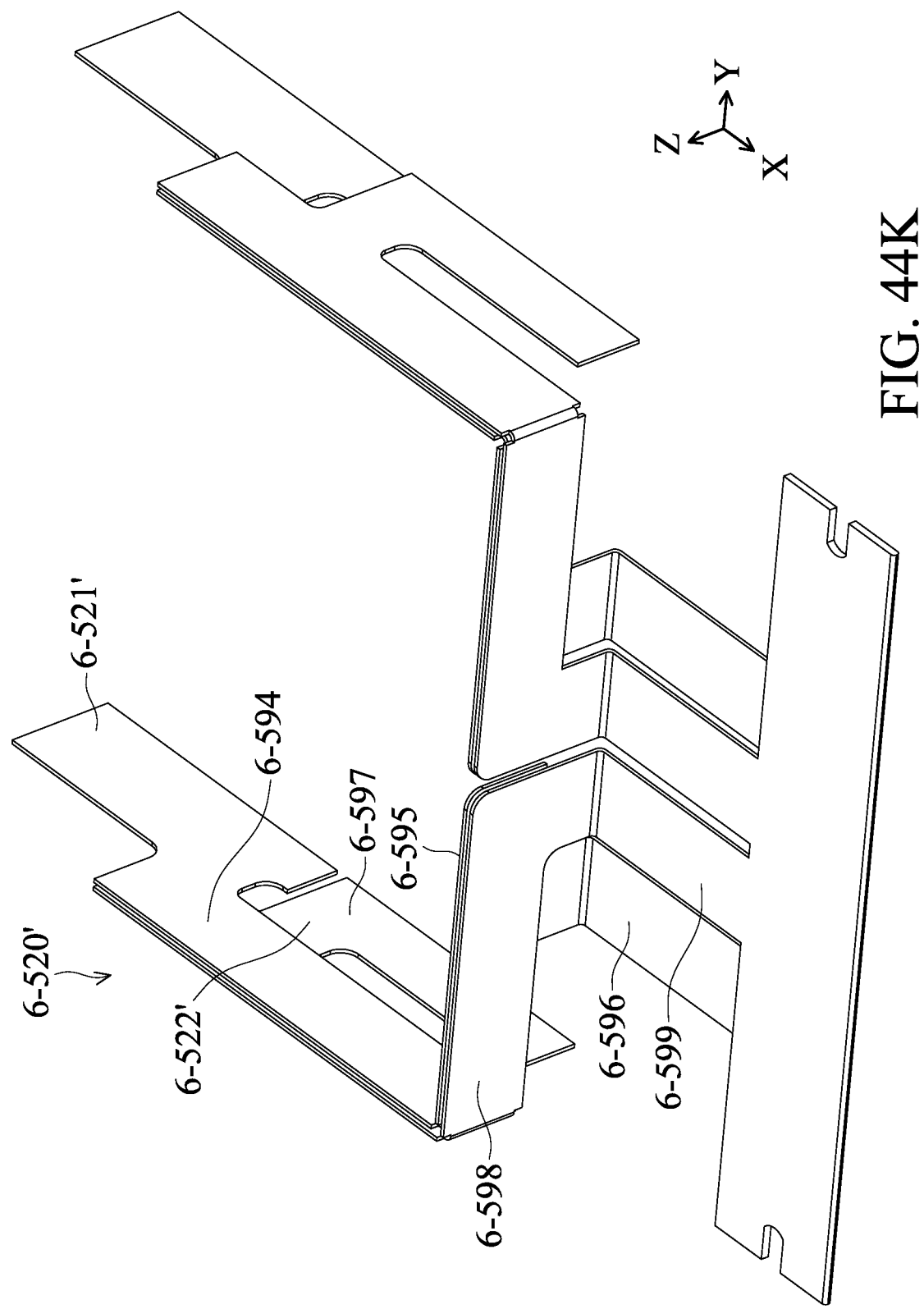
FIG. 44K, FIG. 44L, FIG. 44M, and FIG. 44N are schematic views of a circuit assembly in other embodiments.
Figure 44L:
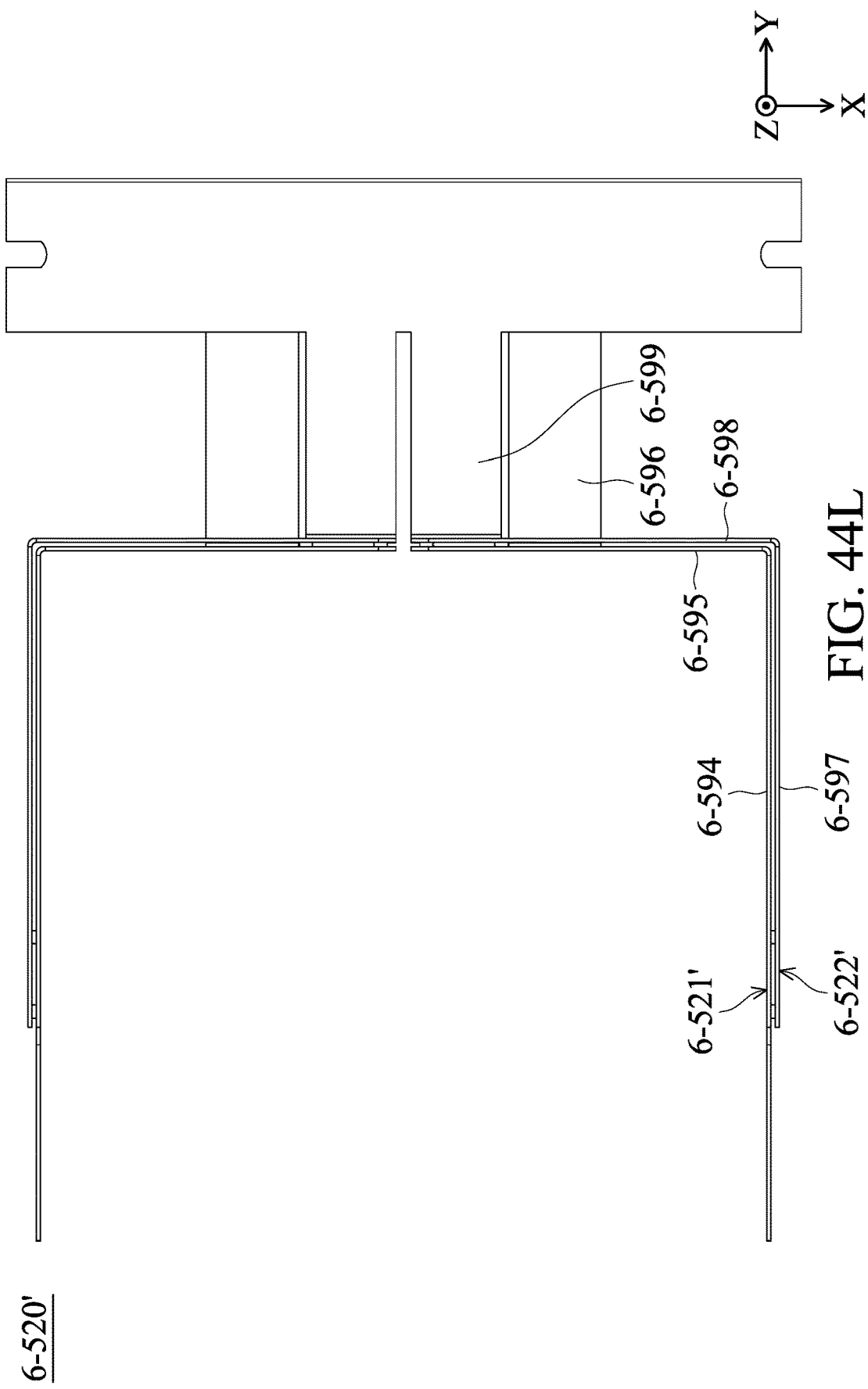
Figure 44M:
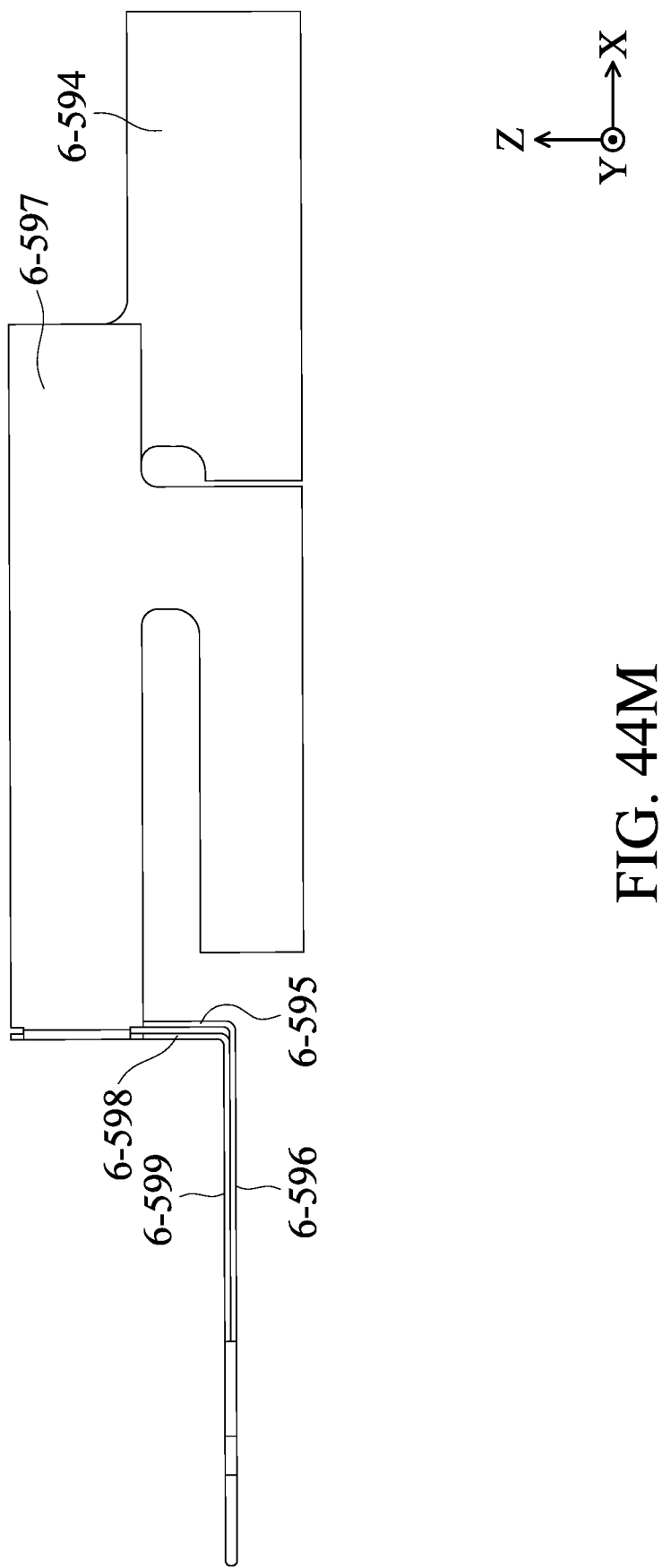
Figure 44N:
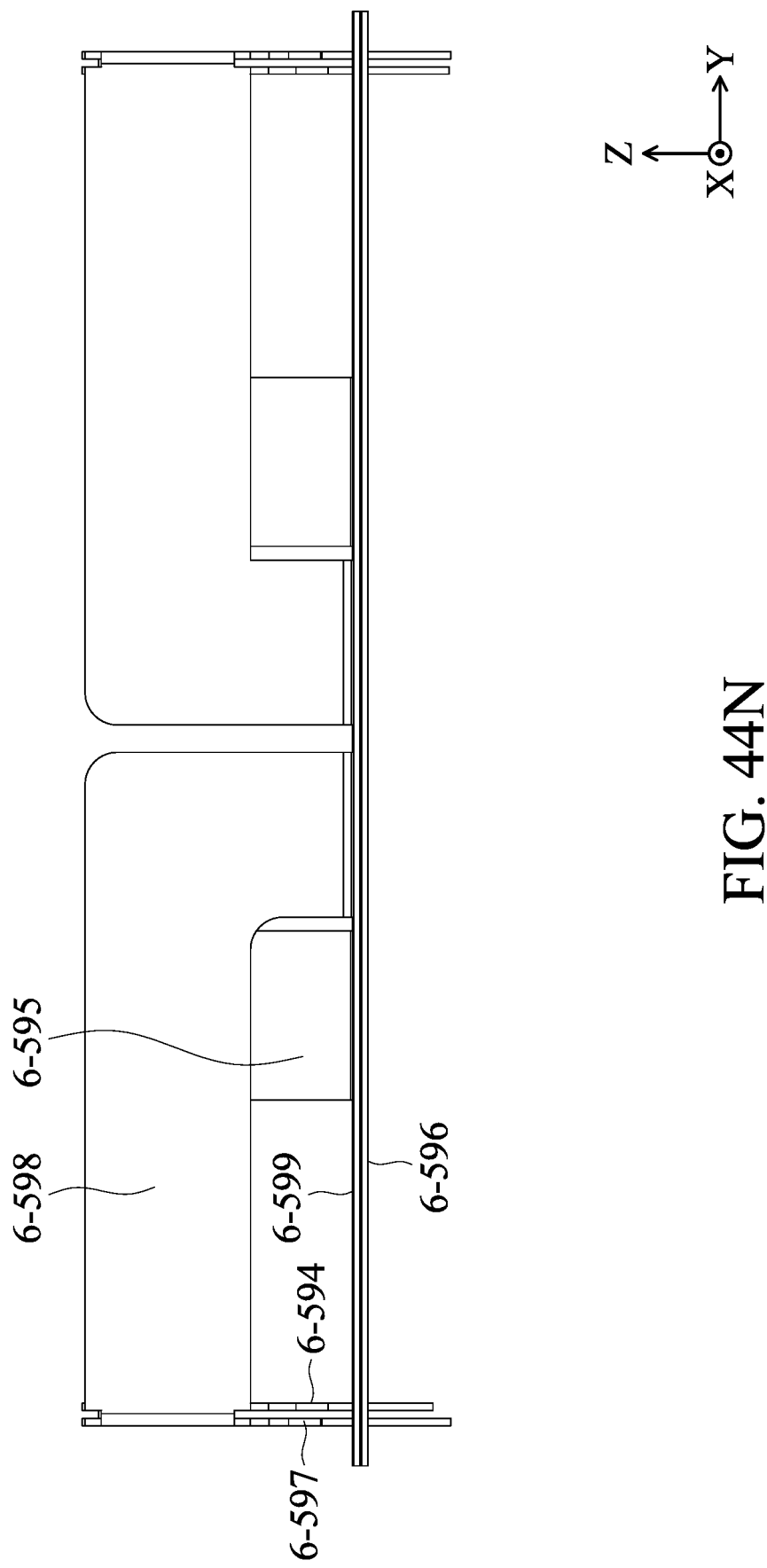

As shown in FIG. 44I, the first connecting portion 6-562 may include a first insulating portion 6-571 and a first circuit portion 6-572 arranged in the thickness direction of the first connecting portion 6-562. The first insulating portion 6-571 may be plate shaped for electrically isolating the first circuit portion 6-572 and the fourth portion 6-544 or the fifth portion 6-545. In other words, when viewed along the main axis 6-O, in the thickness direction, at least a portion of the first insulating portion 6-571 is disposed between the first circuit portion 6-572 and the fourth portion 6-544 or the fifth portion 6-545.

As shown in FIG. 44I, the second connecting portion 6-563 may include a second insulating portion 6-573 and a second circuit portion 6-574 arranged in the thickness direction of the second connecting portion 6-563. The second insulating portion 6-573 may be plate shaped for electrically isolating the second circuit portion 6-574 and the fourth portion 6-544 or the fifth portion 6-545. In other words, when viewed along the main axis 6-O, in the thickness direction, at least a portion of the second insulating portion 6-573 is disposed between the first circuit portion 6-572 and the fourth portion 6-544 or the fifth portion 6-545. Besides, in the direction that the main axis 6-O extends, at least a portion of the first connecting portion 6-562 overlaps the second connecting portion 6-563.

FIG. 44B and FIG. 44D are side views of the second circuit assembly 6-520, and FIG. 44C and FIG. 44E are enlarged views of FIG. 44B and FIG. 44D, respectively, to show the first bending portion 6-560. As shown in FIG. 44B to FIG. 44E, the first connecting portion 6-562 and the second connecting portion 6-563 may be disposed on the first opening 6-564, such as a portion of the first connecting portion 6-562 and the second connecting portion 6-563 may be exposed from the first opening 6-564. Moreover, when viewed along the first direction (X direction) or the second direction (Y direction), at least a portion of the first connecting portion 6-562 and the second connecting portion 6-563 overlaps the first opening 6-564. The first connecting portion 6-562 and the enlarged portion 6-561 form a gap G1, the first connecting portion 6-562 and the second connecting portion 6-563 form a gap G2, second connecting portion 6-563 and the enlarged portion 6-561 form a gap G3. In other words, the enlarged portion 6-561, the first connecting portion 6-562, and the second connecting portion 6-563 are not in direct contact each other in the Z direction.

The second circuit element 6-522 may include a seventh portion 6-547, an eighth portion 6-548, and a ninth portion 6-549 that are plate-shaped. The seventh portion 6-547 and the eighth portion 6-548 are not perpendicular to the main axis 6-O (e.g. parallel). The ninth portion 6-549 is not parallel to the main axis 6-O (e.g. perpendicular). Moreover, the seventh portion 6-547 may be parallel to the first (X) direction, the eighth portion 6-548 may be parallel to the second (Y) direction, and the seventh portion 6-547 and the eighth portion 6-548 are not parallel. The ninth portion 6-549 may be perpendicular to the eighth portion 6-548.

Similarly, the second circuit element 6-522 may be electrically connected to the optical module 6-700. However, as shown in FIG. 44G, the second circuit element 6-522 and the first circuit element 6-521 may have a gap 6-G4 between them. In other words, the second circuit element 6-522 and the first circuit element 6-521 are not in direct contact each other.

The first circuit assembly 6-510 and second circuit assembly 6-520 may be electrically connected to the electronic device 6-2000 through the third circuit assembly 6-530. For example, the third circuit assembly 6-530 may be plate-shaped and not parallel to the main axis 6-O (e.g. perpendicular). Moreover, the first circuit assembly 6-510 and the second circuit assembly 6-520 may be connected to the third circuit assembly 6-530 by welding. For example, as shown in FIG. 44H, the first circuit assembly 6-510 may include a first electrical connection surface 6-581, and the third circuit assembly 6-530 may include a second electrical connection surface 6-582. The first electrical connection surface 6-581 and the second electrical connection surface 6-582 face an identical direction (e.g. +Z direction), and a 585 may be in contact with the first electrical connection surface 6-581 and the second electrical connection surface 6-582 to electrically connect the first circuit assembly 6-510 and the third circuit assembly 6-530.

Similarly, the first circuit assembly 6-510 may include a third electrical connection surface 6-583, and the third circuit assembly 6-530 may include a fourth electrical connection surface 6-584. The third electrical connection surface 6-583 and the fourth electrical connection surface 6-584 face an identical direction (e.g. +Z direction), and a 585 may be in contact with the third electrical connection surface 6-583 and the fourth electrical connection surface 6-584 to electrically connect the first circuit assembly 6-510 and the third circuit assembly 6-530. Moreover, the first electrical connection surface 6-581 and the third electrical connection surface 6-583 may face an identical direction (e.g. +Z direction).

In the direction that the main axis 6-O extends, the first circuit assembly 6-510 at least partially overlaps the gap 6-G4. When viewed in a direction that is perpendicular to the main axis 6-O, at least a portion of the second circuit assembly 6-520 is between the first circuit assembly 6-510 and the third circuit assembly 6-530, and at least a portion of the sixth portion 6-546 is between the third portion 6-543 and the third circuit assembly 6-530.

However, the present disclosure is not limited thereto. For example, FIG. 44K, FIG. 44L, FIG. 44M, and FIG. 44N are schematic views of a second circuit assembly 6-520' in other embodiments. The second circuit assembly 6-520 may be replaced by the second circuit assembly 6-520'. The second circuit assembly 6-520' may include a first circuit element 6-521' and a second circuit element 6-522', wherein the first circuit element 6-521' may include a fourth portion 6-594, a fifth portion 6-595, and a sixth portion 6-596, and the second circuit element 6-522' may include a seventh portion 6-597, an eighth portion 6-598, and a ninth portion 6-599.

The fourth portion 6-594 may be electrically connected to the sixth portion 6-596 through the fifth portion 6-595, and the seventh portion 6-597 may be electrically connected to the ninth portion 6-599 through the eighth portion 6-598. The seventh portion 6-597, the eighth portion 6-598, and the ninth portion 6-599 may be plate-shaped. The seventh portion 6-597 and the eighth portion 6-598 may be not perpendicular to the main axis 6-O (e.g. parallel), and the ninth portion 6-599 may be not parallel to the main axis 6-O (e.g. perpendicular). The seventh portion 6-597 may be parallel to the first direction (the X direction), the eighth portion 6-598 may be parallel to the second (Y) direction. The seventh portion 6-597 and the eighth portion 6-598 are not parallel. The ninth portion 6-599 may be perpendicular to the eighth portion 6-598.

A gap greater than zero may be between the second circuit element 6-522' and the first circuit element 6-521', so the first circuit element 6-521' and the second circuit element 6-522' are not in direct contact each other in the thickness direction. The first circuit element 6-521' and the second circuit element 6-522' may be electrically connected to the optical module 6-700 to transfer different signal, so interference may be prevented.

Figure 43C:
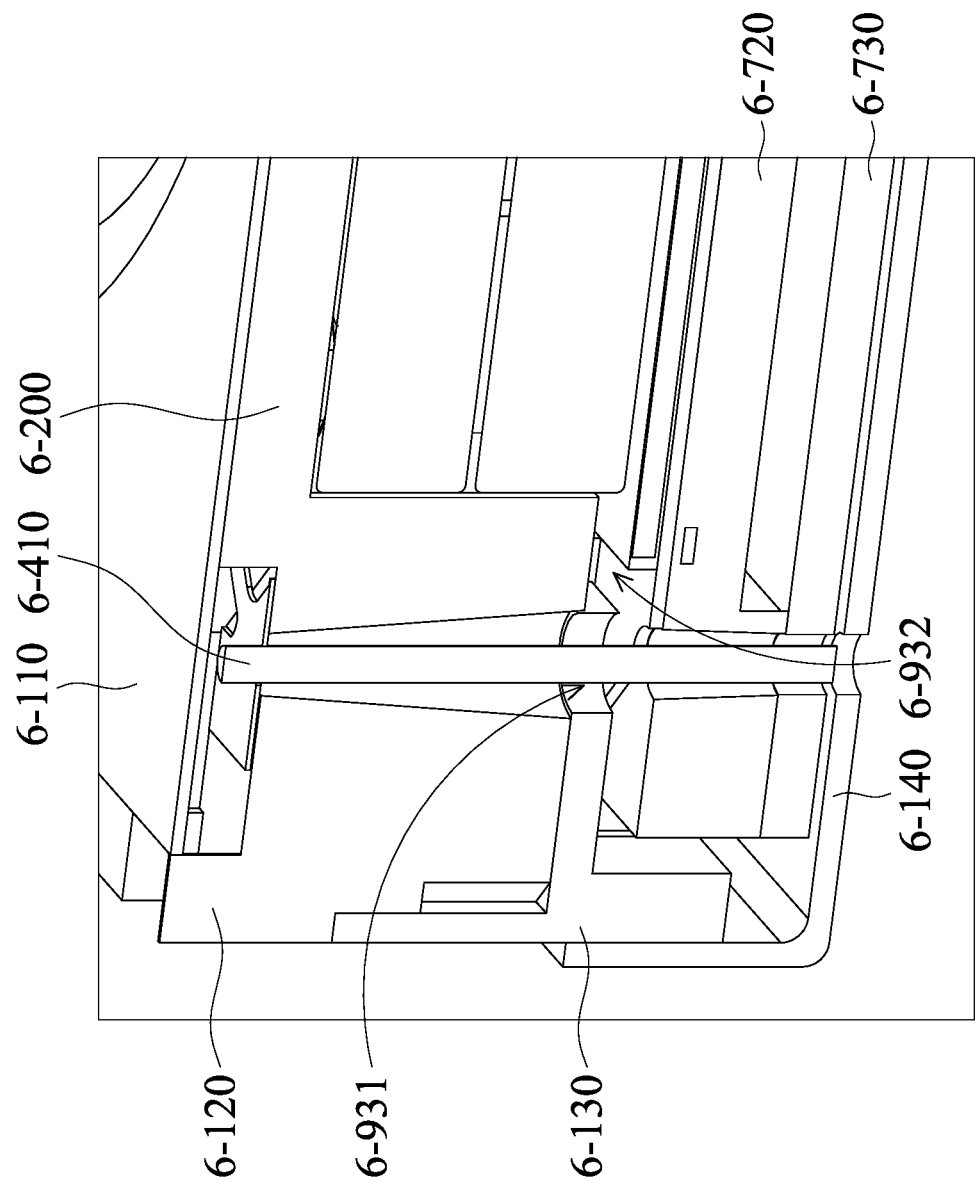
FIG. 43C is a perspective cross-sectional view of the optical system illustrated along a line 6-B-6-B in FIG. 42.

As shown in FIG. 43B and FIG. 43C, the first resilient element 6-410 of the intermediate module 6-400 is strip-shaped and extends along the main axis 6-O (the Z direction). The fixed portion 6-F includes a first disposing portion 6-910, a second disposing portion 6-920, and a first end 6-411 of the first resilient element 6-410 is disposed on the first disposing portion 6-910, a second end 6-412 of the first resilient element 6-410 is disposed on the second disposing portion 6-920. The first disposing portion 6-910 has a recessed structure and is formed between the frame 6-120 and the top plate 6-110 of the fixed portion 6-F. The top plate 6-110 is plate-shaped and perpendicular to the main axis 6-O. The second disposing portion 6-920 may include a recessed structure or a through hole which is formed on the bottom plate 6-140 of the fixed portion 6-F. At least a portion of the frame 6-120 is between the top plate 6-110 and the bottom plate 6-140.

Moreover, as shown in FIG. 44, the fixed portion 6-F may include a first avoid portion 6-931 and a second avoid portion 6-932 to accommodate a portion of the first resilient element 6-410, so the first resilient element 6-410 may pass through the fixed portion 6-F. The first avoid portion 6-931 may at the case 6-130 of the fixed portion 6-F, and the second avoid portion 6-932 may at the movable portion 6-200. The first avoid portion 6-931 and the second avoid portion 6-932 may have shrinking structure, and the first avoid portion 6-931 and the second avoid portion 6-932 may shrink in different directions (e.g. opposite directions).

In some embodiments, as shown in FIG. 43B, a first damping element 6-940 may be provided in the optical system 6-1000, such may be directly disposed on the first resilient element 6-410 to reduce the vibration of the first resilient element 6-410, so the abnormal movement of the movable portion 6-200 relative to the fixed portion 6-F may be suppressed. The first damping element 6-940 may include gel or resin. In some embodiments, the first damping element 6-940 may be in direct contact with the fixed portion 6-F and/or the movable portion 6-200. Moreover, the first damping element 6-940 may be in direct contact with the first avoid portion 6-931 and/or the second avoid portion 6-932 to fill the space in the optical system 6-1000, so the abnormal movement of the movable portion 6-200 relative to the fixed portion 6-F may be suppressed.

The optical sensor 6-710 and the second optical element 6-740 of the optical module 6-700 may be disposed in an accommodating space formed by the case body 6-720 and the bottom 6-730. For example, the optical sensor 6-710 and the case body 6-720 may be affixed on the bottom 6-730. The case body 6-720 may include a case body 6-720 which is plate-shaped and perpendicular to the main axis 6-O. The optical sensor 6-710 may position between the top cover 6-721 and the bottom 6-730 in the direction that the main axis 6-0 extends (the Z direction).

The second optical element 6-740 may be a light filter which may only specific light to pass through and achieve the optical sensor 6-710. Other light with undesired wavelength may be removed. For example, the second optical element 6-740 may remove infrared and allow visible light to pass through, but the present is not limited thereto. The second optical element 6-740 may correspond the optical sensor 6-710. Therefore, the light received by the optical sensor 6-710 may be closer to the light received by eyes.

In some embodiments, as shown in FIG. 45C, a position sensing module 6-800 may be provided in the optical system 6-1000 to detect the movement of the movable portion 6-200 relative to the fixed portion 6-F. The position sensing module 6-800 may include a first position sensing assembly 6-811, a second sensing assembly 6-812, a third sensing assembly 6-813, and a fourth sensing assembly 6-814. The first position sensing assembly 6-811 may include a first sensing element 6-821 and a first reference element 6-831, the second sensing assembly 6-812 may include a second sensing element 6-822 and a second reference element 6-832, the third sensing assembly 6-813 may include a third sensing element 6-823 and a third reference element 6-833, and the fourth sensing assembly 6-814 may include a fourth sensing element 6-824 and a fourth reference element 6-834.

The first sensing element 6-821, the second sensing element 6-822, the third sensing element 6-823, and the fourth sensing element 6-824 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The first reference element 6-831, the second reference element 6-832, the third reference element 6-833, and the fourth reference element 6-834 may be magnets which may be disposed on the movable portion 6-200. The first sensing element 6-821, the second sensing element 6-822, the third sensing element 6-823, and the fourth sensing element 6-824 may be disposed on the fixed portion 6-F to detect the magnetic field change of the first reference element 6-831, the second reference element 6-832, the third reference element 6-833, and the fourth reference element 6-834 when the holder 6-200 moves relative to the fixed portion 6-F. Therefore, the position of the movable portion 6-200 relative to the fixed portion 6-F may be received, and a first sensing signal 6-841, a second sensing signal 6-842, a third sensing signal 6-843, and a fourth sensing signal 6-844 may be provided to the control unit 6-2100 of the electronic device 6-2000 by the first sensing element 6-821, the second sensing element 6-822, the third sensing element 6-823, and the fourth sensing element 6-824, respectively. The control unit 6-2100 may be used for receiving the first sensing signal 6-841, the second sensing signal 6-842, the third sensing signal 6-843, and the fourth sensing signal 6-844 to analyze the movement of the movable portion 6-200 relative to the fixed portion 6-F. For example, the control unit 6-2100 may analyze the translational movement of the movable portion 6-200 relative to the fixed portion 6-F or the rotation of the movable portion 6-200 with a first rotational axis (the main axis 6-0). The main axis 6-O may be perpendicular to an optical signal 6-711 of the optical sensor 6-710 (FIG. 43A).

In some embodiments, the position of the first reference element 6-831, the second reference element 6-832, the third reference element 6-833, or the fourth reference element 6-834 may be interchanged with the position of the first sensing element 6-821, the second sensing element 6-822, the third sensing element 6-823, or the fourth sensing element 6-824, depending on design requirement.

When viewed along the main axis 6-O, the first position sensing assembly 6-811 and the second sensing assembly 6-812 are arranged in a direction that is not parallel or not perpendicular to a direction that the second sensing assembly 6-812 and the third sensing assembly 6-813 arrange. For example, the first position sensing assembly 6-811 and the second sensing assembly 6-812 may arrange in the Y direction (i.e. perpendicular to the first direction). The second sensing assembly 6-812 and the third sensing assembly 6-813 may arrange in a direction that is not parallel or not perpendicular to the Y axis. As a result, the movement of the movable portion 6-200 in different directions may be detected. In some embodiments, the first position sensing assembly 6-811 and the second sensing assembly 6-812 may arrange in the X direction (i.e. parallel to the first direction).

In some embodiments, the first reference element 6-831, the second reference element 6-832, and the third magnetic element 6-323 may be formed as one piece, or they may be an identical element. The third reference element 6-833 and the fourth magnetic element 6-324 may be formed as one piece, or they may be an identical element. Therefore, required space may be reduced to achieve miniaturization.

As shown in FIG. 45C, when viewed along the main axis 6-O, at least a portion of the first sensing element 6-821 is in the third coil 6-313, at least a portion of the second sensing element 6-822 is in the third coil 6-313, and at least a portion of the third sensing element 6-823 is in the fourth coil 6-314. Therefore, required space may be reduced to achieve miniaturization.

Figure 47:
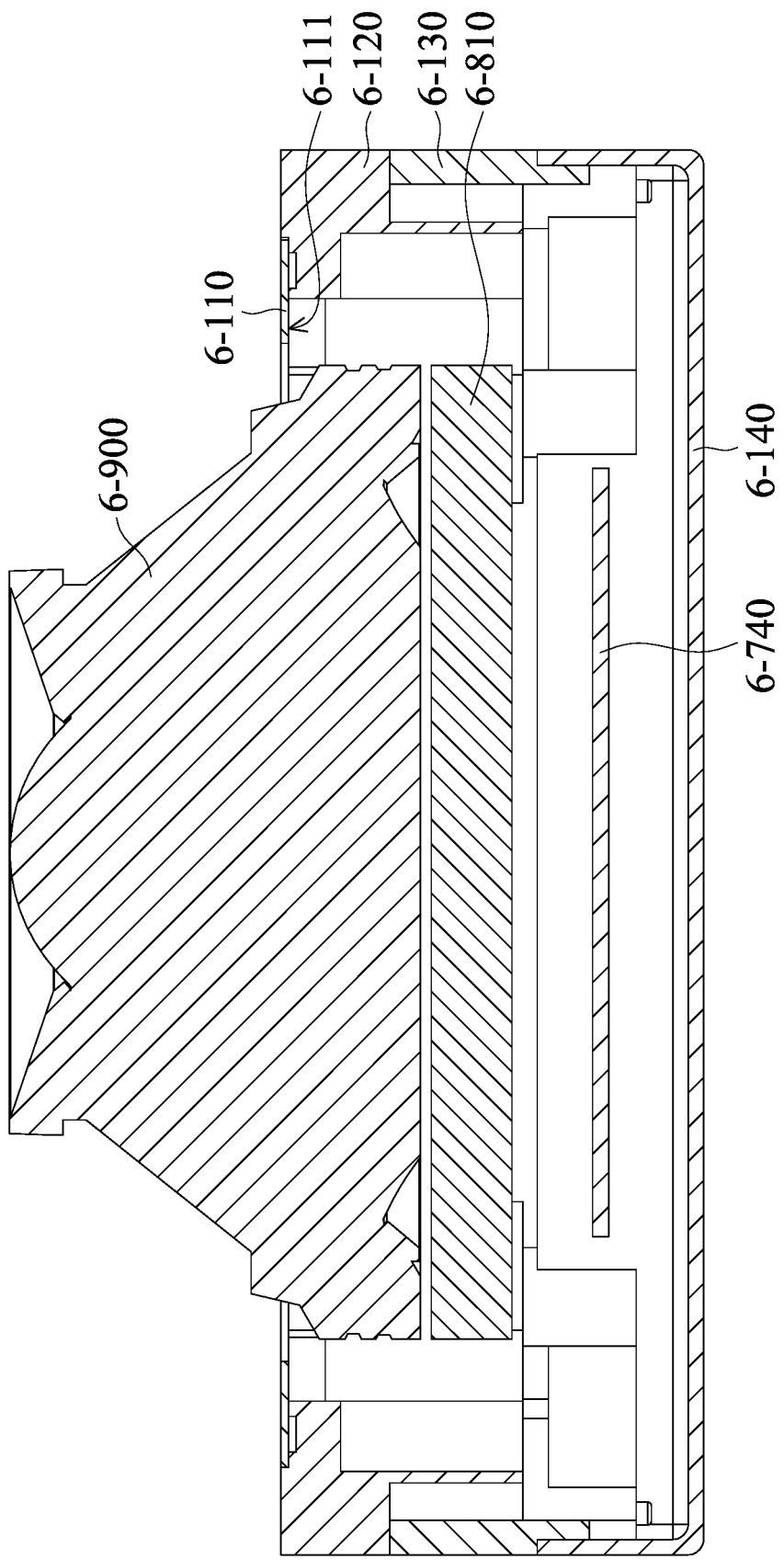
FIG. 47 is a cross-sectional view of an optical system in some embodiments of the present disclosure.

In some embodiments, a third optical element may be provided to achieve focus changing. FIG. 47 is a cross-sectional view of an optical system in some embodiments of the present disclosure. This optical system is similar to the optical system 6-1000, the difference is that a third optical element 6-810 is included between the first optical element 6-800 and the second optical element 6-740. The first optical element 6-800 may have a first lens, the third optical element 6-840 may have a second lens that have different focus to the first lens. In some embodiments, the first optical element 6-800 may move relative to the third optical element 6-810 in the Z direction to change focus, or the relative positions of the first optical element 6-800 and the third optical element 6-810 may be fixed. A surface 6-111 of the top cover 6-110 may face the first driving assembly 6-300, the optical sensor 6-710, the second optical element 6-740, and the third optical element 6-810.

Figure 48:
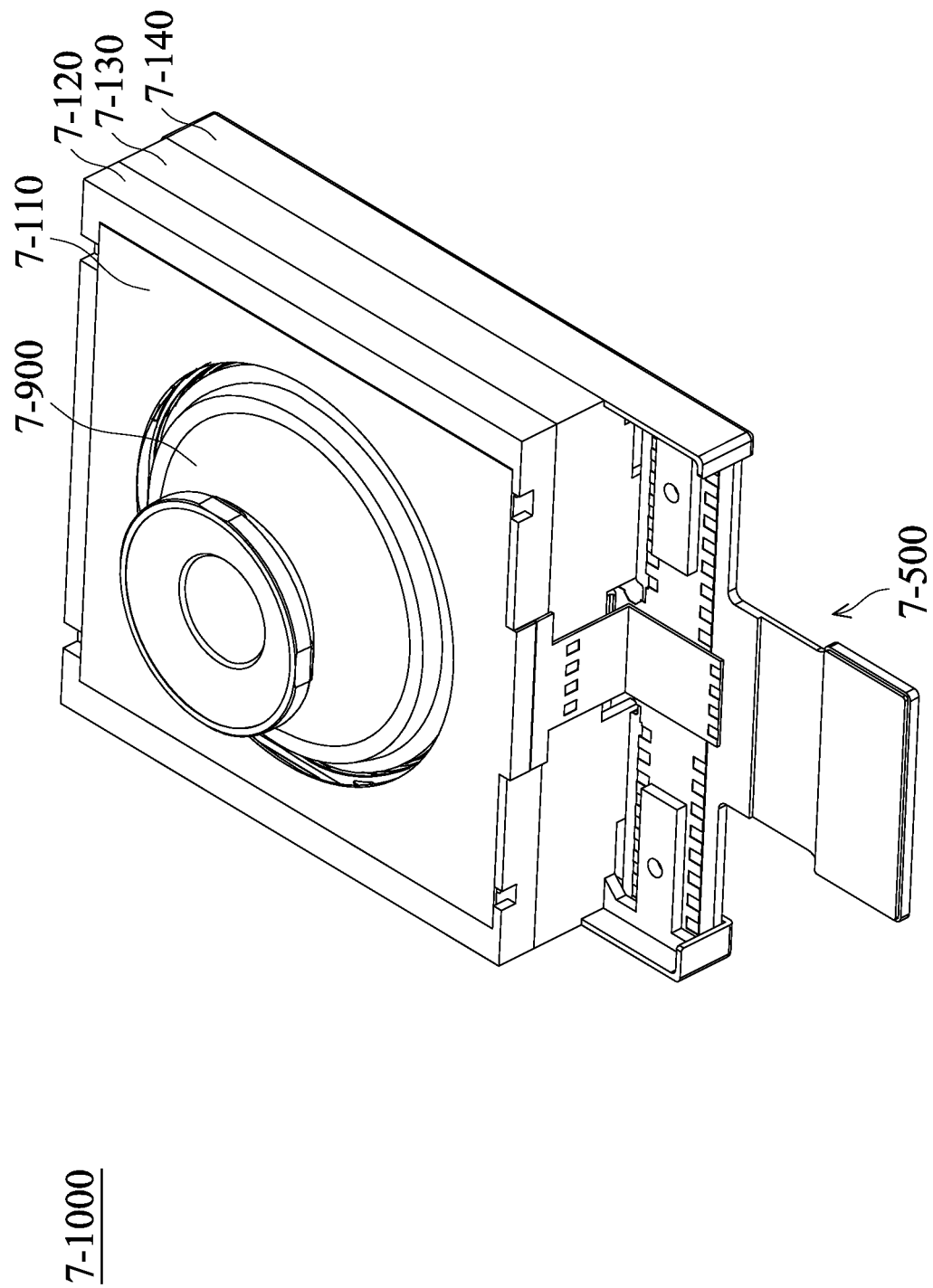
FIG. 48 is a perspective view of an optical system in some embodiments of the present disclosure.
Figure 49:
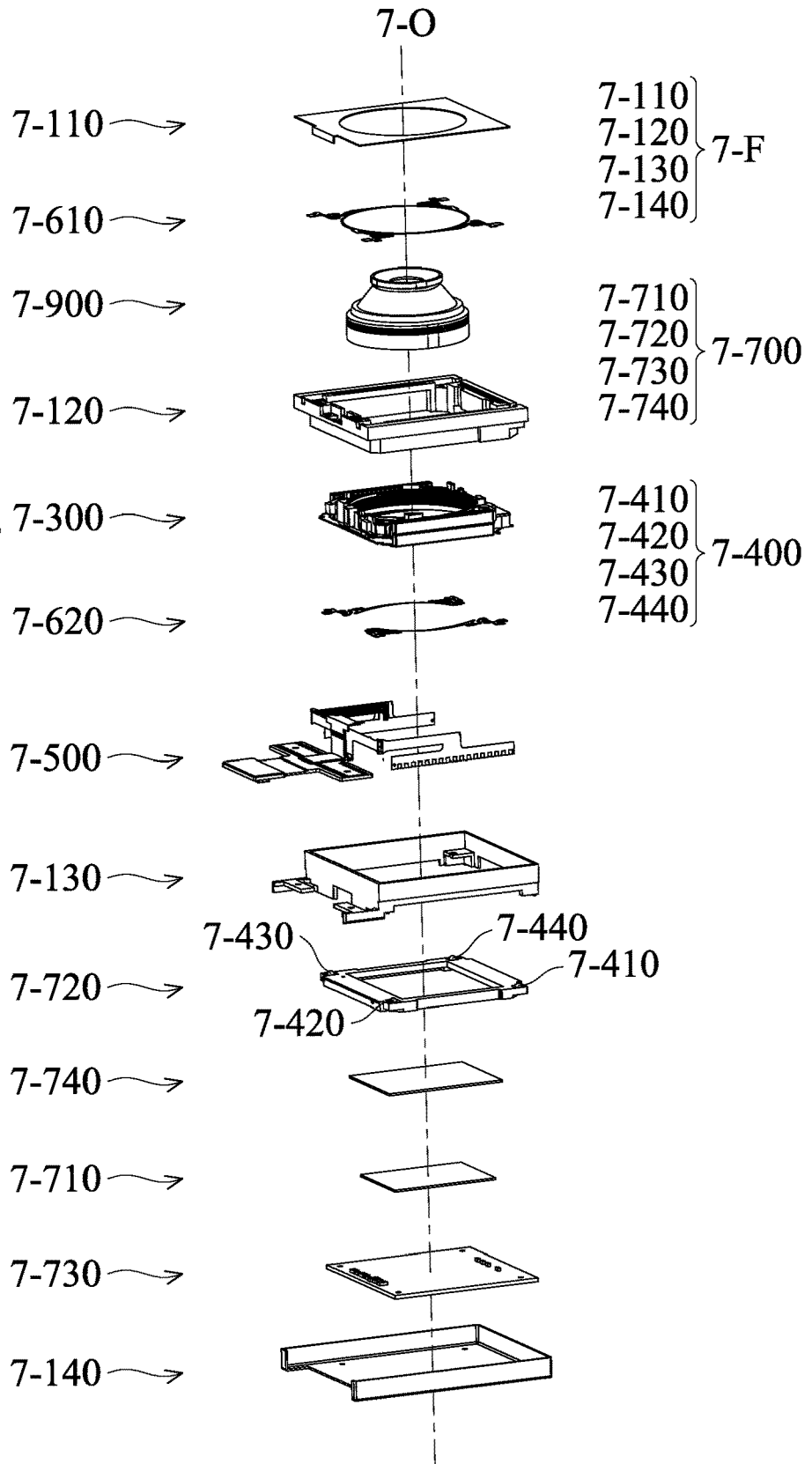
FIG. 49 is an exploded view of the optical system.
Figure 50:
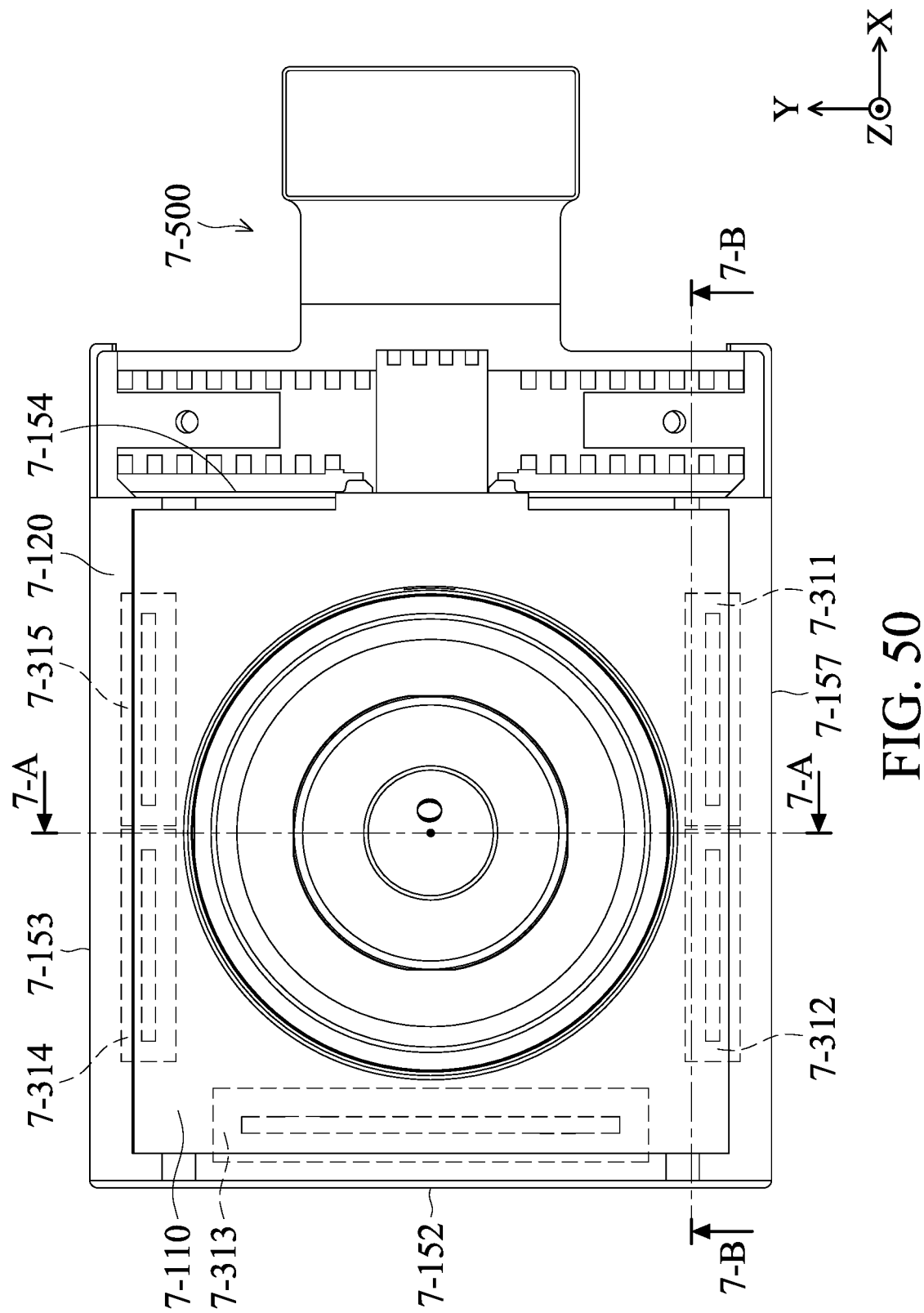
FIG. 50 is atop view of the optical system.
Figure 51:
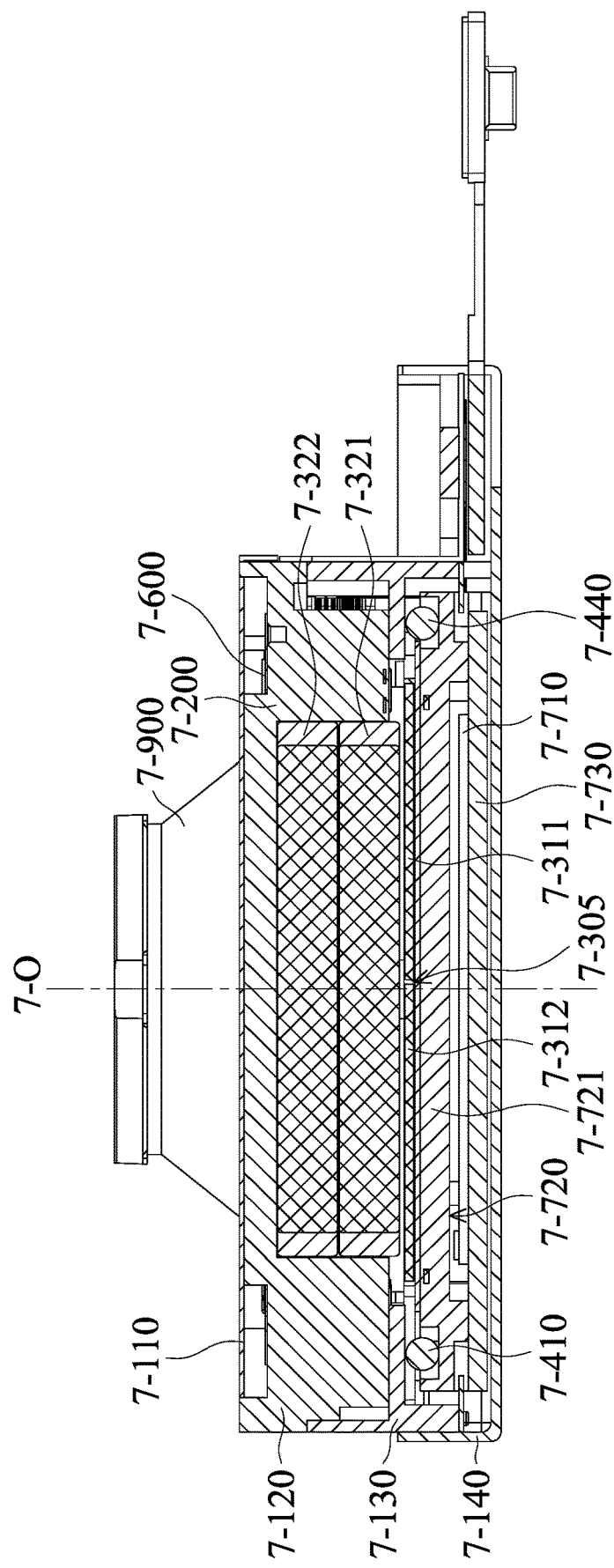
FIG. 51 is a perspective cross-sectional view of the optical system illustrated along a line 7-B-7-B in FIG. 50.

FIG. 48 is a perspective view of an optical system 7-1000 in some embodiments of the present disclosure. FIG. 49 is an exploded view of the optical system 7-1000. FIG. 50 is a top view of the optical system 7-1000. FIG. 51 is a perspective cross-sectional view of the optical system 7-1000 illustrated along a line 7-B-7-B in FIG. 50. FIG. 52A, FIG. 52B, FIG. 52C, FIG. 52D, and FIG. 52E are schematic views of some elements of the optical system 7-1000. FIG. 53 is a schematic view of the electronic device 7-2000.

In some embodiments, the optical system 7-1000 mainly includes a top plate 7-110, a frame 7-120, a case 7-130, a bottom plate 7-140, a holder 7-200, a first driving assembly 7-300, a coil substrate 7-305, a circuit module 7-500, a second resilient 7-610, and a third resilient 7-620 arranged in a main axis 7-O. The optical system 7-1000 may be disposed on a electronic device 7-2000 (FIG. 53), such as may be disposed on a cell phone, a tablet, or a notebook, but the present disclosure it not limited thereto.

The optical system 7-1000 may be used for driving a first optical element 7-900, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. In some embodiments, the first optical element 7-900 may has a first lens.

In some embodiments, the top plate 7-110, the frame 7-120, the case 7-130, and the bottom plate 7-140 may be called as a fixed portion 7-F affixed on the electronic device 7-2000. The electronic device 7-2000 may be a cell phone, a tablet, or a notebook.

In some embodiments, the optical sensor 7-710, the case body 7-720, the bottom 7-730, and the second optical element 7-740 may be called as an optical module 7-700, and the holder 7-200 may be called as movable portion 7-200, the movable portion 7-200 may be used for connecting to the optical module 7-700, and may be used for holding the first optical element 7-900 to move relative to the fixed portion 7-F or relative to the optical sensor 7-710 of the optical module 7-700.

The first driving assembly 7-300 may include a combination of magnets and coils, or may include piezoelectric elements or shape memory alloy elements, so the holder 7-200 and the first optical element 7-900 disposed in the holder 7-200 may move relative to the fixed portion 7-F or relative to the optical module 7-700. Therefore, auto focus (AF) or optical image stabilization may be achieved.

As shown in FIG. 52A to FIG. 52E, a first coil 7-311, a second coil 7-312, a third coil 7-313, a fourth coil 7-314, and a fifth coil 7-315 may be embedded in the coil substrate 7-305. The first coil 7-311 and the second coil 7-312 may correspond to a first magnetic unit 7-331, the third coil 7-313 may correspond to a third magnetic element 7-323, and the fourth coil 7-314 and the fifth coil 7-315 may correspond to a second magnetic unit 7-332, such as may overlap each other in the Z direction. The first magnetic unit 7-331 includes a first magnetic element 7-321 and a second magnetic element 7-322, the second magnetic unit 7-332 includes a fourth magnetic element 7-324 and a fifth magnetic element 7-325 that may arrange in the Z direction. The first magnetic element 7-321, the second magnetic element 7-322, the third magnetic element 7-323, the fourth magnetic element 7-324, and the fifth magnetic element 7-325 may be magnets to generate a magnetic field. When current is passed through the first coil 7-311, the second coil 7-312, the third coil 7-313, the fourth coil 7-314, or the fifth coil 7-315, they may interact with the magnetic field to generate a driving force, so the movable portion 7-200 may be driven to move relative to the fixed portion 7-F.

In some embodiments, the first coil 7-311, the second coil 7-312, the third coil 7-313, and the fourth coil 7-314 may be electrically isolated, so the first coil 7-311, the second coil 7-312, the third coil 7-313, and the fourth coil 7-314 may be controlled separately to provide driving forces with different directions to the movable portion 7-200, such as to achieve translational movement in the X, the Y, or the Z direction, or rotation relative to the X, the Y, or the Z axis. Moreover, the fifth coil 7-315 may be electrically isolated to the second coil 7-312, the third coil 7-313, and the fourth coil 7-314, but be electrically connected to the first coil 7-311 to increase the driving force.

Figure 52B:
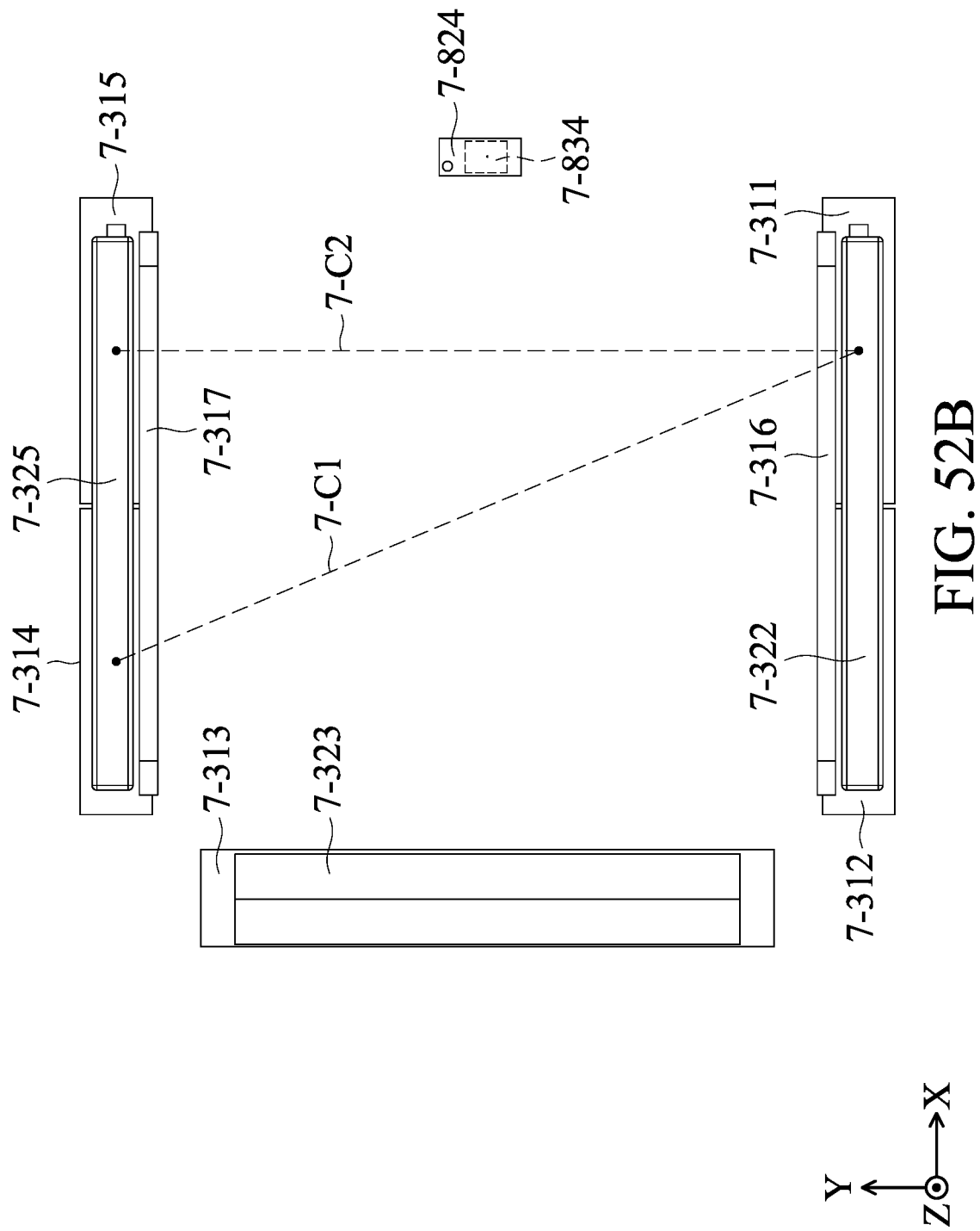
Figure 53:
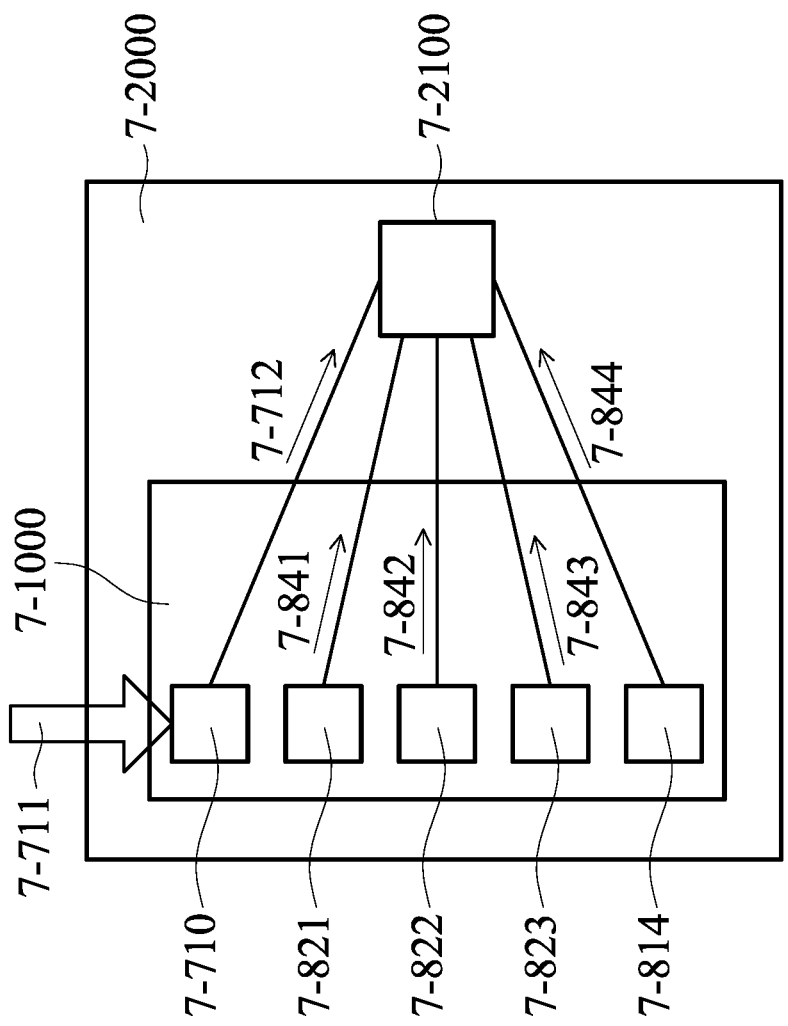
FIG. 53 is a schematic view of the electronic device.

As shown in FIG. 52B, when viewed in the Z direction, a connection 7-C1 between the center of the first coil 7-311 and the center of the fourth coil 7-314 is not perpendicular or not parallel to a first direction (the X direction) or a second direction (the Y direction). Moreover, a connection 7-C2 between the center of the first coil 7-311 and the center of the fifth coil 7-315 may be parallel to the first direction (the X direction). In other words, the first coil 7-311 and the fifth coil 7-315 may arrange in the Y direction.

As shown in FIG. 50, when viewed along the main axis 7-O, the fixed portion 7-F is polygonal and has a first side 7-151, a second side 7-152, a third side 7-153, and a fourth side 7-154 that arrange in a counterclockwise manner. The first coil 7-311 and the second coil 7-312 are at the first side 7-151 of the fixed portion 7-F, the third coil 7-313 is at the second side 7-152 of the fixed portion 7-F, the fourth coil 7-314 and the fifth coil 7-315 is at the third side 7-153 of the fixed portion 7-F. The first side 7-151 extends in the first direction (the X direction), the second side 7-152 extends in the second direction (the Y direction), the third side 7-153 is parallel to the first side 7-151, the fourth side 7-154 is parallel to the second side 7-152. The first side 7-151 is between the second side 7-152 and the fourth side 7-154, and the second side 7-152 is between the first side 7-151 and the third side 7-153.

Figure 52C:
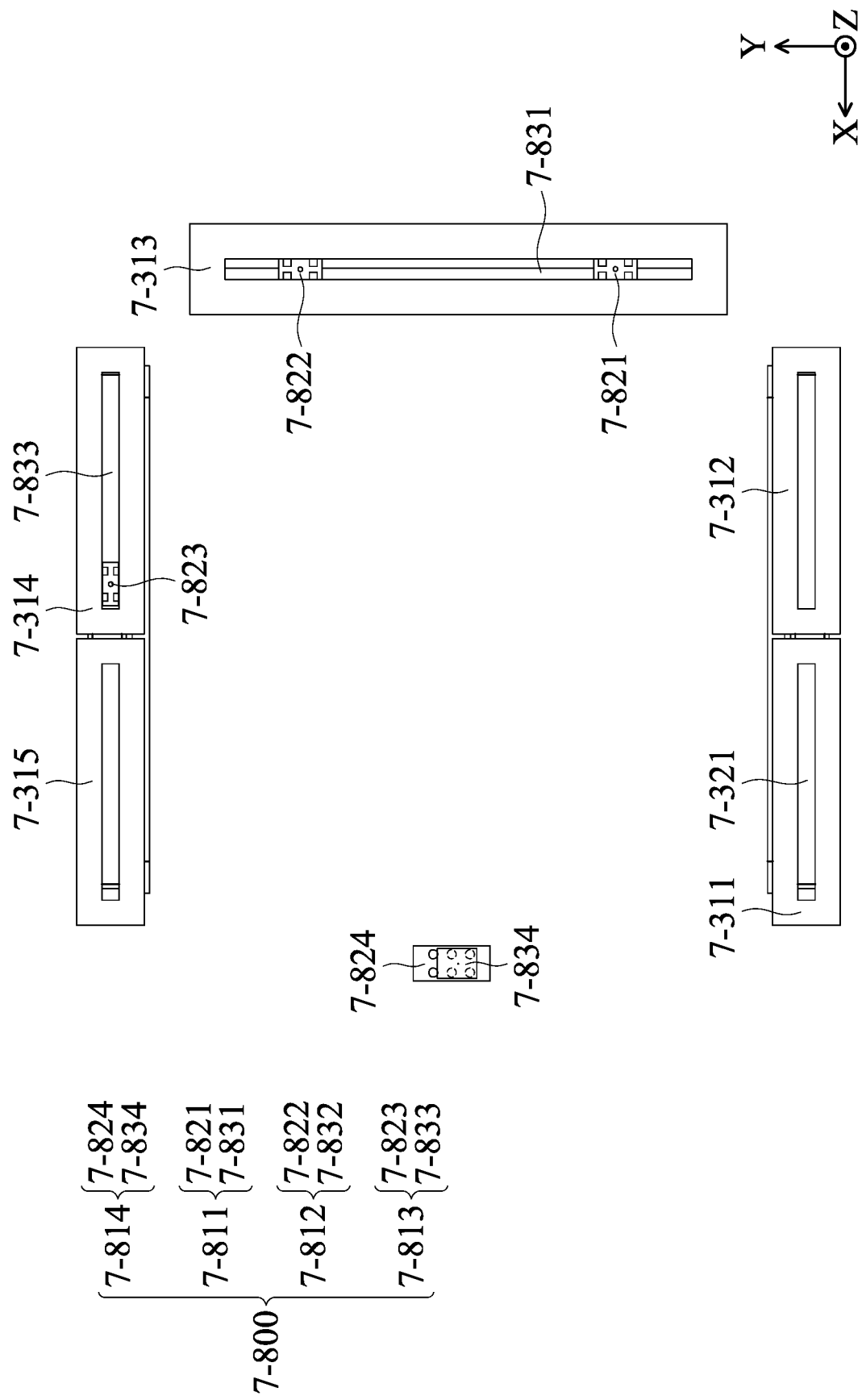
Figure 52D:
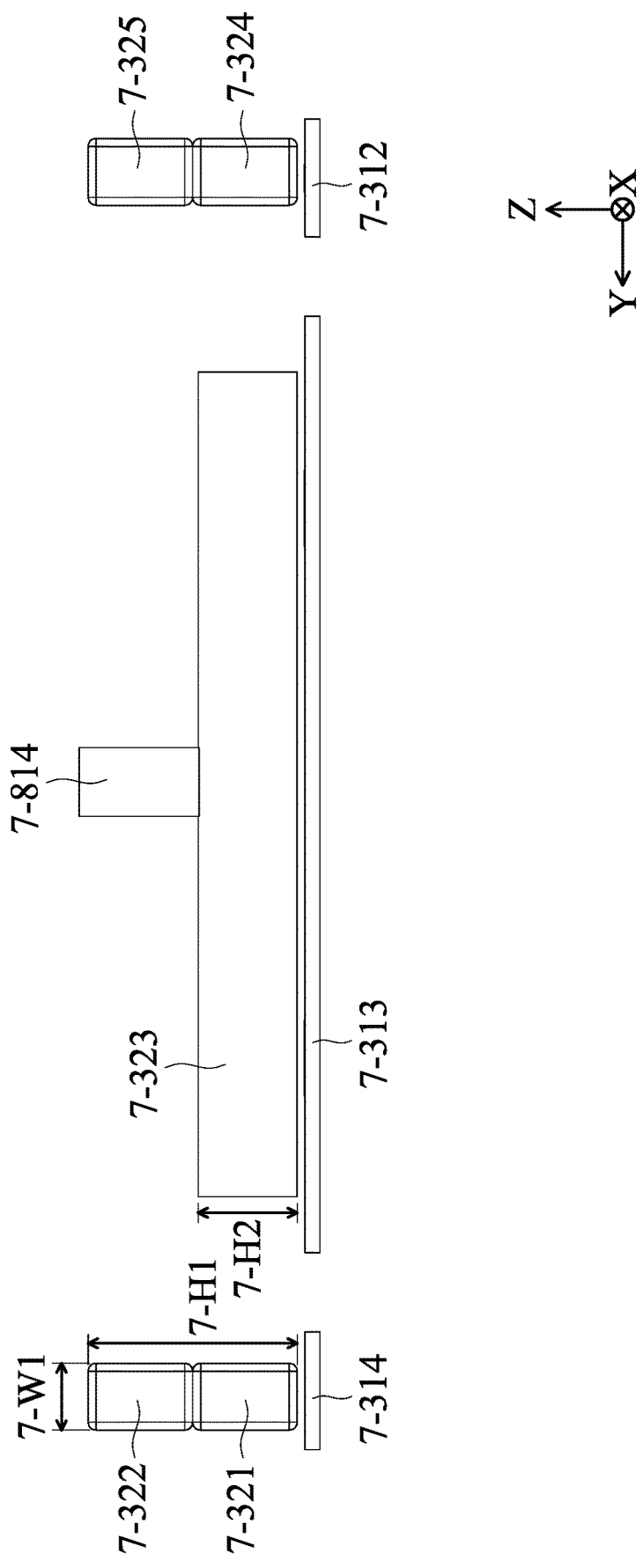
Figure 52E:
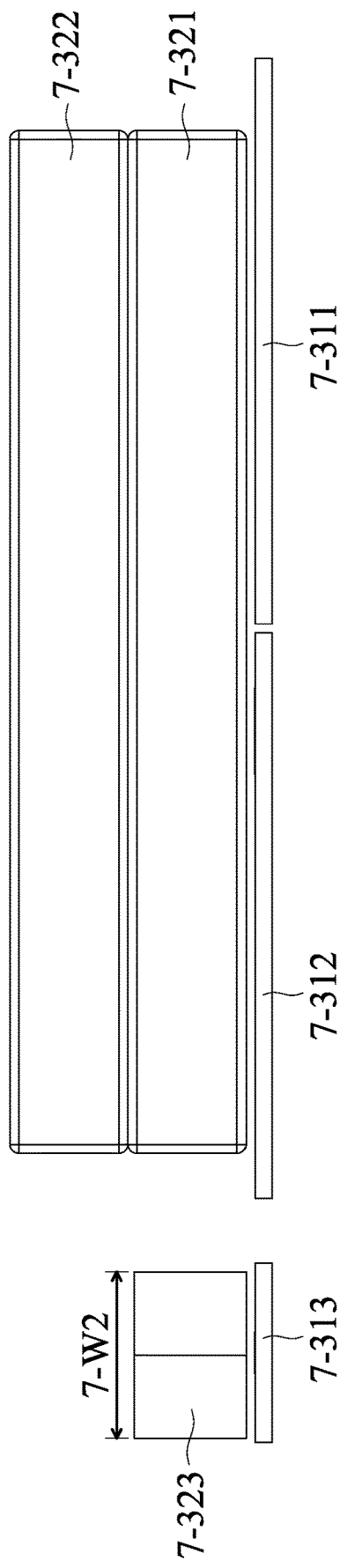

As shown in FIG. 52D and FIG. 52E, a maximum dimension 7-H1 (height) of the first magnetic unit 7-331 is different from a maximum dimension 7-H2 of the third magnetic element 7-323 in the direction that the main axis 7-O extends (i.e. the Z direction). For example, the maximum dimension 7-H1 may be greater than the maximum dimension 7-H2. Moreover, a maximum dimension 7-W1 of the first magnetic unit 7-331 in the second direction (the Y direction) is different from a maximum dimension 7-W2 of the third magnetic element 7-323 in the first direction (the X direction), such as the maximum dimension 7-W1 may be less than the maximum dimension 7-W2.

The optical system 7-1000 may have a second driving assembly 7-340 used for driving the movable portion 7-200 to move relative to the fixed portion 7-F. The first driving assembly 7-300 and the second driving assembly 7-340 may drive the movable portion 7-200 in different directions. The second driving assembly 7-340 may include a sixth coil 7-316 and a seventh coil 7-317 respectively correspond to the first magnetic unit 7-331 and the second magnetic unit 7-332, such as at least partially overlap each other in the Y direction. When viewed along the main axis 7-O, the sixth coil 7-316 may be at the first side 7-151, and the seventh coil 7-317 may be at the third side 7-153.

The optical system 7-1000 may further include a support module 7-400, which includes a first stabilize element 7-410, a second stabilize element 7-420, a third stabilize element 7-430, and a fourth stabilize element 7-440 in the recesses at the corners of the case 7-720. As shown in FIG. 49 and FIG. 51, the first stabilize element 7-410, the second stabilize element 7-420, the third stabilize element 7-430, and the fourth stabilize element 7-440 may be spherical shaped and in direct contact with the case 7-720 and the bottom 7-730. In some embodiments, the first stabilize element 7-410, the second stabilize element 7-420, the third stabilize element 7-430, and the fourth stabilize element 7-440 may be in direct contact with the case 7-720 and the movable portion 7-200, such as disposed between the case 7-720 and the movable portion 7-200 in the Z direction to allow the movable portion 7-200 to move relative to the case 7-720.

The second resilient 7-610, and the third resilient 7-620 may be disposed between the fixed portion 7-F and the movable portion 7-200 to movably connect the fixed portion 7-F and the movable portion 7-200, so the movable portion 7-200 may be movably connected to the fixed portion 7-F. In some embodiments, the second resilient 7-610 and the third resilient 7-620 may be springs which are plate-shaped and perpendicular to the main axis 7-O. The second resilient 7-610, and the third resilient 7-620 may include metal for electrically connected to the electronic elements in the optical system 7-1000, such as the first driving assembly 7-300 or the circuit module 7-500.

The circuit module 7-500 may be a flexible printed circuit which may be affixed on the fixed portion 7-F by glue. In this embodiment, the circuit module 7-500 is electrically connected to other electronic elements inside or outside the optical system 7-1000. For example, electrical signal may be transferred through the circuit module 7-500 to the first driving assembly 7-300 or the second driving assembly 7-340 to control the movement of the holder 7-200 in the X, the Y, or the Z direction, so auto focus or optical image stabilization may be achieved. As shown in FIG. 53, the 710 may receive an optical signal 7-711 and provide an image signal 7-712 to a control unit 7-2100 of the electronic device 7-2000.

The optical sensor 7-710 and the second optical element 7-740 of the optical module 7-700 may be disposed in an accommodating space formed by the case body 7-720 and the bottom 7-730. For example, the optical sensor 7-710 and the case body 7-720 may be affixed on the bottom 7-730. The case body 7-720 may include a case body 7-720 which is plate-shaped and perpendicular to the main axis 7-O. The optical sensor 7-710 may position between the top cover 7-721 and the bottom 7-730 in the direction that the main axis 7-0 extends (the Z direction).

The second optical element 7-740 may be a light filter which may only specific light to pass through and achieve the optical sensor 7-710. Other light with undesired wavelength may be removed. For example, the second optical element 7-740 may remove infrared and allow visible light to pass through, but the present is not limited thereto. In some embodiments, the second optical element 7-740 may correspond the optical sensor 7-710. Therefore, the light received by the optical sensor 7-710 may be closer to the light received by eyes.

In some embodiments, as shown in FIG. 52C, a position sensing module 7-800 may be provided in the optical system 7-1000 to detect the movement of the movable portion 7-200 relative to the fixed portion 7-F. In some embodiments, the position sensing module 7-800 may include a first position sensing assembly 7-811, a second sensing assembly 7-812, a third sensing assembly 7-813, and a fourth sensing assembly 7-814. The first position sensing assembly 7-811 may include a first sensing element 7-821 and a first reference element 7-831, the second sensing assembly 7-812 may include a second sensing element 7-822 and a second reference element 7-832, the third sensing assembly 7-813 may include a third sensing element 7-823 and a third reference element 7-833, and the fourth sensing assembly 7-814 may include a fourth sensing element 7-824 and a fourth reference element 7-834.

The first sensing element 7-821, the second sensing element 7-822, the third sensing element 7-823, and the fourth sensing element 7-824 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The first reference element 7-831, the second reference element 7-832, the third reference element 7-833, and the fourth reference element 7-834 may be magnets which may be disposed on the movable portion 7-200. The first sensing element 7-821, the second sensing element 7-822, the third sensing element 7-823, and the fourth sensing element 7-824 may be disposed on the fixed portion 7-F to detect the magnetic field change of the first reference element 7-831, the second reference element 7-832, the third reference element 7-833, and the fourth reference element 7-834 when the holder 7-200 moves relative to the fixed portion 7-F. Therefore, the position of the movable portion 7-200 relative to the fixed portion 7-F may be received, and a first sensing signal 7-841, a second sensing signal 7-842, a third sensing signal 7-843, and a fourth sensing signal 7-844 may be provided to the control unit 7-2100 of the electronic device 7-2000 by the first sensing element 7-821, the second sensing element 7-822, the third sensing element 7-823, and the fourth sensing element 7-824, respectively. The control unit 7-2100 may be used for receiving the first sensing signal 7-841, the second sensing signal 7-842, the third sensing signal 7-843, and the fourth sensing signal 7-844 to analyze the movement of the movable portion 7-200 relative to the fixed portion 7-F. For example, the control unit 7-2100 may analyze the translational movement of the movable portion 7-200 relative to the fixed portion 7-F or the rotation of the movable portion 7-200 with a first rotational axis (the main axis 7-0). The main axis 7-O may be perpendicular to an optical signal 7-711 of the optical sensor 7-710 (FIG. 51).

In some embodiments, the position of the first reference element 7-831, the second reference element 7-832, the third reference element 7-833, or the fourth reference element 7-834 may be interchanged with the position of the first sensing element 7-821, the second sensing element 7-822, the third sensing element 7-823, or the fourth sensing element 7-824, depending on design requirement.

When viewed along the main axis 7-O, the first position sensing assembly 7-811 and the second sensing assembly 7-812 are arranged in a direction that is not parallel or not perpendicular to a direction that the second sensing assembly 7-812 and the third sensing assembly 7-813 arrange. For example, the first position sensing assembly 7-811 and the second sensing assembly 7-812 may arrange in the Y direction (i.e. perpendicular to the first direction). The second sensing assembly 7-812 and the third sensing assembly 7-813 may arrange in a direction that is not parallel or not perpendicular to the Y axis. As a result, the movement of the movable portion 7-200 in different directions may be detected. In some embodiments, the first position sensing assembly 7-811 and the second sensing assembly 7-812 may arrange in the X direction (i.e. parallel to the first direction).

In some embodiments, the first reference element 7-831, the second reference element 7-832, and the third magnetic element 7-323 may be formed as one piece, or they may be an identical element. The third reference element 7-833 and the fourth magnetic element 7-324 may be formed as one piece, or they may be an identical element. Therefore, required space may be reduced to achieve miniaturization.

As shown in FIG. 52C, when viewed along the main axis 7-O, at least a portion of the first sensing element 7-821 is in the third coil 7-313, at least a portion of the second sensing element 7-822 is in the third coil 7-313, and at least a portion of the third sensing element 7-823 is in the fourth coil 7-314. Therefore, required space may be reduced to achieve miniaturization.

Figure 54:
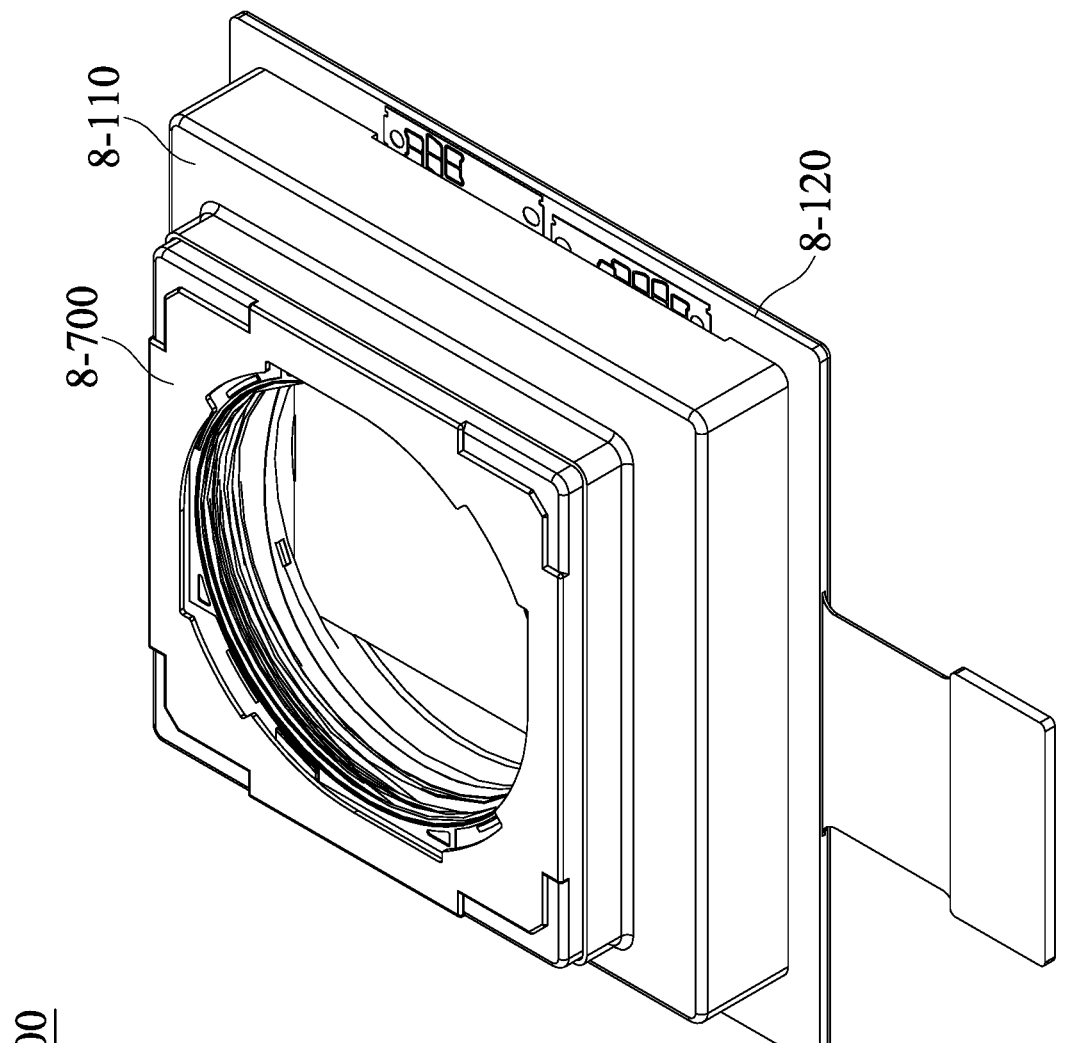
FIG. 54 is a schematic view of the optical system in some embodiments of the present disclosure.
Figure 55:
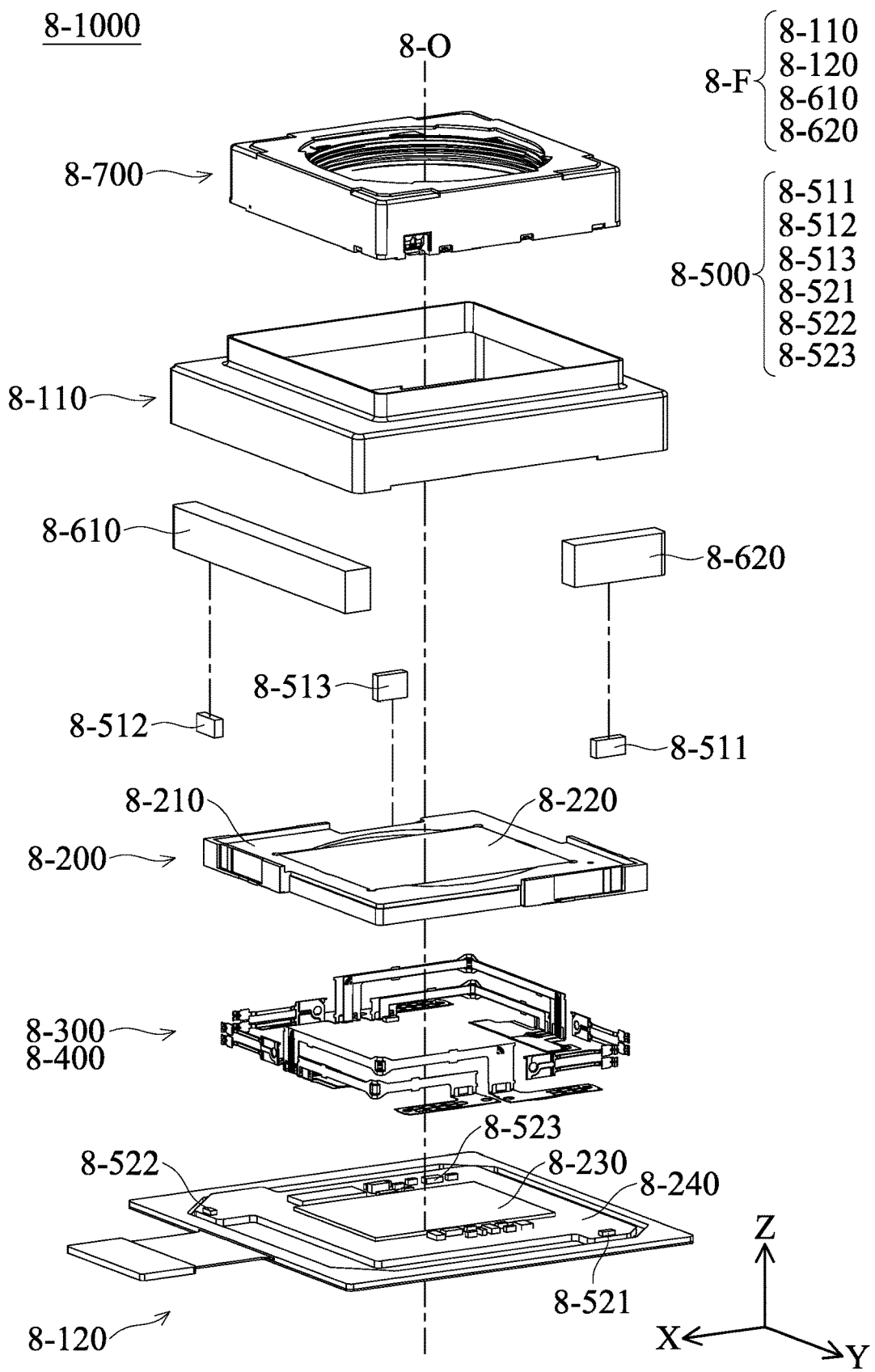
FIG. 55 is an exploded view of the optical system.
Figure 56:
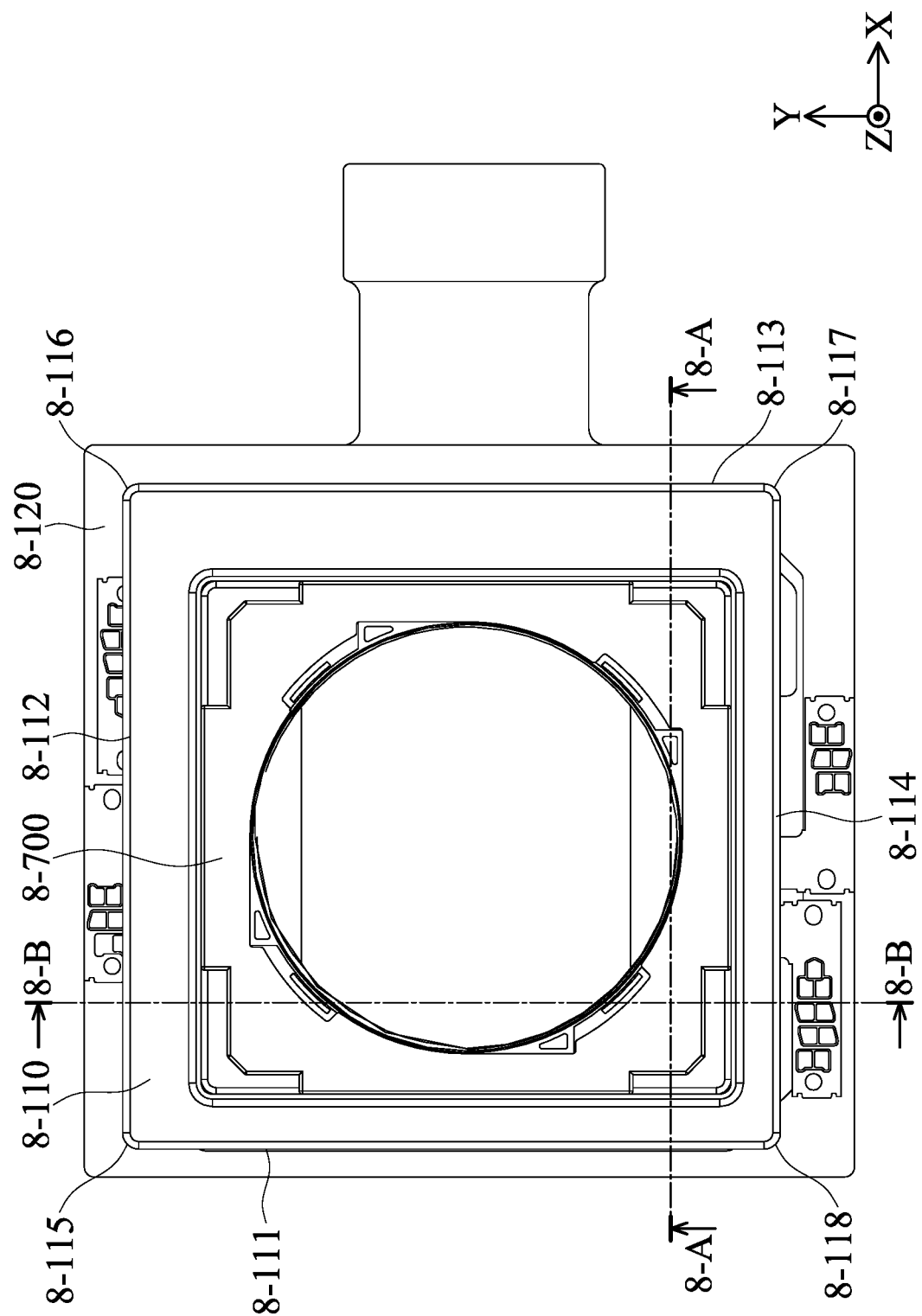
FIG. 56 is a top view of the optical system.
Figure 57A:
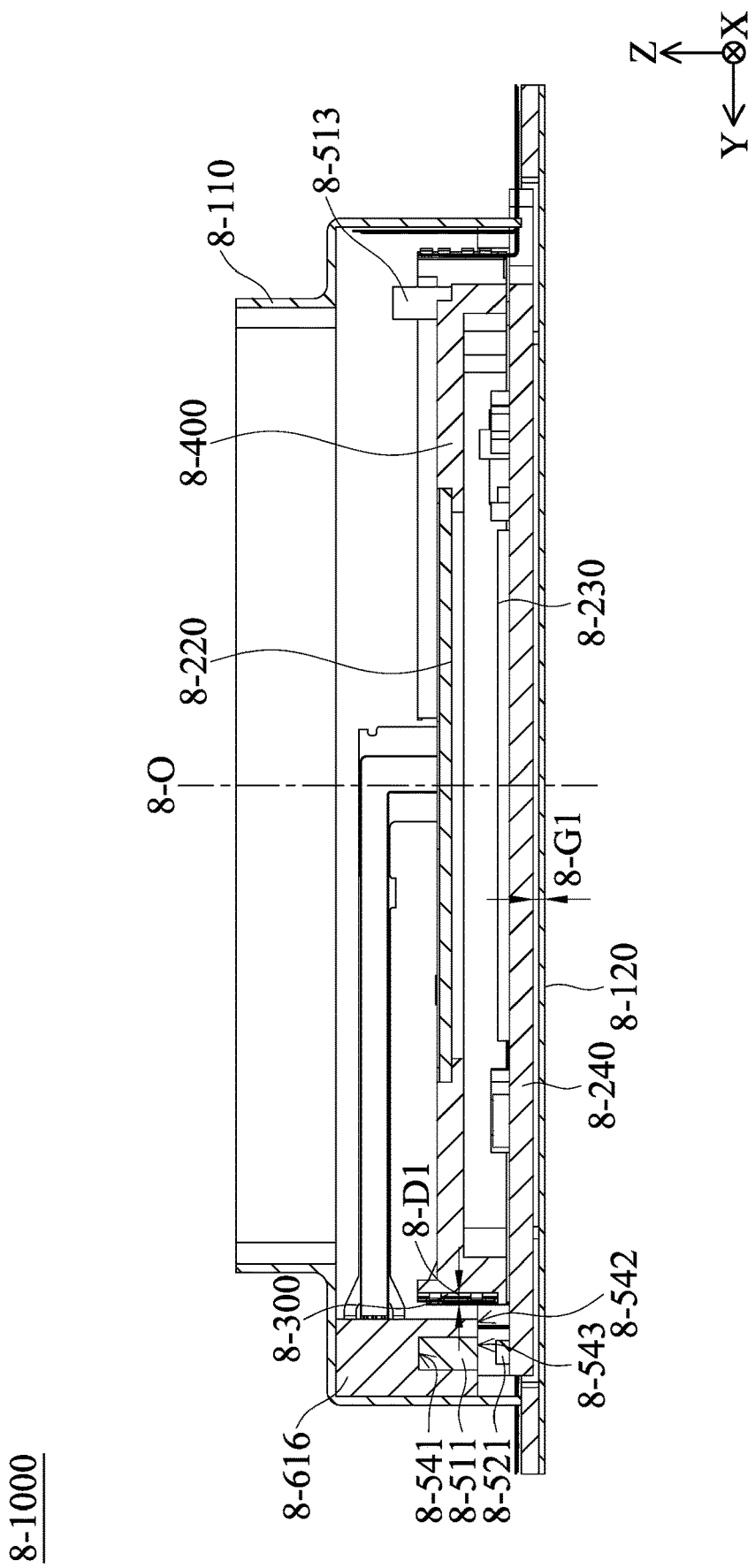
FIG. 57A is a cross-sectional view illustrated along a line 8-A-8-A in FIG. 56.
Figure 57B:
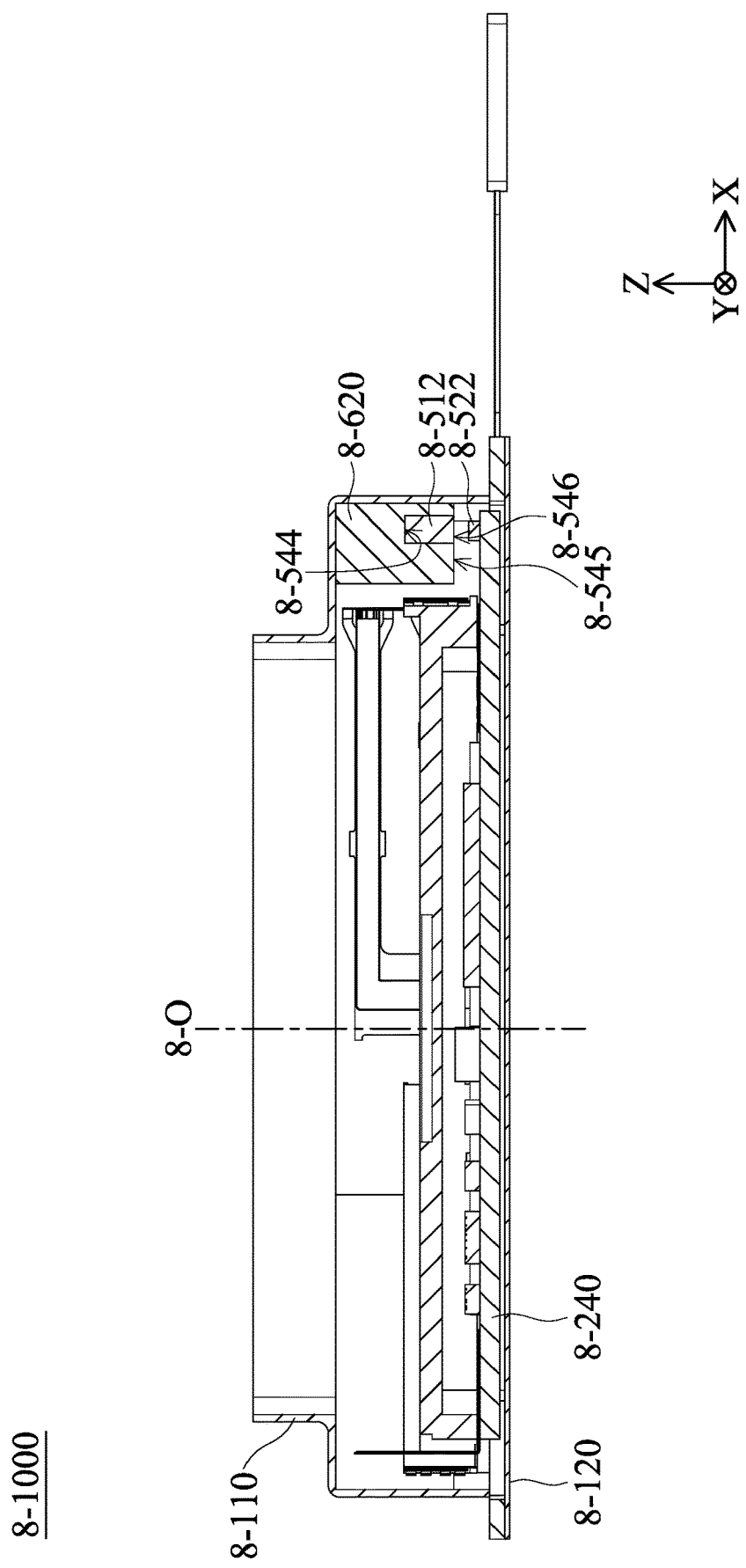
FIG. 57B is a cross-sectional view illustrated along a line 8-B-8-B in FIG. 56.
Figure 58A:
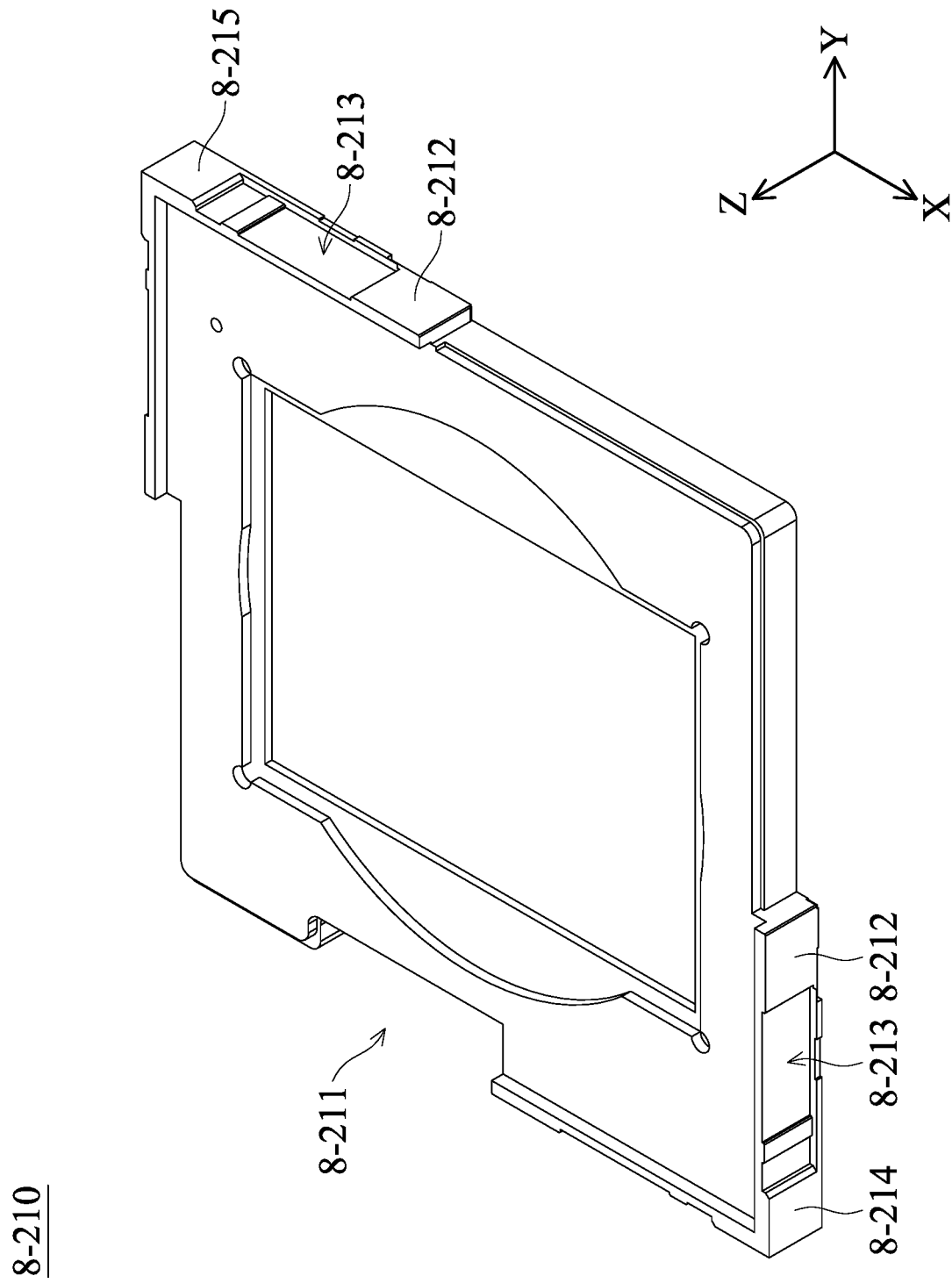
FIG. 58A is a schematic view of the holder.
Figure 58B:
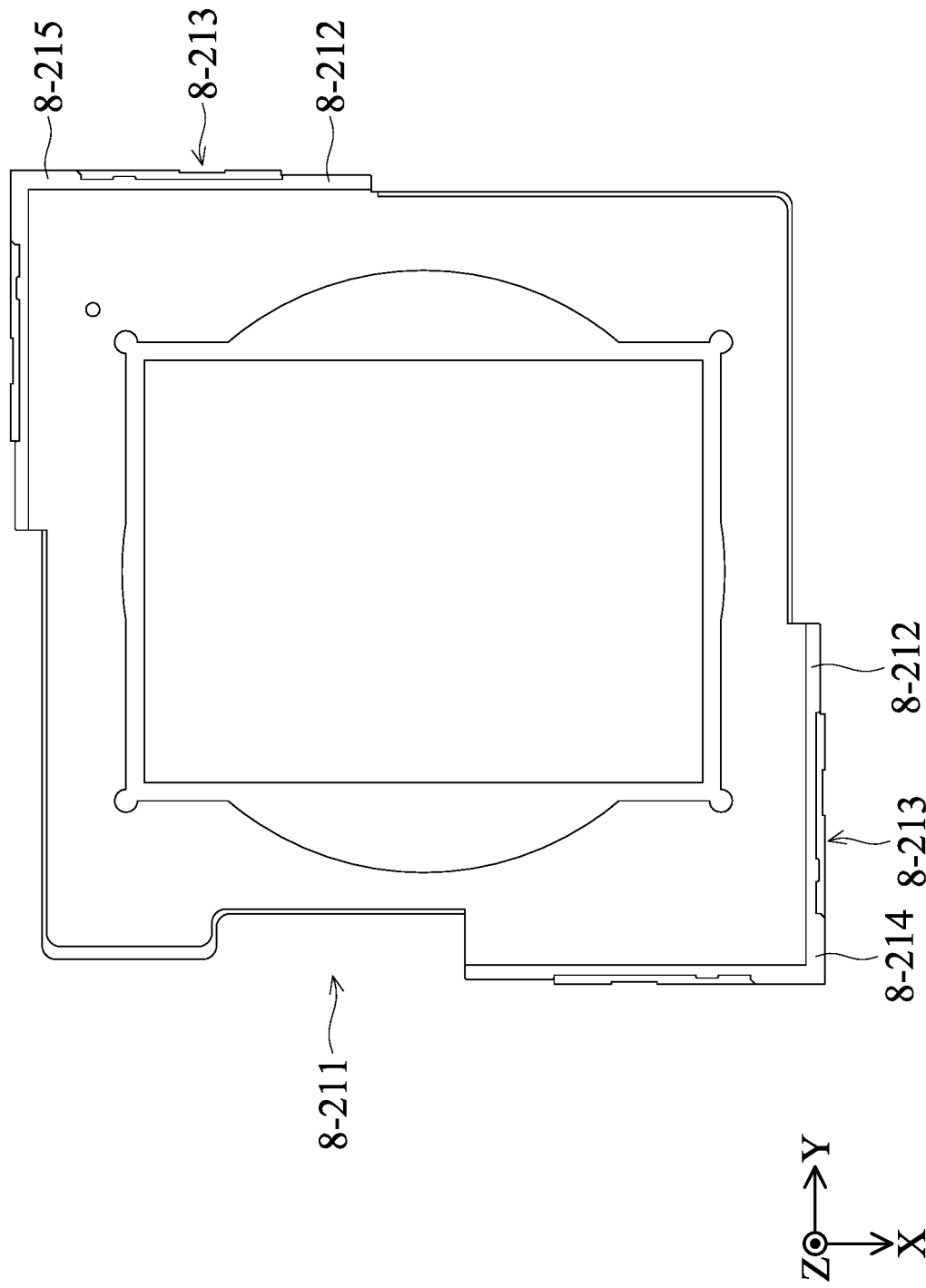
FIG. 58B is a top view of the holder.
Figure 58C:
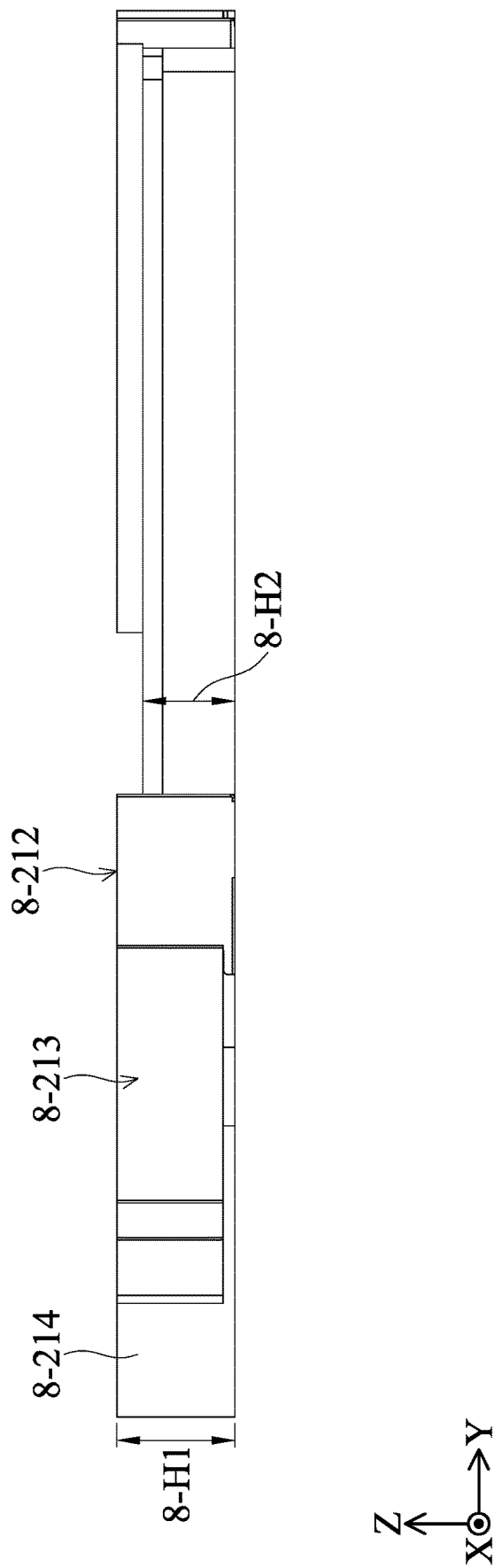
FIG. 58C is a side view of the holder.
Figure 59A:
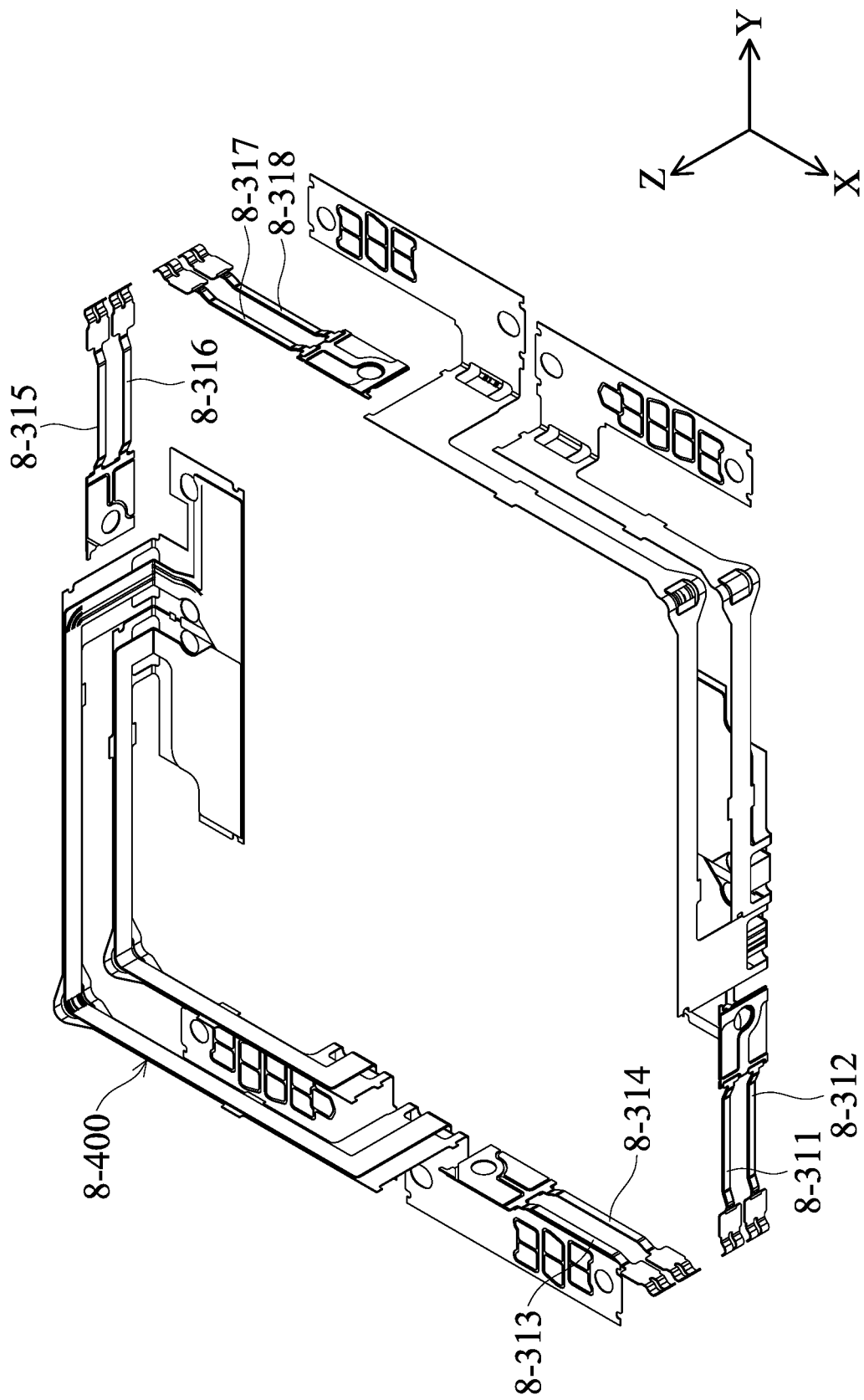
FIG. 59A is a schematic view of the circuit assembly and the driving assembly.
Figure 59B:
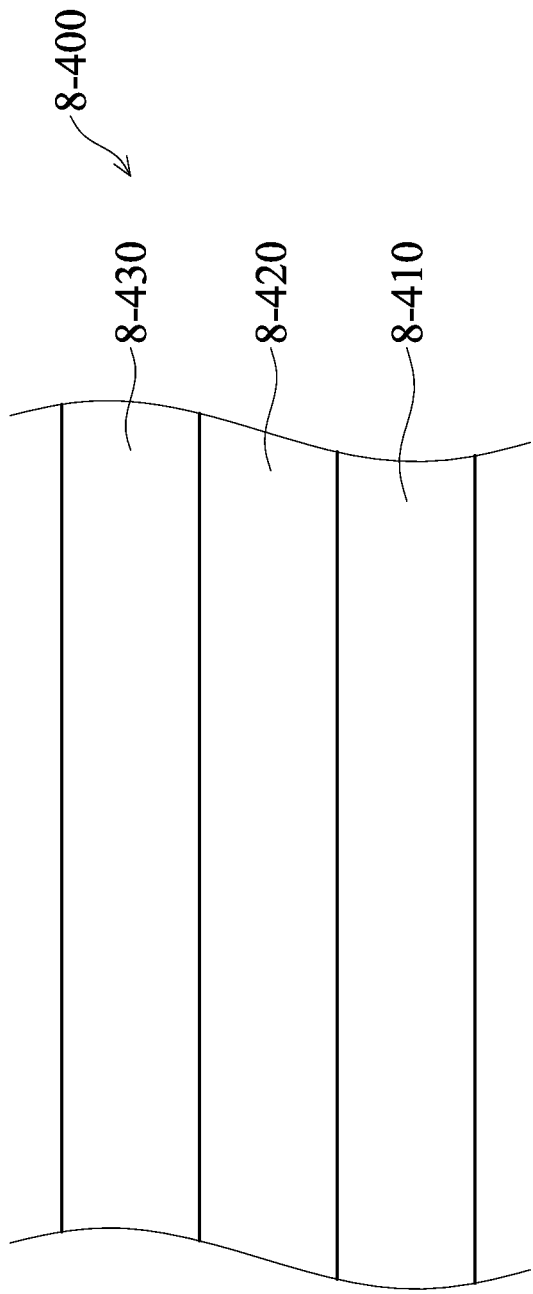
FIG. 59B is detailed a schematic view of the circuit assembly.
Figure 59C:
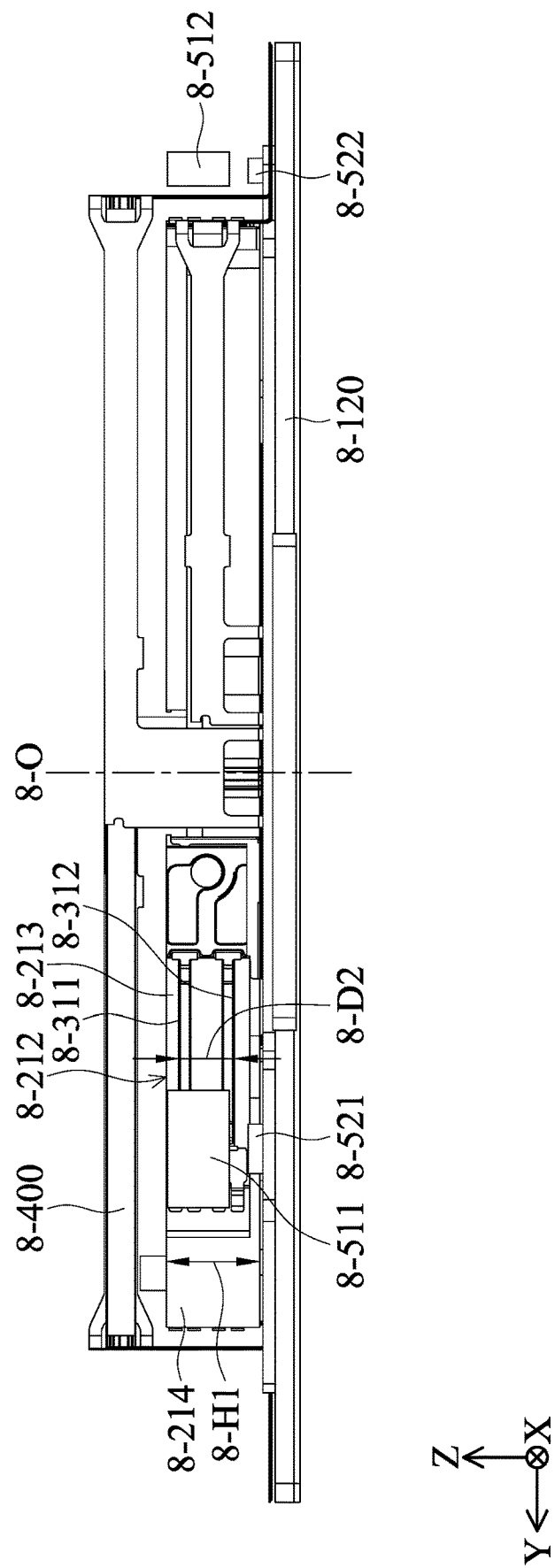
FIG. 59C is a schematic view of some elements of the optical system.
Figure 60A:
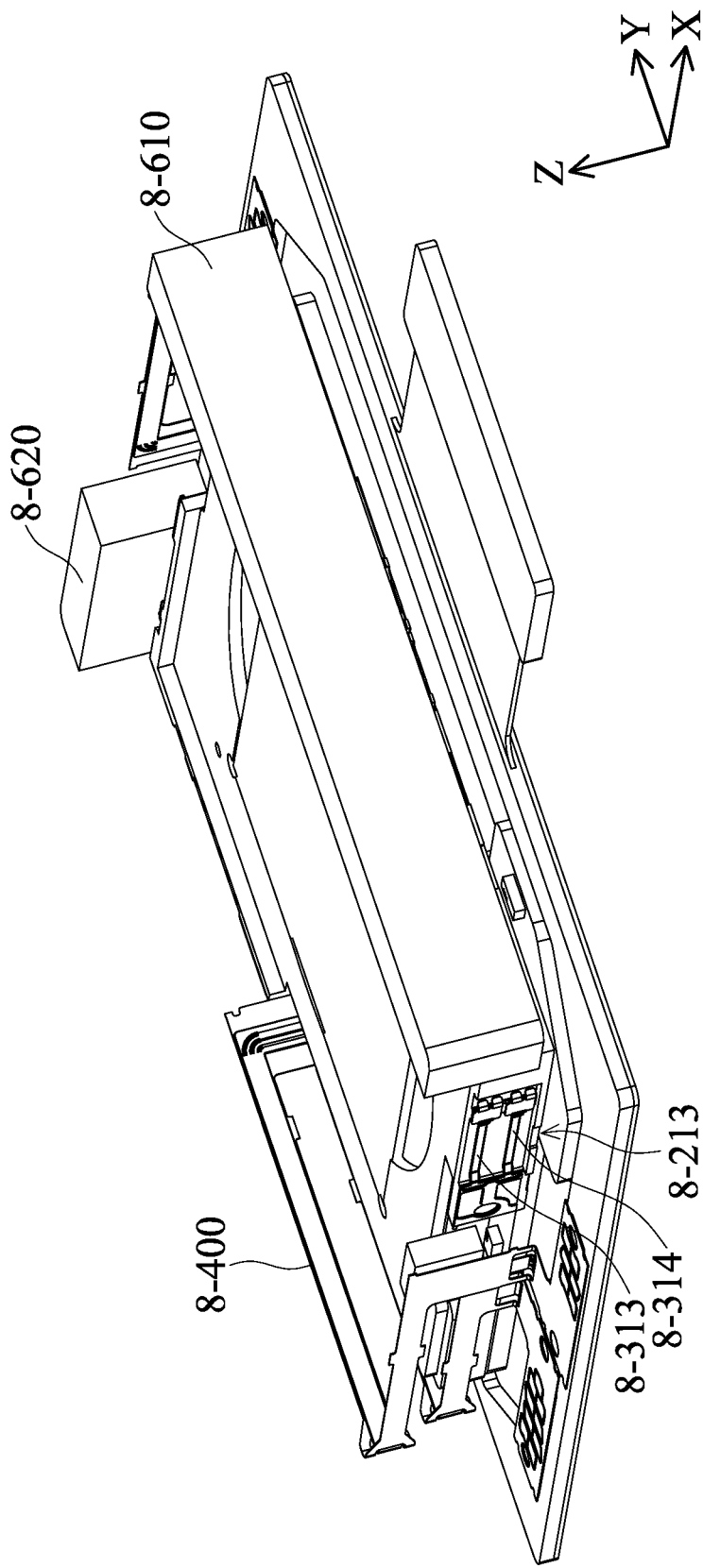
FIG. 60A is a schematic view of some elements of the optical system.
Figure 60B:
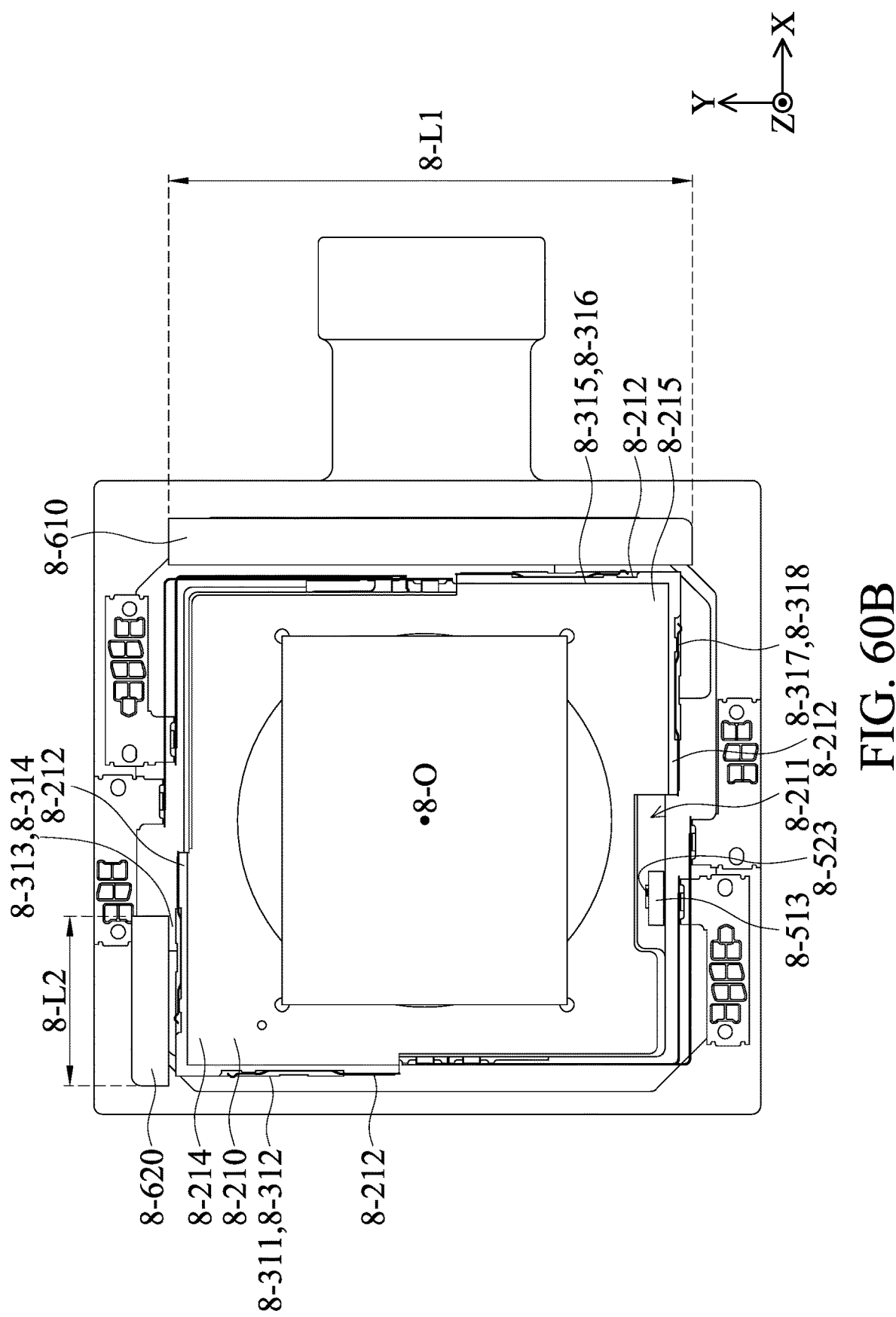
FIG. 60B is a schematic view of some elements of the optical system.
Figure 60C:
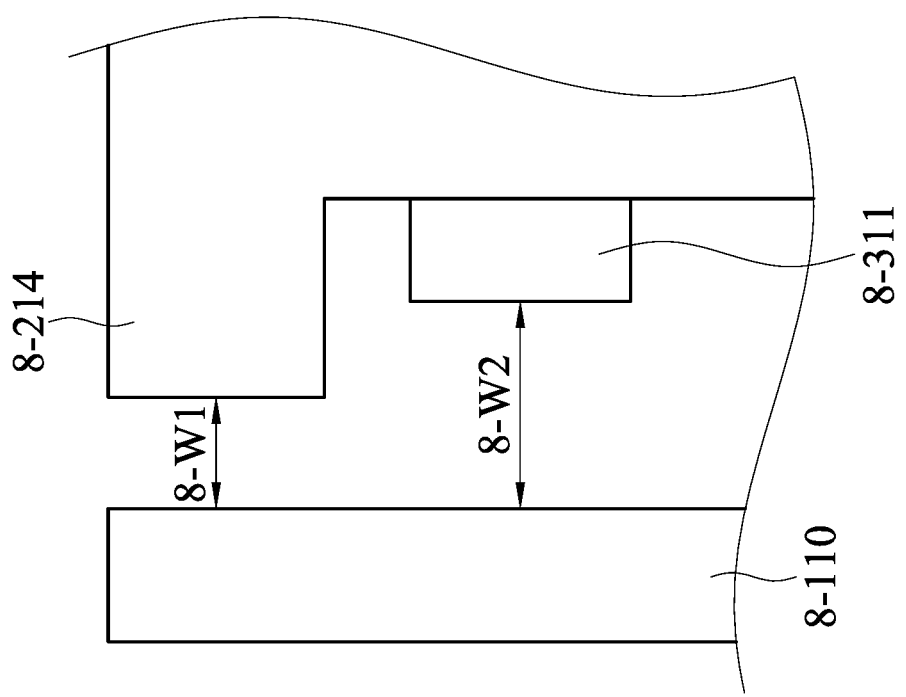
FIG. 60C is a detailed schematic view of some elements of the optical system.
Figure 61:
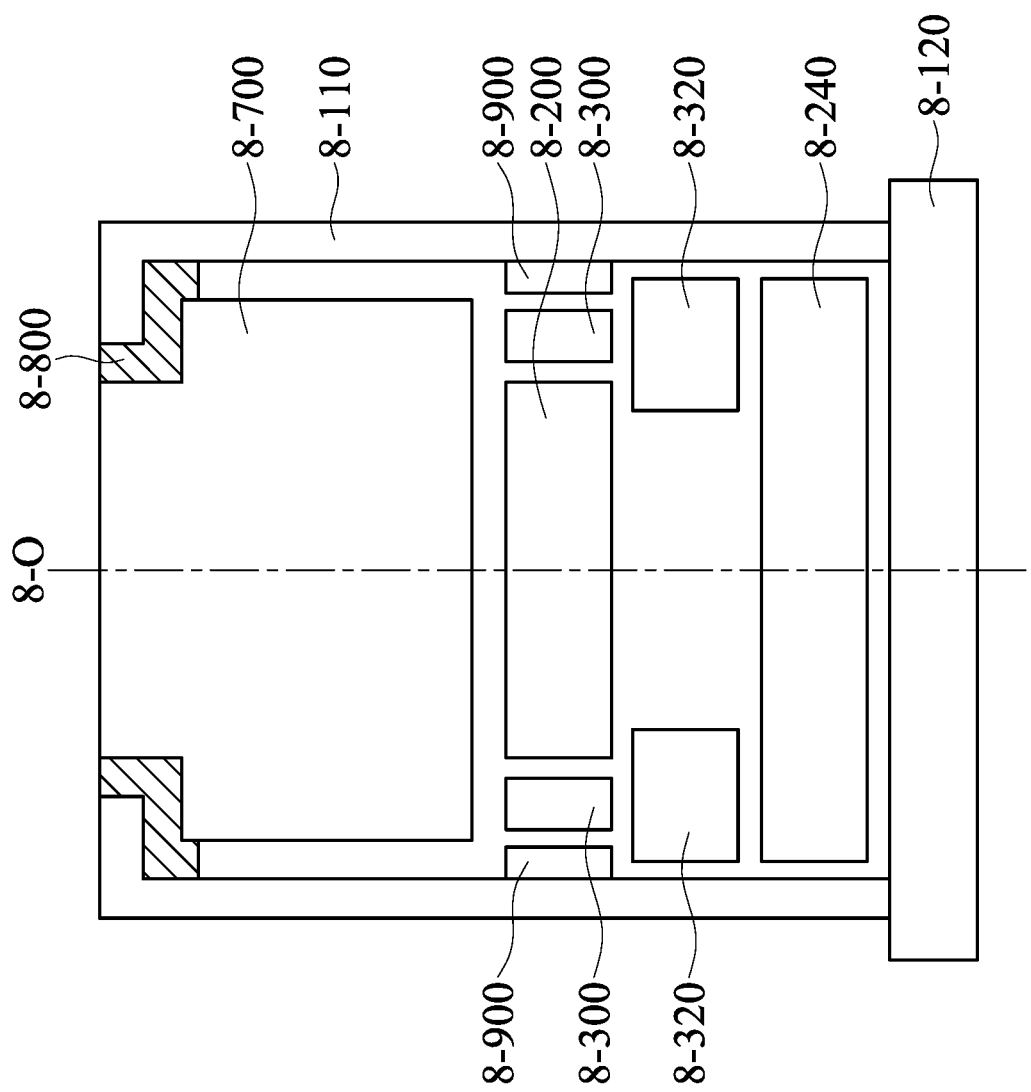
FIG. 61 is a schematic view of some elements of the optical system.

FIG. 54 is a schematic view of the optical system in some embodiments of the present disclosure. FIG. 55 is an exploded view of the optical system. FIG. 56 is a top view of the optical system. FIG. 57A is a cross-sectional view illustrated along a line 8-A-8-A in FIG. 56. FIG. 57B is a cross-sectional view illustrated along a line 8-B-8-B in FIG. 56. FIG. 58A is a schematic view of the holder. FIG. 58B is a top view of the holder. FIG. 58C is a side view of the holder. FIG. 59A is a schematic view of the circuit assembly and the driving assembly. FIG. 59B is detailed a schematic view of the circuit assembly. FIG. 59C is a schematic view of some elements of the optical system. FIG. 60A is a schematic view of some elements of the optical system. FIG. 60B is a schematic view of some elements of the optical system. FIG. 60C is a detailed schematic view of some elements of the optical system. FIG. 61 is a schematic view of some elements of the optical system.

In some embodiments, the optical system 8-1000 includes a case 8-110, a bottom 8-120, a movable portion 8-200, a substrate 8-240, a driving assembly 8-300, a circuit assembly 8-400, a sensing assembly 8-500, a first blocking element 8-610, and a second blocking element 8-620 arranged in a main axis 8-O. The optical system 8-1000 is used for holding a optical module 8-700. In some embodiments, the optical system 8-1000 may be disposed on an electronic device, such as a cell phone, a tablet, or a notebook.

In some embodiments, the case 8-110, the bottom 8-120, the first blocking element 8-610, and the second blocking element 8-620 may be called as a fixed portion 8-F used for holding the optical module 8-700. i.e. the optical module 8-700 may be affixed on the fixed portion 8-F. The movable portion 8-200 is movable relative to the fixed portion 8-F and may hold a optical element 8-220.

In some embodiments, the optical system 8-1000 may hold the optical element 8-220 and the optical sensor 8-230, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, as shown in FIG. 59, the driving assembly 8-300 may include a first driving element 8-311, a second driving element 8-312, a third driving element 8-313, a fourth driving element 8-314, a fifth driving element 8-315, a sixth driving element 8-316, a seventh driving element 8-317, an a eighth driving element 8-318 that are electrically connected to the circuit assembly 8-400.

In some embodiments, as shown in FIGS. 58A, 5B, and 7B, the holder 8-210 of the movable portion 8-200 includes a first concave portion 8-211 recessed in a direction that is perpendicular to the main axis 8-O (e.g. the Y direction). The third reference unit 8-513 and the third sensing unit 8-523 may be disposed in the first concave portion 8-211 to protect the third reference unit 8-513 and the third sensing unit 8-523. Along the main axis 8-O (Z direction), the holder 8-210 of the movable portion 8-200 does not overlap the third reference unit 8-513 and the third sensing unit 8-523.

The holder 8-210 may include a extending portion 8-212, a second concave portion 8-213 and a first limit portion 8-214 (or a second limit portion 8-215) is on the extending portion 8-212. The extending portion 8-212 extends from the holder 8-210 in a direction that is perpendicular to the main axis 8-O, and formed as one piece with the holder 8-210. As shown in FIG. 58C, in the Z direction, the extending portion 8-212 has a first height 8-H1, the holder 8-210 has a second height 8-H2, and the first height 8-H1 is higher than the second height 8-H2. i.e. the extending portion 8-212 is higher than the holder 8-210.

As shown in FIG. 56 and FIG. 60B, the first limit portion 8-214 of the holder 8-210 is at the first corner 8-115, the second limit portion 8-215 is at the third corner 8-117. The first limit portion 8-214 or the second limit portion 8-215 may protrude from the holder 8-210 in the X or Y direction, as shown in FIG. 60C. i.e. a distance W1 between the first limit portion 8-214 and the fixed portion 8-F is less than a distance W2 between the first driving element 8-311 and the fixed portion 8-F to protect the first driving element 8-311.

The material of the driving assembly 8-300 includes shape memory alloy, and the driving assembly 8-300 may connect to the fixed portion 8-F and the movable portion 8-200 to move the movable portion 8-200 relative to the fixed portion 8-F. In a beginning state (e.g. no current is pass through the driving assembly 8-300), the driving assembly 8-300 is separated form one of the movable portion 8-200 or the fixed portion 8-F.

The first driving element 8-311 and the second driving element 8-312, the third driving element 8-313 and the fourth driving element 8-314, the fifth driving element 8-315 and the sixth driving element 8-316, or the seventh driving element 8-317 and the eighth driving element 8-318 may arrange in a first direction (Z direction) which is parallel to the main axis 8-O.

Refer to FIG. 56 and FIG. 60B, wherein the optical module 8-700 and the case 8-110 are omitted in FIG. 60B. The fixed portion 8-F and the optical module 8-700 may be polygonal, and the fixed portion 8-F may include a first side 8-111, a second side 8-112, a third side 8-113, and a fourth side 8-114 arranged in a clockwise manner. The first side 8-111 and the second side 8-112 define a first corner 8-115, the second side 8-112 and the third side 8-113 define a second corner 8-116, the third side 8-113 and the fourth side 8-114 define a third corner 8-117, the fourth side 8-114 and the first side 8-111 define a fourth corner 8-118.

In some embodiments, the first driving element 8-311 and the second driving element 8-312 may be disposed on the first side 8-111, the third driving element 8-313 and the fourth driving element 8-314 may be disposed on the second side 8-112, the fifth driving element 8-315 and the sixth driving element 8-316 may be disposed on the third side 8-113, the seventh driving element 8-317 and the eighth driving element 8-318 may be disposed on the fourth side 8-114. The first driving element 8-311, the second driving element 8-312, the third driving element 8-313, and the fourth driving element 8-314 may be disposed at the first corner 8-115. The fifth driving element 8-315, the sixth driving element 8-316, the seventh driving element 8-317, and the eighth driving element 8-318 may at the third corner 8-117.

However, the present disclosure is not limited thereto. For example, as shown in FIG. 61, the optical system 8-1000 may further include a 320 disposed between the movable portion 8-200 and the substrate 8-240 in the Z direction, and the substrate 8-240 and the bottom 8-120 may have a gap 8-G1 to allow the substrate 8-240 moving relative to the bottom 8-120. For example, the substrate 8-240 may drive the movable portion 8-200 to move in the Z direction or flip, or may move with the movable portion 8-200. The 320 may have similar structure to the first driving element 8-311, and is not repeated. In some embodiments, a circuit element (not shown) may be embedded in the holder 8-210 to electrically and movably connected to the substrate 8-240.

As shown in FIG. 59C, the driving elements (e.g. the first driving element 8-311 and the second driving element 8-312) are disposed on the extending portion 8-212, such as disposed in the second concave portion 8-213 and at least partially exposed form the second concave portion 8-213. In the Z direction, the maximum distance 8-D2 between the first driving element 8-311 and the second driving element 8-312 is less than the first height 8-H1.

As shown in FIG. 57A, the driving assembly 8-300 (e.g. the first driving element 8-311), may be disposed on one of the movable portion 8-200 and the fixed portion 8-F, and separate from another one with a distance 8-first distance 8-D1.

As shown in FIG. 59B, the circuit assembly 8-400 includes a holding element 8-410, a resilient element 8-420, and a circuit unit 8-430. The resilient element 8-420 is between the holding element 8-410 and the circuit unit 8-430 to electrically isolate them. The hardness of the holding element 8-410 is higher than the resilient element 8-420. For example, the holding element 8-410 may include stainless steel, and the resilient element 8-420 may include plastic. The circuit unit 8-430 may include circuit to electrically connected to the driving assembly 8-300 for transferring signal.

The sensing assembly 8-500 may include a first reference unit 8-511, a second reference unit 8-512, a third reference unit 8-513, a first sensing unit 8-521, a second sensing unit 8-522, and a third sensing unit 8-523. The first reference unit 8-511 and the first sensing unit 8-521 may at least partially overlap each other in the Z direction, the second reference unit 8-512 and the second sensing unit 8-522 may at least partially overlap each other in the Z direction, the third reference unit 8-513 and the third sensing unit 8-523 may at least partially overlap each other in the Z direction.

In some embodiments, the sensing assembly 8-500 may be used for detecting the movement of the movable portion 8-200 relative to the fixed portion 8-F in first, second, and third dimensions that are different. For example, the first, second, and third dimensions may be translational movement in the X, Y, or Z directions, or maybe rotation with X, Y, or Z axes as the rotational axis, depending on design requirement.

In some embodiments, the first reference unit 8-511, the second reference unit 8-512 and the third reference unit 8-513 may be disposed on the fixed portion 8-F, and the first sensing unit 8-521, the second sensing unit 8-522, and the third sensing unit 8-523 may be disposed on the movable portion 8-200 to detect the movement of the movable portion 8-200 relative to the fixed portion 8-F.

As shown in FIG. 57A, the first reference unit 8-511 is disposed in the first blocking element 8-610 and at least partially overlaps from the first blocking element 8-610. For example, the first blocking element 8-610 includes a first surface 8-541 and a second surface 8-542, the first reference unit 8-511 includes a third surface 8-543. The first surface 8-541 and the second surface 8-542 faces in an identical direction, and the first surface 8-541 and the third surface 8-543 are parallel. The third surface 8-543 is between the first surface 8-541 and the second surface 8-542, or may be in an identical plane with the second surface 8-542. At least a portion of the third surface 8-543 is exposed form the third surface 8-543 to allow the magnetic field of the first reference unit 8-511 detected by the first sensing unit 8-521.

As shown in FIG. 57B, the second reference unit 8-512 is disposed in the second blocking element 8-620 and at least partially overlaps from the second blocking element 8-620. For example, the second blocking element 8-620 includes a fourth surface 8-544 and a fifth surface 8-545, the second reference unit 8-512 includes a sixth surface 8-546. The fourth surface 8-544 and the fifth surface 8-545 faces in an identical direction, and the fourth surface 8-544 and the sixth surface 8-546 are parallel. The sixth surface 8-546 is between the fourth surface 8-544 and the fifth surface 8-545, or may be in an identical plane with the fifth surface 8-545. At least a portion of the sixth surface 8-546 is exposed form the sixth surface 8-546 to allow the magnetic field of the second reference unit 8-512 detected by the second sensing unit 8-522.

Moreover, as shown in FIG. 60B, the length 8-L1 of the first blocking element 8-610 in the second (Y) direction is greater than the length 8-L2 of the second blocking element 8-620 in the third (X) direction, and the second and the third directions are different and perpendicular to the main axis 8-O.

The first blocking element 8-610 and the second blocking element 8-620 may include plastic, and the first blocking element 8-610 may be disposed between the first driving element 8-311 and the case 8-110 or between the second driving element 8-312 and the case 8-110, as shown in FIG. 57A. Therefore, the driving assembly 8-300 and the case 8-110 may be separated to reduce the thickness of the case 8-110.

As shown in FIG. 61, the optical system 8-1000 may include a driving assembly adhesive element 8-800 disposed between the optical module 8-700 and the case 8-110 to affix the optical module 8-700 and the case 8-110.

In some embodiments, as shown in FIG. 61, a spacer 8-900 may be disposed between the driving assembly 8-300 and the fixed portion 8-F to reduce the coefficient of friction between them, so debris may be prevented from occurring between the driving assembly 8-300 and the fixed portion 8-F. In some embodiments, the spacer 8-900 includes resin, and the fixed portion 8-F includes plastic or metal.

Figure 62:
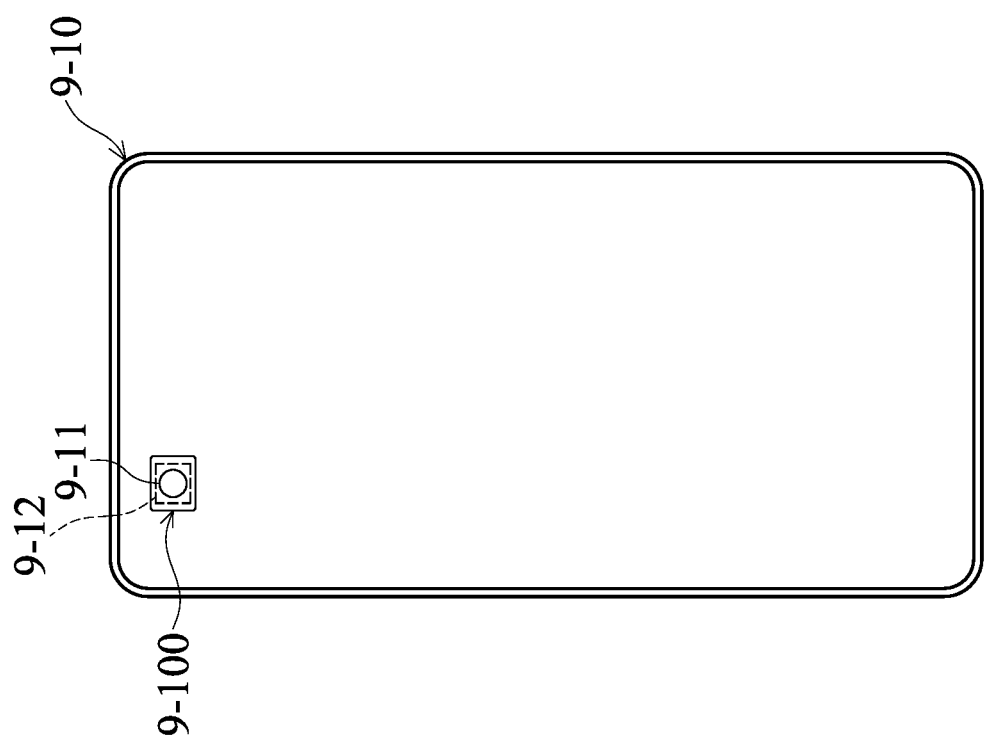
FIG. 62 is a schematic view of the electronic device, the first optical element, the second optical element, and the optical system.
Figure 63:
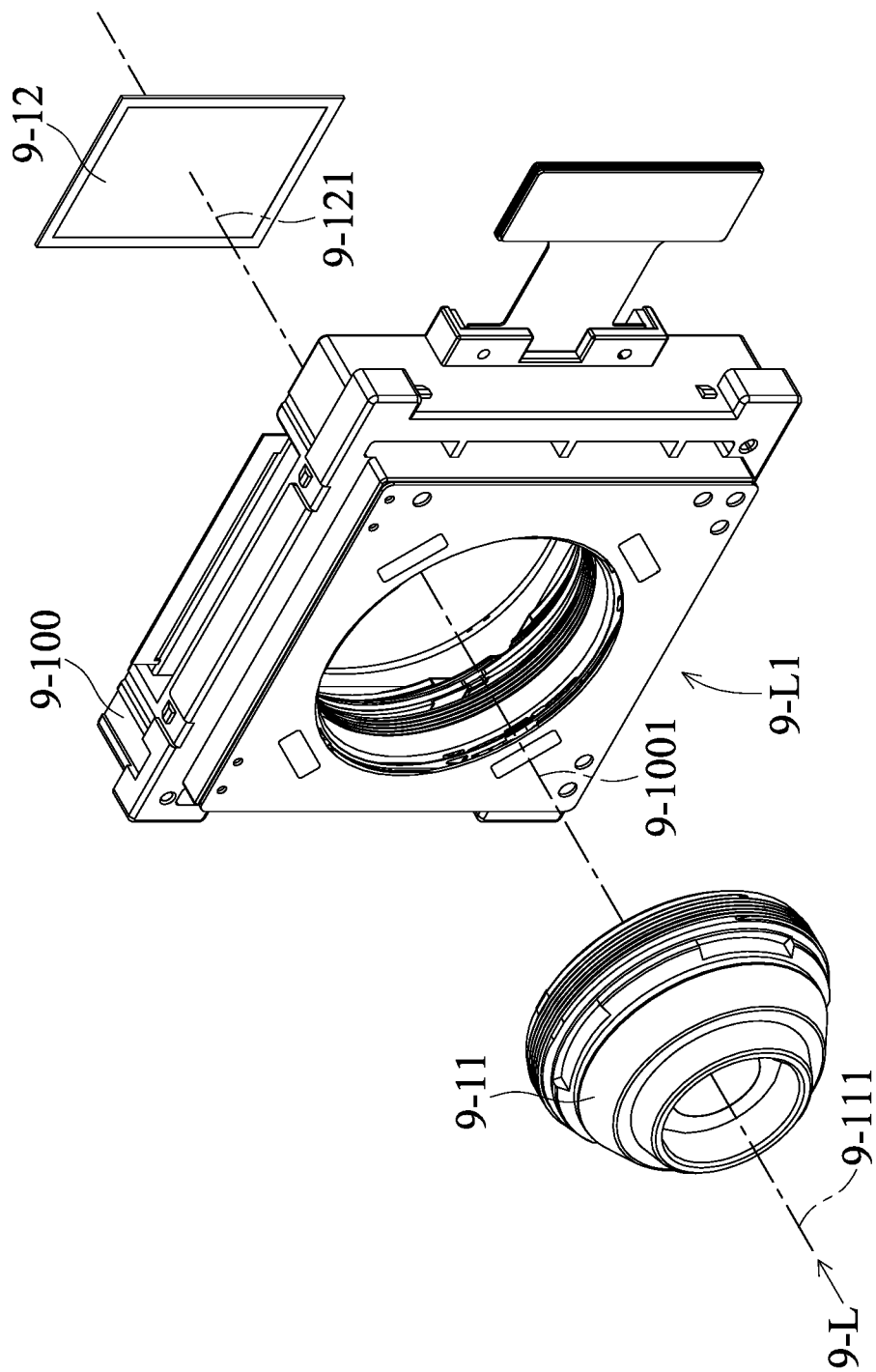
FIG. 63 is a schematic view of the first optical element, the second optical element, and the optical system.

Please refer to FIG. 62 and FIG. 63. FIG. 62 is a schematic view of an electronic device 9-10, a first optical element 9-11, a second optical element 9-12, and an optical system 9-100. FIG. 63 is a schematic view of the first optical element 9-11, the second optical element 9-12, and the optical system 9-100. The electronic device 9-10 may be a tablet computer, a smart phone, etc. The optical system 9-100 is usually disposed on the top region of the electronic device 9-10. The optical system 9-100 is connected to the first optical element 9-11 and the second optical element 9-12. The first optical element 9-11 may be a lens. In some embodiments, the profile of the first optical element 9-11 may be a circle, an ellipse, a circle with a straight line, an ellipse with a straight line, etc. The second optical element 9-12 may be a photosensitive element, e.g., a charge-coupled detector (CCD). In some embodiments, the profile of the second optical element 9-12 may be polygonal, such as rectangular. When a light 9-L outside the optical system 9-100 enters the optical system 9-100, the light 9-L passes through the first optical element 9-11, and the light 9-L is convert into an image on the second optical element 9-12. Therefore, the side of the optical system 9-100 that is close to the first optical element 9-11 may be defined as a light incident side 9-L1.

The first optical element 9-11 includes a first optical axis 9-111, and the first optical axis 9-111 is a virtual axis passing through the center of the first optical element 9-11. The second optical element 9-12 includes a second optical axis 9-121, and the second optical axis 9-121 is a virtual axis passing through the center of the second optical element 9-12. The optical system 9-100 includes a main axis 9-1001, and the main axis 9-1001 is a virtual axis passing through and perpendicular to the entire optical system 9-100. In the drawings and in the following, the first axis 9-111, the second optical axis 9-121, the main axis 9-1001 may be used to illustrate related features of the present disclosure.

Figure 64:
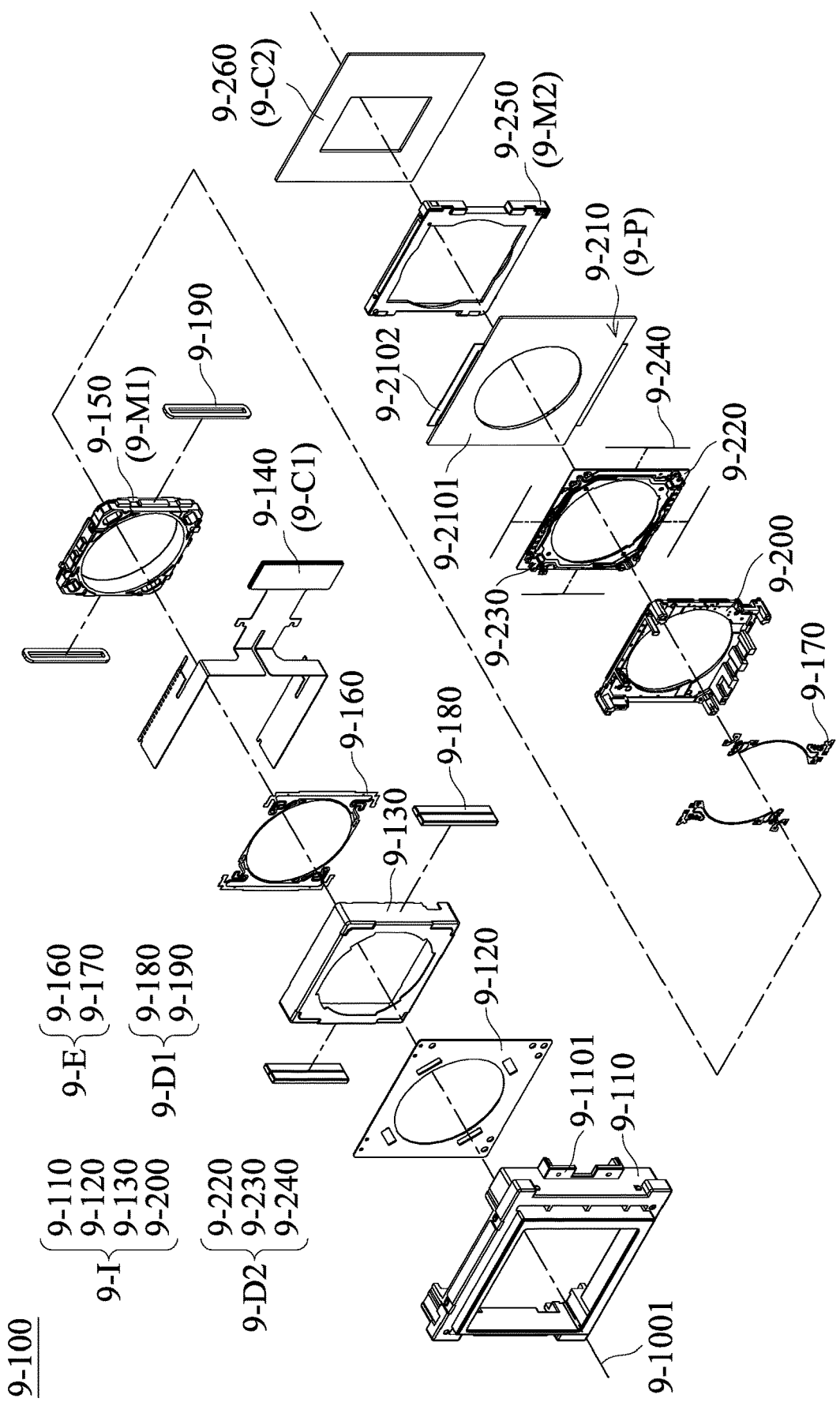
FIG. 64 is an exploded view of the optical system in FIG. 63.

FIG. 64 is an exploded view of the optical system 9-100 in FIG. 63. In this embodiment, the optical system 9-100 includes an immovable part 9-I, a first movable part 9-M1, an elastic assembly 9-E, a first drive assembly 9-D1, a first circuit assembly 9-C1, a second movable part 9-M2, a second drive assembly 9-D2, a second circuit assembly 9-C2, and a positioning assembly 9-P.

When the optical system 9-100 is used for capturing an image, the first drive assembly 9-D1 may drive the first movable part 9-M1 to move relative to the immovable part 9-I, and the second drive assembly 9-D2 may drive the second movable part 9-M2 moves relative to the immovable part 9-I. The movement of the first optical element 9-11 driven by the first movable part 9-M1 relative to the immovable part 9-I may achieve focus, and it is generally referred to as auto focus (AF). Also, the movement of the second optical element 9-12 driven by the second movable part 9-M2 relative to the immovable part 9-I may compensate for the blur and the deviation of the image caused by the shake or vibration by the user or by the impact of the external force, enhancing the results of the optical system 9-100 for capturing dynamic scenes, and it is generally referred to as sensor-shift.

As shown in FIG. 64, in this embodiment, the immovable part 9-I includes a housing 9-110, a top cover 9-120, a case 9-130, and a bottom 9-200. The first movable part 9-M1 includes a first holder 9-150. The elastic assembly 9-E includes an upper elastic element 9-160 and a lower elastic element 9-170. The first drive assembly 9-D1 includes at least one magnetic element 9-180 and at least one coil 9-190. The first circuit assembly 9-C1 includes a first circuit board 9-140. The second movable part 9-M2 includes a second holder 9-250. The second drive assembly 9-D2 includes an immovable board 9-220, a movable board 9-230, and at least one bias element 9-240. The second circuit assembly 9-C2 includes a second circuit board 9-260. The positioning assembly 9-P includes a positioning element 9-210. The element(s) may be added or omitted according to actual requirements.

The top cover 9-120, the case 9-130, and the bottom 9-200 of the immovable part 9-I are arranged along the main axis 9-1001. The case 9-130 may be connected to the bottom 9-200 through soldering, welding, etc. The space formed therein may accommodate the first movable part 9-M1, the elastic assembly 9-E, the first drive assembly 9-D1, the first circuit assembly 9-C1, etc. The bottom 9-200 is located between the first movable part 9-M1 and the second movable part 9-M2.

The first holder 9-150 of the first movable part 9-M1 is used for connected to the first optical element 9-11. Corresponding screw structure may be provided between the first holder 9-150 and the first optical element 9-11, so that the first optical element 9-11 may be better fixed to the first holder 9-150. The first holder 9-150 is spaced apart a distance from the case 9-130 and the bottom 9-200. In detail, the first holder 9-150 is not in direct contact with the case 9-130 and the bottom 9-200 through the elastic assembly 9-E.

The upper elastic element 9-160 and the lower elastic element 9-170 are made of an elastic material or a ductile material, e.g., metal. In this technical field, the upper elastic element 9-160 and the lower elastic element 9-170 may be known as "spring", "leaf spring", "plate spring", etc. A portion of the case 9-30 and the top surface of the first holder 9-150 are connected by the upper elastic element 9-160, and a portion of the bottom 9-200 and the bottom surface of the first holder 9-150 are connected by the lower elastic element 9-170. When the first movable part 9-M1 moves relative to the immovable part 9-I, the movement range of the first holder 9-150 is restricted because the first holder 9-150 is held resiliently by the upper elastic element 9-160 and the lower elastic element 9-170. Therefore, collision between the first holder 9-150 and the case 9-30 or the bottom 9-200 does not occur. Therefore, the first holder 9-150 and the first optical element 9-11 therein are not damaged when the optical system 9-100 moves or being impacted by the environment.

The magnetic element 9-180 of the first drive assembly 9-D1 may be a permanent magnet. The magnetic element 9-180 is substantially elongated. The magnetic element 9-180 is disposed inside the case 9-130. The position of the magnetic element 9-180 corresponds to the position of the coil 9-190. The coil 9-190 is substantially elliptical, but it is not limited thereto. The coil 9-190 is disposed on the first holder 9-150. The winding axis of the coil 9-190 is perpendicular to the main axis 9-1001. The magnetic force that is parallel with the first optical axis 9-111 of the first optical element 9-11 may be generated between the coil 9-190 and the magnetic element 9-180 to drive the first holder 9-150 to move in a direction that is parallel with the first optical axis 9-111, thereby driving the first optical element 9-11 in the first holder 9-150 to move in a direction that is parallel with the first optical axis 9-111, so as to achieve auto focus.

It should be noted that, in some other embodiments, the optical system 9-100 may further include a reference element and a sensing element (not shown). The reference element is disposed close to the first holder 9-150, and the position of the sensing element corresponds to the position of the reference element. The reference element may be a permanent magnet. The sensing element may be a giant magnetoresistive effect sensing element (GMR sensing element), a tunneling magnetoresistive effect sensing element (TMR sensing element), etc. When the first holder 9-150 moves, the reference element near the first holder 9-150 moves as well, and the magnetic field of the reference element changes. Additionally, the change of the magnetic field of the reference element is detected by the sensing element. Therefore, the position of the first holder 9-150 may be known. Furthermore, the position adjustment and the displacement control of the first holder 9-150 may be conducted.

The first circuit board 9-140 of the first circuit assembly 9-C1 may be a flexible printed circuit (FPC) or a rigid-flex board. The first circuit assembly 9-C1 is electrically connected to the first drive assembly 9-D1. As shown in FIG. 64, the housing 9-110 may include a protrusion 9-1101 to be connected to the first circuit board 9-140.

The second holder 9-250 of the second movable part 9-M2 is connected to the second optical element 9-12. In detail, the second optical element 9-12 may be disposed on the second circuit board 9-260, and the second holder 9-250 may be connected to the second circuit board 9-260.

The movable board 9-230 of the second drive assembly 9-D2 is connected to the immovable board 9-220 via bias element 9-240, and the movable board 9-230 is movable relative to the immovable board 9-220 via bias element 9-240. The immovable board 9-220 and/or the movable board 9-230 may be a multi-layer board. It should be noted that, since the relative motion occurs between the immovable board 9-220 and the movable board 9-230, in some other embodiments, the immovable board 9-220 is movable relative to the movable board 9-230. Under such circumstances, the immovable board 9-220 is movable while the movable board 9-230 is immovable. That is, the terms "the immovable board" and "the movable board" used herein are not limited thereto.

The bias element 9-240 may include a shape memory alloy (SMA) material, such as a titanium-nickel (TiNi) alloy, a titanium-palladium (TiPd) alloy, a titanium-nickel (TiNiCu) alloy, a titanium-nickel-palladium (TiNiPd) alloy, or a combination thereof. Furthermore, a drive signal (e.g., current) may be applied to the bias element 9-240 by a power source to change the lengths of the bias element 9-240. Moreover, different drive signals may be applied to the bias element 9-240 to independently control the lengths of each of the bias element 9-240. For example, when the drive signal is applied to the bias element 9-240, different bias element 9-240 may produce the same or different change in length, and drive the movable board 9-230 to move relative to the immovable board 9-220, thereby drive the second holder 9-250 and the second optical element 9-12 to move, including linear motion, rotation, etc.

Although the embodiments that the first drive assembly 9-D1 includes a magnetic element and a coil and the second drive assembly 9-D2 includes a shape memory alloy are described, the present disclosure is not limited thereto. For example, in some other embodiments, the first drive assembly 9-D1 may include beads, balls, etc.

The second circuit board 9-260 of the second circuit assembly 9-C2 may be a FPC or a rigid-flex board. The second circuit assembly 9-C2 is electrically connected to the electronic device 9-10. Moreover, the second drive assembly 9-D2 is electrically connected to the electronic device 9-10 via the second circuit assembly 9-C2. That is, the second circuit assembly 9-C2 may be referred to as "an external circuit" of the optical system 9-100.

In this embodiment, the positioning element 9-210 of the positioning assembly 9-P is disposed between the first drive assembly 9-D1 and the second movable part 9-M2. However, the position of the positioning assembly 9-P is not limited thereto. The positioning element 9-210 includes a plate-like structure, including a body 9-2101 and at least one removable portion 9-2102. The removable portion 9-2102 is disposed on the main body 9-2101. When viewed from the main axis 9-1001, the removable portion 9-2102 does not overlap the immovable part 9-I. In some embodiments, the positioning assembly 9-P is made of a conductive material, for example, a metal material.

In the present disclosure, the positioning assembly 9-P may assist the active alignment process of the first optical element 9-11 and the second optical element 9-12. Next, please refer to FIG. 65 and FIG. 66 to understand how the active alignment process of the first optical element 9-11 and the second optical element 9-12 is conducted. The active alignment process of the first optical element 9-11 and the second optical element 9-12 may be substantially divided into a first assembling step and a second assembling step. The first assembling step includes assembling the first optical element 9-11 to the optical system 9-100. The second assembling step includes assembling the second optical element 9-12 and the second circuit assembly 9-C2 (the external circuit) to the optical system 9-100. FIG. 65 is a schematic view of the optical system 9-100 in FIG. 63 in the first assembling step. FIG. 66 is a schematic view of the optical system 9-100 in FIG. 63 in the second assembling step. In FIG. 65 and FIG. 66, the elements, an assembling appliance 9-300, a cutting appliance 9-400 are schematically illustrated.

Before performing the active alignment process of the first optical element 9-11 and the second optical element 9-12, at least part of the optical system 9-100 needs to be assembled first, including the immovable part 9-I, the first movable part 9-M1, the second movable part 9-M2, and the positioning assembly 9-P. For example, an adhesive may be applied between the immovable part 9-I, the first movable part 9-M1, the second movable part 9-M2, and the positioning assembly 9-P. It should be noted that, in some other embodiments, if the optical system 9-100 does not need sensor-shift, the second movable part 9-M2 and/or the second drive assembly 9-D2 may be omitted. However, even if the optical system 9-100 does not need sensor-shift, the following description of the active alignment process of the first optical element 9-11 and the second optical element 9-12 is still applicable.

In the first assembling step, the positioning assembly 9-P positions the first movable part 9-M1 at a first assembling position relative to the immovable part 9-I and positions the second movable part 9-M2 at a second assembling position relative to the immovable part 9-I. In detail, the positioning assembly 9-P positions the first holder 9-150 without the installation of the first optical element 9-11 relative to the bottom 9-200 and positions the second holder 9-250 without the installation of the second optical element 9-12 relative to the bottom 9-200.

The positioning element 9-210 includes an assembling positioning portion 9-2103 corresponding to the assembling appliance 9-300. In detail, during the first assembling step, the assembling appliance 9-300 is in direct contact with the assembling positioning portion 9-2103, so that the assembling appliance 9-300 may temporarily keep the first movable part 9-M1 at the first assembling position and keep the second movable part 9-M2 at the second assembling position by physical contact.

In some embodiments, the positioning element 9-210 further includes a conductive positioning portion 9-2104 corresponding to a power supply of the assembling appliance 9-300. The conductive positioning portion 9-2104 is electrically connected to other elements of the optical system 9-100, such as the second drive assembly 9-D2. The current is supplied to the conductive positioning portion 9-2104 by the power supply of the assembling appliance 9-300, so that the current is also supplied to the element(s) that are electrically connected to the positioning element 9-210 (e.g., the second drive assembly 9-D2), and thus the first movable part 9-M1 is temporarily kept at the first assembling position and/or the second movable part 9-M2 is temporarily kept at the second assembling position.

When the first movable part 9-M1 is temporarily kept at the first assembling position and the second movable part 9-M2 is temporarily kept at the second assembling position by the assembling appliance 9-300 through the conductive positioning portion 9-2104 of the positioning element 9-210, the conductive positioning portion 9-2104 is in direct contact with at least part of the assembling appliance 9-300. For example, the conductive positioning portion 9-2104 includes a metal exposed portion corresponding to a temporary pin of the assembling appliance 9-300. In some embodiments, the assembling positioning portion 9-2103 and the conductive positioning portion 9-2104 are the same portion of the positioning element 9-210. That is, the assembling positioning portion 9-2103 and the conductive positioning portion 9-2104 are integrally formed as a single piece.

After the first movable part 9-M1 is temporarily kept at the first assembling position and the second movable part 9-M2 is temporarily kept at the second assembling position, the first optical element 9-11 is assembled to the optical system 9-300 to accomplish the first assembling step.

Next, the second optical element 9-12 is positioned relative to the immovable part 9-I, so that the first optical axis 9-111 of the first optical element 9-11 overlaps the second optical axis 9-121 of the second optical element 9-12 to accomplish the second assembling step. In some embodiments, during the second assembling step, it may be determined whether the removable portion 9-2102 of the positioning element 9-210 needs to be removed according to the actual requirements. The removable portion 9-2102 of the positioning element 9-210 may be removed by laser cutting, manually, etc. For example, the removable portion 9-2102 may be cut by the cutting appliance 9-400. In some embodiments, the maximum size of the removable portion 9-2102 in the main axis 9-1001 is less than the maximum size of the rest part of the positioning element 9-210 in the main axis 9-1001, so that the removable portion 9-2102 may be easily removed. That is, the thickness of the removable portion 9-2102 is less than the thickness of the rest part of the positioning element 9-210.

After the second assembling step, the assembling appliance 9-300 is removed. Next, the optical system 9-100 equipped with the first optical element 9-11 and the second optical element 9-12 may be installed to the electronic device 9-10. It should be understood that, the positioning assembly 9-P includes a circuit electrically connected to the assembling appliance 9-300 (for example, the conductive positioning portion 9-2104), but such circuit only plays a role in the active alignment process. When the electronic device 9-10 outputs a drive signal to the optical system 9-100, the drive signal does not pass through at least part of the circuit of the positioning assembly 9-P. For example, when the electronic device 9-10 outputs a drive signal to the optical system 9-100, the drive signal is input to the first drive assembly 9-D1 and/or the second drive assembly 9-D2 via the second circuit assembly 9-C2.

In the foregoing embodiments, the positioning assembly 9-P includes a separate positioning element 9-210, but in some other embodiments, the positioning assembly 9-P may be disposed inside other elements. For example, the positioning assembly 9-P may be formed in at least one of the immovable part 9-I, the first movable part. 9-M1, the second movable part 9-M2, and the second drive assembly 9-D2. That is, the positioning assembly 9-P may be immovably connected to at least one of the immovable part 9-I, the first movable part. 9-M1, the second movable part 9-M2, and the second drive assembly 9-D2.

For example, when the first holder 9-150, the bottom 9-200 or second holder 9-250 includes a resin material, at least part of the positioning assembly 9-P may be formed (such as embedded) in the first holder 9-150, the bottom 9-200, or the second holder 9-250 by methods such as insert molding. Alternatively, at least part of the positioning assembly 9-P may be formed on second circuit board 9-260 by methods such as gluing. Furthermore, the positioning assembly 9-P may still achieve functions done by the assembling positioning portion 9-2103 and/or the conductive positioning portion 9-2104. That is, the assembling appliance 9-300 may still provide physical contact to the positioning assembly 9-P and/or supply power to the positioning assembly 9-P. The assembling positioning portion 9-2103 and/or the conductive positioning portion 9-2104 may be immovably disposed on the immovable part 9-I, the first movable part 9-M1, the second movable part 9-M2, the second drive assembly 9-D2, the second circuit assembly 9-C2, etc.

Figure 67:
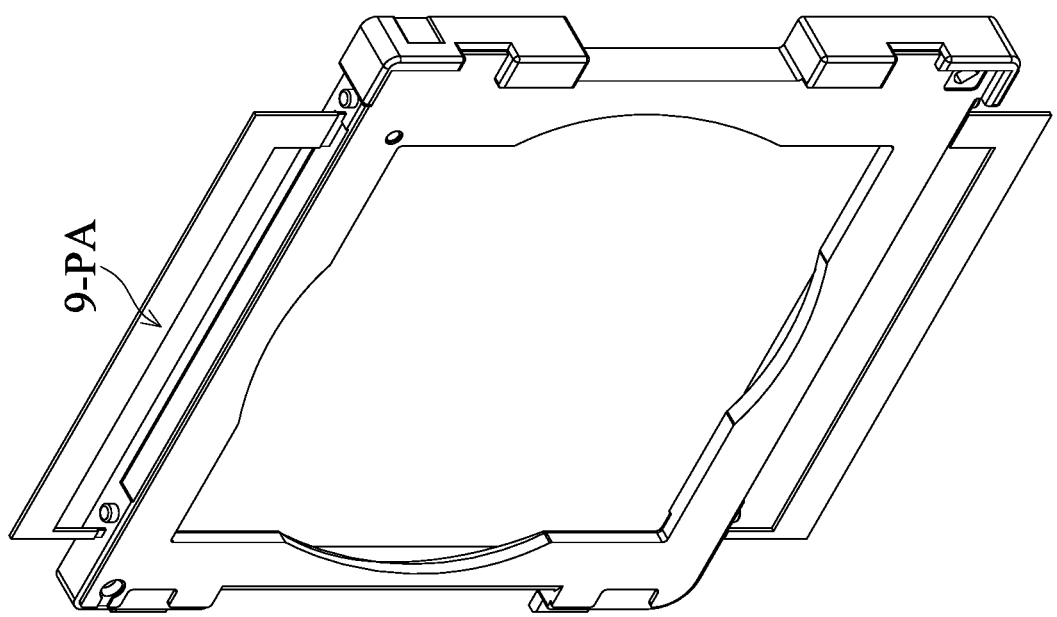
FIG. 67 is a perspective view of the second holder of the optical system in some other embodiments.
Figure 68:
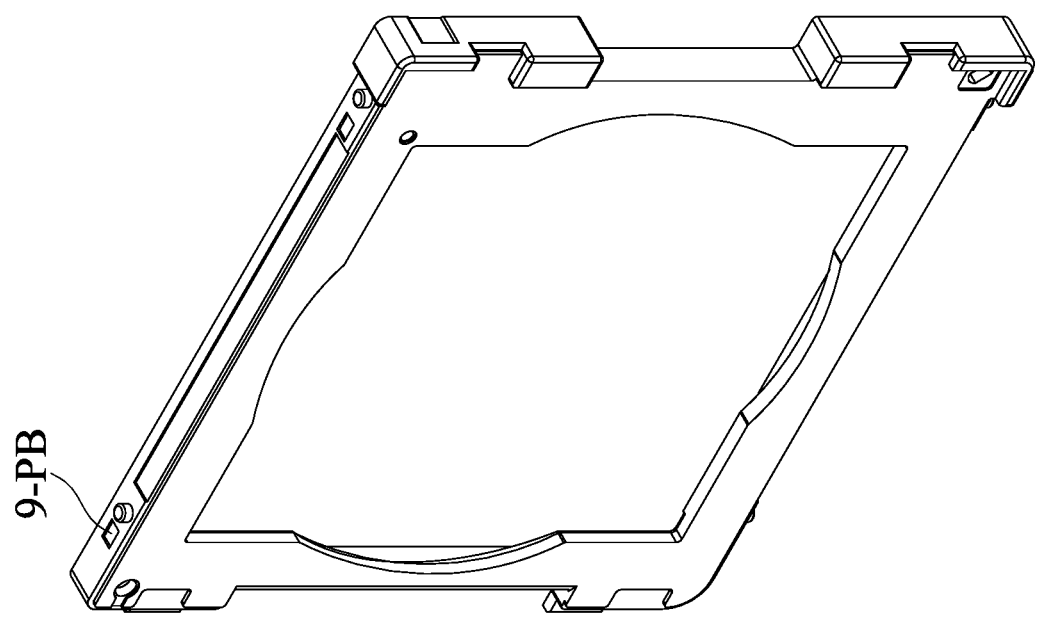
FIG. 68 is a perspective view of the second holder of the optical system in yet some other embodiments.
Figure 69:
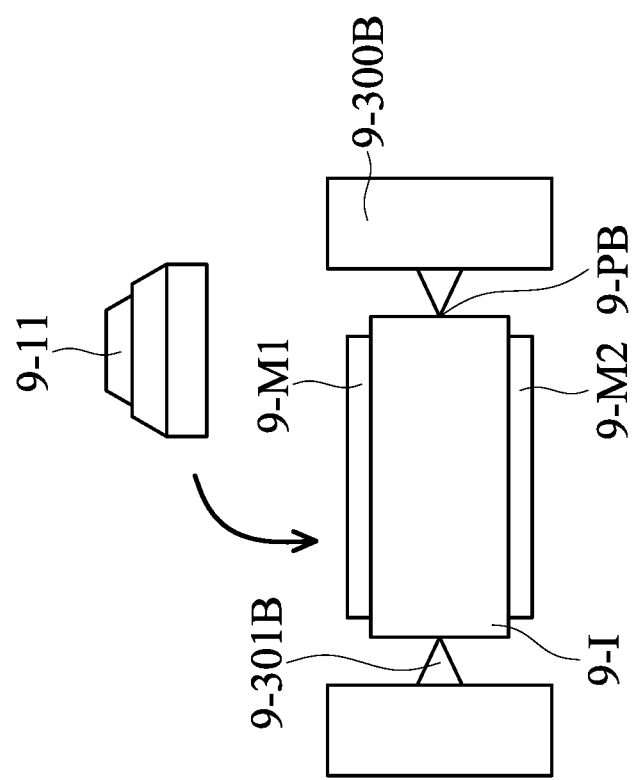
FIG. 69 is a schematic view of the optical system in FIG. 68 in the first assembling step.

In the following, the same elements are denoted by the same symbols, similar elements are denoted by similar symbols, and the same features are not repeated. Next, please refer to FIG. 67 to FIG. 69. FIG. 67 is a perspective view of a second holder 9-250B of an optical system in some other embodiments. FIG. 68 is a perspective view of a second holder 9-250 of an optical system in yet some other embodiments. FIG. 69 is a schematic view of the optical system in FIG. 68 in the first assembling step. In FIG. 69, the elements and an assembling appliance 9-300B are schematically illustrated.

In the embodiments shown in FIG. 67, at least part of a positioning assembly 9-PA is formed in the second holder 9-250A, and the positioning assembly 9-PA includes a structure that is similar to the removable portion 9-2102 of the positioning element 9-210. In the embodiments shown in FIG. 68, at least part of a positioning assembly 9-PB is formed on the second holder 9-250B, and the positioning assembly 9-PB does not include a structure similar to the removable portion 9-2102 of the positioning element 9-210. Since the positioning assembly 9-PB in the embodiment shown in FIG. 68 does not include a structure similar to removable portion 9-2102 of the positioning element 9-210, the assembling appliance 9-300B in FIG. 69 may include a contact portion 9-301B used to be in contact with the positioning assembly 9-PB. Although only embodiments that the positioning assembly is formed on the second holder are illustrated, the positioning assembly may also be formed on other elements, and the shape and structure of the positioning assembly are not limited thereto.

Figure 70:
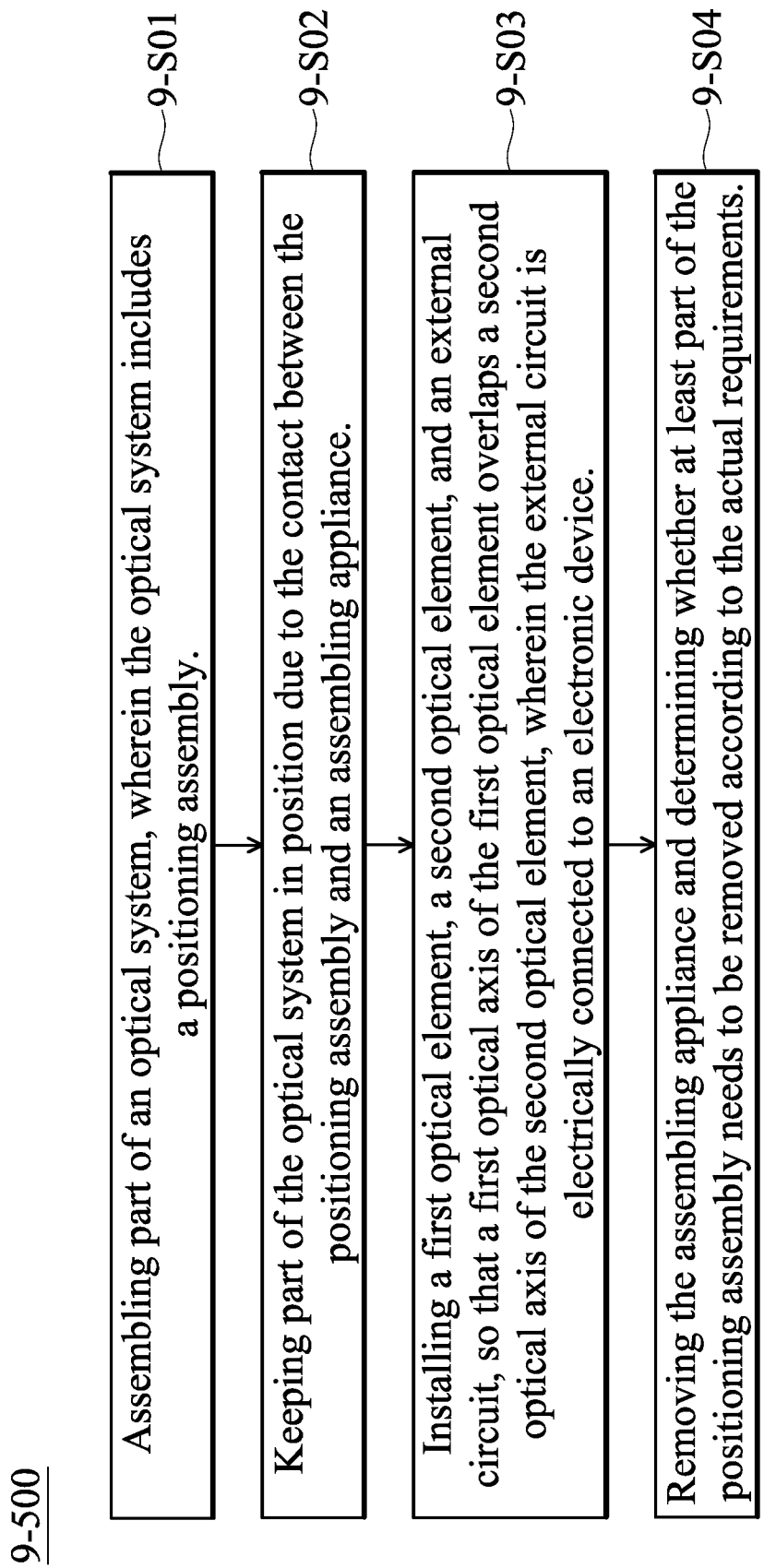
FIG. 70 is a flow chart of a method of assembling an optical system.

FIG. 70 is a flow chart of a method 9-500 of assembling an optical system. During the step 9-S01, part of an optical system is assembled, including a movable part (e.g., the first movable part and/or the second movable part described above), an immovable part, and a positioning assembly. During the step 9-S02, part of the optical system is kept in position (i.e. temporary positioning) due to the contact between the positioning assembly and an assembling appliance. The temporary positioning may include physical contact, such as clamping. In some other embodiments, the temporary positioning may further include power supply, for example, the assembling appliance may include a temporary pin to supply the current to the positioning assembly and control the position of the movable part of the optical system relative to the immovable part. During the step 9-S03, a first optical element, a second optical element, and an external circuit are installed, so that a first optical axis of the first optical element overlaps a second optical axis of the second optical element, wherein the external circuit is electrically connected to an electronic device. During the step 9-S04, the assembling appliance is remove. Furthermore, it may be determined whether at least part of the positioning assembly or the entire positioning assembly needs to be removed according to the actual requirements. After the assembling process is accomplished, the optical system may be installed to the electronic device.

To sum up, when performing the active alignment process of the first optical element and the second optical element, through physically contact and/or power supply to the positioning assembly by the assembling appliance, the positioning assembly may temporarily fix the part of the optical system that is connected to the first optical element, and thus facilitates the active alignment of the second optical element. In some other embodiments, the positioning assembly may temporarily fix the part of the optical system that is connected to the second optical element, and the active alignment process may be accomplished by adjusting the position of the first optical element. In addition, the positioning assembly may be a separate element or may be formed in other element(s). Furthermore, it may be determined whether part of the positioning assembly or the entire positioning assembly needs to be removed or cut according to actual needs.

Figure 71:
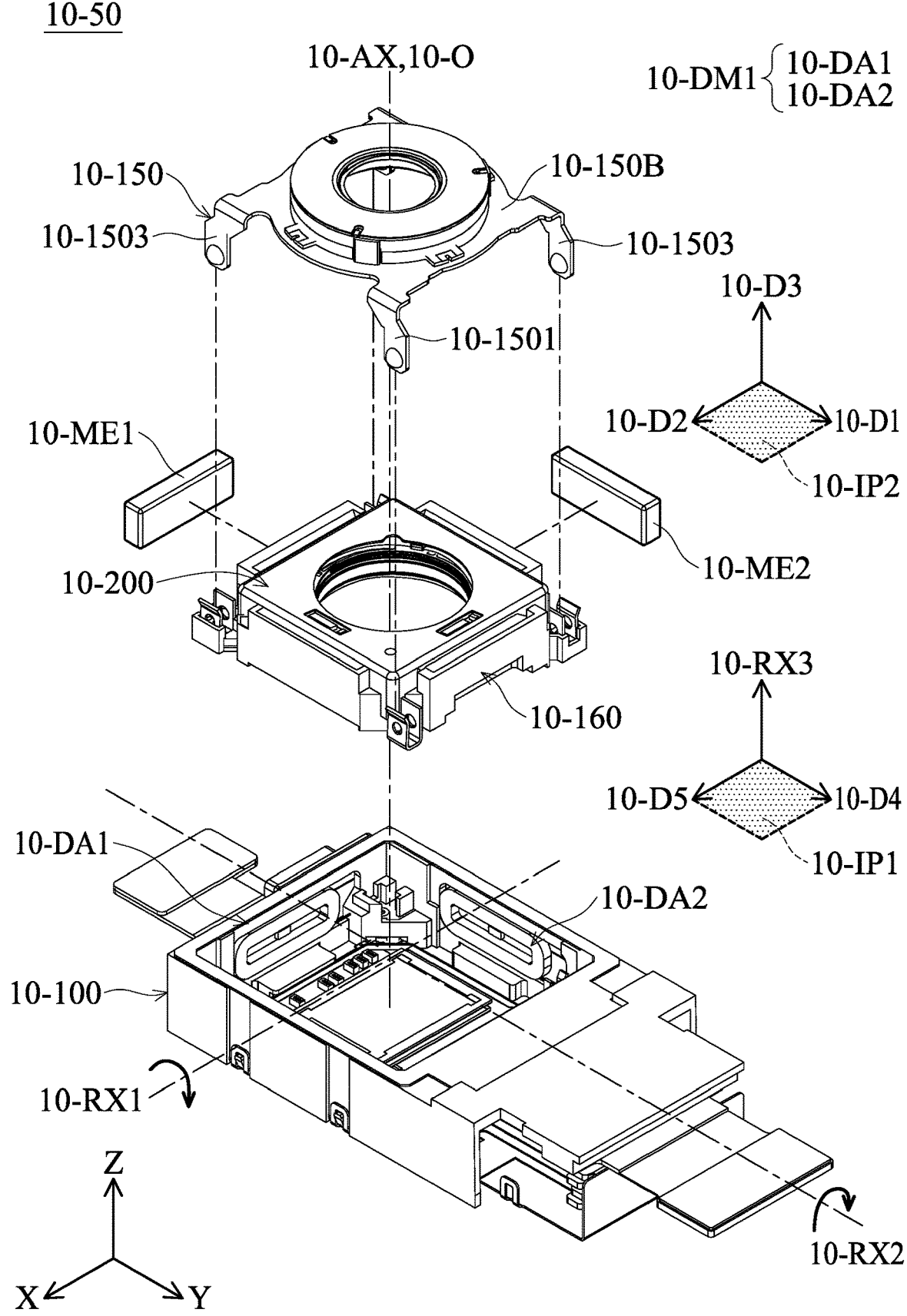
FIG. 71 is an exploded view of an optical system 10-50 of an embodiment of the present disclosure.
Figure 72:
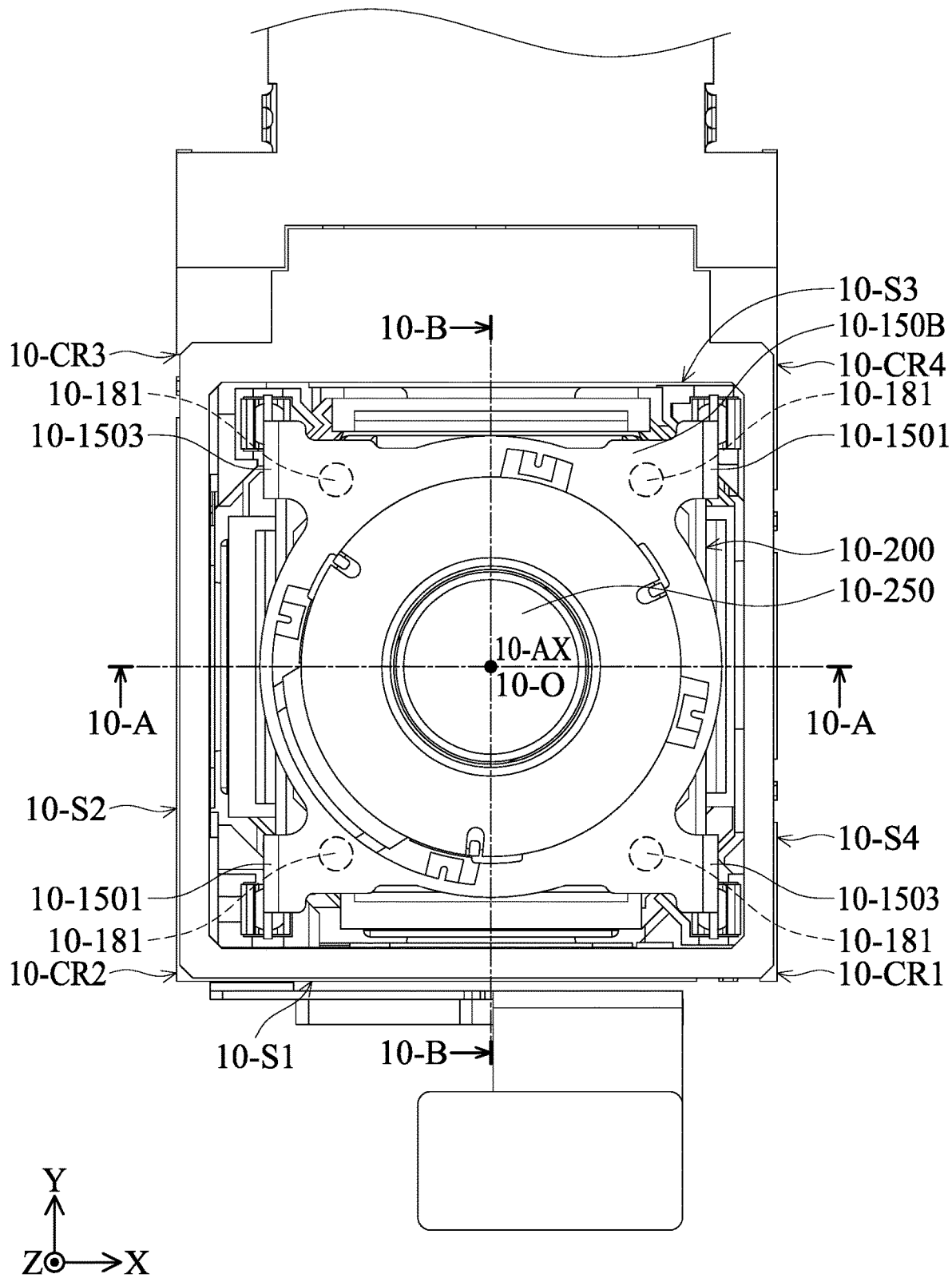
FIG. 72 is atop view of the optical system 10-50 of an embodiment of the present disclosure.

Please refer to FIG. 71 to FIG. 72. FIG. 71 is an exploded view of an optical system 10-50 of an embodiment of the present disclosure, and FIG. 72 is a top view of the optical system 10-50 of an embodiment of the present disclosure. The optical system 10-50 includes a fixed module 10-100, a movable module 10-200, a first driving mechanism 10-DM1, and a first supporting assembly 10-150. The movable module 10-200 is configured to connect to a first optical element 10-250, and the movable module 10-200 is movable relative to the fixed module 10-100.

The first driving mechanism 10-DM1 is configured to drive the movable module 10-200 to move relative to the fixed module 10-100 in a first dimension, and the movable module 10-200 is movable relative to the fixed module 10-100 through the first supporting assembly 10-150. Specifically, the movable module 10-200 is movably connected to the fixed module 10-100 via an outer frame 10-160 and the first supporting assembly 10-150. The movement in the first dimension includes movement around the X-axis.

The movable module 10-200 and the fixed module 10-100 are arranged along a main axis 10-AX. The optical system 10-50 may have a polygonal structure, such as a quadrilateral, an octagon, or an asymmetric polygon. In this embodiment, as shown in FIG. 72, the optical system 10-50 may include a first side 10-S1, a second side 10-S2, a third side 10-S3, and a fourth side 10-S4. When viewed along the main axis 10-AX, the second side 10-S2 is not parallel to the first side 10-S1. When viewed along the main axis 10-AX, the first side 10-S1 is parallel to the third side 10-53. When viewed along the main axis 10-AX, the second side 10-52 is parallel to the fourth side 10-54.

Furthermore, the optical system 10-50 further includes a first corner 10-CR1, a second corner 10-CR2, a third corner 10-CR3, and a fourth corner 10-CR4. The first corner 10-CR1 is located between the first side 10-S1 and the fourth side 10-S4. The second corner 10-CR2 is located between the first side 10-S1 and the second side 10-S2. The third corner 10-CR3 is located between the second side 10-S2 and the third side 10-S3. The fourth corner 10-CR4 is located between the third side 10-S3 and the fourth side 10-S4.

In this embodiment, the first driving mechanism 10-DM1 can be used to drive the movable module 10-200 to move relative to the fixed module 10-100 in a second dimension. The first dimension is different from the second dimension, and the second dimension includes movement around the Y-axis, for example. In addition, the main axis 10-AX is parallel to an optical axis 10-O of the first optical element 10-250, and in this embodiment, the main axis 10-AX may overlap the optical axis 10-O.

The first driving mechanism 10-DM1 includes a first driving assembly 10-DA1 and a second driving assembly 10-DA2. The first driving assembly 10-DA1 is used to drive the movable module 10-200 to move relative to the fixed module 10-100 in the first dimension, and the second driving assembly 10-DA2 is used to drive the movable module 10-200 to move relative to the fixed module 10-100 in the second dimension.

Figure 73:
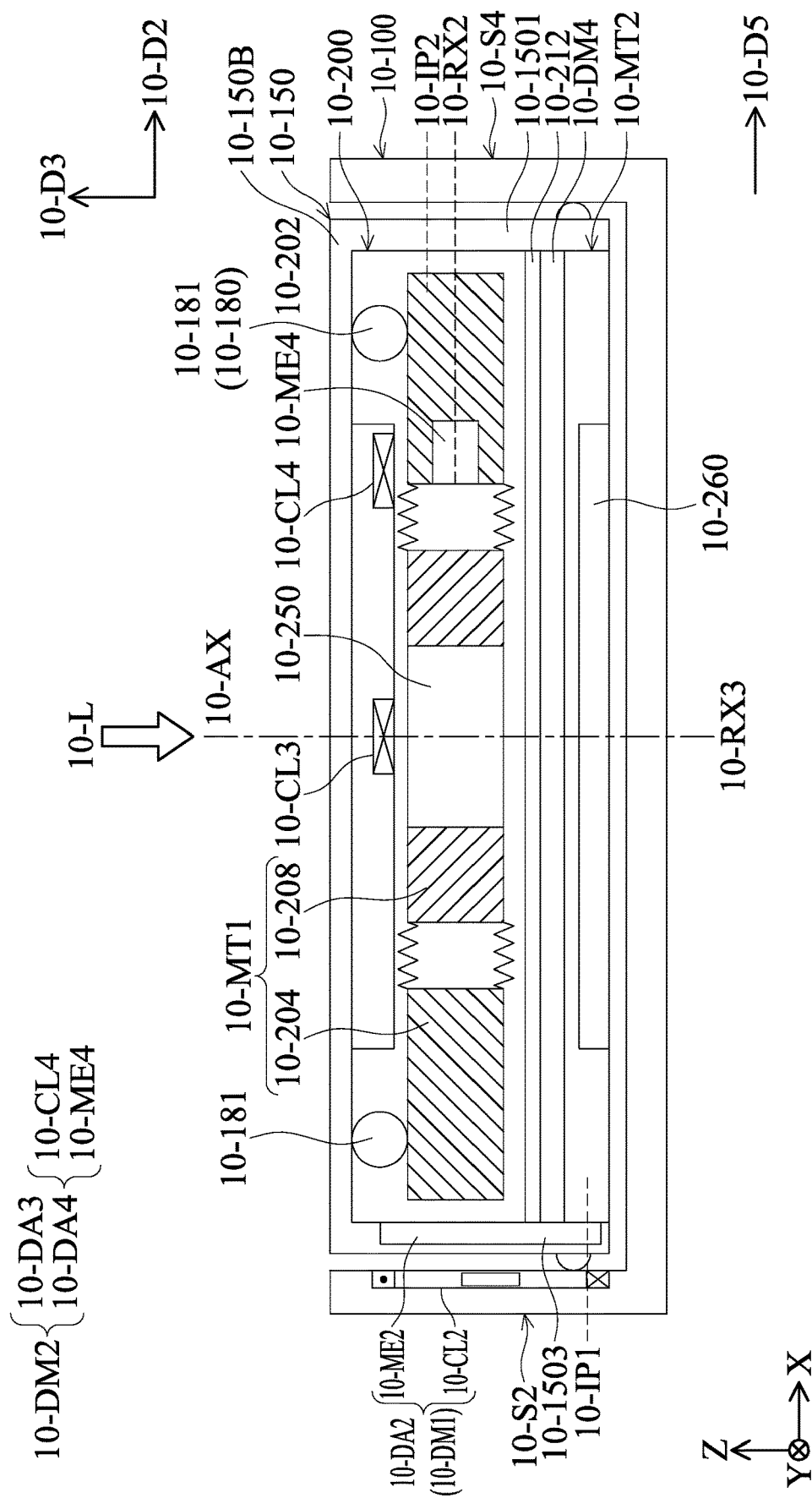
FIG. 73 is a schematic cross-sectional view of the optical system 10-50 along the line 10-A-10-A in FIG. 72 according to an embodiment of the present disclosure.

Please refer to FIG. 71 to FIG. 73 together. FIG. 73 is a schematic cross-sectional view of the optical system 10-50 along the line 10-A-10-A in FIG. 72 according to an embodiment of the present disclosure. In this embodiment, the movable module 10-200 may include a casing 10-202, a first movable part 10-MT1, a second movable part 10-MT2, a base 10-212, a second driving mechanism 10-DM2, a third driving mechanism 10-DM3, and a fourth driving mechanism 10-DM4.

The first movable part 10-MT1 is used to connect to the first optical element 10-250, and the second movable part 10-MT2 is used to connect to a second optical element 10-260. The first optical element 10-250 is, for example, a camera lens, and the second optical element 10-260 is, for example, an image sensor.

The second driving mechanism 10-DM2 can be used to drive the first movable part 10-MT1 to move relative to the base 10-212 in a third dimension, and the second driving mechanism 10-DM2 can be used to drive the first movable part 10-MT1 to move relative to base 10-212 in a fourth dimension.

In this embodiment, the first movable part 10-MT1 is movable relative to the base 10-212, and the first optical element 10-250 can include at least one lens corresponding to a light 10-L. The first movable part 10-MT1 may include a holder 10-208, and the holder 10-208 may be used to connect to the first optical element 10-250. Furthermore, the first movable part 10-MT1 can further include a frame 10-204, the holder 10-208 is movable relative to the frame 10-204, and the third driving mechanism 10-DM3 can be used to drive the holder 10-208 to move relative to the frame 10-204 in a fifth dimension.

The second optical element 10-260 is used to receive the light 10-L to output an electrical signal, such as an image signal. The fourth driving mechanism 10-DM4 can be used to drive the second movable part 10-MT2 to move relative to base 10-212 in a sixth dimension, and the fourth driving mechanism 10-DM4 can be used to drive the second movable part 10-MT2 to move relative to base 10-212 in a seventh dimension. Furthermore, the fourth driving mechanism 10-DM4 can also be used to drive the second movable part 10-MT2 to move relative to the base 10-212 in an eighth dimension. Furthermore, as shown in FIG. 72 and FIG. 73, when viewed along the main axis 10-AX, the first driving mechanism 10-DM1 does not overlap the fourth driving mechanism 10-DM4.

In this embodiment, the first dimension is different from the second dimension, the third dimension is different from the fourth dimension, the fifth dimension is different from the third dimension, the fifth dimension is different from the fourth dimension, the sixth dimension is different from the seventh dimension, the sixth dimension is different from the eighth dimension, the seventh dimension is different from the eighth dimension, the eighth dimension is different from the first dimension, the eighth dimension is different from the second dimension, the third dimension is the same as the sixth dimension, and the fourth dimension is the same as the seventh dimension.

In this embodiment, the movement in at least one of the first, second, third, fourth, fifth, sixth, seventh, and eighth dimensions includes the rotation around a first rotating axis 10-RX1. Specifically, the movement in the first dimension includes the rotation around the first rotating axis 10-RX1. As shown in FIG. 71, the first rotating axis 10-RX1 is parallel to the X-axis, and the movable module 10-200 is rotatable around the first rotating axis 10-RX1.

The movement in at least one of the first, second, third, fourth, fifth, sixth, seventh, and eighth dimensions includes rotation around a second rotating axis 10-RX2. Specifically, the movement in the second dimension includes the rotation around the second rotating axis 10-RX2. As shown in FIG. 71, the second rotating axis 10-RX2 is parallel to the Y-axis, and the movable module 10-200 is rotatable around the second rotating axis 10-RX2.

The movement in at least one of the first, second, third, fourth, fifth, sixth, seventh, and eighth dimensions includes movement along a second direction 10-D2. Specifically, the movement in the fourth dimension includes the movement along the second direction 10-D2. As shown in FIG. 71 and FIG. 73, the first movable part 10-MT1 is movable along the second direction 10-D2.

The movement in at least one of the first, second, third, fourth, fifth, sixth, seventh, and eighth dimensions includes movement along a first direction 10-D1. Specifically, the movement in the third dimension includes the movement along the first direction 10-D1. As shown in FIG. 71 and FIG. 73, the first movable part 10-MT1 is movable along the first direction 10-D1.

The movement in at least one of the first, second, third, fourth, fifth, sixth, seventh, and eighth dimensions includes movement along a third direction 10-D3. Specifically, the movement in the fifth dimension includes the movement along the third direction 10-D3. As shown in FIG. 71 and FIG. 73, the holder 10-208 of the first movable part 10-MT1 is movable relative to the frame 10-204 along the third direction 10-D3.

The movement in at least one of the first, second, third, fourth, fifth, sixth, seventh, and eighth dimensions includes movement along a fourth direction 10-D4. Specifically, the movement in the sixth dimension includes the movement along the fourth direction 10-D4. As shown in FIG. 71 and FIG. 73, the second movable part 10-MT2 is movable along the fourth direction 10-D4.d The movement in at least one of the first, second, third, fourth, fifth, sixth, seventh, and eighth dimensions includes movement along a fifth direction 10-D5. Specifically, the movement in the seventh dimension includes the movement along the fifth direction 10-D5. As shown in FIG. 71 and FIG. 73, the second movable part 10-MT2 is movable along the fifth direction 10-D5.

The movement in at least one of the first, second, third, fourth, fifth, sixth, seventh, and eighth dimensions includes rotation around a third rotating axis 10-RX3. Specifically, the movement in the eighth dimension includes the rotation around the third rotating axis 10-RX3. As shown in FIG. 71 and FIG. 73, the second movable part 10-MT2 is rotatable around the third rotating axis 10-RX3.

In this embodiment, the first direction 10-D1 is parallel to the Y-axis, the second direction 10-D2 is parallel to the X-axis, and the third direction 10-D3 is parallel to the Z-axis. The fourth direction 10-D4 is parallel to the Y-axis, the fifth direction 10-D5 is parallel to the X-axis, and the third rotating axis 10-RX3 is parallel to the Z-axis.

In this embodiment, the first rotating axis 10-RX1 and the second rotating axis 10-RX2 are not parallel. Specifically, the first rotating axis 10-RX1 is perpendicular to the second rotating axis 10-RX2. The first rotating axis 10-RX1 and the third rotating axis 10-RX3 are not parallel. Specifically, the first rotating axis 10-RX1 is perpendicular to the third rotating axis 10-RX3. The second rotating axis 10-RX2 and the third rotating axis 10-RX3 are not parallel. Specifically, the second rotating axis 10-RX2 is perpendicular to the third rotating axis 10-RX3.

The first direction 10-D1 and the second direction 10-D2 are not parallel. Specifically, the first direction 10-D1 is perpendicular to the second direction 10-D2. The third direction 10-D3 is not parallel to the first direction 10-D1. Specifically, the first direction 10-D1 is perpendicular to the third direction 10-D3. The third direction 10-D3 is not parallel to the second direction 10-D2. Specifically, the third direction 10-D3 is perpendicular to the second direction 10-D2.

The fourth direction 10-D4 and the fifth direction 10-D5 are not parallel. Specifically, the fourth direction 10-D4 is perpendicular to the fifth direction 10-D5. The fourth direction 10-D4 and the fifth direction 10-D5 define a first imaginary plane 10-IP1 that is not perpendicular to a second imaginary plane 10-IP2 defined by the first direction 10-D1 and the second direction 10-D2. Specifically, as shown in FIG. 73, the first imaginary plane 10-IP1 is parallel to the second imaginary plane 10-IP2.

In this embodiment, the third rotating axis 10-RX3 is parallel to the third direction 10-D3. The first rotating axis 10-RX1 is parallel to the first direction 10-D1. The second rotating axis 10-RX2 is parallel to the second direction 10-D2. The third direction 10-D3 is parallel to the main axis 10-AX. In addition, the third rotating axis 10-RX3 may overlap the main axis 10-AX, for example, but it is not limited thereto.

Figure 74:
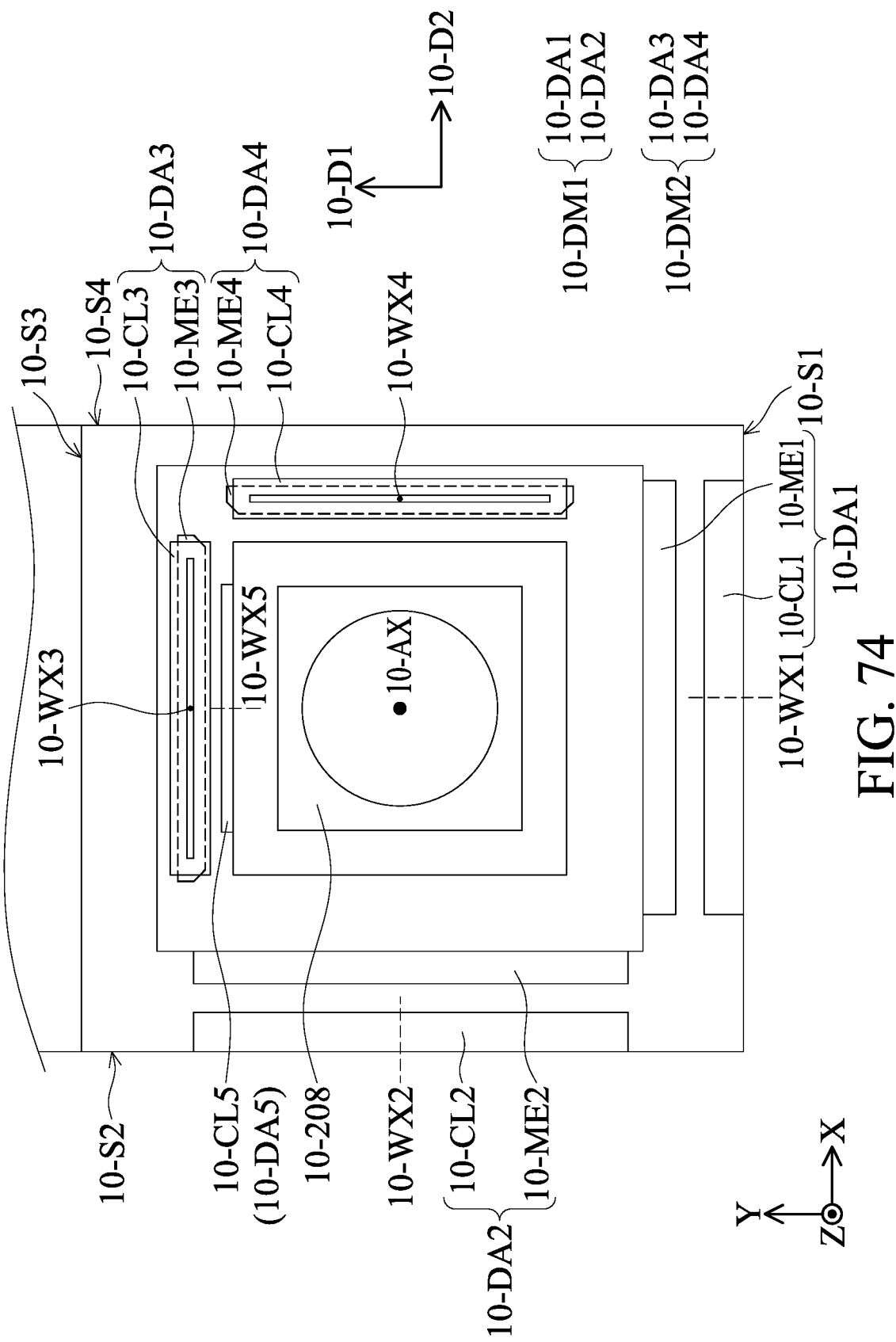
FIG. 74 is a top view of the optical system 10-50 according to an embodiment of the present disclosure.
Figure 75:
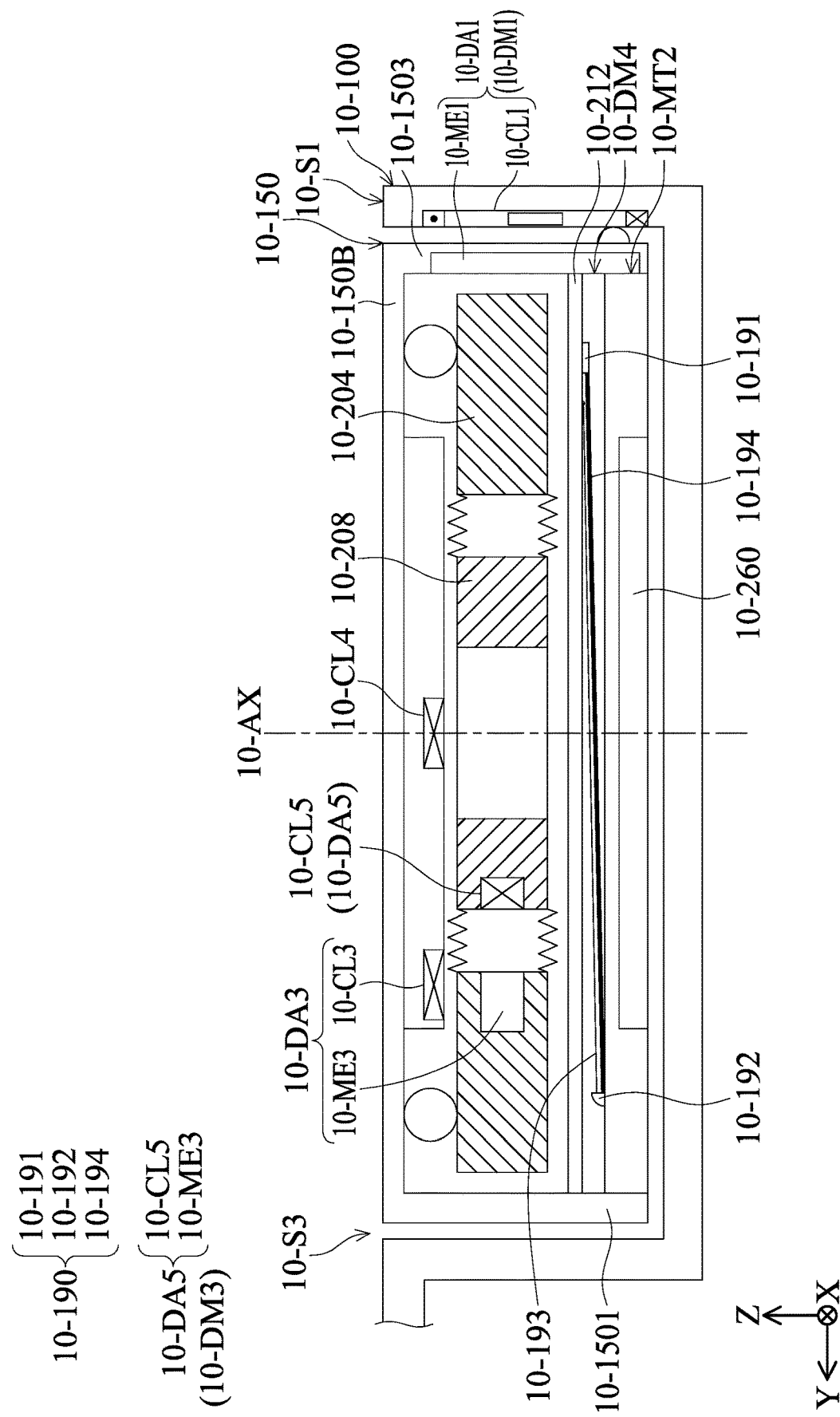
FIG. 75 is a schematic cross-sectional view of the optical system 10-50 along the line 10-B-10-B in FIG. 72 according to an embodiment of the present disclosure.

Please refer to FIG. 71 to FIG. 75. FIG. 74 is atop view of the optical system 10-50 according to an embodiment of the present disclosure, and FIG. 75 is a schematic cross-sectional view of the optical system 10-50 along the line 10-B-10-B in FIG. 72 according to an embodiment of the present disclosure. When viewed along the main axis 10-AX, the first driving assembly 10-DA1 is located on the first side 10-S1. The first driving assembly 10-DA1 includes a first coil 10-CL1 and a first magnetic element 10-ME1. The first coil 10-CL1 has a first winding axis 10-WX1, and the first winding axis 10-WX1 is perpendicular to an extending direction (for example, the X-axis) of the first side 10-S1. The first winding axis 10-WX1 is, for example, parallel to the Y-axis, and the first winding axis 10-WX1 is perpendicular to the main axis 10-AX.

When viewed along the main axis 10-AX, the second driving assembly 10-DA2 is located on the second side 10-S2. The second driving assembly 10-DA2 includes a second coil 10-CL2 and a second magnetic element 10-ME2. The second coil 10-CL2 has a second winding axis 10-WX2, and the second winding axis 10-WX2 is perpendicular to an extending direction (for example, the Y-axis) of the second side 10-S2. The second winding axis 10-WX2 is, for example, parallel to the X-axis, and the second winding axis 10-WX2 is perpendicular to the main axis 10-AX.

The second driving mechanism 10-DM2 includes a third driving assembly 10-DA3 and a fourth driving assembly 10-DA4. When viewed along the main axis 10-AX, the second driving mechanism 10-DM2 does not overlap the first driving mechanism 10-DM1. Furthermore, when viewed along the extending direction of the first side 10-S1, the second driving mechanism 10-DM2 overlaps at least a part of the first driving mechanism 10-DM1. When viewed along the extending direction of the second side 10-S2, the second driving mechanism 10-DM2 overlaps at least a part of the first driving mechanism 10-DM1.

The third driving assembly 10-DA3 can be used to drive the first movable part 10-MT1 to move relative to the base 10-212 in the third dimension, and the fourth driving assembly 10-DA4 can be used to drive the first movable part 10-MT1 to move relative to base 10-212 in the fourth dimension.

When viewed along the main axis 10-AX, the third driving assembly 10-DA3 is located on the third side 10-S3. The third driving assembly 10-DA3 includes a third coil 10-CL3 and a third magnetic element 10-ME3. The third coil 10-CL3 has a third winding axis 10-WX3, and the third winding axis 10-WX3 is perpendicular to the extending direction (for example, the X-axis) of the third side 10-S3. The third winding axis 10-WX3 is, for example, parallel to the Z-axis, and the third winding axis 10-WX3 is parallel to the main axis 10-AX.

When viewed along the main axis 10-AX, the fourth driving assembly 10-DA4 is located on the fourth side 10-S4. The fourth driving assembly 10-DA4 includes a fourth coil 10-CL4 and a fourth magnetic element 10-ME4. The fourth coil 10-CL4 has a fourth winding axis 10-WX4, and the fourth winding axis 10-WX4 is parallel to the third winding axis 10-WX3. The fourth winding axis 10-WX4 is perpendicular to the extending direction (for example, the Y-axis) of the fourth side 10-S4, and the fourth winding axis 10-WX4 is parallel to the main axis 10-AX.

When viewed along the main axis 10-AX, the third driving mechanism 10-DM3 does not overlap the first driving mechanism 10-DM1. When viewed along the extending direction of the first side 10-S1, the third driving mechanism 10-DM3 overlaps at least a part of the first driving mechanism 10-DM1, such as overlapping the second driving assembly 10-DA2. When viewed along the extending direction of the second side 10-S2, the third driving mechanism 10-DM3 overlaps at least a part of the first driving mechanism 10-DM1, such as overlapping the first driving assembly 10-DA1.

The third driving mechanism 10-DM3 includes a fifth driving assembly 10-DA5 for driving the holder 10-208 to move relative to the frame 10-204 in the fifth dimension.

When viewed along the main axis 10-AX, the fifth driving assembly 10-DA5 is located on the third side 10-S3, but it is not limited thereto. In other embodiments, the fifth driving assembly 10-DA5 may be located on the fourth side 10-S4. The fifth driving assembly 10-DA5 includes a fifth coil 10-CL5, and the fifth coil 10-CL5 corresponds to the third magnetic element 10-ME3 to generate an electromagnetic driving force. The third magnetic element 10-ME3 can also be included in the fifth driving assembly 10-DA5, which means that the third coil 10-CL3 and the fifth coil 10-CL5 share the third magnetic element 10-ME3. The fifth coil 10-CL5 has a fifth winding axis 10-WX5, and the fifth winding axis 10-WX5 is perpendicular to the main axis 10-AX.

When viewed along the main axis 10-AX, the fourth driving mechanism 10-DM4 does not overlap the first driving mechanism 10-DM1. When viewed along the main axis 10-AX, the fourth driving mechanism 10-DM4 overlaps at least a part of the second driving mechanism 10-DM2. When viewed along the main axis 10-AX, the fourth driving mechanism 10-DM4 overlaps at least a part of the third driving mechanism 10-DM3.

As shown in FIG. 73 to FIG. 75, when viewed along the extending direction of the first side 10-S1, the fourth driving mechanism 10-DM4 overlaps at least a part of the first driving mechanism 10-DM1 (such as the second driving assembly 10-DA2). When viewed along the extending direction of the second side 10-S2, the fourth driving mechanism 10-DM4 overlaps at least a part of the first driving mechanism 10-DM1 (such as the first driving assembly 10-DA1).

When viewed along the extending direction of the first side 10-S1, the fourth driving mechanism 10-DM4 does not overlap the second driving mechanism 10-DM2. When viewed along the extending direction of the second side 10-S2, the fourth driving mechanism 10-DM4 does not overlap the second driving mechanism 10-DM2.

When viewed along the extending direction of the first side 10-S1, the fourth driving mechanism 10-DM4 does not overlap the third driving mechanism 10-DM3. When viewed along the extending direction of the second side 10-S2, the fourth driving mechanism 10-DM4 does not overlap the third driving mechanism 10-DM3.

Figure 76:
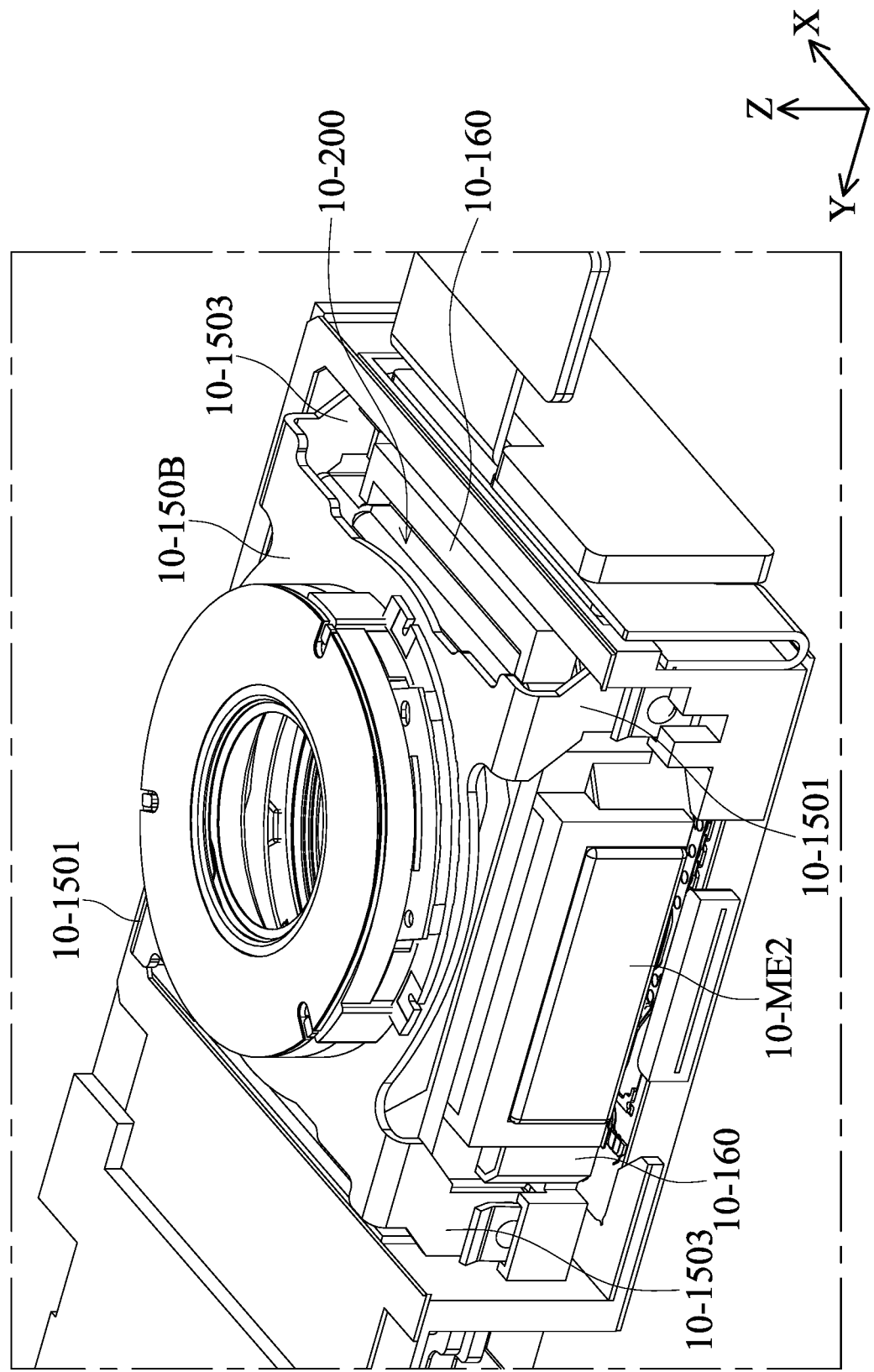
FIG. 76 is a perspective cross-sectional view of the optical system 10-50 according to an embodiment of the present disclosure.

Please refer to FIG. 71, FIG. 72, and FIG. 76. FIG. 76 is a perspective cross-sectional view of the optical system 10-50 according to an embodiment of the present disclosure. In this embodiment, the first supporting assembly 10-150 includes a main body 10-150B, two first supporting portions 10-1501, and two second supporting portions 10-1503. The main body 10-150B has a plate-shaped structure, and the main body 10-150B is not parallel to the main axis 10-AX.

The main body 10-150B is movably connected to the fixed module 10-100 through the first supporting portions 10-1501, and the first supporting portion 10-1501 has a plate-shaped structure and is not parallel to the main body 10-150B, such as perpendicular to the main body 10-150B. The main body 10-150B is movably connected to the outer frame 10-160 and the movable module 10-200 through the second supporting portions 10-1503, and the second supporting portion 10-1503 has a plate-shaped structure and is not parallel to the main body 10-150B, such as perpendicular to the main body 10-150B.

It should be noted that a circuit (not shown in the figures) may be provided on the first supporting assembly 10-150, so that the movable module 10-200 can be electrically connected to an external circuit (not shown in the figures) through the first supporting assembly 10-150. In addition, as shown in FIG. 76, the outer frame 10-160 is fixedly connected to the movable module 10-200, and the second magnetic element 10-ME2 (and the first magnetic element 10-ME1) is disposed on the outer frame 10-160.

Please go back to FIG. 72 and FIG. 73. The optical system 10-50 may further include a second supporting assembly 10-180, and the first movable part 10-MT1 is movable relative to the base 10-212 through the second supporting assembly 10-180. The second supporting assembly 10-180 may include one or more first intermediate elements 10-181, which can move relative to the first movable part 10-MT1 or the base 10-212. The first intermediate element 10-181 has a spherical structure, and the first intermediate element 10-181 may have a ceramic material.

When viewed along the main axis 10-AX, the second supporting assembly 10-180 overlaps at least a part of the first supporting assembly 10-150. Specifically, when viewed along the main axis 10-AX, the first intermediate elements 10-181 of the second supporting assembly 10-180 do not overlap the first supporting portion 10-1501. Similarly, when viewed along the main axis 10-AX, the first intermediate elements 10-181 of the second supporting assembly 10-180 do not overlap the second supporting portion 10-1503. In addition, when viewed along the main axis 10-AX, the second supporting assembly 10-180 overlaps at least a part of the main body 10-150B.

As shown in FIG. 73, when viewed in a direction perpendicular to the main axis 10-AX (for example, along the X-axis or the Y-axis), the second supporting assembly 10-180 overlaps at least a part of the first supporting portion 10-1501. When viewed in the direction perpendicular to the main axis 10-AX, the second supporting assembly 10-180 overlaps at least a part of the second supporting portion 10-1503. When viewed in the direction perpendicular to the main axis 10-AX, the second supporting assembly 10-180 does not overlap the main body 10-150B.

Figure 77:
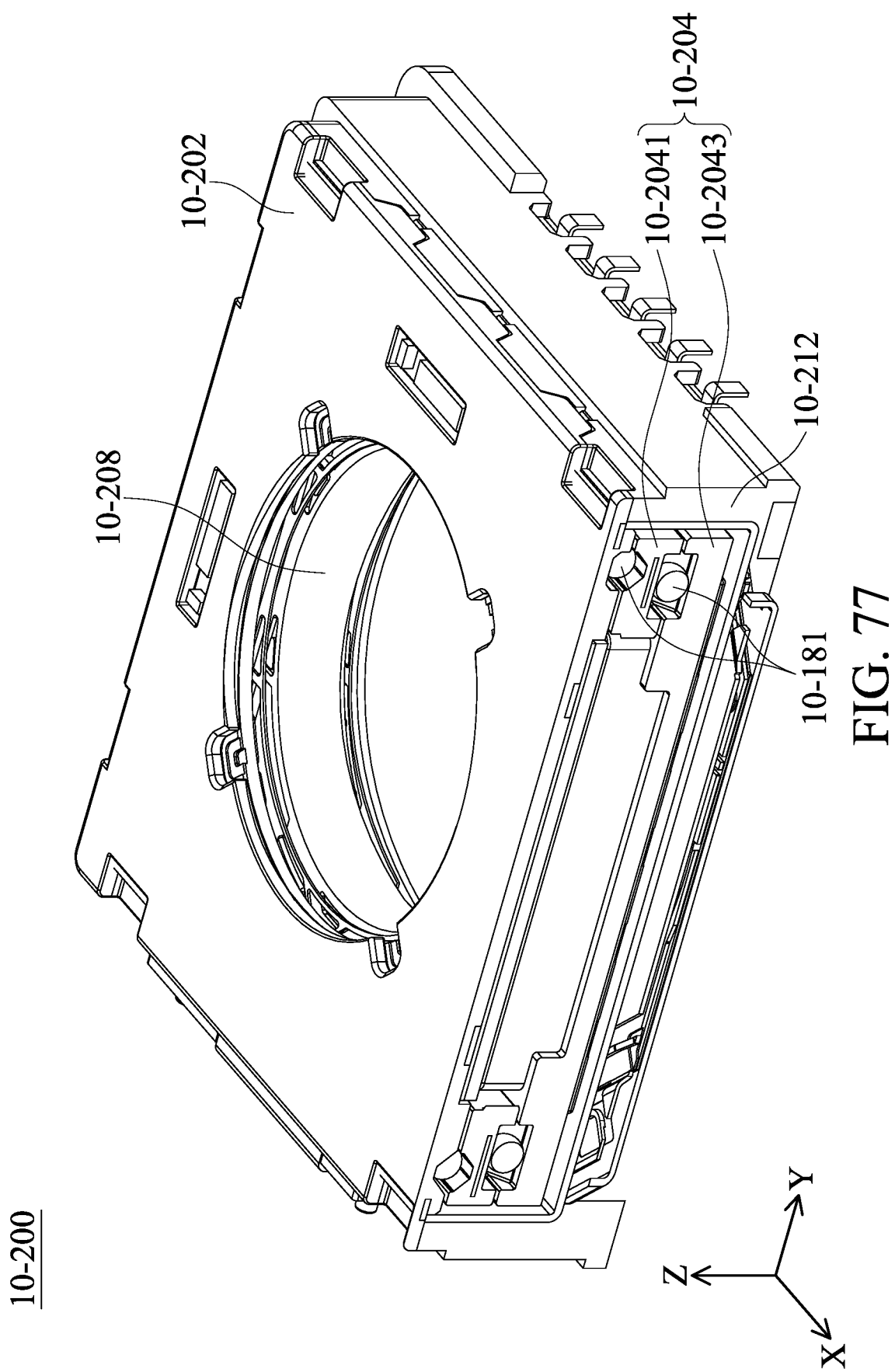
FIG. 77 is a perspective cross-sectional view of the movable module 10-200 according to an embodiment of the present disclosure.

Please refer to FIG. 77, which is a perspective cross-sectional view of the movable module 10-200 according to an embodiment of the present disclosure. In this embodiment, the frame 10-204 may include a first frame portion 10-2041 and a second frame portion 10-2043, a plurality of first intermediate elements 10-181 may be disposed between the casing 10-202 and the first frame portions 10-2041, and a plurality of first intermediate elements 10-181 may be disposed between the first frame portion 10-2041 and the second frame portion 10-2043.

Based on the configuration of the first intermediate elements 10-181, the first frame portion 10-2041 can drive the holder 10-208 to move along the X-axis relative to the casing 10-202, and the second frame portion 10-2043 can drive the holder 10-208 to move along the Y axis relative to the base 10-212 so as to achieve the function of optical image stabilization.

Please go back to FIG. 75. The fourth driving mechanism 10-DM4 of the optical system 10-50 may further include a third supporting assembly 10-190, and the second movable part 10-MT2 is movable relative to the base 10-212 through the third supporting assembly 10-190.

The third supporting assembly 10-190 includes a first connecting end 10-191, a second connecting end 10-192, and an elastic portion 10-194. The first connecting end 10-191 is fixedly connected to the base 10-212, the second connecting end 10-192 is fixedly connected to the second movable part 10-MT2, and the second connecting end 10-192 is movably connected to the first connecting end 10-191 through the elastic portion 10-194.

In addition, in this embodiment, the fourth driving mechanism 10-DM4 may include a first driving element 10-193, and the first driving element 10-193 may be made of shape memory alloys (SMA). Shape memory alloy (SMA) is an alloy that can eliminate the deformation in lower temperature by heating. When the shape memory alloy performs plastic deformation under its phase transition temperature, it may return to its original shape by heating. By controlling the temperature of the first driving element 10-193, the second movable part 10-MT2 can be moved relative to the base 10-212.

Figure 78:
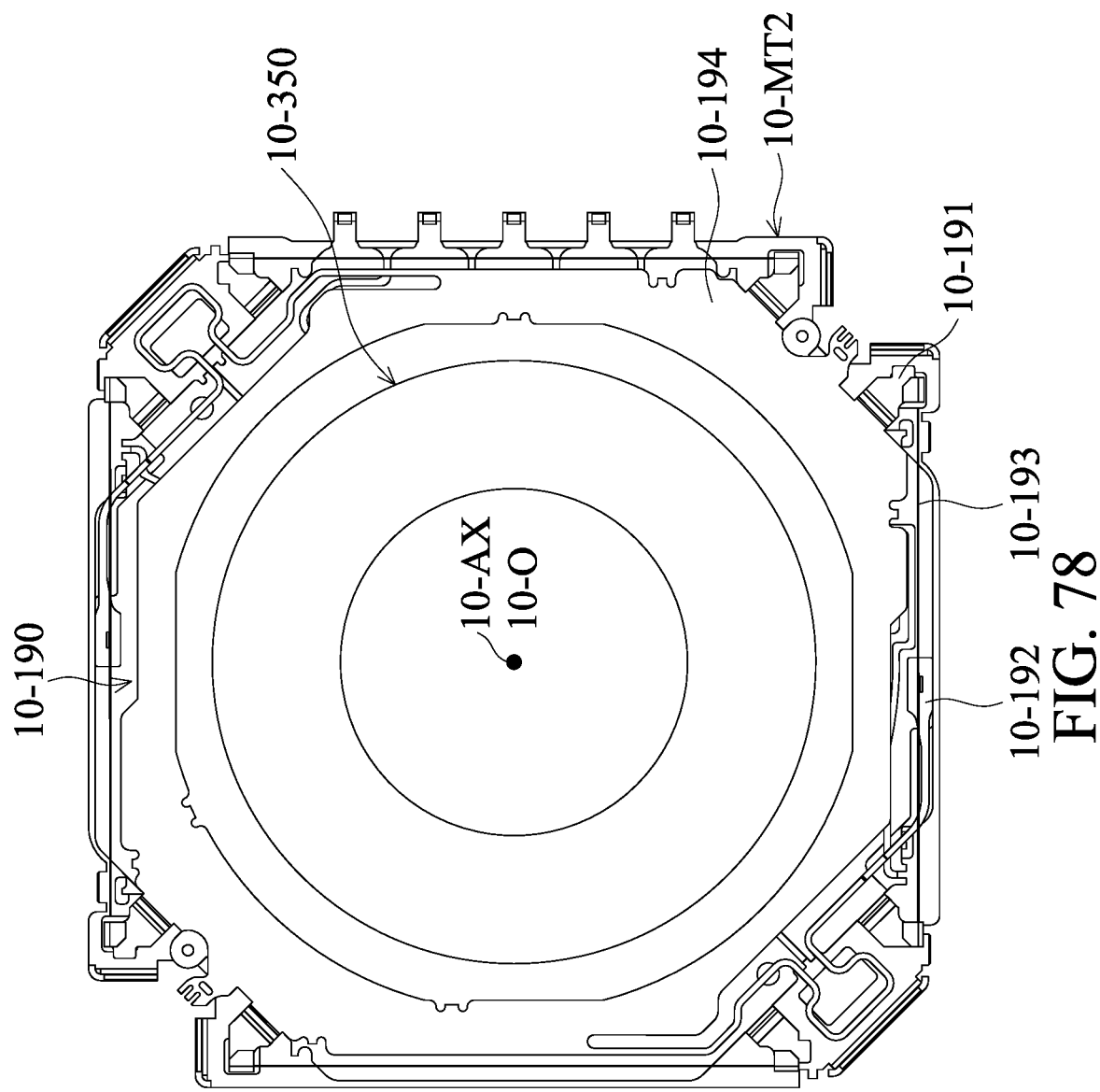
FIG. 78 is a top view of the third supporting assembly 10-190 and the second movable part 10-MT2 according to an embodiment of the present disclosure.

Please refer to FIG. 75 and FIG. 78 together. FIG. 78 is a top view of the third supporting assembly 10-190 and the second movable part 10-MT2 according to an embodiment of the present disclosure. The third supporting assembly 10-190 may have a plate-shaped structure, at least a part of the third supporting assembly 10-190 is parallel to the main body 10-150B, and the third supporting assembly 10-190 is not parallel to the main axis 10-AX. When viewed in the direction perpendicular to the main axis 10-AX, at least a part of the base 10-212 is located between the main body 10-150B and the third supporting assembly 10-190.

In this embodiment, the third supporting assembly 10-190 can be made of a conductive material, so that the first driving element 10-193 of the fourth driving mechanism 10-DM4 can be electrically connected to the external circuit through the third supporting assembly 10-190.

Figure 79:
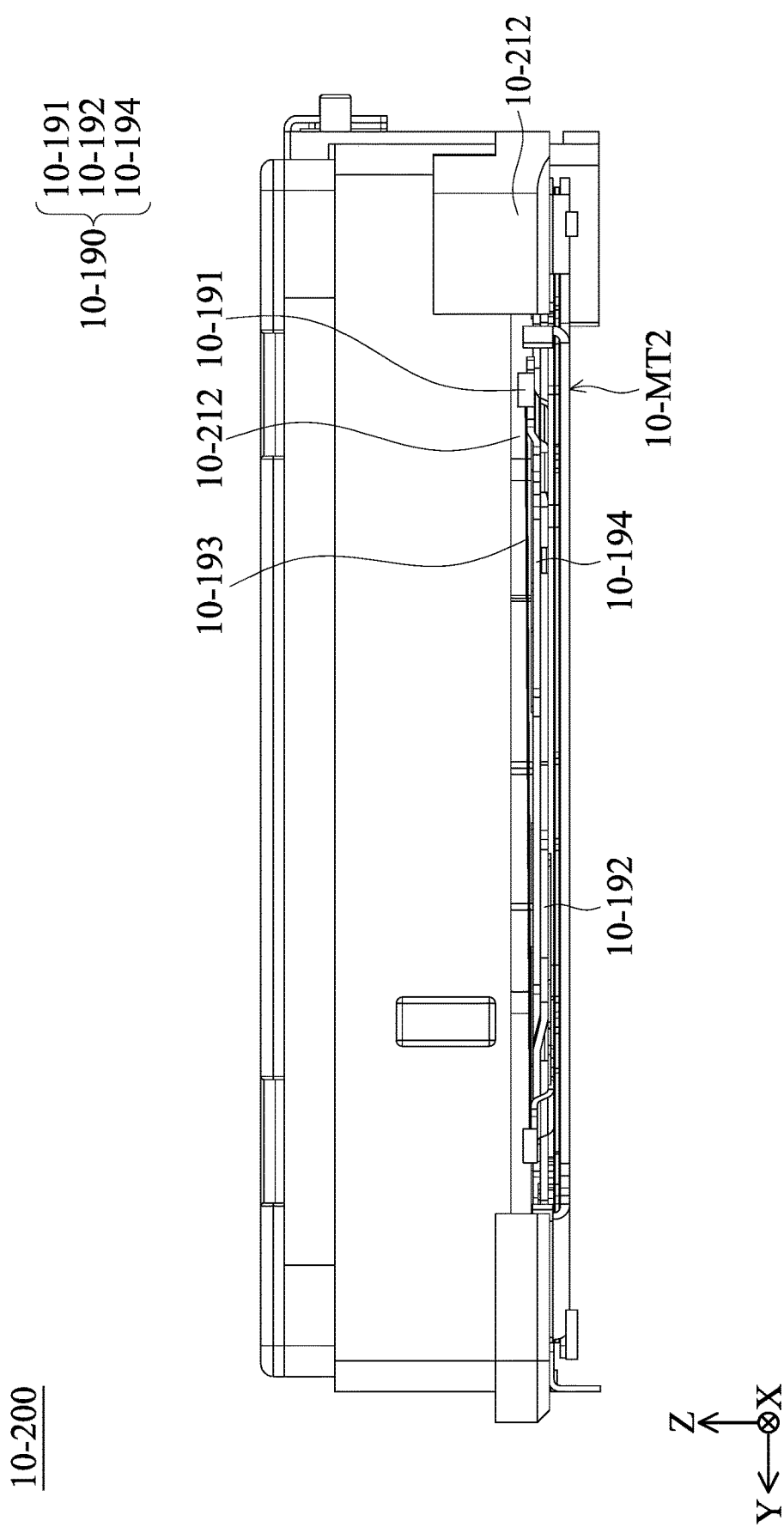
FIG. 79 is a side view of the movable module 10-200 according to an embodiment of the present disclosure.

Please refer to FIG. 75, FIG. 78 and FIG. 79 together. FIG. 79 is a side view of the movable module 10-200 according to an embodiment of the present disclosure. As shown in FIG. 75, when viewed along the main axis 10-AX, the third supporting assembly 10-190 overlaps at least a part of the first supporting assembly 10-150. When viewed along the main axis 10-AX, the third supporting assembly 10-190 does not overlap the first supporting portion 10-1501. When viewed along the main axis 10-AX, the third supporting assembly 10-190 does not overlap the second supporting portion 10-1503.

When viewed along the main axis 10-AX, the third supporting assembly 10-190 overlaps at least a part of the main body 10-150B. Furthermore, when viewed in a direction perpendicular to the main axis 10-AX (such as the Y-axis), the third supporting assembly 10-190 overlaps at least a part of the first supporting portion 10-1501.

When viewed in a direction perpendicular to the main axis 10-AX (such as the Y-axis), the third supporting assembly 10-190 overlaps at least a part of the second supporting portion 10-1503. When viewed in the direction perpendicular to the main axis 10-AX, the third supporting assembly 10-190 does not overlap the main body 10-150B.

As shown in FIG. 79, in the Z-axis, the third supporting assembly 10-190 is connected between the second movable part 10-MT2 and the base 10-212, and at least part of the third supporting assembly 10-190 is exposed from the base 10-212. This structural design can effectively use the space of the movable module 10-200, thereby achieving the effects of miniaturization.

Figure 80:
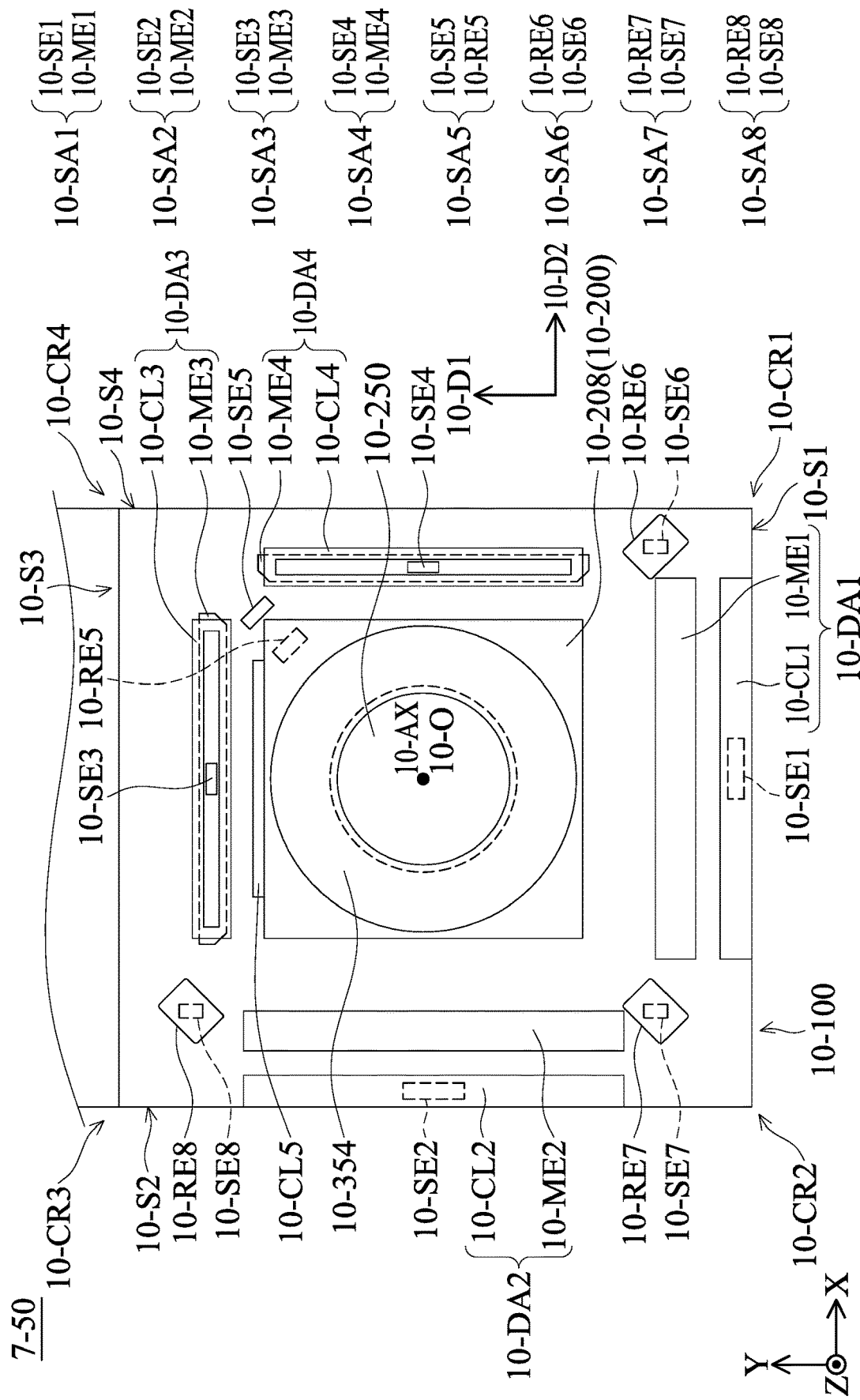
FIG. 80 is a top view of a part of the structure of the optical system 10-50 according to an embodiment of the present disclosure.

Please refer to FIG. 80, which is a top view of a part of the structure of the optical system 10-50 according to an embodiment of the present disclosure. The optical system 10-50 may further include a first position sensing mechanism configured to sense the movement of the movable module 10-200 relative to the fixed module 10-100. The first position sensing mechanism may include a first position sensing assembly 10-SA1 and a second position sensing assembly 10-SA2.

The first position sensing assembly 10-SA1 is configured to sense the movement of the movable module 10-200 relative to the fixed module 10-100 in the first dimension, and the second position sensing assembly 10-SA2 is configured to sense the movement of the movable module 10-200 relative to the fixed module 10-100 in the second dimension. The first position sensing assembly 10-SA1 may include a first position sensing element 10-SE1, and the second position sensing assembly 10-SA2 may include a second position sensing element 10-SE2.

When viewed along the main axis 10-AX, the first position sensing assembly 10-SA1 is located on the first side 10-S1. When viewed along the main axis 10-AX, the first position sensing assembly 10-SA1 overlaps at least a part of the first driving assembly 10-DA1. Specifically, when viewed along the main axis 10-AX, the first position sensing element 10-SE1 overlaps at least a part of the first coil 10-CL1.

The first position sensing element 10-SE1 of the first position sensing assembly 10-SA1 corresponds to the first magnetic element 10-ME1 and is configured to sense the change in the magnetic field of the first magnetic element 10-ME1, thereby sensing the movement of the movable module 10-200 relative to the fixed module 10-100 in the first dimension. When viewed along the main axis 10-AX, the first position sensing element 10-SE1 and the first magnetic element 10-ME1 do not overlap. In addition, the first magnetic element 10-ME1 may also be included in the first position sensing assembly 10-SA1.

Furthermore, when viewed along the main axis 10-AX, the second position sensing assembly 10-SA2 is located on the second side 10-S2. When viewed along the main axis 10-AX, the second position sensing assembly 10-SA2 overlaps at least a part of the second driving assembly 10-DA2. Specifically, the second position sensing element 10-SE2 overlaps at least a part of the second coil 10-CL2.

Similarly, the second position sensing element 10-SE2 of the second position sensing assembly 10-SA2 corresponds to the second magnetic element 10-ME2 and is configured to sense the change in the magnetic field of the second magnetic element 10-ME2. The magnetic element 10-ME2 can also be included in the second position sensing assembly 10-SA2.

The optical system 10-50 further includes a second position sensing mechanism configured to sense the movement of the first movable part 10-MT1 relative to the base 10-212. The second position sensing mechanism includes a third position sensing assembly 10-SA3 and a fourth position sensing assembly 10-SA4. The third position sensing assembly 10-SA3 is configured to sense the movement of the first movable part 10-MT1 relative to the base 10-212 in the third dimension, and the fourth position sensing assembly 10-SA4 is configured to sense the movement of the first movable part 10-MT1 relative to the base 10-212 in the fourth dimension.

As shown in FIG. 80, when viewed along the main axis 10-AX, the third position sensing assembly 10-SA3 is located on the third side 10-S3. When viewed along the main axis 10-AX, the third position sensing assembly 10-SA3 overlaps at least a part of the third driving assembly 10-DA3. The third position sensing assembly 10-SA3 includes a third position sensing element 10-SE3, which corresponds to the third magnetic element 10-ME3. The third position sensing element 10-SE3 is configured to sense changes in the magnetic field of the third magnetic element 10-ME3, and the third magnetic element 10-ME3 may also be included in the third position sensing assembly 10-SA3.

When viewed along the main axis 10-AX, the shortest distance between the third position sensing assembly 10-SA3 and the center (for example, the optical axis 10-0) of the first optical element 10-250 is different from the shortest distance between the first position sensing assembly 10-SA1 and the center of the first optical element 10-250. For example, when viewed along the main axis 10-AX, the shortest distance between the third position sensing assembly 10-SA3 and the center of the first optical element 10-250 is less than the shortest distance between the first position sensing assembly 10-SA1 and the center of the first optical element 10-250.

When viewed along the main axis 10-AX, the third position sensing element 10-SE3 and the third coil 10-CL3 do not overlap, but it is not limited thereto. In other embodiments, the third position sensing element 10-SE3 may overlap the third coil 10-CL3. When viewed along the main axis 10-AX, the third position sensing element 10-SE3 overlaps at least a part of the third magnetic element 10-ME3. The third magnetic element 10-ME3 can also be included in the third position sensing assembly 10-SA3.

Similarly, when viewed along the main axis 10-AX, the fourth position sensing assembly 10-SA4 is located on the fourth side 10-S4. When viewed along the main axis 10-AX, the fourth position sensing assembly 10-SA4 overlaps at least apart of the fourth driving assembly 10-DA4. The fourth position sensing assembly 10-SA4 includes a fourth position sensing element 10-SE4, which corresponds to the fourth magnetic element 10-ME4. The fourth position sensing element 10-SE4 is configured to sense the changes in the magnetic field of the fourth magnetic element 10-ME4, and the fourth magnetic element 10-ME4 may also be included in the fourth position sensing assembly 10-SA4.

Figure 81:
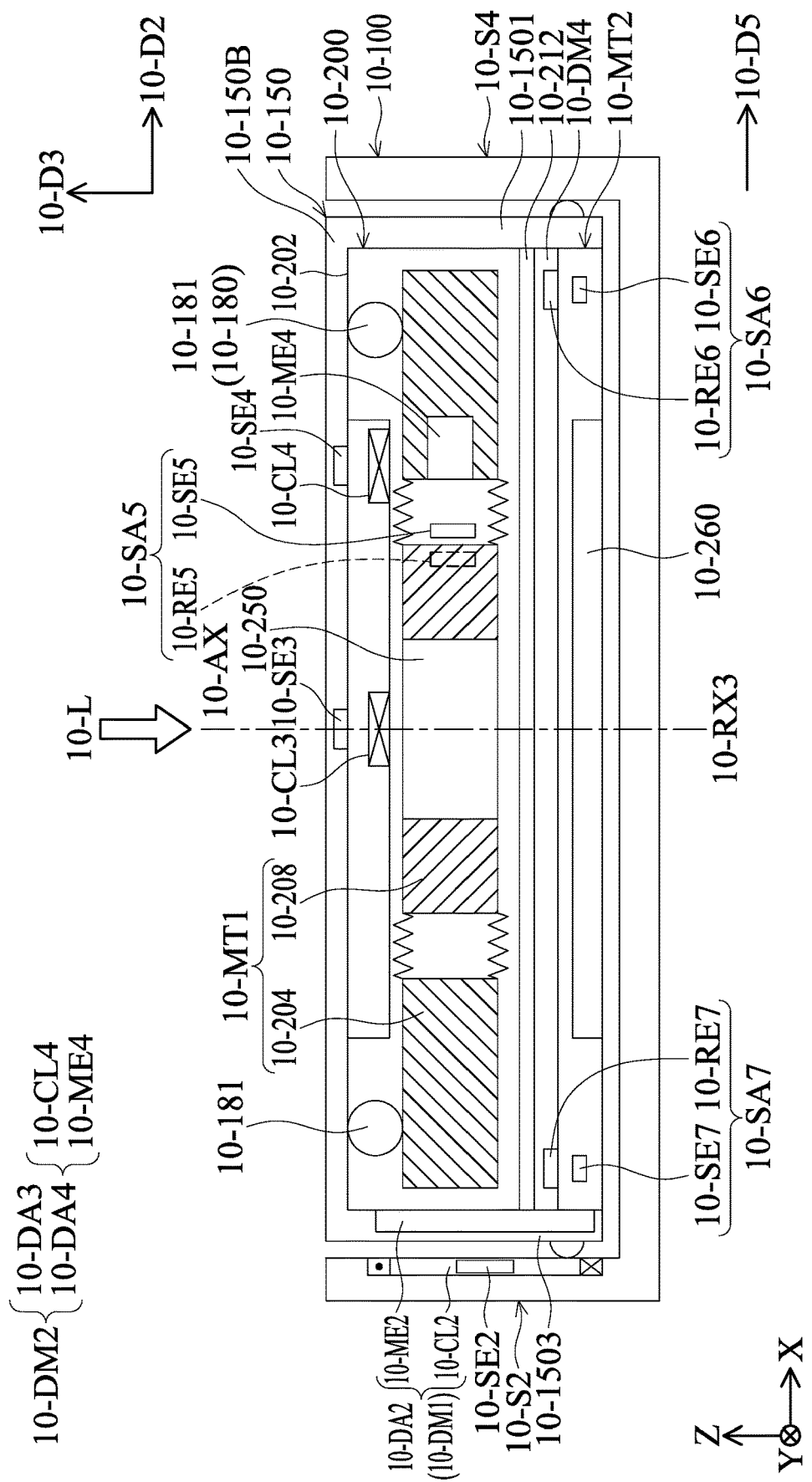
FIG. 81 is a cross-sectional view of the optical system 10-50 along the Y-axis according to an embodiment of the present disclosure.

Please refer to FIG. 80 and FIG. 81 together. FIG. 81 is a schematic cross-sectional view of the optical system 10-50 along the Y-axis according to an embodiment of the present disclosure. When viewed along the main axis 10-AX, the second position sensing mechanism and the first position sensing mechanism do not overlap. In addition, when viewed along the main axis 10-AX, as shown in FIG. 81, the second position sensing mechanism overlaps at least a part of the first position sensing mechanism. For example, the fourth magnetic element 10-ME4 of the fourth position sensing assembly 10-SA4 overlaps the second magnetic element 10-ME2 of the second position sensing assembly 10-SA2.

The optical system 10-50 may further include a third position sensing mechanism configured to sense the movement of the holder 10-208 relative to the frame 10-204. The third position sensing mechanism may include a fifth position sensing assembly 10-SA5 configured to sense the movement of the holder 10-208 relative to the frame 10-204 in the fifth dimension.

When viewed along the main axis 10-AX, the fifth position sensing assembly 10-SA5 is located at a corner of the optical system 10-50. Specifically, when viewed along the main axis 10-AX, the fifth position sensing assembly 10-SA5 is located at the fourth corner 10-CR4 of the optical system 10-50. Specifically, the fifth position sensing assembly 10-SA5 includes a fifth position sensing element 10-SE5 and a fifth reference element 10-RE5, which are disposed at the fourth corner 10-CR4.

When viewed along the main axis 10-AX, the fifth position sensing assembly 10-SA5 and the fifth driving assembly 10-DA5 do not overlap. When viewed along the main axis 10-AX, the fifth position sensing element 10-SE5 of the fifth position sensing assembly 10-SA5 does not overlap the fifth coil 10-CL5 of the fifth driving assembly 10-DA5.

As shown in FIG. 80, when viewed along the main axis 10-AX, the third position sensing mechanism does not overlap the first position sensing mechanism, and when viewed along the main axis 10-AX, the third position sensing mechanism does not overlap the second position sensing mechanism.

As shown in FIG. 81, when viewed along a direction perpendicular to the main axis 10-AX, the third position sensing mechanism overlaps at least a part of the first position sensing mechanism. For example, the fifth position sensing assembly 10-SA5 of the third position sensing mechanism overlaps the second position sensing element 10-SE2 in the X direction. Furthermore, when viewed in a direction perpendicular to the main axis 10-AX, the third position sensing mechanism overlaps at least a part of the second position sensing mechanism. For example, the fifth position sensing assembly 10-SA5 of the third position sensing mechanism overlaps the fourth magnetic element 10-ME4 in the X direction.

In this embodiment, the optical system 10-50 may further include a fourth position sensing mechanism configured to sense the movement of the second movable part 10-MT2 relative to the base 10-212. The fourth position sensing mechanism includes a sixth position sensing assembly 10-SA6, a seventh position sensing assembly 10-SA7, and an eighth position sensing assembly 10-SA8. The sixth position sensing assembly 10-SA6 and the seventh position sensing assembly 10-SA7 are configured to sense the movement of the second movable part 10-MT2 in the sixth dimension and/or the seventh dimension, and the eighth position sensing assembly 10-SA8 is configured to sense the movement of the second movable part 10-MT2 in the eighth dimension.

The sixth position sensing assembly 10-SA6 has a sixth reference element 10-RE6 and a sixth position sensing element 10-SE6, and the seventh position sensing assembly 10-SA7 has a seventh reference element 10-RE7 and a seventh position sensing element 10-SE7. The eighth position sensing assembly 10-SA8 has an eighth reference element 10-RE8 and an eighth position sensing element 10-SE8. The sixth reference element 10-RE6, the seventh reference element 10-RE7, and the eighth reference element 10-RE8 may be reference magnets, for example.

As shown in FIG. 80, when viewed along the main axis 10-AX, the fourth position sensing mechanism and the first position sensing mechanism do not overlap. When viewed along the main axis 10-AX, the fourth position sensing mechanism and the second position sensing mechanism do not overlap. When viewed along the main axis 10-AX, the fourth position sensing mechanism and the third position sensing mechanism do not overlap.

In addition, as shown in FIG. 81, when viewed in a direction perpendicular to the main axis 10-AX, the fourth position sensing mechanism overlaps at least a part of the first position sensing mechanism. For example, the seventh position sensing assembly 10-SA7 overlaps the second driving assembly 10-DA2 in the X-axis.

When viewed in a direction perpendicular to the main axis 10-AX, the fourth position sensing mechanism and the second position sensing mechanism do not overlap. For example, the seventh position sensing assembly 10-SA7 does not overlap the fourth position sensing element 10-SE4 in the X-axis. When viewed in the direction perpendicular to the main axis 10-AX, the fourth position sensing mechanism and the third position sensing mechanism do not overlap. For example, the seventh position sensing assembly 10-SA7 does not overlap the fifth position sensing assembly 10-SA5 in the X-axis.

In this embodiment, the sixth position sensing element 10-SE6 is configured to sense a sixth magnetic field generated by the sixth reference element 10-RE6, and when viewed along the main axis 10-AX, the sixth position sensing element 10-SE6 is located at the first corner 10-CR1. The seventh position sensing element 10-SE7 is configured to sense a seventh magnetic field generated by the seventh reference element 10-RE7, and when viewed along the main axis 10-AX, the seventh position sensing element 10-SE7 is located in the second corner 10-CR2. The eighth position sensing element 10-SE8 is configured to sense an eighth magnetic field generated by the eighth reference element 10-RE8, and when viewed along the main axis 10-AX, the eighth position sensing element 10-SE8 is located at the third corner 10-CR3.

Figure 82:
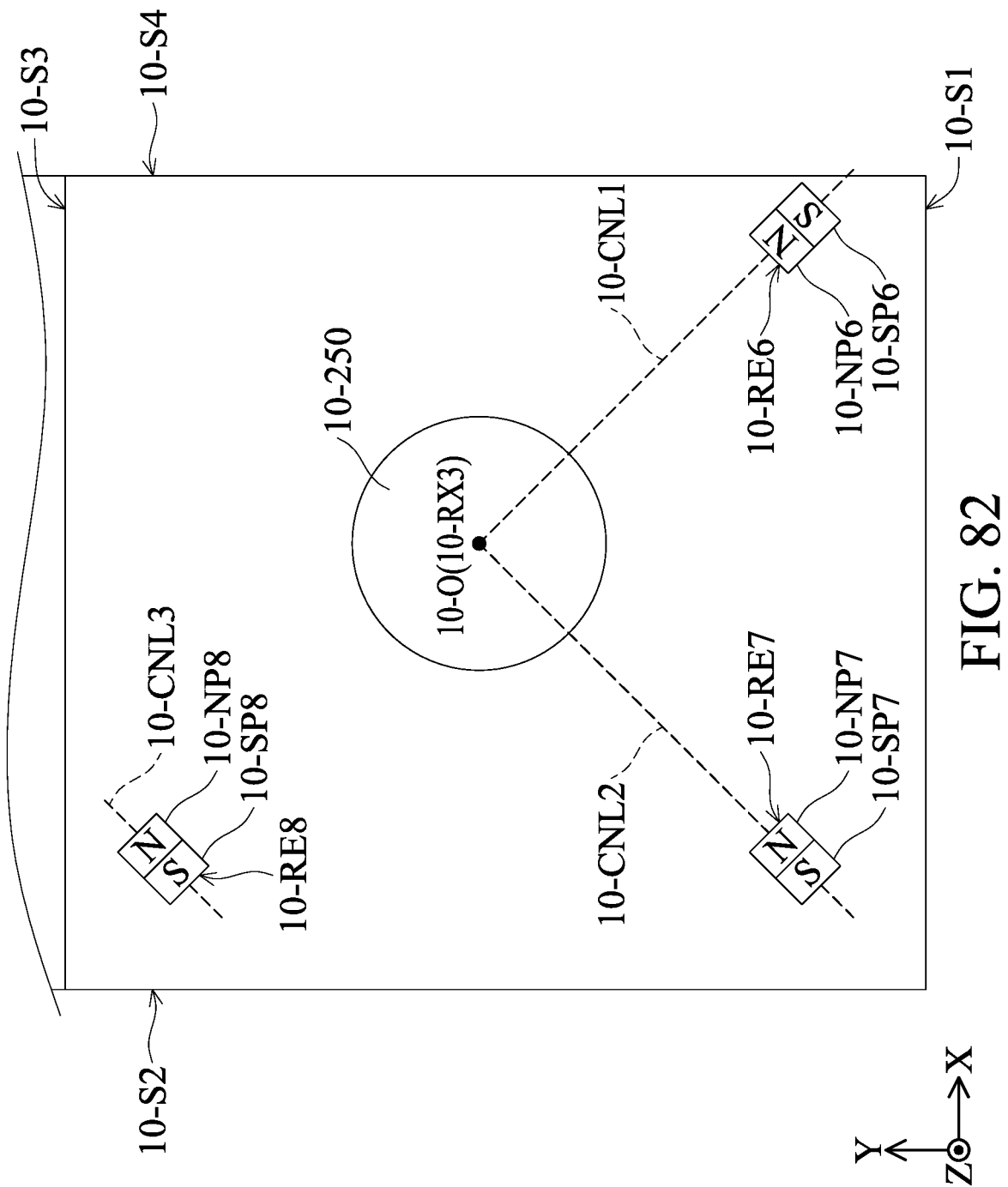
FIG. 82 is a top view of the fourth position sensing mechanism and the first optical element 10-250 according to an embodiment of the present disclosure.

Please refer to FIG. 82, which is a top view of the fourth position sensing mechanism and the first optical element 10-250 according to an embodiment of the present disclosure. A center of a sixth north pole 10-NP6 of the sixth reference element 10-RE6 and a center of a sixth south pole 10-SP6 of the sixth reference element 10-RE6 form a first connection line 10-CNL1. A center of a seventh north pole 10-NP7 of the seventh reference element 10-RE7 and a center of a seventh south pole 10-SP7 of the seventh reference element 10-RE7 form a second connection line 10-CNL. A center of an eighth north pole 10-NP8 of the eighth reference element 10-RE8 and a center of an eighth south pole 10-SP8 of the eighth reference element 10-RE8 form a third connection line 10-CNL3.

When viewed along the main axis 10-AX, at least one of the first connection line 10-CNL1, the second connection line 10-CNL2 and the third connection line 10-CNL3 does not pass the third rotating axis 10-RX3. When viewed along the main axis 10-AX, at least two of the first connection line 10-CNL1, the second connection line 10-CNL2 and the third connection line 10-CNL3 pass through the third rotating axis 10-RX3.

When viewed along the main axis 10-AX, the first connection line 10-CNL1 is not parallel to the first side 10-S1. When viewed along the main axis 10-AX, the first connection line 10-CNL1 is not perpendicular to the first side 10-S1. When viewed along the main axis 10-AX, the first connection line 10-CNL1 and the second connection line 10-CNL2 are not parallel. When viewed along the main axis 10-AX, the first connection line 10-CNL1 is perpendicular to the second connection line 10-CNL2. When viewed along the main axis 10-AX, the second connection line 10-CNL2 is parallel to the third connection line 10-CNL3.

Figure 83:
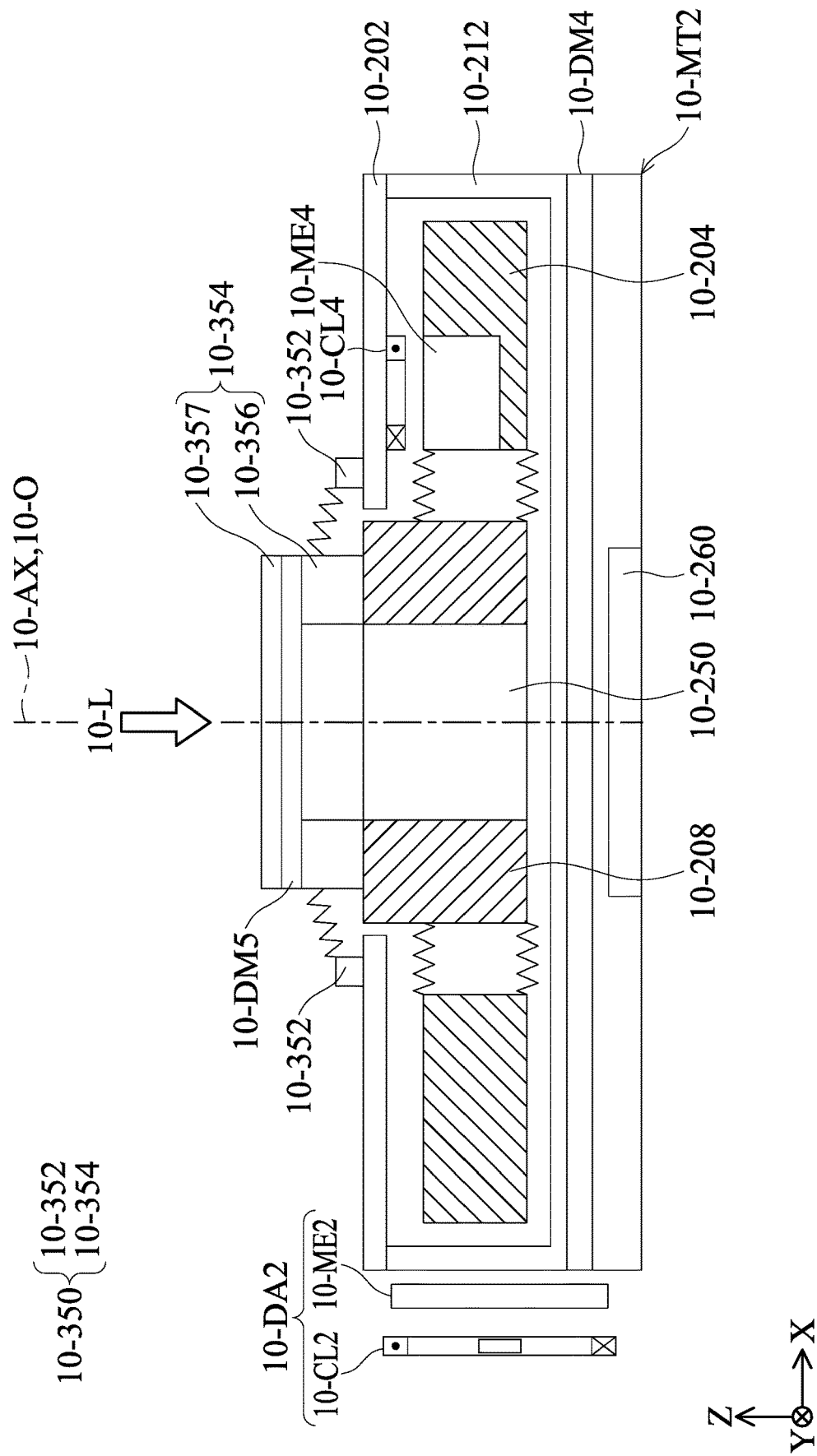
FIG. 83 is a cross-sectional view of a part of the structure of the optical system 10-50 along the Y-axis according to an embodiment of the present disclosure.

Please refer to FIG. 83, which is a cross-sectional view of a part of the structure of the optical system 10-50 viewed along the Y-axis according to an embodiment of the present disclosure. The movable module 10-200 may further include a light control assembly 10-350 configured to control the total amount of light 10-L entering the first optical element 10-250 or the second optical element 10-260.

The light control assembly 10-350 includes a pedal 10-352 and a light control element 10-354. The pedestal 10-352 is fixedly connected to the casing 10-202 of the movable module 10-200, and the casing 10-202 is connected to the base 10-212. The light control element 10-354 is movable relative to the pedal 10-352 and is configured to control the total amount of the light 10-L entering the first optical element 10-250 or the second optical element 10-260.

The light control element 10-354 includes a platform 10-356 and at least one shading blade 10-357, and the shading blades 10-357 are movable relative to the platform 10-356. It is worth noting that platform 10-356 is fixedly connected to the holder 10-208, and the platform 10-356 cannot move relative to the holder 10-208.

In this embodiment, the optical system 10-50 may further include a fifth driving mechanism 10-DM5 configured to drive the shading blades 10-357 to move relative to the platform 10-356, so as to adjust to the amount of light entering the first optical element 10-250.

As shown in FIG. 80 and FIG. 83, when viewed along the main axis 10-AX, the fifth driving mechanism 10-DM5 and the first driving mechanism 10-DM1 do not overlap. When viewed along the main axis 10-AX, the fifth driving mechanism 10-DM5 and the second driving mechanism 10-DM2 do not overlap. When viewed along the main axis 10-AX, the fifth driving mechanism 10-DM5 and the third driving mechanism 10-DM3 do not overlap.

For example, the fifth driving mechanism 10-DM5 and the light control element 10-354 do not overlap the fifth coil 10-CL5, but it is not limited thereto. In other embodiments, the fifth driving mechanism 10-DM5 may overlap a part of the fifth coil 10-CL5. In addition, as shown in FIG. 78, when viewed along the main axis 10-AX, the fifth driving mechanism 10-DM5 and the fourth driving mechanism 10-DM4 do not overlap.

As shown in FIG. 83, when viewed along the direction perpendicular to the main axis 10-AX, the fifth driving mechanism 10-DM5 and the first driving mechanism 10-DM1 do not overlap. When viewed along the direction perpendicular to the main axis 10-AX, the fifth driving mechanism 10-DM5 and the second driving mechanism 10-DM2 do not overlap. When viewed along the direction perpendicular to the main axis 10-AX, the fifth driving mechanism 10-DM5 and the third driving mechanism 10-DM3 do not overlap. When viewed along the direction perpendicular to the main axis 10-AX, the fifth driving mechanism 10-DM5 and the fourth driving mechanism 10-DM4 do not overlap. That is, the height of the fifth driving mechanism 10-DM5 in the Z-axis is different from the height of other driving mechanisms in the Z-axis.

Figure 84:
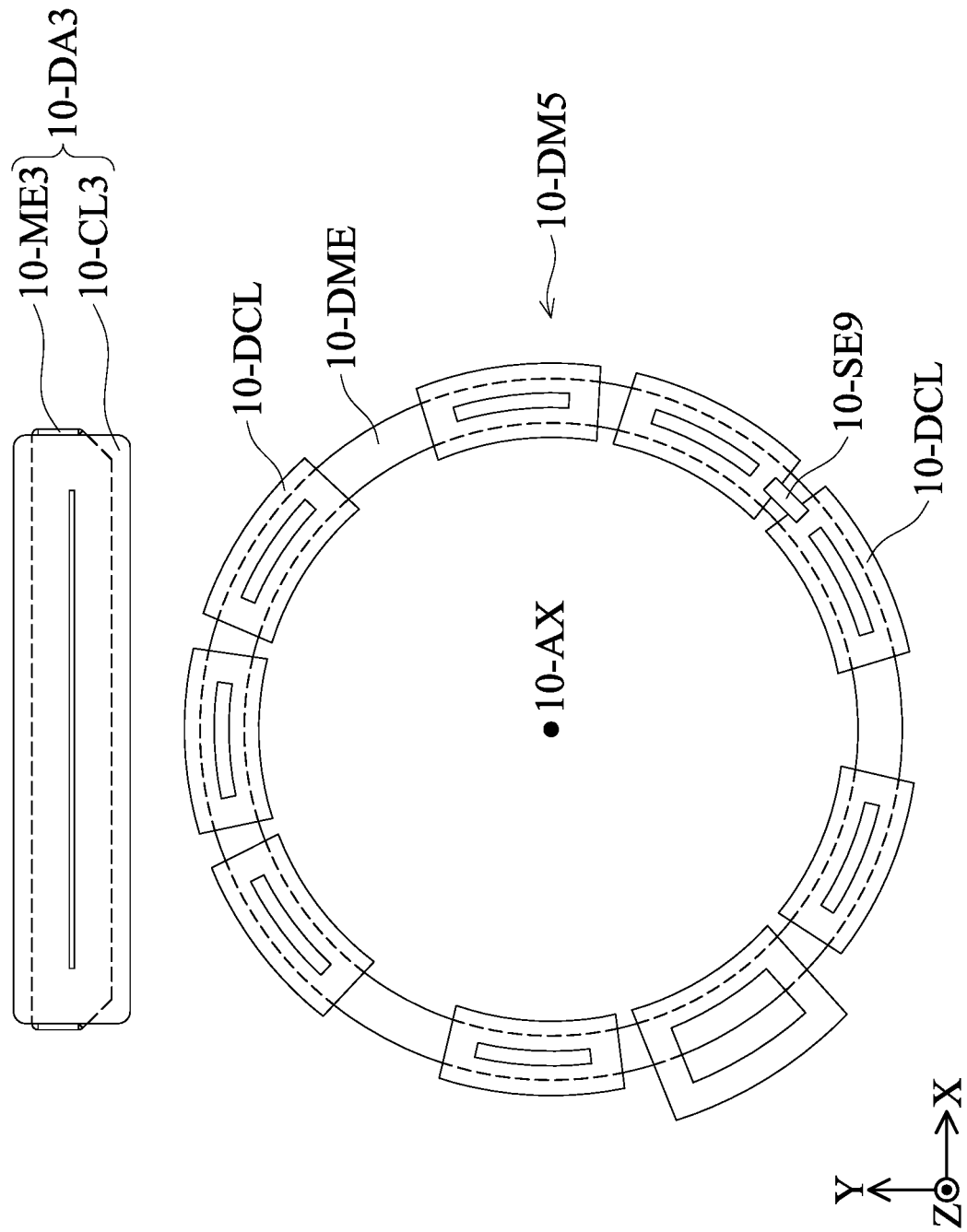
FIG. 84 is atop view of the fifth driving mechanism 10-DM5 and the third driving assembly 10-DA3 according to an embodiment of the present disclosure.

Please refer to FIG. 84, which is a top view of the fifth driving mechanism 10-DM5 and the third driving assembly 10-DA3 according to an embodiment of the present disclosure. In this embodiment, the fifth driving mechanism 10-DM5 may include a driving magnet 10-DME and a plurality of driving coils 10-DCL. The driving magnet 10-DME can act with the driving coils 10-DCL to generate an electromagnetic driving force to drive the shading blades 10-357 to move.

Furthermore, the optical system 10-50 may further include a fifth position sensing mechanism configured to sense the movement of the shading blades 10-357 relative to the platform 10-356. For example, the fifth position sensing mechanism may include a ninth position sensing element 10-SE9 configured to sense changes in the magnetic field of the fifth driving mechanism 10-DM5. When viewed along the main axis 10-AX, the ninth position sensing element 10-SE9 and the third driving assembly 10-DA3 do not overlap. Therefore, miniaturization and reduction of magnetic interference can be achieved.

The present disclosure provides an optical system 10-50, and based on the structural configuration of the first driving mechanism 10-DM1 to the fourth driving mechanism 10-DM4, movement in multiple dimensions can be achieved. Furthermore, based on the configuration of the first position sensing mechanism to the fifth position sensing mechanism, the position in multiple dimensions can be accurately sensed so as to achieve the effect of precise optical compensation.

In summary, an optical element driving mechanism is provided. The optical element driving mechanism is disposed on an electronic apparatus. The optical element driving mechanism includes a first movable portion, a fixed portion, a first driving assembly, a circuit assembly, and a first position sensing assembly. The first movable portion is used for connecting to a first optical element. The first optical element is used for corresponding to light. The first movable portion is movable relative to the fixed portion. The first driving assembly is used for driving the first movable portion to move relative to the fixed portion. The circuit assembly is used for electrically connected to the electronic apparatus. The first position sensing assembly is used for detecting the movement of the first movable portion relative to the fixed portion. The design of present disclosure may allow the optical element to move in different directions to enhance the performance of the optical module, and may achieve miniaturization.

The relative positions and size relationship of the elements in the present disclosure may allow the optical system achieving miniaturization in specific directions or for the entire mechanism. Moreover, different optical modules may be combined with the optical system to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism used for disposing on an electronic apparatus, comprising:
    a first movable portion used for connecting to a first optical element, wherein the first optical element is used for corresponding to a light;
    a fixed portion, wherein the first movable portion is movable relative to the fixed portion;
    a first driving assembly used for driving the first movable portion to move relative to the fixed portion; and
    a circuit assembly used for electrically connecting to the electronic apparatus; and
    a first position sensing assembly used for detecting the movement of the first movable portion relative to the fixed portion, comprising:
        a first sensing element, comprising a first reference magnetic unit and a first magnetic sensing unit;
        a second sensing element, comprising a second reference magnetic unit and a second magnetic sensing unit; and
        a third sensing element, comprising a third reference magnetic unit and a third magnetic sensing unit;
    wherein:
    the fixed portion comprises a main axis passing through a reference point of the movable portion;
    the first reference magnetic unit comprises a first north pole and a first south pole, the first north pole and the first south pole are arranged in a first direction when viewed along the main axis;
    the second reference magnetic unit comprises a second north pole and a second south pole, the second north pole and the second south pole are arranged in a second direction when viewed along the main axis;
    the third reference magnetic unit comprises a third north pole and a third south pole, the third north pole and the third south pole are arranged in a third direction when viewed along the main axis;
    at least one of the first direction, the second direction, and the third direction is different from other two of the first direction, the second direction, and the third direction.

2. The optical element driving mechanism as claimed in claim 1, wherein:
    at least two of the first direction, the second direction, and the third direction are parallel;
    at least two of the first direction, the second direction, and the third direction are perpendicular;
    when viewed along the main axis, at least a portion of the first magnetic sensing unit overlays the first reference magnetic unit.

3. The optical element driving mechanism as claimed in claim 2, wherein:
    the second magnetic sensing unit is used for detecting the magnetic field strength in a direction that is parallel to the main axis;
    at least a portion of the second magnetic sensing unit overlaps the second reference magnetic unit when viewed along the main axis.

4. The optical element driving mechanism as claimed in claim 3, wherein:
- the third magnetic sensing unit is used for detecting the magnetic field strength in a direction that is parallel to the main axis;
- at least a portion of the third magnetic sensing unit overlaps the third reference magnetic unit when viewed along the main axis.

5. The optical element driving mechanism as claimed in claim 4, wherein:
- when viewed along the main axis, the first reference magnetic unit is strip-shaped and extends in a fourth direction;
- when viewed along the main axis, the second reference magnetic unit is strip-shaped and extends in a fifth direction;
- when viewed along the main axis, the third reference magnetic unit is strip-shaped and extends in a sixth direction.

6. The optical element driving mechanism as claimed in claim 5, wherein:
- at least one of the fourth direction, the fifth direction, and the sixth direction is different from other two of the fourth direction, the fifth direction, and the sixth direction;
- at least two of the fourth direction, the fifth direction, and the sixth direction are parallel;
- the first direction and the fourth direction are not parallel.

7. The optical element driving mechanism as claimed in claim 6, wherein:
- the fourth direction is perpendicular to the first direction;
- when viewed along the main axis, the first magnetic detecting unit is strip-shaped and extends in a seventh direction.

8. The optical element driving mechanism as claimed in claim 7, wherein:
- when viewed along the main axis, the second magnetic detecting unit is strip-shaped and extends in an eighth direction;
- when viewed along the main axis, the third magnetic detecting unit is strip-shaped and extends in a ninth direction.

9. The optical element driving mechanism as claimed in claim 8, wherein:
- at least one of the seventh direction, the eighth direction, and the ninth direction is different from other two of the seventh direction, the eighth direction, and the ninth direction;
- at least two of the seventh direction, the eighth direction, and the ninth direction are parallel.

10. The optical element driving mechanism as claimed in claim 9, wherein:
- the seventh direction and the first direction are not parallel;
- the seventh direction and the first direction are not perpendicular;
- the seventh direction and the fourth direction are not parallel;
- the seventh direction and the fourth direction are not perpendicular.

11. The optical element driving mechanism as claimed in claim 10, wherein:
- when viewed along the main axis, the fixed portion comprises a first side, a second side, a third side, and a fourth side;
- the first side and the third side are parallel;
- the second side and the fourth side are parallel;
- the second side is between the first side and the third side;
- the first side and the second side extend in different directions.

12. The optical element driving mechanism as claimed in claim 11, wherein:
- when viewed along the main axis, the first magnetic sensing unit is at a first corner that is formed by the first side and the fourth side;
- when viewed along the main axis, the second magnetic sensing unit is at a second corner that is formed by the first side and the second side;
- when viewed along the main axis, the third magnetic sensing unit is at a third corner that is formed by the second side and the third side.

13. The optical element driving mechanism as claimed in claim 12, wherein:
- when viewed along the main axis, the first optical element does not overlap the first position sensing assembly;
- in a direction that is perpendicular to the main axis, at least a portion of the first optical element overlaps the first position sensing assembly.

14. The optical element driving mechanism as claimed in claim 13, wherein:
- when viewed along the main axis, the first direction is not parallel to the first side;
- when viewed along the main axis, the first direction is not perpendicular to the first side.

15. The optical element driving mechanism as claimed in claim 14, wherein:
- when viewed along the main axis, at least one of a connection of the first north pole and the first south pole, a connection of the second north pole and the second south pole, and a connection of the third north pole and the third south pole does pass through a center of the first optical element;
- the first position sensing assembly is used for detecting the movement of the first movable portion relative to the fixed portion in directions that are perpendicular to the main axis;
- the first position sensing assembly is used for detecting a rotation of the first movable portion relative to the fixed portion with a first rotation axis that is parallel to the main axis.

16. The optical element driving mechanism as claimed in claim 15, wherein when viewed along the main axis, two of the connection of the first north pole and the first south pole, the connection of the second north pole and the second south pole, and the connection of the third north pole and the third south pole pass through the center of the first optical element.

17. The optical element driving mechanism as claimed in claim 15, wherein when viewed along the main axis, at least three of the connection of the first north pole and the first south pole, the connection of the second north pole and the second south pole, and the connection of the third north pole and the third south pole pass through the center of the first optical element.

18. The optical element driving mechanism as claimed in claim 17, further comprises a second optical assembly, the second optical assembly comprises:
- a second movable portion used for holding a second optical element; and
- a second driving assembly used for driving the second movable portion to move relative to the first movable portion.

19. The optical element driving mechanism as claimed in claim 18, wherein:

the second driving assembly is used for driving the second movable portion to move relative to the first movable portion along an optical axis of the first optical element, and the optical axis and the main axis are parallel;

the second driving assembly is used for generating a driving force with the first reference magnetic unit to drive the second movable portion moving relative to the first movable portion.

\* \* \* \* \*